(12) United States Patent
Terre et al.

(10) Patent No.: US 12,094,070 B2
(45) Date of Patent: Sep. 17, 2024

(54) COORDINATING CURSOR MOVEMENT BETWEEN A PHYSICAL SURFACE AND A VIRTUAL SURFACE

(71) Applicant: MULTINARITY LTD., Tel Aviv (IL)

(72) Inventors: Doron Assayas Terre, Holon (IL); Tamir Berliner, Tel Aviv (IL); Tomer Kahan, Ramat Hasharon (IL)

(73) Assignee: SIGHTFUL COMPUTERS LTD, Tel Aviv (IL)

( * ) Notice: Subject to any disclaimer, the term of this patent is extended or adjusted under 35 U.S.C. 154(b) by 0 days.

(21) Appl. No.: 18/313,055

(22) Filed: May 5, 2023

(65) Prior Publication Data

US 2023/0274512 A1 Aug. 31, 2023

Related U.S. Application Data

(63) Continuation of application No. 17/947,039, filed on Sep. 16, 2022, now abandoned, which is a
(Continued)

(51) Int. Cl.
*G06T 19/00* (2011.01)
*G02B 27/01* (2006.01)
(Continued)

(52) U.S. Cl.
CPC ........ *G06T 19/006* (2013.01); *G02B 27/0101* (2013.01); *G02B 27/017* (2013.01);
(Continued)

(58) Field of Classification Search
CPC . G06T 19/006; G06F 3/04812; G06F 3/0354; G06F 3/04815
(Continued)

(56) References Cited

U.S. PATENT DOCUMENTS

| | | |
|---|---|---|
| 5,168,531 A | 12/1992 | Sigel |
| 5,977,935 A | 11/1999 | Yasukawa et al. |

(Continued)

FOREIGN PATENT DOCUMENTS

| | | |
|---|---|---|
| CN | 110442245 | 11/2019 |
| CN | 110832441 | 2/2020 |

(Continued)

OTHER PUBLICATIONS

Abdul Waheed Khan et al. "VGDRA: A Virtual Grid-Based Dynamic Routes Adjustment Scheme for Mobile Sink-Based Wireless Sensor Networks." IEEE Sensors Journal 15.1, pp. 526-534. (Year: 2015).
(Continued)

*Primary Examiner* — Thomas J Lett
(74) *Attorney, Agent, or Firm* — FINNEGAN, HENDERSON, FARABOW, GARRETT & DUNNER LLP

(57) ABSTRACT

Methods, systems, apparatuses, and computer-readable media are provided for moving a virtual cursor along two traversing virtual planes. In one implementation, the computer-readable medium includes instructions to cause a processor to generate, via a wearable extended reality appliance, a display including a virtual cursor and virtual objects located on a first virtual plane that traverses a second virtual plane overlying a physical surface; receive a first two-dimensional input reflective of an intent to select a first virtual object located on the first virtual plane; cause a first cursor movement, toward the first virtual object, along the first virtual plane; receive a second two-dimensional input reflective of an intent to select a second virtual object appearing on the physical surface; and cause a second cursor movement, toward the second virtual object, including a partial movement along the first virtual plane and a partial movement along the second virtual plane.

21 Claims, 61 Drawing Sheets

Related U.S. Application Data continuation of application No. 17/711,299, filed on Apr. 1, 2022, now Pat. No. 11,475,650, which is a continuation of application No. PCT/US2022/015548, filed on Feb. 8, 2022.

(60) Provisional application No. 63/307,203, filed on Feb. 7, 2022, provisional application No. 63/307,207, filed on Feb. 7, 2022, provisional application No. 63/307,217, filed on Feb. 7, 2022, provisional application No. 63/300,005, filed on Jan. 16, 2022, provisional application No. 63/226,977, filed on Jul. 29, 2021, provisional application No. 63/216,335, filed on Jun. 29, 2021, provisional application No. 63/215,500, filed on Jun. 27, 2021, provisional application No. 63/213,019, filed on Jun. 21, 2021, provisional application No. 63/173,095, filed on Apr. 9, 2021, provisional application No. 63/157,768, filed on Mar. 7, 2021, provisional application No. 63/147,051, filed on Feb. 8, 2021.

(51) Int. Cl.
*G06F 3/01* (2006.01)
*G06F 3/033* (2013.01)
*G06F 3/041* (2006.01)
*G06F 3/04812* (2022.01)
*G06F 3/04815* (2022.01)
*G06F 3/04817* (2022.01)
*G06F 3/0488* (2022.01)
*G06F 3/04892* (2022.01)
*G06F 3/14* (2006.01)
*G06F 3/16* (2006.01)
*G06T 3/40* (2006.01)
*G06T 7/70* (2017.01)
*G06V 40/20* (2022.01)
*G09G 5/10* (2006.01)

(52) U.S. Cl.
CPC .............. *G06F 3/011* (2013.01); *G06F 3/013* (2013.01); *G06F 3/017* (2013.01); *G06F 3/033* (2013.01); *G06F 3/041* (2013.01); *G06F 3/04812* (2013.01); *G06F 3/04815* (2013.01); *G06F 3/04817* (2013.01); *G06F 3/0488* (2013.01); *G06F 3/04892* (2013.01); *G06F 3/14* (2013.01); *G06F 3/165* (2013.01); *G06T 3/40* (2013.01); *G06T 7/70* (2017.01); *G06T 19/003* (2013.01); *G06V 40/25* (2022.01); *G09G 5/10* (2013.01); *G02B 2027/0138* (2013.01); *G02B 2027/014* (2013.01); *G02B 2027/0178* (2013.01); *G06F 2203/04104* (2013.01); *G06T 2219/012* (2013.01); *G09G 2320/08* (2013.01); *G09G 2340/04* (2013.01); *G09G 2354/00* (2013.01); *G09G 2370/16* (2013.01)

(58) Field of Classification Search
USPC ........................................................ 345/633
See application file for complete search history.

(56) References Cited

U.S. PATENT DOCUMENTS

| | | |
|---|---|---|
| 6,023,275 A | 2/2000 | Horvitz et al. |
| 6,215,498 B1 | 4/2001 | Filo et al. |
| 6,388,657 B1 | 5/2002 | Natoli |
| 6,445,364 B2 | 9/2002 | Zwern |
| 7,119,819 B1 | 10/2006 | Robertson et al. |
| 7,225,414 B1 | 5/2007 | Sharma et al. |
| 7,542,040 B2 | 6/2009 | Templeman |
| 8,751,969 B2 | 6/2014 | Matsuda et al. |
| 8,947,322 B1 | 2/2015 | Chi et al. |
| 8,947,323 B1 | 2/2015 | Raffle et al. |
| 8,957,916 B1 | 2/2015 | Hedman et al. |
| 9,007,301 B1 | 4/2015 | Raffle et al. |
| 9,081,177 B2 | 7/2015 | Wong et al. |
| 9,113,032 B1 | 8/2015 | Mey et al. |
| 9,122,321 B2 | 9/2015 | Perez et al. |
| 9,244,533 B2 | 1/2016 | Friend et al. |
| 9,613,448 B1 | 4/2017 | Margolin |
| 9,696,795 B2 | 7/2017 | Marcolina et al. |
| 9,726,896 B2 | 8/2017 | von und zu Liechtenstein |
| 9,779,517 B2 | 10/2017 | Ballard et al. |
| 9,939,900 B2 | 4/2018 | Cruz-Hernandez et al. |
| 9,996,797 B1 | 6/2018 | Holz et al. |
| 10,007,359 B2 | 6/2018 | Chung et al. |
| 10,127,731 B1 | 11/2018 | Ozery |
| 10,317,505 B1 | 6/2019 | Spiko et al. |
| 10,353,532 B1 | 7/2019 | Holz et al. |
| 10,430,018 B2 | 10/2019 | Black et al. |
| 10,438,262 B1 | 10/2019 | Helmer et al. |
| 10,469,804 B1 | 11/2019 | Lyren |
| 10,516,853 B1 | 12/2019 | Gibson et al. |
| 10,553,031 B2 | 2/2020 | Alt et al. |
| 10,706,111 B1 | 7/2020 | Nasserbakht et al. |
| 10,916,057 B2 | 2/2021 | Leppanen et al. |
| 10,917,613 B1 | 2/2021 | Chiarella et al. |
| 10,948,997 B1 | 3/2021 | Victor-Faichney et al. |
| 11,003,307 B1 | 5/2021 | Ravasz et al. |
| 11,014,000 B2 | 5/2021 | Koyama et al. |
| 11,042,028 B1 | 6/2021 | Welch et al. |
| 11,060,858 B2 | 7/2021 | Abovitz et al. |
| 11,061,239 B2 | 7/2021 | Lanman et al. |
| 11,106,328 B1 | 8/2021 | Holland et al. |
| D931,307 S | 9/2021 | Lee et al. |
| 11,120,640 B1 | 9/2021 | Yang et al. |
| 11,144,759 B1 | 10/2021 | Hatfield et al. |
| 11,170,221 B2 | 11/2021 | Sato et al. |
| 11,178,376 B1 | 11/2021 | Tichenor et al. |
| 11,210,851 B1 | 12/2021 | Nussbaum et al. |
| 11,210,863 B1 | 12/2021 | Yan et al. |
| 11,227,445 B1 | 1/2022 | Tichenor et al. |
| 11,245,871 B1 | 2/2022 | Gandhi et al. |
| 11,294,475 B1 | 4/2022 | Pinchon et al. |
| 11,307,968 B2 | 4/2022 | Yerli |
| 11,308,686 B1 | 4/2022 | Boissière et al. |
| 11,317,060 B1 | 4/2022 | Libin |
| 11,334,212 B2 | 5/2022 | Ravasz et al. |
| 11,340,857 B1 | 5/2022 | Smith et al. |
| 11,355,043 B1 | 6/2022 | Choi et al. |
| 11,402,871 B1 | 8/2022 | Berliner et al. |
| 11,475,650 B2 | 10/2022 | Berliner et al. |
| 11,480,791 B2 | 10/2022 | Berliner et al. |
| 11,481,963 B2 | 10/2022 | Berliner et al. |
| 11,496,571 B2 | 11/2022 | Berliner et al. |
| 11,514,656 B2 | 11/2022 | Berliner et al. |
| 11,516,297 B2 | 11/2022 | Berliner et al. |
| 11,638,147 B2 | 4/2023 | Irvin et al. |
| 2003/0058215 A1 | 3/2003 | Yamaji et al. |
| 2003/0063132 A1 | 4/2003 | Sauer et al. |
| 2004/0100556 A1 | 5/2004 | Stromme |
| 2004/0113888 A1 | 6/2004 | De Waal |
| 2005/0019079 A1 | 1/2005 | Griffin et al. |
| 2006/0028400 A1 | 2/2006 | Lapstun et al. |
| 2007/0133788 A1 | 6/2007 | Ladouceur et al. |
| 2007/0223792 A1 | 9/2007 | Morimoto et al. |
| 2008/0184124 A1 | 7/2008 | Agarwal et al. |
| 2008/0270947 A1 | 10/2008 | Elber et al. |
| 2009/0015559 A1 | 1/2009 | Day et al. |
| 2009/0183125 A1 | 7/2009 | Magal et al. |
| 2009/0303984 A1 | 12/2009 | Clark et al. |
| 2010/0034457 A1 | 2/2010 | Berliner et al. |
| 2010/0182340 A1 | 7/2010 | Bachelder et al. |
| 2011/0004481 A1 | 1/2011 | Jones |
| 2011/0216060 A1 | 9/2011 | Weising et al. |
| 2011/0302535 A1 | 12/2011 | Clerc et al. |
| 2012/0068921 A1 | 3/2012 | Jacobsen et al. |
| 2012/0113092 A1 | 5/2012 | Bar-Zeev et al. |

(56) References Cited

U.S. PATENT DOCUMENTS

| | | |
|---|---|---|
| 2012/0162384 A1 | 6/2012 | Vesely et al. |
| 2012/0192088 A1 | 7/2012 | Sauriol et al. |
| 2012/0194418 A1 | 8/2012 | Osterhout et al. |
| 2012/0202569 A1 | 8/2012 | Maizels et al. |
| 2012/0204133 A1 | 8/2012 | Guendelman et al. |
| 2012/0229425 A1 | 9/2012 | Barrus et al. |
| 2012/0242603 A1 | 9/2012 | Engelhardt et al. |
| 2012/0249587 A1 | 10/2012 | Anderson et al. |
| 2012/0249741 A1 | 10/2012 | Maciocci et al. |
| 2012/0272179 A1 | 10/2012 | Stafford |
| 2012/0326961 A1 | 12/2012 | Bromer |
| 2013/0033483 A1 | 2/2013 | Im et al. |
| 2013/0069985 A1 | 3/2013 | Wong et al. |
| 2013/0106692 A1 | 5/2013 | Maizels et al. |
| 2013/0107021 A1 | 5/2013 | Maizels et al. |
| 2013/0117377 A1 | 5/2013 | Miller |
| 2013/0135344 A1 | 5/2013 | Stirbu et al. |
| 2013/0174213 A1 | 7/2013 | Liu et al. |
| 2013/0194304 A1 | 8/2013 | Latta et al. |
| 2013/0208232 A1 | 8/2013 | Boukli-Hacene |
| 2013/0246955 A1 | 9/2013 | Schwesig et al. |
| 2013/0260822 A1 | 10/2013 | Wu |
| 2013/0278631 A1 | 10/2013 | Border et al. |
| 2013/0283208 A1 | 10/2013 | Bychkov et al. |
| 2013/0293468 A1 | 11/2013 | Perez et al. |
| 2013/0321265 A1 | 12/2013 | Bychkov et al. |
| 2013/0321271 A1 | 12/2013 | Bychkov et al. |
| 2013/0328914 A1 | 12/2013 | Smith et al. |
| 2013/0328925 A1 | 12/2013 | Latta et al. |
| 2013/0342564 A1 | 12/2013 | Kinnebrew et al. |
| 2013/0342570 A1 | 12/2013 | Kinnebrew et al. |
| 2014/0002496 A1 | 1/2014 | Lamb et al. |
| 2014/0028548 A1 | 1/2014 | Bychkov et al. |
| 2014/0035819 A1 | 2/2014 | Griffin |
| 2014/0062875 A1 | 3/2014 | Rafey et al. |
| 2014/0063055 A1 | 3/2014 | Osterhout et al. |
| 2014/0082526 A1 | 3/2014 | Park et al. |
| 2014/0091857 A1 | 4/2014 | Bernstein |
| 2014/0123077 A1 | 5/2014 | Kutliroff et al. |
| 2014/0132629 A1 | 5/2014 | Pandey et al. |
| 2014/0152552 A1 | 6/2014 | Berliner et al. |
| 2014/0191927 A1 | 7/2014 | Cho |
| 2014/0193047 A1 | 7/2014 | Grosz et al. |
| 2014/0208274 A1 | 7/2014 | Smyth et al. |
| 2014/0258942 A1 | 9/2014 | Kutliroff et al. |
| 2014/0272845 A1 | 9/2014 | Hendriks et al. |
| 2014/0282105 A1 | 9/2014 | Nordstrom |
| 2014/0327611 A1 | 11/2014 | Ono et al. |
| 2014/0380230 A1 | 12/2014 | Venable et al. |
| 2015/0067580 A1 | 3/2015 | Um et al. |
| 2015/0091780 A1 | 4/2015 | Lyren |
| 2015/0121287 A1 | 4/2015 | Fermon |
| 2015/0133193 A1 | 5/2015 | Stotler |
| 2015/0160825 A1 | 6/2015 | Dolbier et al. |
| 2015/0205106 A1 | 7/2015 | Norden |
| 2015/0206349 A1 | 7/2015 | Rosenthal et al. |
| 2015/0215581 A1 | 7/2015 | Barzuza et al. |
| 2015/0235267 A1 | 8/2015 | Steube et al. |
| 2015/0268721 A1 | 9/2015 | Joo |
| 2015/0277560 A1 | 10/2015 | Beaty |
| 2015/0294480 A1 | 10/2015 | Marks et al. |
| 2015/0302665 A1 | 10/2015 | Miller |
| 2015/0302867 A1 | 10/2015 | Tomlin et al. |
| 2015/0324001 A1 | 11/2015 | Yanai et al. |
| 2015/0338886 A1 | 11/2015 | Seo |
| 2015/0379770 A1 | 12/2015 | Haley, Jr. et al. |
| 2016/0005229 A1 | 1/2016 | Lee et al. |
| 2016/0018985 A1 | 1/2016 | Bennet et al. |
| 2016/0026242 A1 | 1/2016 | Burns et al. |
| 2016/0026253 A1 | 1/2016 | Bradski et al. |
| 2016/0027214 A1 | 1/2016 | Memmott et al. |
| 2016/0027216 A1 | 1/2016 | da Veiga et al. |
| 2016/0041625 A1 | 2/2016 | Maizels et al. |
| 2016/0071325 A1 | 3/2016 | Callaghan |
| 2016/0093108 A1 | 3/2016 | Mao et al. |
| 2016/0139787 A1 | 5/2016 | Joo et al. |
| 2016/0147399 A1 | 5/2016 | Berajawala |
| 2016/0191910 A1 | 6/2016 | von und zu Liechtenstein |
| 2016/0209928 A1 | 7/2016 | Kandur Raja et al. |
| 2016/0239080 A1 | 8/2016 | Marcolina et al. |
| 2016/0253842 A1 | 9/2016 | Shapira et al. |
| 2016/0255748 A1 | 9/2016 | Kim et al. |
| 2016/0259548 A1 | 9/2016 | Ma |
| 2016/0262235 A1 | 9/2016 | Clymer et al. |
| 2016/0282824 A1 | 9/2016 | Smallwood et al. |
| 2016/0306431 A1 | 10/2016 | Stafford et al. |
| 2016/0313868 A1 | 10/2016 | Weng et al. |
| 2016/0313890 A1* | 10/2016 | Walline ............... G06F 3/04812 |
| 2016/0328590 A1 | 11/2016 | Fefferman |
| 2016/0370860 A1 | 12/2016 | Bychkov et al. |
| 2016/0370970 A1 | 12/2016 | Chu et al. |
| 2016/0379409 A1 | 12/2016 | Gavriliuc et al. |
| 2017/0039770 A1 | 2/2017 | Lanier et al. |
| 2017/0083104 A1 | 3/2017 | Namba et al. |
| 2017/0109516 A1 | 4/2017 | Engelhardt et al. |
| 2017/0131964 A1 | 5/2017 | Baek et al. |
| 2017/0132199 A1 | 5/2017 | Vescovi et al. |
| 2017/0132842 A1 | 5/2017 | Morrison |
| 2017/0153866 A1 | 6/2017 | Grinberg et al. |
| 2017/0169616 A1 | 6/2017 | Wiley et al. |
| 2017/0185261 A1 | 6/2017 | Perez et al. |
| 2017/0193706 A1 | 7/2017 | Lo et al. |
| 2017/0195629 A1 | 7/2017 | Wexler et al. |
| 2017/0220134 A1 | 8/2017 | Burns |
| 2017/0221264 A1 | 8/2017 | Perry |
| 2017/0242480 A1 | 8/2017 | Dees et al. |
| 2017/0243403 A1 | 8/2017 | Daniels et al. |
| 2017/0248785 A1 | 8/2017 | Thomas et al. |
| 2017/0262045 A1 | 9/2017 | Rouvinez et al. |
| 2017/0266554 A1 | 9/2017 | Marks et al. |
| 2017/0280090 A1 | 9/2017 | Raskin |
| 2017/0285758 A1 | 10/2017 | Hastings et al. |
| 2017/0287217 A1 | 10/2017 | Kim et al. |
| 2017/0315627 A1 | 11/2017 | Yao |
| 2017/0315722 A1 | 11/2017 | Yao |
| 2017/0322622 A1 | 11/2017 | Hong et al. |
| 2017/0343811 A1 | 11/2017 | Mese et al. |
| 2017/0345457 A1 | 11/2017 | Li |
| 2017/0351097 A1 | 12/2017 | Memmott et al. |
| 2017/0352083 A1 | 12/2017 | Ruck et al. |
| 2018/0011863 A1 | 1/2018 | Xin et al. |
| 2018/0045963 A1 | 2/2018 | Hoover et al. |
| 2018/0075658 A1 | 3/2018 | Lanier et al. |
| 2018/0088663 A1 | 3/2018 | Zhang et al. |
| 2018/0088682 A1 | 3/2018 | Tsang |
| 2018/0089510 A1 | 3/2018 | Li |
| 2018/0089899 A1 | 3/2018 | Piemonte et al. |
| 2018/0090018 A1 | 3/2018 | Gavrilets et al. |
| 2018/0101994 A1 | 4/2018 | Da Veiga et al. |
| 2018/0117470 A1 | 5/2018 | Chiu et al. |
| 2018/0131847 A1 | 5/2018 | Kokonaski et al. |
| 2018/0131907 A1 | 5/2018 | Schmirler et al. |
| 2018/0150997 A1 | 5/2018 | Austin |
| 2018/0167501 A1 | 6/2018 | Peterson et al. |
| 2018/0173323 A1 | 6/2018 | Harvey et al. |
| 2018/0173404 A1 | 6/2018 | Smith |
| 2018/0181626 A1 | 6/2018 | Lyons et al. |
| 2018/0189568 A1 | 7/2018 | Powderly et al. |
| 2018/0197341 A1 | 7/2018 | Loberg et al. |
| 2018/0197624 A1 | 7/2018 | Robaina et al. |
| 2018/0214777 A1 | 8/2018 | Hingorani |
| 2018/0246324 A1 | 8/2018 | Hada et al. |
| 2018/0246328 A1 | 8/2018 | Song et al. |
| 2018/0247431 A1 | 8/2018 | Clark et al. |
| 2018/0253900 A1 | 9/2018 | Finding et al. |
| 2018/0267762 A1 | 9/2018 | Aurongzeb et al. |
| 2018/0276891 A1 | 9/2018 | Craner et al. |
| 2018/0276896 A1 | 9/2018 | Launonen |
| 2018/0300952 A1 | 10/2018 | Evans et al. |
| 2018/0307303 A1 | 10/2018 | Powderly et al. |
| 2018/0314329 A1 | 11/2018 | Bychkov et al. |
| 2018/0314406 A1 | 11/2018 | Powderly et al. |
| 2018/0315248 A1 | 11/2018 | Bastov et al. |
| 2018/0350119 A1 | 12/2018 | Kocharlakota et al. |

(56) References Cited

U.S. PATENT DOCUMENTS

| | | |
|---|---|---|
| 2018/0350150 A1 | 12/2018 | Powderly et al. |
| 2018/0357472 A1 | 12/2018 | Dreessen |
| 2019/0035234 A1 | 1/2019 | Howard et al. |
| 2019/0073109 A1* | 3/2019 | Zhang .................. G06F 3/013 |
| 2019/0087015 A1 | 3/2019 | Lam et al. |
| 2019/0102946 A1 | 4/2019 | Spivack et al. |
| 2019/0107944 A1 | 4/2019 | Glass et al. |
| 2019/0107991 A1 | 4/2019 | Spivack et al. |
| 2019/0114802 A1 | 4/2019 | Lazarow |
| 2019/0114991 A1 | 4/2019 | Selan et al. |
| 2019/0114997 A1 | 4/2019 | Okamoto |
| 2019/0174088 A1 | 6/2019 | Kim et al. |
| 2019/0204599 A1 | 7/2019 | Abbott |
| 2019/0229495 A1 | 7/2019 | Pierer et al. |
| 2019/0236842 A1 | 8/2019 | Bennett et al. |
| 2019/0237044 A1 | 8/2019 | Day et al. |
| 2019/0265781 A1 | 8/2019 | Kehoe et al. |
| 2019/0270015 A1 | 9/2019 | Li et al. |
| 2019/0295323 A1 | 9/2019 | Gutierrez et al. |
| 2019/0311460 A1 | 10/2019 | Mandy |
| 2019/0318065 A1 | 10/2019 | Brent et al. |
| 2019/0324277 A1 | 10/2019 | Kohler et al. |
| 2019/0333275 A1 | 10/2019 | Wang et al. |
| 2019/0335083 A1 | 10/2019 | DiGiantomasso et al. |
| 2019/0340816 A1 | 11/2019 | Rogers |
| 2019/0362557 A1 | 11/2019 | Lacey et al. |
| 2019/0362562 A1 | 11/2019 | Benson |
| 2019/0380792 A1 | 12/2019 | Poltaretskyi et al. |
| 2019/0384406 A1 | 12/2019 | Smith et al. |
| 2019/0385376 A1 | 12/2019 | Kim et al. |
| 2020/0004401 A1 | 1/2020 | Hwang et al. |
| 2020/0005026 A1 | 1/2020 | Andersen et al. |
| 2020/0019156 A1 | 1/2020 | Drew et al. |
| 2020/0035203 A1 | 1/2020 | Kosik et al. |
| 2020/0043243 A1 | 2/2020 | Bhushan et al. |
| 2020/0051337 A1 | 2/2020 | Reynolds et al. |
| 2020/0051527 A1 | 2/2020 | Ngo |
| 2020/0066030 A1 | 2/2020 | Naik et al. |
| 2020/0074738 A1 | 3/2020 | Hare et al. |
| 2020/0109847 A1 | 4/2020 | Poggio et al. |
| 2020/0110928 A1 | 4/2020 | Al Jazaery et al. |
| 2020/0111232 A1 | 4/2020 | Bleyer et al. |
| 2020/0111255 A1 | 4/2020 | Brodsky et al. |
| 2020/0111256 A1 | 4/2020 | Bleyer et al. |
| 2020/0111257 A1 | 4/2020 | Kim |
| 2020/0111259 A1 | 4/2020 | Sears et al. |
| 2020/0117267 A1 | 4/2020 | Gibson et al. |
| 2020/0117270 A1 | 4/2020 | Gibson et al. |
| 2020/0125322 A1 | 4/2020 | Wilde |
| 2020/0126309 A1 | 4/2020 | Moroze et al. |
| 2020/0135419 A1 | 4/2020 | Nakano et al. |
| 2020/0151965 A1 | 5/2020 | Forbes et al. |
| 2020/0174660 A1 | 6/2020 | Klein et al. |
| 2020/0175759 A1 | 6/2020 | Russell et al. |
| 2020/0193938 A1 | 6/2020 | Estruch Tena et al. |
| 2020/0209628 A1 | 7/2020 | Sztuk et al. |
| 2020/0211207 A1 | 7/2020 | Chen et al. |
| 2020/0213632 A1 | 7/2020 | Goldberg |
| 2020/0225715 A1 | 7/2020 | Goergen et al. |
| 2020/0258481 A1 | 8/2020 | Woo et al. |
| 2020/0320794 A1 | 10/2020 | Huang et al. |
| 2020/0342671 A1 | 10/2020 | Ishihara |
| 2020/0342675 A1* | 10/2020 | Leuze .................. G06T 7/0012 |
| 2020/0363636 A1 | 11/2020 | Karafin et al. |
| 2020/0364915 A1 | 11/2020 | Ruth et al. |
| 2020/0367970 A1 | 11/2020 | Qiu et al. |
| 2020/0387215 A1 | 12/2020 | Smathers et al. |
| 2020/0401805 A1 | 12/2020 | Kotoyori |
| 2020/0404217 A1 | 12/2020 | Yerli |
| 2021/0008413 A1 | 1/2021 | Asikainen et al. |
| 2021/0041951 A1 | 2/2021 | Gibson et al. |
| 2021/0096726 A1 | 4/2021 | Faulkner et al. |
| 2021/0097766 A1 | 4/2021 | Palangie et al. |
| 2021/0121136 A1 | 4/2021 | Dobson et al. |
| 2021/0132683 A1 | 5/2021 | Herling et al. |
| 2021/0135895 A1 | 5/2021 | Cheung |
| 2021/0173480 A1 | 6/2021 | Osterhout et al. |
| 2021/0174570 A1 | 6/2021 | Bleyer et al. |
| 2021/0185471 A1 | 6/2021 | Jot et al. |
| 2021/0191600 A1 | 6/2021 | Lemay et al. |
| 2021/0201581 A1 | 7/2021 | Xie et al. |
| 2021/0227178 A1 | 7/2021 | Lyon et al. |
| 2021/0232211 A1 | 7/2021 | McCall |
| 2021/0235124 A1 | 7/2021 | Seregin et al. |
| 2021/0255458 A1 | 8/2021 | Yoon |
| 2021/0256261 A1 | 8/2021 | Wang et al. |
| 2021/0272373 A1 | 9/2021 | Fradet et al. |
| 2021/0272537 A1 | 9/2021 | Mak et al. |
| 2021/0286502 A1 | 9/2021 | Lemay et al. |
| 2021/0295602 A1 | 9/2021 | Scapel et al. |
| 2021/0311320 A1 | 10/2021 | Pike et al. |
| 2021/0349676 A1 | 11/2021 | Sommer et al. |
| 2021/0366440 A1 | 11/2021 | Burns et al. |
| 2021/0373672 A1 | 12/2021 | Schwarz et al. |
| 2021/0407205 A1 | 12/2021 | Canberk et al. |
| 2022/0012920 A1 | 1/2022 | Beith et al. |
| 2022/0035439 A1 | 2/2022 | Holland et al. |
| 2022/0075517 A1 | 3/2022 | Bailey et al. |
| 2022/0084279 A1 | 3/2022 | Lindmeier et al. |
| 2022/0084288 A1 | 3/2022 | LeBeau et al. |
| 2022/0086203 A1 | 3/2022 | Morris et al. |
| 2022/0092862 A1 | 3/2022 | Faulkner et al. |
| 2022/0101612 A1 | 3/2022 | Palangie et al. |
| 2022/0107632 A1 | 4/2022 | Sinha et al. |
| 2022/0121344 A1 | 4/2022 | Pastrana Vicente et al. |
| 2022/0130077 A1 | 4/2022 | Rajarathnam et al. |
| 2022/0155853 A1 | 5/2022 | Fan et al. |
| 2022/0156998 A1 | 5/2022 | Lee et al. |
| 2022/0172397 A1 | 6/2022 | Herling et al. |
| 2022/0229534 A1 | 7/2022 | Terre et al. |
| 2022/0253093 A1 | 8/2022 | Berliner et al. |
| 2022/0253098 A1 | 8/2022 | Berliner et al. |
| 2022/0253128 A1 | 8/2022 | Berliner et al. |
| 2022/0253130 A1 | 8/2022 | Berliner et al. |
| 2022/0253136 A1 | 8/2022 | Holder et al. |
| 2022/0253139 A1 | 8/2022 | Berliner et al. |
| 2022/0253149 A1 | 8/2022 | Berliner et al. |
| 2022/0253188 A1 | 8/2022 | Berliner et al. |
| 2022/0253194 A1 | 8/2022 | Berliner et al. |
| 2022/0253200 A1 | 8/2022 | Berliner et al. |
| 2022/0253201 A1 | 8/2022 | Berliner et al. |
| 2022/0253263 A1 | 8/2022 | Noam et al. |
| 2022/0253264 A1 | 8/2022 | Berliner et al. |
| 2022/0253266 A1 | 8/2022 | Berliner et al. |
| 2022/0253759 A1 | 8/2022 | Berliner et al. |
| 2022/0254112 A1 | 8/2022 | Berliner et al. |
| 2022/0254118 A1 | 8/2022 | Berliner et al. |
| 2022/0254120 A1 | 8/2022 | Berliner et al. |
| 2022/0255974 A1 | 8/2022 | Berliner et al. |
| 2022/0255995 A1 | 8/2022 | Berliner et al. |
| 2022/0256062 A1 | 8/2022 | Berliner et al. |
| 2022/0261091 A1 | 8/2022 | Berliner et al. |
| 2022/0261149 A1 | 8/2022 | Berliner et al. |
| 2022/0335673 A1 | 10/2022 | Jang et al. |
| 2023/0080905 A1 | 3/2023 | Tomczek et al. |
| 2023/0081717 A1 | 3/2023 | Hoang et al. |
| 2023/0135787 A1 | 5/2023 | Peleg et al. |
| 2023/0139337 A1 | 5/2023 | Noam et al. |

FOREIGN PATENT DOCUMENTS

| | | |
|---|---|---|
| CN | 111782332 | 10/2020 |
| EP | 3188075 | 7/2017 |
| EP | 3584692 | 12/2019 |
| KR | 20190088545 | 7/2019 |
| WO | WO 2019/126175 | 6/2019 |
| WO | WO 2021/239223 | 12/2021 |

OTHER PUBLICATIONS

International Search Report and Written Opinion for International Application No. PCT/US2022/015546, dated Jun. 29, 2022, 16 pages.

(56) References Cited

OTHER PUBLICATIONS

International Search Report and Written Opinion for International Application No. PCT/US2022/015547, dated Jul. 1, 2022, 16 pages.

International Search Report and Written Opinion for International Application No. PCT/US2022/015548, dated Jun. 30, 2020, 13 pages.

International Search Report and Written Opinion for International Application No. PCT/US2022/038450, dated Feb. 6, 2023, 13 pages.

Kimberly Ruth, Tadayoshi Kohno, Franziska Roesner, "Secure Multi-User Content Sharing for Augmented Reality Applications", Aug. 2019, USENIX Association, Proceedings of 28th USENIX Security Symposium (USENIX Security 19), pp. 141-158.

Yehia ElRakaiby, Frederic Cuppens, Nora Cuppens-Boulahia, "Interactivity for Reactive Access Control", 2008, International Conference on Security and Cryptography (SECRYPT), pp. 57-64.

International Search Report and Written Opinion for International Application No. PCT/IB2023/059718, dated Feb. 23, 2024, 19 pages.

International Search Report and Written Opinion for International Application No. PCT/US2023/011401, dated Jul. 7, 2023, 14 pages.

Meta Quest, "Oculus Quest Basics Tutorial Part 02: Play area setup", https://www.youtube.com/watch?v=zh5ldprM5Mg, May 20, 2019 . (Year: 2019).

\* cited by examiner

2510

PRIOR TO RECEIPT OF THE INITIAL KINESICS INPUT, RECEIVE A PRELIMINARY KINESICS INPUT TENDING TOWARD THE SECOND VIRTUAL REGION — 2510

HIGHLIGHT A GROUP OF VIRTUAL OBJECTS IN THE SECOND VIRTUAL REGION BASED ON THE PRELIMINARY KINESICS INPUT — 2512

UPON RECEIPT OF THE INITIAL KINESICS INPUT, CANCEL THE HIGHLIGHTING OF THE GROUP OF VIRTUAL OBJECTS IN THE SECOND VIRTUAL REGION AND HIGHLIGHT THE GROUP OF VIRTUAL OBJECTS IN THE FIRST VIRTUAL REGION — 2514

```
┌─────────────────────────────────────────────────────────┐
│ DETERMINE A FIRST CERTAINTY LEVEL ASSOCIATED WITH THE   │─ 2610
│              INITIAL KINESICS INPUT                      │
└─────────────────────────────────────────────────────────┘
                            │
                            ▼
┌─────────────────────────────────────────────────────────┐
│ FORGO HIGHLIGHTING THE GROUP OF VIRTUAL OBJECTS IN THE  │
│ FIRST VIRTUAL REGION WHEN THE FIRST CERTAINTY LEVEL IS  │─ 2612
│            LOWER THAN A FIRST THRESHOLD                  │
└─────────────────────────────────────────────────────────┘
                            │
                            ▼
┌─────────────────────────────────────────────────────────┐
│ DETERMINE A SECOND CERTAINTY LEVEL ASSOCIATED WITH      │─ 2614
│              THE REFINED KINESICS INPUT                  │
└─────────────────────────────────────────────────────────┘
                            │
                            ▼
┌─────────────────────────────────────────────────────────┐
│  FORGO TRIGGERING THE FUNCTIONALITY ASSOCIATED WITH     │
│   THE PARTICULAR VIRTUAL OBJECT WHEN THE SECOND         │─ 2616
│  CERTAINTY LEVEL IS LOWER THAN A SECOND THRESHOLD       │
└─────────────────────────────────────────────────────────┘
```

FIG. 26

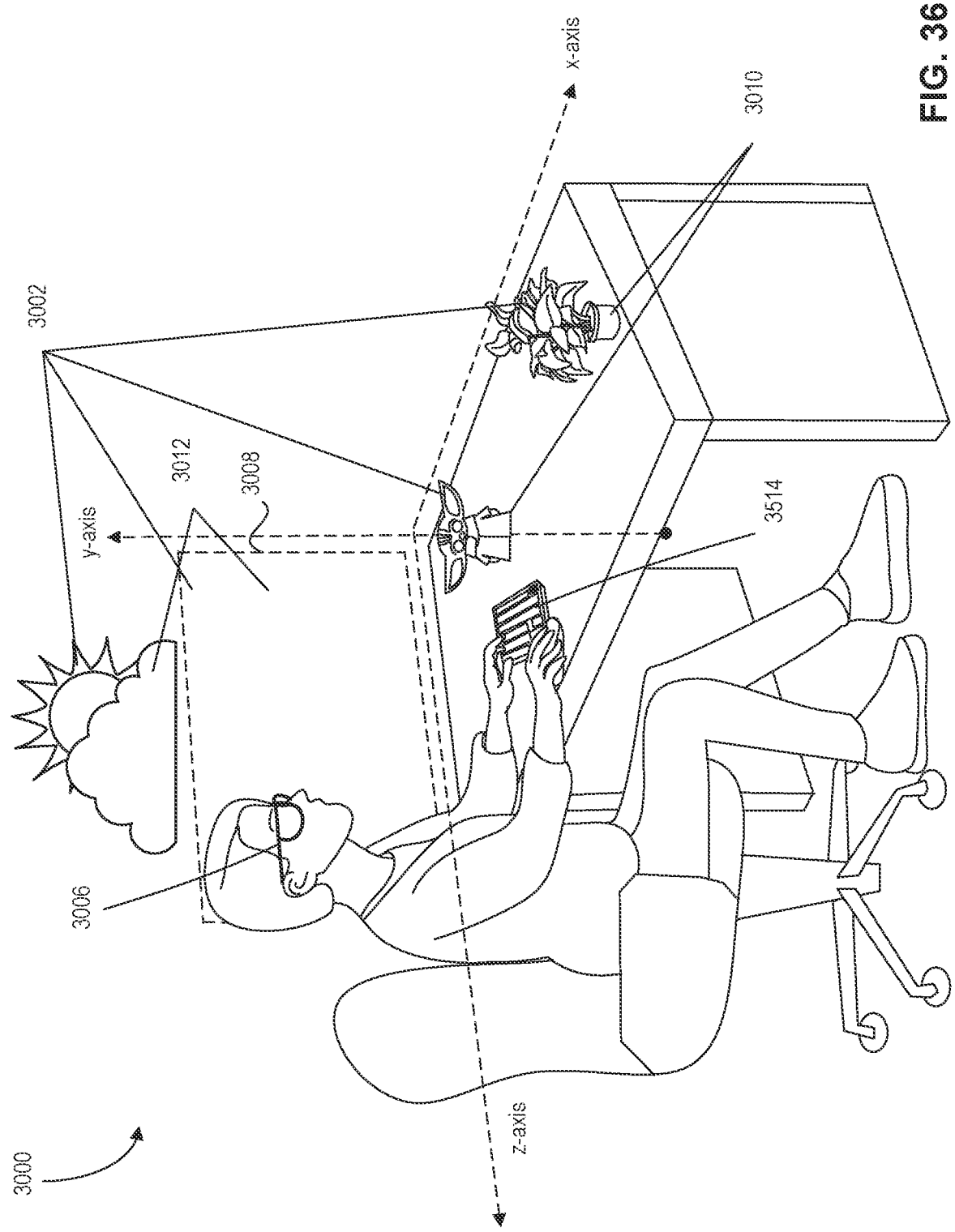

4900

```
┌─────────────────────────────────────────────────────────────┐
│ RECEIVING FROM AN IMAGE SENSOR FIRST IMAGE DATA REFLECTING A│
│ FIRST REGION OF FOCUS OF A USER OF A WEARABLE EXTENDED      │── 4912
│ REALITY APPLIANCE, WHEREIN THE FIRST REGION OF FOCUS IS     │
│ WITHIN AN INITIAL FIELD OF VIEW IN AN EXTENDED REALITY SPACE│
└─────────────────────────────────────────────────────────────┘
                              │
                              ▼
┌─────────────────────────────────────────────────────────────┐
│ CAUSING A FIRST PRESENTATION OF A VIRTUAL CURSOR IN THE     │── 4914
│ FIRST REGION OF FOCUS                                       │
└─────────────────────────────────────────────────────────────┘
                              │
                              ▼
┌─────────────────────────────────────────────────────────────┐
│ RECEIVING FROM THE IMAGE SENSOR SECOND IMAGE DATA REFLECTING│
│ A SECOND REGION OF FOCUS OF THE USER OUTSIDE THE INITIAL    │── 4916
│ FIELD OF VIEW IN THE EXTENDED REALITY SPACE                 │
└─────────────────────────────────────────────────────────────┘
                              │
                              ▼
┌─────────────────────────────────────────────────────────────┐
│ RECEIVING INPUT DATA INDICATIVE OF A DESIRE OF THE USER TO  │── 4918
│ INTERACT WITH THE VIRTUAL CURSOR                            │
└─────────────────────────────────────────────────────────────┘
                              │
                              ▼
┌─────────────────────────────────────────────────────────────┐
│ CAUSING A SECOND PRESENTATION OF THE VIRTUAL CURSOR IN THE  │── 4920
│ SECOND REGION OF FOCUS IN RESPONSE TO THE INPUT DATA        │
└─────────────────────────────────────────────────────────────┘
```

FIG. 49

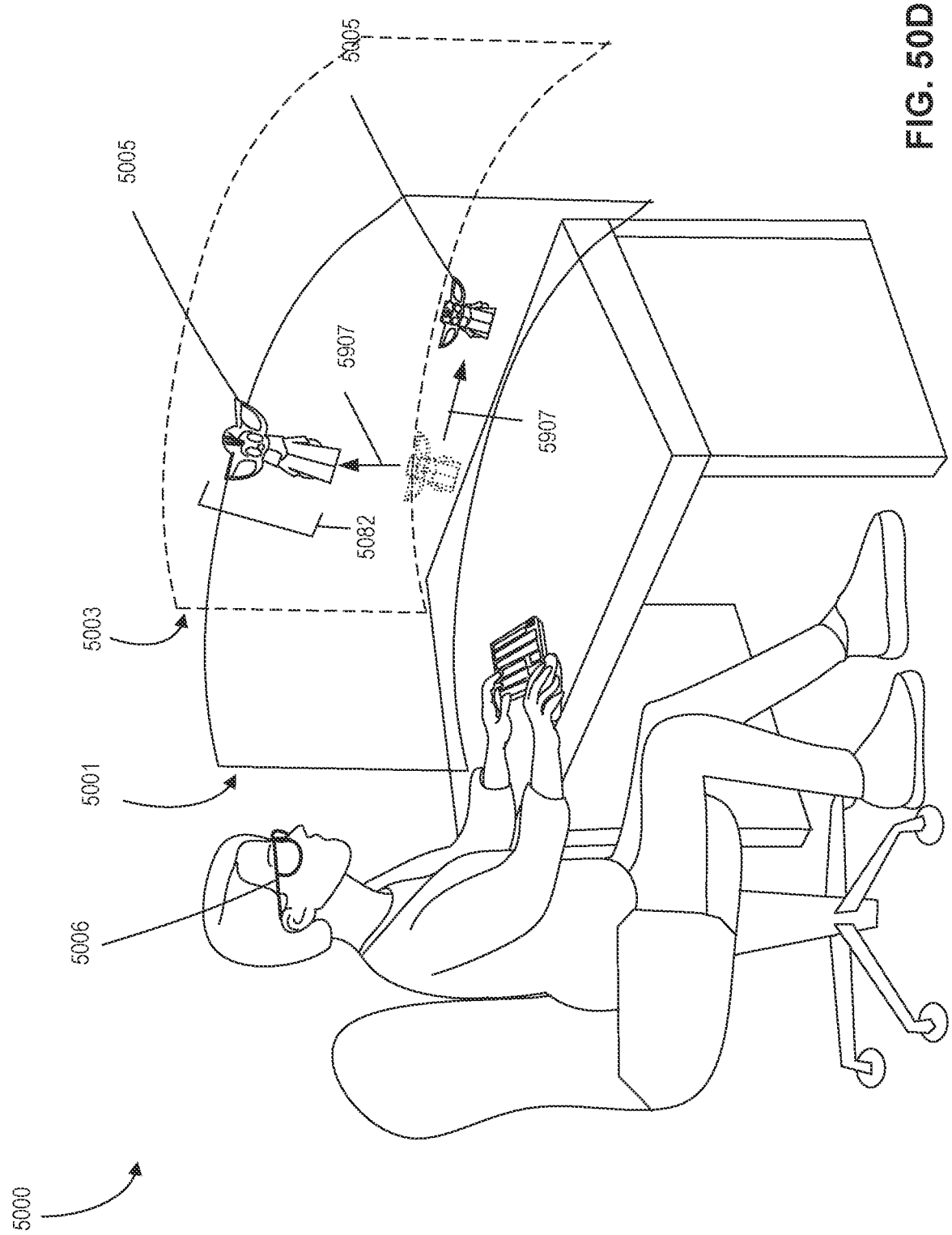

5100

```
┌─────────────────────────────────────────────────┐
│ USING A WEARABLE EXTENDED REALITY APPLIANCE TO  │
│ VIRTUALLY DISPLAY A PLURALITY OF VIRTUAL OBJECTS│
│ ON A PLURALITY OF VIRTUAL PLANES, WHEREIN THE   │── 5142
│ PLURALITY OF VIRTUAL PLANES INCLUDES A FIRST    │
│ VIRTUAL PLANE A SECOND VIRTUAL PLANE            │
└─────────────────────────────────────────────────┘
                        │
                        ▼
┌─────────────────────────────────────────────────┐
│ OUTPUTTING FOR PRESENTATION VIA THE WEARABLE    │
│ EXTENDED REALITY APPLIANCE FIRST DISPLAY SIGNALS│── 5144
│ REFLECTIVE OF A VIRTUAL OBJECT AT A FIRST LOCATION│
│ ON THE FIRST VIRTUAL PLANE                      │
└─────────────────────────────────────────────────┘
                        │
                        ▼
┌─────────────────────────────────────────────────┐
│ RECEIVING INTRAPLANAR INPUT SIGNALS FOR CAUSING │
│ THE VIRTUAL OBJECT TO MOVE TO A SECOND LOCATION │── 5146
│ ON THE FIRST VIRTUAL PLANE                      │
└─────────────────────────────────────────────────┘
                        │
                        ▼
┌─────────────────────────────────────────────────┐
│ IN RESPONSE TO THE INTRAPLANAR INPUT SIGNALS,   │
│ CAUSING THE WEARABLE EXTENDED REALITY APPLIANCE │
│ TO VIRTUALLY DISPLAY AN INTRAPLANAR MOVEMENT OF │── 5148
│ THE VIRTUAL OBJECT FROM THE FIRST LOCATION TO THE│
│ SECOND LOCATION                                 │
└─────────────────────────────────────────────────┘
                        │
                        ▼
┌─────────────────────────────────────────────────┐
│ WHILE THE VIRTUAL OBJECT IS IN THE SECOND       │
│ LOCATION, RECEIVING INTERPLANAR INPUT SIGNALS FOR│── 5150
│ CAUSING THE VIRTUAL OBJECT TO MOVE TO A THIRD   │
│ LOCATION ON THE SECOND VIRTUAL PLANE            │
└─────────────────────────────────────────────────┘
                        │
                        ▼
┌─────────────────────────────────────────────────┐
│ IN RESPONSE TO THE INTERPLANAR INPUT SIGNALS,   │
│ CAUSING THE WEARABLE EXTENDED REALITY APPLIANCE │
│ TO VIRTUALLY DISPLAY AN INTERPLANAR MOVEMENT OF │── 5152
│ THE VIRTUAL OBJECT FROM THE SECOND LOCATION TO  │
│ THE THIRD LOCATION                              │
└─────────────────────────────────────────────────┘
```

FIG. 51

COORDINATING CURSOR MOVEMENT BETWEEN A PHYSICAL SURFACE AND A VIRTUAL SURFACE

CROSS REFERENCES TO RELATED APPLICATIONS

This application is a continuation of U.S. patent application Ser. No. 17/947,039, filed Sep. 16, 2022, which is a continuation of U.S. patent application Ser. No. 17/711,299, filed Apr. 1, 2022, which is a continuation of PCT International Application No. PCT/US2022/015548, filed Feb. 8, 2022, which claims the benefit of priority of U.S. Provisional Patent Application No. 63/147,051, filed on Feb. 8, 2021, U.S. Provisional Patent Application No. 63/157,768, filed on Mar. 7, 2021, U.S. Provisional Patent Application No. 63/173,095, filed on Apr. 9, 2021, U.S. Provisional Patent Application No. 63/213,019, filed on filed on Jun. 21, 2021, U.S. Provisional Patent Application No. 63/215,500, filed on Jun. 27, 2021, U.S. Provisional Patent Application No. 63/216,335, filed on Jun. 29, 2021, U.S. Provisional Patent Application No. 63/226,977, filed on Jul. 29, 2021, U.S. Provisional Patent Application No. 63/300,005, filed on Jan. 16, 2022, U.S. Provisional Patent Application No. 63/307,207, filed on Feb. 7, 2022, U.S. Provisional Patent Application No. 63/307,203, filed on Feb. 7, 2022, and U.S. Provisional Patent Application No. 63/307,217, filed on Feb. 7, 2022 all of which are incorporated herein by reference in their entirety.

BACKGROUND

I. Technical Field

The present disclosure generally relates to the field of extended reality. More specifically, the present disclosure relates to systems, methods, and devices for providing productivity applications using an extended reality environment.

II. Background Information

For many years, PC users were faced with a productivity dilemma: either to limit their mobility (when selecting a desktop computer) or to limit their screen size (when selecting a laptop computer). One partial solution to this dilemma is using a docking station. A docking station is an interface device for connecting a laptop computer with other devices. By plugging the laptop computer into the docking station, laptop users can enjoy the increased visibility provided by a larger monitor. But because the large monitor is stationary, the mobility of the user—while improved—is still limited. For example, even laptop users with docking stations do not have the freedom of using two 32" screens anywhere they want.

Some of the disclosed embodiments are directed to providing a new approach for solving the productivity dilemma, one that uses extended reality (XR) to provide a mobile environment that enables users to experience the comfort of a stationary workspace anywhere they want by providing virtual desktop-like screens.

SUMMARY

Embodiments consistent with the present disclosure provide systems, methods, and devices for providing and supporting productivity applications using an extended reality environment.

Some disclosed embodiments may include systems, methods and non-transitory computer readable media for controlling perspective in an extended reality environment using a physical touch controller. Some of these embodiments may involve outputting for presentation via a wearable extended reality appliance, first display signals reflective of a first perspective of a scene; receiving via a touch sensor, first input signals caused by a first multi-finger interaction with the touch sensor; in response to the first input signals, outputting for presentation via the wearable extended reality appliance second display signals configured to modify the first perspective of the scene to thereby cause a second perspective of the scene to be presented via the wearable extended reality appliance; receiving via the touch sensor, second input signals caused by a second multi-finger interaction with the touch sensor; and in response to the second input signals, outputting for presentation via the wearable extended reality appliance third display signals configured to modify the second perspective of the scene to thereby cause a third perspective of the scene to be presented via the wearable extended reality appliance.

Some disclosed embodiments may include systems, methods and non-transitory computer readable media for enabling gesture interaction with invisible virtual objects. Some of these embodiments may involve receiving image data captured by at least one image sensor of a wearable extended reality appliance, the image data including representations of a plurality of physical objects in a field of view associated with the at least one image sensor of the wearable extended reality appliance; displaying a plurality of virtual objects in a portion of the field of view, wherein the portion of the field of view is associated with a display system of the wearable extended reality appliance; receiving a selection of a specific physical object from the plurality of physical objects; receiving a selection of a specific virtual object from the plurality of virtual objects for association with the specific physical object; docking the specific virtual object with the specific physical object; when the specific physical object and the specific virtual object are outside the portion of the field of view associated with the display system of the wearable extended reality appliance such that the specific virtual object is invisible to a user of the wearable extended reality appliance; receiving a gesture input indicating that a hand is interacting with the specific virtual object; and in response to the gesture input, causing an output associated with the specific virtual object.

Some disclosed embodiments may include systems, methods and non-transitory computer readable media for performing incremental convergence operations in an extended reality environment. Some of these embodiments may involve displaying a plurality of dispersed virtual objects across a plurality of virtual regions, the plurality of virtual regions including at least a first virtual region and a second virtual region that differs from the first virtual region; receiving an initial kinesics input tending toward the first virtual region; highlighting a group of virtual objects in the first virtual region based on the initial kinesics input; receiving a refined kinesics input tending toward a particular virtual object from among the highlighted group of virtual objects; and triggering a functionality associated with the particular virtual object based on the refined kinesics input.

Some disclosed embodiments may include systems, methods and non-transitory computer readable media for facilitating an environmentally adaptive extended reality display in a physical environment. Some of these embodiments may involve virtually displaying content via a wearable extended reality appliance operating in the physical environment, wherein displaying content via the wearable extended reality appliance is associated with at least one adjustable extended reality display parameter; obtaining image data from the wearable extended reality appliance; detecting in the image data a specific environmental change unrelated to the virtually displayed content; accessing a group of rules associating environmental changes with changes in the at least one adjustable extended reality display parameter; determining that the specific environmental change corresponds to a specific rule of the group of rules; and implementing the specific rule to adjust the at least one adjustable extended reality display parameter based on the specific environmental change.

Some disclosed embodiments may include systems, methods and non-transitory computer readable media for selectively controlling display of virtual objects. Some of these embodiments may involve virtually presenting a plurality of virtual objects in an environment via a wearable extended reality appliance operable in a first display mode and in a second display mode, wherein in the first display mode, positions of the plurality of virtual objects are maintained in the environment regardless of detected movements of the wearable extended reality appliance, and in the second display mode, the plurality of virtual objects move in the environment in response to detected movements of the wearable extended reality appliance; detecting a movement of the wearable extended reality appliance; receiving a selection of the first display mode or the second display mode for use in virtually presenting the plurality of virtual objects while the wearable extended reality appliance moves; and in response to the selected display mode, outputting for presentation via the wearable extended reality appliance display signals configured to present the plurality of virtual objects in a manner consistent with the selected display mode.

Some disclosed embodiments may include systems, methods and non-transitory computer readable media for moving a virtual cursor along two traversing virtual planes. Some of these embodiments may involve generating a display via a wearable extended reality appliance, the display including a virtual cursor and plurality of virtual objects located on a first virtual plane that traverses a second virtual plane overlying a physical surface; while the virtual cursor is displayed on the first virtual plane, receiving a first two-dimensional input via a surface input device, wherein the first two-dimensional input is reflective of an intent to select a first virtual object located on the first virtual plane; in response to the first two-dimensional input, causing a first cursor movement toward the first virtual object, the first cursor movement being along the first virtual plane; while the virtual cursor is displayed on the first virtual plane, receiving a second two-dimensional input via the surface input device, wherein the second two-dimensional input is reflective of an intent to select a second virtual object that appears on the physical surface; and in response to the second two-dimensional input, causing a second cursor movement toward the second virtual object, the second cursor movement including a partial movement along the first virtual plane and a partial movement along the second virtual plane.

Some disclosed embodiments may include systems, methods and non-transitory computer readable media for enabling cursor control in an extended reality space. Some of these embodiments may involve receiving from an image sensor first image data reflecting a first region of focus of a user of a wearable extended reality appliance, wherein the first region of focus is within an initial field of view in an extended reality space; causing a first presentation of a virtual cursor in the first region of focus; receiving from the image sensor second image data reflecting a second region of focus of the user outside the initial field of view in the extended reality space; receiving input data indicative of a desire of the user to interact with the virtual cursor; and causing a second presentation of the virtual cursor in the second region of focus in response to the input data.

Some disclosed embodiments may include systems, methods and non-transitory computer readable media for moving virtual content between virtual planes in three-dimensional space. Some of these embodiments may involve using a wearable extended reality appliance to virtually display a plurality of virtual objects on a plurality of virtual planes, wherein the plurality of virtual planes includes a first virtual plane and a second virtual plane; outputting, for presentation via the wearable extended reality appliance, first display signals reflective of a virtual object at a first location on the first virtual plane; receiving intraplanar input signals for causing the virtual object to move to a second location on the first virtual plane; in response to the intraplanar input signals, causing the wearable extended reality appliance to virtually display an intraplanar movement of the virtual object from the first location to the second location: while the virtual object is in the second location, receiving interplanar input signals for causing the virtual object to move to a third location on the second virtual plane; and in response to the interplanar input signals, causing the wearable extended reality appliance to virtually display an interplanar movement of the virtual object from the second location to the third location.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 25 is a flowchart illustrating an exemplary process for highlighting and unhighlighting virtual objects in response to kinesics inputs, consistent with some embodiments of the present disclosure.

FIG. 26 is a flowchart illustrating an exemplary process for determining certainty levels associated with kinesics inputs, consistent with some embodiments of the present disclosure.

FIG. 36 illustrates an exemplary environment with a plurality of virtual objects, consistent with some embodiments of the present disclosure.

FIG. 49 is a flowchart illustrating an exemplary method for enabling cursor control in an extended reality space, consistent with some embodiments of the present disclosure.

FIG. 50D illustrates an exemplary extended reality display with a plurality of curved virtual planes, consistent with some embodiments of the present disclosure.

FIG. 51 is a block diagram illustrating an exemplary method for moving virtual content between virtual planes in three-dimensional space, consistent with some embodiments of the present disclosure.

DETAILED DESCRIPTION

Figure 1:
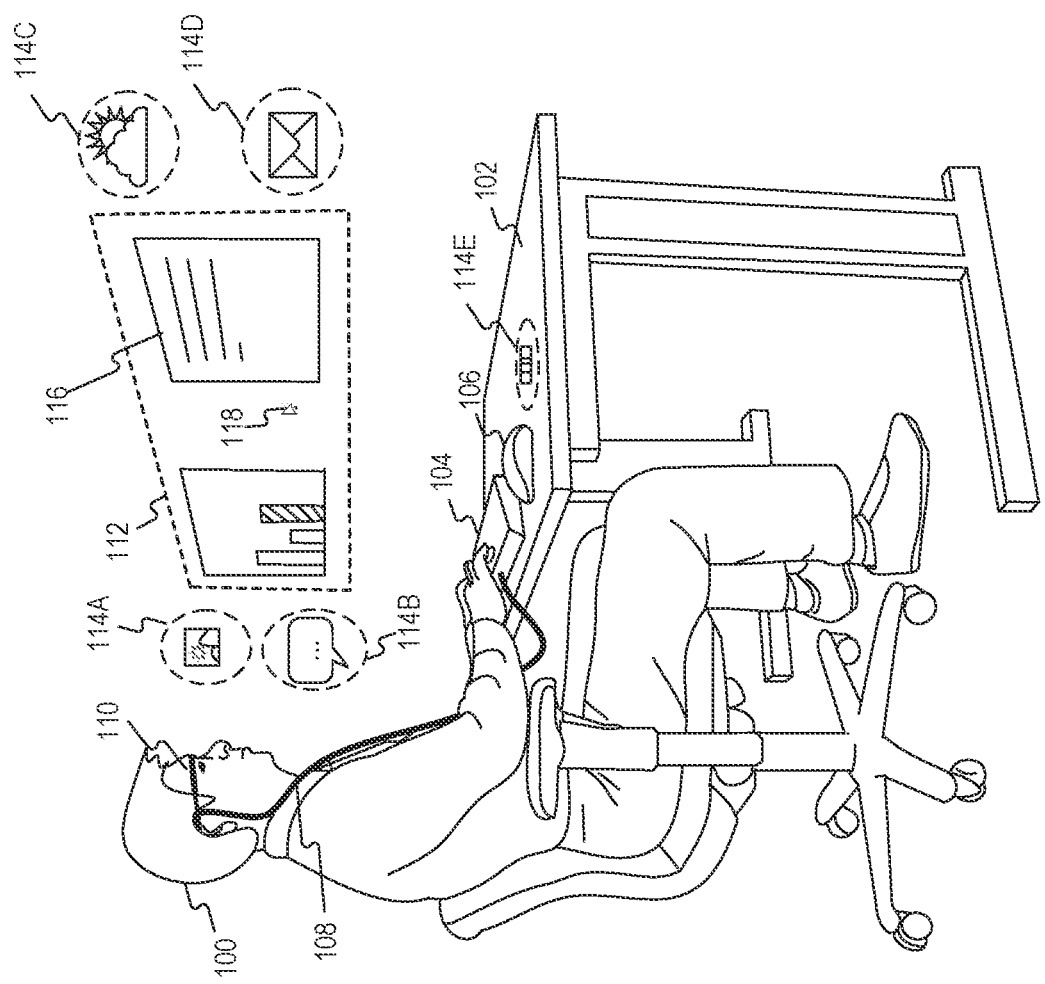
FIG. 1 is a schematic illustration of a user, using an example extended reality system, consistent with the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the specific embodiments and examples, but is inclusive of general principles described herein and illustrated in the figures in addition to the general principles encompassed by the appended claims.

The present disclosure is directed to systems and methods for providing users an extended reality environment. The term "extended reality environment," which may also be referred to as "extended reality," "extended reality space," or "extended environment," refers to all types of real-and-virtual combined environments and human-machine interactions at least partially generated by computer technology. The extended reality environment may be a completely simulated virtual environment or a combined real- and virtual environment that a user may perceive from different perspectives. In some examples, the user may interact with elements of the extended reality environment. One non-limiting example of an extended reality environment may be a virtual reality environment, also known as "virtual reality" or a "virtual environment." An immersive virtual reality environment may be a simulated non-physical environment which provides to the user the perception of being present in the virtual environment. Another non-limiting example of an extended reality environment may be an augmented reality environment, also known as "augmented reality" or "augmented environment." An augmented reality environment may involve live direct or indirect view of a physical real-world environment that is enhanced with virtual computer-generated perceptual information, such as virtual objects that the user may interact with. Another non-limiting example of an extended reality environment is a mixed reality environment, also known as "mixed reality" or a "mixed environment." A mixed reality environment may be a hybrid of physical real-world and virtual environments, in which physical and virtual objects may coexist and interact in real time. In some examples, both augmented reality environments and mixed reality environments may include a combination of real and virtual worlds, real-time interactions, and accurate 3D registration of virtual and real objects. In some examples, both augmented reality environment and mixed reality environments may include constructive overlaid sensory information that may be added to the physical environment. In other examples, both augmented reality environment and mixed reality environments may include destructive virtual content that may mask at least part of the physical environment.

In some embodiments, the systems and methods may provide the extended reality environment using an extended reality appliance. The term extended reality appliance may include any type of device or system that enables a user to perceive and/or interact with an extended reality environment. The extended reality appliance may enable the user to perceive and/or interact with an extended reality environment through one or more sensory modalities. Some non-limiting examples of such sensory modalities may include visual, auditory, haptic, somatosensory, and olfactory. One example of the extended reality appliance is a virtual reality appliance that enables the user to perceive and/or interact with a virtual reality environment. Another example of the extended reality appliance is an augmented reality appliance that enables the user to perceive and/or interact with an augmented reality environment. Yet another example of the extended reality appliance is a mixed reality appliance that enables the user to perceive and/or interact with a mixed reality environment.

Consistent with one aspect of the disclosure, the extended reality appliance may be a wearable device, such as a head-mounted device, for example, smart glasses, smart contact lens, headsets or any other device worn by a human for purposes of presenting an extended reality to the human. Other extended reality appliances may include holographic projector or any other device or system capable of providing an augmented reality (AR), virtual reality (VR), mixed reality (MR), or any immersive experience. Typical components of wearable extended reality appliances may include at least one of: a stereoscopic head-mounted display, a stereoscopic head-mounted sound system, head-motion tracking sensors (such as gyroscopes, accelerometers, magnetometers, image sensors, structured light sensors, etc.), head mounted projectors, eye-tracking sensors, and additional components described below. Consistent with another aspect of the disclosure, the extended reality appliance may be a non-wearable extended reality appliance. Specifically, the non-wearable extended reality appliance may include multi-projected environment appliances. In some embodiments, an extended reality appliance may be configured to change the viewing perspective of the extended reality environment in response to movements of the user and in response to head movements of the user in particular. In one example, a wearable extended reality appliance may change the field-of-view of the extended reality environment in response to a change of the head pose of the user, such as by changing the spatial orientation without changing the spatial position of the user in the extended reality environment. In another example, a non-wearable extended reality appliance may change the spatial position of the user in the extended reality environment in response to a change in the position of the user in the real world, for example, by changing the spatial position of the user in the extended reality environment without changing the direction of the field-of-view with respect to the spatial position.

According to some embodiments, an extended reality appliance may include a digital communication device configured to at least one of: receiving virtual content data configured to enable a presentation of the virtual content, transmitting virtual content for sharing with at least one external device, receiving contextual data from at least one external device, transmitting contextual data to at least one external device, transmitting of usage data indicative of usage of the extended reality appliance, and transmitting of data based on information captured using at least one sensor included in the extended reality appliance. In additional embodiments, the extended reality appliance may include memory for storing at least one of virtual data configured to enable a presentation of virtual content, contextual data, usage data indicative of usage of the extended reality appliance, sensor data based on information captured using at least one sensor included in the extended reality appliance, software instructions configured to cause a processing device to present the virtual content, software instructions configured to cause a processing device to collect and analyze the contextual data, software instructions configured to cause a processing device to collect and analyze the usage data, and software instructions configured to cause a processing device to collect and analyze the sensor data. In additional embodiments, the extended reality appliance may include a processing device configured to perform at least one of rendering of virtual content, collecting and analyzing contextual data, collecting and analyzing usage data, and collecting and analyzing sensor data. In additional embodiments, the extended reality appliance may include one or more sensors. The one or more sensors may include one or more image sensors (e.g., configured to capture images and/or videos of a user of the appliance or of an environment of the user), one or more motion sensors (such as an accelerometer, a gyroscope, a magnetometer, etc.), one or more positioning sensors (such as GPS, outdoor positioning sensor, indoor positioning sensor, etc.), one or more temperature sensors (e.g., configured to measure the temperature of at least part of the appliance and/or of the environment), one or more contact sensors, one or more proximity sensors (e.g., configured to detect whether the appliance is currently worn), one or more electrical impedance sensors (e.g., configured to measure electrical impedance of the user), one or more eye tracking sensors, such as gaze detectors, optical trackers, electric potential trackers (e.g., electrooculogram (EOG) sensors), video-based eye-trackers, infra-red/near infra-red sensors, passive light sensors, or any other technology capable of determining where a human is looking or gazing.

In some embodiments, the systems and methods may use an input device to interact with the extended reality appliance. The term input device may include any physical device configured to receive input from a user or an environment of the user, and to provide the data to a computational device. The data provided to the computational device may be in a digital format and/or in an analog format. In one embodiment, the input device may store the input received from the user in a memory device accessible by a processing device, and the processing device may access the stored data for analysis. In another embodiment, the input device may provide the data directly to a processing device, for example, over a bus or over another communication system configured to transfer data from the input device to the processing device. In some examples, the input received by the input device may include key presses, tactile input data, motion data, position data, gestures based input data, direction data, or any other data for supply for computation. Some examples of the input device may include a button, a key, a keyboard, a computer mouse, a touchpad, a touchscreen, a joystick, or another mechanism from which input may be received. Another example of an input device may include an integrated computational interface device that includes at least one physical component for receiving input from a user. The integrated computational interface device may include at least a memory, a processing device, and the at least one physical component for receiving input from a user. In one example, the integrated computational interface device may further include a digital network interface that enables digital communication with other computing devices. In one example, the integrated computational interface device may further include a physical component for outputting information to the user. In some examples, all components of the integrated computational interface device may be included in a single housing, while in other examples the components may be distributed among two or more housings. Some non-limiting examples of physical components for receiving input from users that may be included in the integrated computational interface device may include at least one of a button, a key, a keyboard, a touchpad, a touchscreen, a joystick, or any other mechanism or sensor from which computational information may be received. Some non-limiting examples of physical components for outputting information to users may include at least one of a light indicator (such as a LED indicator), a screen, a touchscreen, a beeper, an audio speaker, or any other audio, video, or haptic device that provides human-perceptible outputs.

In some embodiments, image data may be captured using one or more image sensors. In some examples, the image sensors may be included in the extended reality appliance, in a wearable device, in the wearable extended reality device, in the input device, in an environment of a user, and so forth. In some examples, the image data may be read from memory, may be received from an external device, may be generated (for example, using a generative model), and so forth. Some non-limiting examples of image data may include images, grayscale images, color images, 2D images, 3D images, videos, 2D videos, 3D videos, frames, footages, data derived from other image data, and so forth. In some examples, the image data may be encoded in any analog or digital format. Some non-limiting examples of such formats may include raw formats, compressed formats, uncompressed formats, lossy formats, lossless formats, JPEG, GIF, PNG, TIFF, EMP, NTSC, PAL, SECAM, MPEG, MPEG-4 Part 14, MOV, WMV, FLV, AVI, AVCHD, WebM, MKV, and so forth.

In some embodiments, the extended reality appliance may receive digital signals, for example, from the input device. The term digital signals refers to a series of digital values that are discrete in time. The digital signals may represent, for example, sensor data, textual data, voice data, video data, virtual data, or any other form of data that provides perceptible information. Consistent with the present disclosure, the digital signals may be configured to cause the extended reality appliance to present virtual content. In one embodiment, the virtual content may be presented in a selected orientation. In this embodiment, the digital signals may indicate a position and an angle of a viewpoint in an environment, such as an extended reality environment. Specifically, the digital signals may include an encoding of the position and angle in six degree-of-freedom coordinates (e.g., forward/back, up/down, left/right, yaw, pitch, and roll). In another embodiment, the digital signals may include an encoding of the position as three-dimensional coordinates (e.g., x, y, and z), and an encoding of the angle as a vector originating from the encoded position. Specifically, the digital signals may indicate the orientation and an angle of the presented virtual content in an absolute coordinates of the environment, for example, by encoding yaw, pitch and roll of the virtual content with respect to a standard default angle. In another embodiment, the digital signals may indicate the orientation and the angle of the presented virtual content with respect to a viewpoint of another object (e.g., a virtual object, a physical object, etc.), for example, by encoding yaw, pitch, and roll of the virtual content with respect a direction corresponding to the viewpoint or to a direction corresponding to the other object. In another embodiment, such digital signals may include one or more projections of the virtual content, for example, in a format ready for presentation (e.g., image, video, etc.). For example, each such projection may correspond to a particular orientation or a particular angle. In another embodiment, the digital signals may include a representation of virtual content, for example, by encoding objects in a three-dimensional array of voxels, in a polygon mesh, or in any other format in which virtual content may be presented.

In some embodiments, the digital signals may be configured to cause the extended reality appliance to present virtual content. The term virtual content may include any type of data representation that may be displayed by the extended reality appliance to the user. The virtual content may include a virtual object, inanimate virtual content, animate virtual content configured to change over time or in response to triggers, virtual two-dimensional content, virtual three-dimensional content, a virtual overlay over a portion of a physical environment or over a physical object, a virtual addition to a physical environment or to a physical object, a virtual promotion content, a virtual representation of a physical object, a virtual representation of a physical environment, a virtual document, a virtual character or persona, a virtual computer screen, a virtual widget, or any other format for displaying information virtually. Consistent with the present disclosure, the virtual content may include any visual presentation rendered by a computer or a processing device. In one embodiment, the virtual content may include a virtual object that is a visual presentation rendered by a computer in a confined region and configured to represent an object of a particular type (such as an inanimate virtual object, an animate virtual object, virtual furniture, a virtual decorative object, virtual widget, or other virtual representation). The rendered visual presentation may change to reflect changes to a status object or changes in the viewing angle of the object, for example, in a way that mimics changes in the appearance of physical objects. In another embodiment, the virtual content may include a virtual display (also referred to as a "virtual display screen" or a "virtual screen" herein), such as a virtual computer screen, a virtual tablet screen or a virtual smartphone screen, configured to display information generated by an operating system, in which the operating system may be configured to receive textual data from a physical keyboard and/or a virtual keyboard and to cause a display of the textual content in the virtual display screen. In one example, illustrated in FIG. 1, the virtual content may include a virtual environment that includes a virtual computer screen and a plurality of virtual objects. In some examples, a virtual display may be a virtual object mimicking and/or extending the functionality of a physical display screen. For example, the virtual display may be presented in an extended reality environment (such as a mixed reality environment, an augmented reality environment, a virtual reality environment, etc.), using an extended reality appliance. In one example, a virtual display may present content produced by a regular operating system that may be equally presented on a physical display screen. In one example, a textual content entered using a keyboard (for example, using a physical keyboard, using a virtual keyboard, etc.) may be presented on a virtual display in real time as the textual content is typed. In one example, a virtual cursor may be presented on a virtual display, and the virtual cursor may be controlled by a pointing device (such as a physical pointing device, a virtual pointing device, a computer mouse, a joystick, a touchpad, a physical touch controller, and so forth). In one example, one or more windows of a graphical user interface operating system may be presented on a virtual display. In another example, content presented on a virtual display may be interactive, that is, it may change in reaction to actions of users. In yet another example, a presentation of a virtual display may include a presentation of a screen frame, or may include no presentation of a screen frame.

Some disclosed embodiments may include and/or access a data structure or a database. The terms data structure and a database, consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree; a balanced tree, a heap, a stack, a queue, a set, a hash table, a record, a tagged union, Entity- Relationship model, a graph, a hypergraph, a matrix, a tensor, and so forth. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure does not require information to be co-located. It may be distributed across multiple servers, for example, that may be owned or operated by the same or different entities. Thus; the term data structure in the singular is inclusive of plural data structures.

In some embodiments, the system may determine the confidence level in received input or in any determined value. The term confidence level refers to any indication, numeric or otherwise, of a level (e.g., within a predetermined range) indicative of an amount of confidence the system has at determined data. For example, the confidence level may have a value between 1 and 10. Alternatively, the confidence level may be expressed as a percentage or any other numerical or non-numerical indication. In some cases, the system may compare the confidence level to a threshold. The term threshold may denote a reference value, a level, a point, or a range of values. In operation, when the confidence level of determined data exceeds the threshold for is below it, depending on a particular use case), the system may follow a first course of action and, when the confidence level is below it (or above it, depending on a particular use case), the system may follow a second course of action. The value of the threshold may be predetermined for each type of examined object or may be dynamically selected based on different considerations.

System Overview

Reference is now made to FIG. 1, which illustrates a user that uses an example extended reality system consistent with various embodiments of the present disclosure. FIG. 1 is an exemplary representation of just one embodiment, and it is to be understood that some illustrated elements might be omitted and others added within the scope of this disclosure. As shown, a user 100 is sitting behind table 102, supporting a keyboard 104 and mouse 106. Keyboard 104 is connected by wire 108 to a wearable extended reality appliance 110 that displays virtual content to user 100. Alternatively or additionally to wire 108, keyboard 104 may connect to wearable extended reality appliance 110 wirelessly. For illustration purposes, the wearable extended reality appliance is depicted as a pair of smart glasses, but, as described above, wearable extended reality appliance 110 may be any type of head-mounted device used for presenting an extended reality to user 100. The virtual content displayed by wearable extended reality appliance 110 includes a virtual screen 112 (also referred to as a "virtual display screen" or a "virtual display" herein) and a plurality of virtual widgets 114. Virtual widgets 114A-114D are displayed next to virtual screen 112 and virtual widget 114E is displayed on table 102. User 100 may input text to a document 116 displayed in virtual screen 112 using keyboard 104; and may control virtual cursor 118 using mouse 106. In one example, virtual cursor 118 may move anywhere within virtual screen 112. In another example, virtual cursor 118 may move anywhere within virtual screen 112 and may also move to any one of virtual widgets 114A-114D but not to virtual widget 114E. In yet another example, virtual cursor 118 may move anywhere within virtual screen 112 and may also move to any one of virtual widgets 114A-114E. In an additional example, virtual cursor 118 may move anywhere in the extended reality environment including virtual screen 112 and virtual widgets 114A-114E. In yet another example, virtual cursor may move on all available surfaces (i.e., virtual surfaces or physical surfaces) or only on selected surfaces in the extended reality environment. Alternatively or additionally, user 100 may interact with any one of virtual widgets 114A-114E, or with selected virtual widgets, using hand gestures recognized by wearable extended reality appliance 110. For example, virtual widget 114E may be an interactive widget (e.g., a virtual slider controller) that may be operated with hand gestures.

Figure 2:
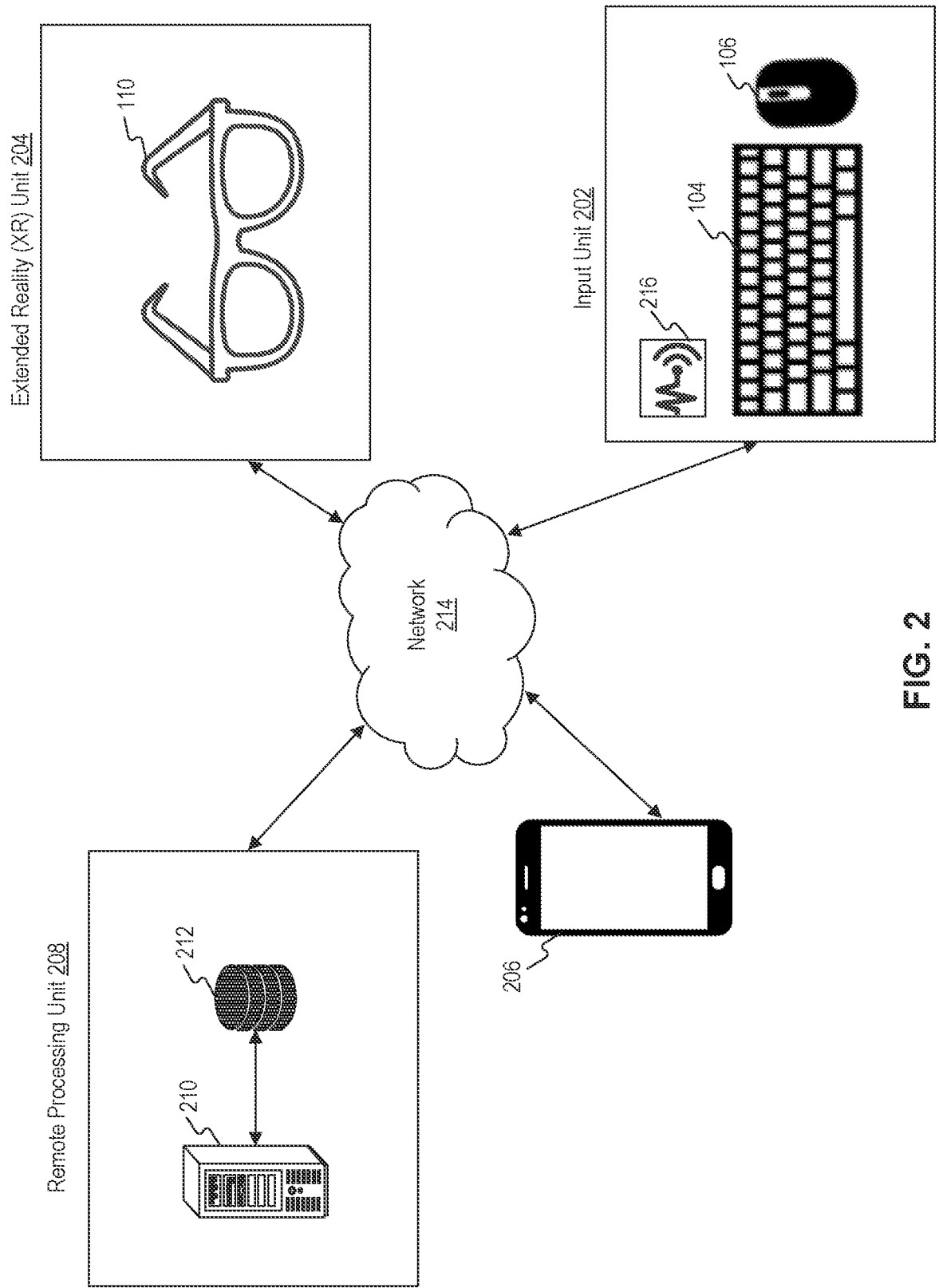
FIG. 2 is a schematic illustration of the main components of the example extended reality system of FIG. 1, consistent with some embodiments of the present disclosure.

FIG. 2 illustrates an example of a system 200 that provides extended reality (XR) experience to users, such as user 100. FIG. 2 is an exemplary representation of just one embodiment, and it is to be understood that some illustrated elements might be omitted and others added within the scope of this disclosure. System 200 may be computer-based and may include computer system components, wearable appliances, workstations, tablets, handheld computing devices, memory devices, and/or internal network(s) connecting the components. System 200 may include or be connected to various network computing resources (e.g., servers, routers, switches, network connections, storage devices, etc.) for supporting services provided by system 200. Consistent with the present disclosure, system 200 may include an input unit 202, an XR unit 204, a mobile communications device 206, and a remote processing unit 208. Remote processing unit 208 may include a server 210 coupled to one or more physical or virtual storage devices, such as a data structure 212. System 200 may also include or be connected to a communications network 214 that facilitates communications and data exchange between different system components and the different entities associated with system 200.

Consistent with the present disclosure, input unit 202 may include one or more devices that may receive input from user 100. In one embodiment, input unit 202 may include a textual input device, such as keyboard 104. The textual input device may include all possible types of devices and mechanisms for inputting textual information to system 200. Examples of textual input devices may include mechanical keyboards, membrane keyboards, flexible keyboards, QWERTY keyboards, Dvorak keyboards, Colemak keyboards, chorded keyboards, wireless keyboards, keypads, key-based control panels, or other arrays of control keys, vision input devices, or any other mechanism for inputting text, whether the mechanism is provided in physical form or is presented virtually. In one embodiment, input unit 202 may also include a pointing input device, such as mouse 106. The pointing input device may include all possible types of devices and mechanisms for inputting two-dimensional or three-dimensional information to system 200. In one example, two-dimensional input from the pointing input device may be used for interacting with virtual content presented via the XR unit 204. Examples of pointing input devices may include a computer mouse, trackball, touchpad, trackpad, touchscreen, joystick, pointing stick, stylus, light pen, or any other physical or virtual input mechanism. In one embodiment, input unit 202 may also include a graphical input device, such as a touchscreen configured to detect contact, movement, or break of movement. The graphical input device may use any of a plurality of touch sensitivity technologies, including, but not limited to, capacitive, resistive, infrared, and surface acoustic wave technologies as well as other proximity sensor arrays or other elements for determining one or more points of contact. In one embodiment, input unit 202 may also include one or more voice input devices, such as a microphone. The voice input device may include all possible types of devices and mechanisms for inputting voice data to facilitate voice-enabled functions, such as voice recognition, voice replication, digital recording, and telephony functions. In one embodiment, input unit 202 may also include one or more image input devices, such as an image sensor, configured to capture image data. In one embodiment, input unit 202 may also include one or more haptic gloves configured to capture hands motion and pose data. In one embodiment, input unit 202 may also include one or more proximity sensors configured to detect presence and/or movement of objects in a selected region near the sensors.

In accordance with some embodiments, the system may include at least one sensor configured to detect and/or measure a property associated with the user, the user's action, or user's environment. One example of the at least one sensor, is sensor 216 included in input unit 202. Sensor 216 may be a motion sensor, a touch sensor, a light sensor, an infrared sensor, an audio sensor, an image sensor, a proximity sensor, a positioning sensor, a gyroscope, a temperature sensor, a biometric sensor, or any other sensing devices to facilitate related functionalities. Sensor 216 may be integrated with, or connected to; the input devices or it may be separated from the input devices. In one example, a thermometer may be included in mouse 106 to determine the body temperature of user 100. In another example, a positioning sensor may be integrated with keyboard 104 to determine movement of user 100 relative to keyboard 104. Such positioning sensor may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, image based positioning technology, indoor positioning technology, outdoor positioning technology, or any other positioning technology.

In accordance with some embodiments, the system may include one or more sensors for identifying a position and/or a movement of a physical device (such as a physical input device, a physical computing device, keyboard 104, mouse 106, wearable extended reality appliance 110, and so forth). The one or more sensors may be included in the physical device or may be external to the physical device. In some examples, an image sensor external to the physical device (for example, an image sensor included in another physical device) may be used to capture image data of the physical device, and the image data may be analyzed to identify the position and/or the movement of the physical device. For example, the image data may be analyzed using a visual object tracking algorithm to identify the movement of the physical device, may be analyzed using a visual object detection algorithm to identify the position of the physical device (for example, relative to the image sensor, in a global coordinates system, etc.), and so forth. In some examples, an image sensor included in the physical device may be used to capture image data, and the image data may be analyzed to identify the position and/or the movement of the physical device. For example, the image data may be analyzed using visual odometry algorithms to identify the position of the physical device, may be analyzed using an ego-motion algorithm to identify movement of the physical device, and so forth. In some examples, a positioning sensor, such as an indoor positioning sensor or an outdoor positioning sensor, may be included in the physical device and may be used to determine the position of the physical device. In some examples, a motion sensor, such as an accelerometer or a gyroscope, may be included in the physical device and may be used to determine the motion of the physical device. In some examples, a physical device, such as a keyboard or a mouse, may be configured to be positioned on a physical surface. Such physical device may include an optical mouse sensor (also known as non-mechanical tracking engine) aimed towards the physical surface, and the output of the optical mouse sensor may be analyzed to determine movement of the physical device with respect to the physical surface.

Consistent with the present disclosure, XR unit 204 may include a wearable extended reality appliance configured to present virtual content to user 100. One example of the wearable extended reality appliance is wearable extended reality appliance 110. Additional examples of wearable extended reality appliance may include a Virtual Reality (VR) device, an Augmented Reality (AR) device, a Mixed Reality (MR) device, or any other device capable of generating extended reality content. Some non-limiting examples of such devices may include Nreal Light, Magic Leap One, Varjo, Quest 1/2, Vive, and others. In some embodiments, XR unit 204 may present virtual content to user 100. Generally, an extended reality appliance may include all real- and virtual combined environments and human-machine interactions generated by computer technology and wearables. As mentioned above, the term "extended reality" (XR) refers to a superset which includes the entire spectrum from "the complete real" to "the complete virtual." It includes representative forms such as augmented reality (AR), mixed reality (MR), virtual reality (VR), and the areas interpolated among them. Accordingly, it is noted that the terms "XR appliance," "AR appliance," "VR appliance," and "MR appliance" may be used interchangeably herein and may refer to any device of the variety of appliances listed above.

Consistent with the present disclosure, the system may exchange data with a variety of communication devices associated with users, for example, mobile communications device 206. The term "communication device" is intended to include all possible types of devices capable of exchanging data using digital communications network, analog communication network or any other communications network configured to convey data. In some examples, the communication device may include a smartphone, a tablet, a smartwatch, a personal digital assistant, a desktop computer, a laptop computer, an IoT device, a dedicated terminal, a wearable communication device, and any other device that enables data communications. In some cases, mobile communications device 206 may supplement or replace input unit 202. Specifically, mobile communications device 206 may be associated with a physical touch controller that may function as a pointing input device. Moreover, mobile communications device 206 may also, for example, be used to implement a virtual keyboard and replace the textual input device. For example, when user 100 steps away from table 102 and walks to the break room with his smart glasses, he may receive an email that requires a quick answer. In this case, the user may select to use his or her own smartwatch as the input device and to type the answer to the email while it is virtually presented by the smart glasses.

Consistent with the present disclosure, embodiments of the system may involve the usage of a cloud server. The term "cloud server" refers to a computer platform that provides services via a network, such as the Internet. In the example embodiment illustrated in FIG. 2, server 210 may use virtual machines that may not correspond to individual hardware. For example, computational and/or storage capabilities may be implemented by allocating appropriate portions of desirable computation/storage power from a scalable repository, such as a data center or a distributed computing environment. Specifically, in one embodiment, remote processing unit 208 may be used together with XR unit 204 to provide the virtual content to user 100, In one example configuration, server 210 may be a cloud server that functions as the operation system (OS) of the wearable extended reality appliance. In one example, server 210 may implement the methods described herein using customized hard-wired logic, one or more Application Specific Integrated Circuits (ASICs), Field Programmable Gate Arrays (FPGAs), firmware, and/or program logic which, in combination with the computer system, cause server 210 to be a special-purpose machine.

In some embodiments, server 210 may access data structure 212 to determine, for example, virtual content to display user 100. Data structure 212 may utilize a volatile or non-volatile, magnetic, semiconductor, tape, optical, removable, non-removable, other type of storage device or tangible or non-transitory computer-readable medium, or any medium or mechanism for storing information. Data structure 212 may be part of server 210 or separate from server 210, as shown. When data structure 212 is not part of server 210, server 210 may exchange data with data structure 212 via a communication link. Data structure 212 may include one or more memory devices that store data and instructions used to perform one or more features of the disclosed methods. In one embodiment, data structure 212 may include any of a plurality of suitable data structures, ranging from small data structures hosted on a workstation to large data structures distributed among data centers. Data structure 212 may also include any combination of one or more data structures controlled by memory controller devices (e.g., servers) or software.

Consistent with the present disclosure, communications network may be any type of network (including infrastructure) that supports communications, exchanges information, and/or facilitates the exchange of information between the components of a system. For example, communications network 214 in system 200 may include, for example, a telephone network, an extranet, an intranet, the Internet, satellite communications, off-line communications, wireless communications, transponder communications, a Local Area Network (LAN), wireless network (e.g., a Wi-Fi/ 302.11 network), a Wide Area Network (WAN), a Virtual Private Network (VPN), digital communication network, analog communication network, or any other mechanism or combinations of mechanism that enable data transmission.

The components and arrangements of system 200 shown in FIG. 2 are intended to be exemplary only and are not intended to limit any embodiment, as the system components used to implement the disclosed processes and features may vary.

Figure 3:
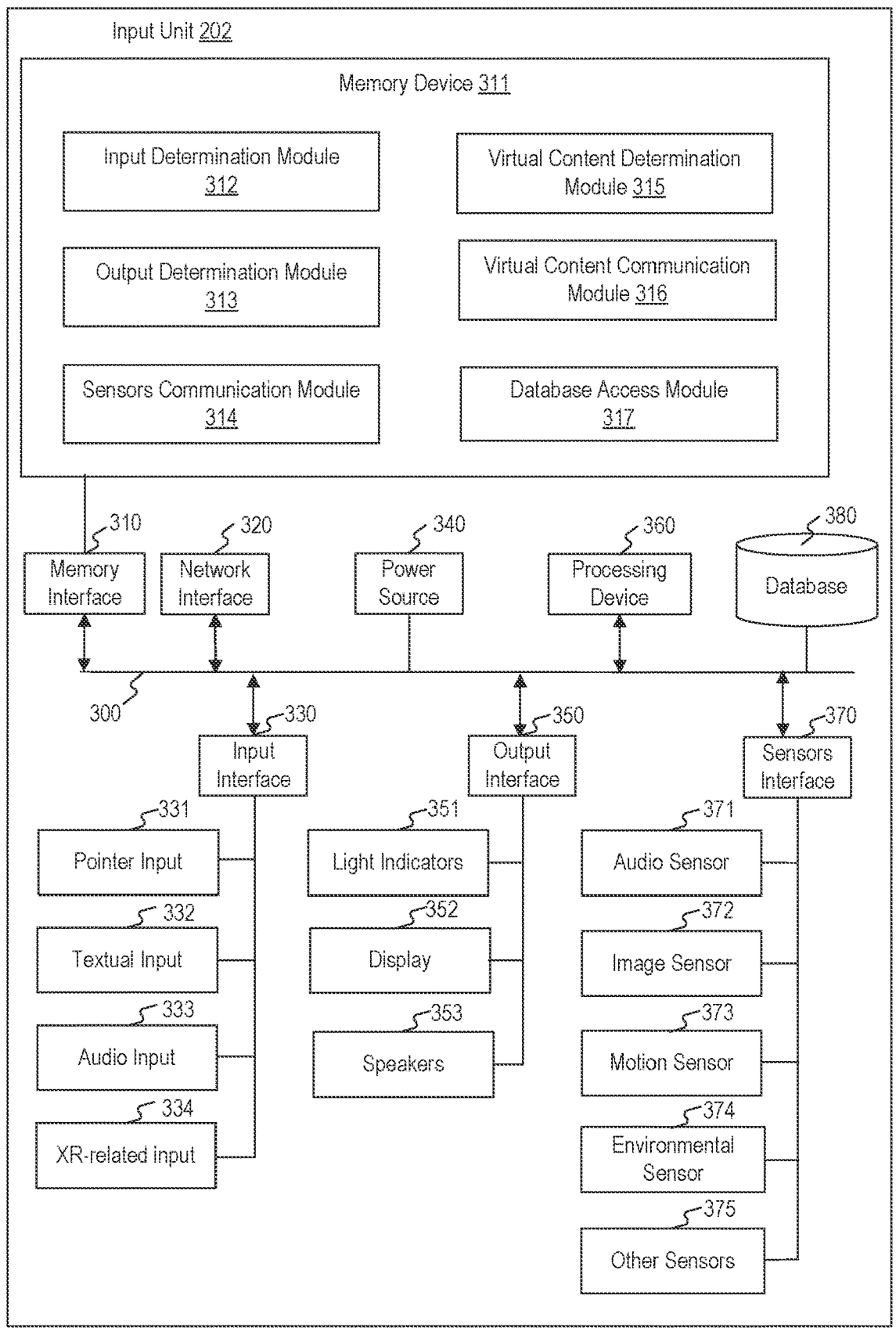
FIG. 3 is a block diagram illustrating some of the components of an input unit, consistent with some embodiments of the present disclosure.

FIG. 3 is a block diagram of an exemplary configuration of input unit 202. FIG. 3 is an exemplary representation of just one embodiment, and it is to be understood that some illustrated elements might be omitted and others added within the scope of this disclosure. In the embodiment of FIG. 3, input unit 202 may directly or indirectly access a bus 300 (or other communication mechanism) that interconnects subsystems and components for transferring information within input unit 202. For example, bus 300 may interconnect a memory interface 310, a network interface 320, an input interface 330, a power source 340, an output interface 350, a processing device 360, a sensors interface 370, and a database 360.

Memory interface 310, shown in FIG. 3, may be used to access a software product and/or data stored on a non-transitory computer-readable medium. Generally, a non-transitory computer-readable storage medium refers to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. Accordingly, the term computer-readable storage medium should be understood to include tangible items and exclude carrier waves and transient signals. In the specific embodiment illustrated in FIG. 3, memory interface 310 may be used to access a software product and/or data stored on a memory device, such as memory device 311. Memory device 311 may include high-speed random-access memory and/or non-volatile memory, such as one or more magnetic disk storage devices, one or more optical storage devices, and/or flash memory (e.g., NAND, NOR). Consistent with the present disclosure, the components of memory device 311 may be distributed in more than units of system 200 and/or in more than one memory device.

Memory device 311, shown in FIG. 3, may contain software modules to execute processes consistent with the present disclosure. In particular, memory device 311 may include an input determination module 312, an output determination module 313, a sensors communication module 314, a virtual content determination module 315, a virtual content communication module 316, and a database access module 317. Modules 312-317 may contain software instructions for execution by at least one processor (e.g., processing device 360) associated with input unit 202. Input determination module 312, output determination module 313, sensors communication module 314, virtual content determination module 315, virtual content communication module 316, and database access module 317 may cooperate to perform various operations. For example, input determination module 312 may determine text using data received from, for example, keyboard 104. Thereafter, output determination module 313 may cause presentation of the recent inputted text, for example on a dedicated display 352 physically or wirelessly coupled to keyboard 104. This way, when user 100 types, he can see a preview of the typed text without constantly moving his head up and down to look at virtual screen 112. Sensors communication module 314 may receive data from different sensors to determine a status of user 100. Thereafter, virtual content determination module 315 may determine the virtual content to display, based on received input and the determined status of user 100. For example, the determined virtual content may be a virtual presentation of the recent inputted text on a virtual screen virtually located adjacent to keyboard 104. Virtual content communication module 316 may obtain virtual content that is not determined by virtual content determination module 315 (e.g.; an avatar of another user). The retrieval of the virtual content may be from database 380, from remote processing unit 208, or any other source.

In some embodiments, input determination module 312 may regulate the operation of input interface 330 in order to receive pointer input 331, textual input 332, audio input 333, and XR-related input 334. Details on the pointer input, the textual input, and the audio input are described above. The term "XR-related input" may include any type of data that may cause a change in the virtual content displayed to user 100. In one embodiment, XR-related input 334 may include image data of user 100, a wearable extended reality appliance (e.g., detected hand gestures of user 100). In another embodiment, XR-related input 334 may include wireless communication indicating a presence of another user in proximity to user 100. Consistent with the present disclosure, input determination module 312 may concurrently receive different types of input data. Thereafter, input determination module 312 may further apply different rules based on the detected type of input. For example, a pointer input may have precedence over voice input.

In some embodiments, output determination module 313 may regulate the operation of output interface 350 in order to generate output using light indicators 351, display 352, and/or speakers 353. In general, the output generated by output determination module 313 does not include virtual content to be presented by a wearable extended reality appliance. Instead, the output generated by output determination module 313 include various outputs that relates to the operation of input unit 202 and/or the operation of XR unit 204. In one embodiment, light indicators 351 may include a light indicator that shows the status of a wearable extended reality appliance. For example, the light indicator may display green light when wearable extended reality appliance 110 are connected to keyboard 104, and blinks when wearable extended reality appliance 110 has low battery. In another embodiment, display 352 may be used to display operational information. For example, the display may present error messages when the wearable extended reality appliance is inoperable. In another embodiment, speakers 353 may be used to output audio, for example, when user 100 wishes to play some music for other users.

In some embodiments, sensors communication module 314 may regulate the operation of sensors interface 370 in order to receive sensor data from one or more sensors, integrated with, or connected to, an input device. The one or more sensors may include: audio sensor 371, image sensor 372, motion sensor 373, environmental sensor 374 (e.g., a temperature sensor, ambient light detectors, etc.), and other sensors 375. In one embodiment, the data received from sensors communication module 314 may be used to determine the physical orientation of the input device. The physical orientation of the input device may be indicative of a state of the user and may be determined based on combination of a tilt movement, a roll movement, and a lateral movement. Thereafter, the physical orientation of the input device may be used by virtual content determination module 315 to modify display parameters of the virtual content to match the state of the user (e.g., attention, sleepy, active, sitting, standing, leaning backwards, leaning forward, walking, moving, riding, etc.).

In some embodiments, virtual content determination module 315 may determine the virtual content to be displayed by the wearable extended reality appliance. The virtual content may be determined based on data from input determination module 312, sensors communication module 314, and other sources (e.g., database 380). In some embodiments, determining the virtual content may include determining the distance, the size, and the orientation of the virtual objects. The determination of the position of the virtual objects may be determined based on the type of the virtual objects. Specifically, with regards to the example illustrated in FIG. 1, the virtual content determination module 315 may determine to place four virtual widgets 114A-114D on the sides of virtual screen 112 and to place virtual widget 114E on table 102 because virtual widget 114E is a virtual controller (e.g., volume bar). The determination of the position of the virtual objects may further be determined based on user's preferences. For example, for left-handed users, virtual content determination module 315 may determine placing a virtual volume bar left of keyboard 104; and for right-handed users, virtual content determination module 315 may determine placing the virtual volume bar right of keyboard 104.

In some embodiments, virtual content communication module 316 may regulate the operation of network interface 320 in order to obtain data from one or more sources to be presented as virtual content to user 100. The one or more sources may include other XR units 204, the user's mobile communications device 206, remote processing unit 208, publicly available information, etc. In one embodiment, virtual content communication module 316 may communicate with mobile communications device 206 in order to provide a virtual representation of mobile communications device 206. For example, the virtual representation may enable user 100 to read messages and interact with applications installed on the mobile communications device 206. Virtual content communication module 316 may also regulate the operation of network interface 320 in order to share virtual content with other users. In one example, virtual content communication module 316 may use data from input determination module to identify a trigger (e.g., the trigger may include a gesture of the user) and to transfer content from the virtual display to a physical display (e.g., TV) or to a virtual display of a different user.

In some embodiments, database access module 317 may cooperate with database 380 to retrieve stored data. The retrieved data may include, for example, privacy levels associated with different virtual objects, the relationship between virtual objects and physical objects, the user's preferences, the user's past behavior, and more. As described above, virtual content determination module 315 may use the data stored in database 380 to determine the virtual content. Database 380 may include separate databases, including, for example, a vector database, raster database, tile database, viewport database, and/or a user input database. The data stored in database 380 may be received from modules 314-317 or other components of system 200. Moreover, the data stored in database 380 may be provided as input using data entry, data transfer, or data uploading.

Modules 312-317 may be implemented in software, hardware, firmware, a mix of any of those, or the like. In some embodiments, any one or more of modules 312-317 and data associated with database 380 may be stored in XR unit 204, mobile communications device 206, or remote processing unit 208. Processing devices of system 200 may be configured to execute the instructions of modules 312-317. In some embodiments, aspects of modules 312-317 may be implemented in hardware, in software (including in one or more signal processing and/or application specific integrated circuits), in firmware, or in any combination thereof, executable by one or more processors, alone, or in various combinations with each other. Specifically, modules 312-317 may be configured to interact with each other and/or other modules of system 200 to perform functions consistent with Some disclosed embodiments. For example, input unit 202 may execute instructions that include an image processing algorithm on data from XR unit 204 to determine head movement of user 100. Furthermore, each functionality described throughout the specification, with regards to input unit 202 or with regards to a component of input unit 202, may correspond to a set of instructions for performing said functionality. These instructions need not be implemented as separate software programs, procedures, or modules. Memory device 311 may include additional modules and instructions or fewer modules and instructions. For example, memory device 311 may store an operating system, such as ANDROID, iOS, UNIX, OSX, WINDOWS, DARWIN, RTXC, LINUX or an embedded operating system such as VXWorkS. The operating system can include instructions for handling basic system services and for performing hardware-dependent tasks.

Network interface 320, shown in FIG. 3, may provide two-way data communications to a network, such as communications network 214. In one embodiment, network interface 320 may include an Integrated Services Digital Network (ISDN) card, cellular modem, satellite modem, or a modem to provide a data communication connection over the Internet. As another example, network interface 320 may include a Wireless Local Area Network (WLAN) card. In another embodiment, network interface 320 may include an Ethernet port connected to radio frequency receivers and transmitters and/or optical (e.g., infrared) receivers and transmitters. The specific design and implementation of network interface 320 may depend on the communications network or networks over which input unit 202 is intended to operate. For example, in some embodiments, input unit 202 may include network interface 320 designed to operate over a GSM network, a GPRS network, an EDGE network, a Wi-Fi or WiMax network, and a Bluetooth network. In any such implementation, network interface 320 may be configured to send and receive electrical, electromagnetic, or optical signals that carry digital data streams or digital signals representing various types of information.

Input interface 330, shown in FIG. 3, may receive input from a variety of input devices, for example, a keyboard, a mouse, a touch pad, a touch screen, one or more buttons, a joystick, a microphone, an image sensor, and any other device configured to detect physical or virtual input. The received input may be in the form of at least one of: text, sounds, speech, hand gestures, body gestures, tactile information, and any other type of physically or virtually input generated by the user. In the depicted embodiment, input interface 330 may receive pointer input 331, textual input 332, audio input 333, and XR-related input 334. In additional embodiment, input interface 330 may be an integrated circuit that may act as bridge between processing device 360 and any of the input devices listed above.

Power source 340, shown in FIG. 3, may provide electrical energy to power input unit 202 and optionally also power XR unit 204. Generally, a power source included in the any device or system in the present disclosure may be any device that can repeatedly store, dispense, or convey electric power, including, but not limited to, one or more batteries (e.g., a lead-acid battery, a lithium-ion battery, a nickel-metal hydride battery, a nickel-cadmium battery), one or more capacitors, one or more connections to external power sources, one or more power convertors, or any combination of them. With reference to the example illustrated in FIG. 3, the power source may be mobile, which means that input unit 202 can be easily carried by a hand (e.g., the total weight of power source 340 may be less than a pound). The mobility of the power source enables user 100 to use input unit 202 in a variety of situations. In other embodiments, power source 340 may be associated with a connection to an external power source (such as an electrical power grid) that may be used to charge power source 340. In addition, power source 340 may be configured to charge one or more batteries included in XR unit 204; for example, a pair of extended reality glasses (e.g., wearable extended reality appliance 110) may be charged (e.g., wirelessly or not wirelessly) when they are placed on or in proximity to the input unit 202.

Output interface 350, shown in FIG. 3, may cause output from a variety of output devices, for example, using light indicators 351, display 352, and/or speakers 353. In one embodiment, output interface 350 may be an integrated circuit that may act as bridge between processing device 360 and at least one of the output devices listed above. Light indicators 351 may include one or more light sources, for example, a LED array associated with different colors. Display 352 may include a screen (e.g., LCD or dot-matrix screen) or a touch screen. Speakers 353 may include audio headphones, a hearing aid type device, a speaker, a bone conduction headphone, interfaces that provide tactile cues, vibrotactile stimulators, and more.

Processing device 360, shown in FIG. 3, may include at least one processor configured to execute computer programs, applications, methods, processes, or other software to perform embodiments described in the present disclosure. Generally, a processing device included in the any device or system in the present disclosure may include one or more integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. The processing device may include at least one processor configured to perform functions of the disclosed methods such as a microprocessor manufactured by Intel™. The processing device may include a single core or multiple core processors executing parallel processes simultaneously. In one example, the processing device may be a single core processor configured with virtual processing technologies. The processing device may implement virtual machine technologies or other technologies to provide the ability to execute, control, run, manipulate, store, etc., multiple software processes, applications, programs, etc. In another example, the processing device may include a multiple-core processor arrangement (e.g., dual, quad core, etc.) configured to provide parallel processing functionalities to allow a device associated with the processing device to execute multiple processes simultaneously. It is appreciated that other types of processor arrangements could be implemented to provide the capabilities disclosed herein.

Sensors interface 370, shown in FIG. 3, may obtain sensor data from a variety of sensors, for example, audio sensor 371, image sensor 372, motion sensor 373, environmental sensor 374, and other sensors 375. In one embodiment, sensors interface 370 may be an integrated circuit that may act as bridge between processing device 360 and at least one of the sensors listed above.

Audio sensor 371 may include one or more audio sensors configured to capture audio by converting sounds to digital information. Some examples of audio sensors may include: microphones, unidirectional microphones, bidirectional microphones, cardioid microphones, omnidirectional microphones, onboard microphones, wired microphones, wireless microphones, or any combination of the above. Consistent with the present disclosure, processing device 360 may modify a presentation of virtual content based on data received from audio sensor 371 (e.g., voice commands).

Image sensor 372 may include one or more image sensors configured to capture visual information by converting light to image data. Consistent with the present disclosure, an image sensor may be included in the any device or system in the present disclosure and may be any device capable of detecting and converting optical signals in the near-infrared, infrared, visible, and ultraviolet spectrums into electrical signals. Examples of image sensors may include digital cameras, phone cameras, semiconductor Charge-Coupled Devices (CCDs), active pixel sensors in Complementary Metal-Oxide-Semiconductor (CMOS), or N-type metal-oxide-semiconductor (NMOS, Live MOS). The electrical signals may be used to generate image data. Consistent with the present disclosure, the image data may include pixel data streams, digital images, digital video streams, data derived from captured images, and data that may be used to construct one or more 3D images, a sequence of 3D images, 3D videos, or a virtual 3D representation. The image data acquired by image sensor 372 may be transmitted by wired or wireless transmission to any processing device of system 200. For example, the image data may be processed in order to: detect objects, detect events, detect action, detect face, detect people, recognize a known person, or any other information that may be used by system 200. Consistent with the present disclosure, processing device 360 may modify a presentation of virtual content based on image data received from image sensor 372.

Motion sensor 373 may include one or more motion sensors configured to measure motion of input unit 202 or motion of objects in the environment of input unit 202. Specifically, the motion sensors may perform at least one of the following: detect motion of objects in the environment of input unit 202, measure the velocity of objects in the environment of input unit 202, measure the acceleration of objects in the environment of input unit 202, detect the motion of input unit 202, measure the velocity of input unit 202, measure the acceleration of input unit 202, etc. In some embodiments, motion sensor 373 may include one or more accelerometers configured to detect changes in proper acceleration and/or to measure proper acceleration of input unit 202. In other embodiments, motion sensor 373 may include one or more gyroscopes configured to detect changes in the orientation of input unit 202 and/or to measure information related to the orientation of input unit 202. In other embodiments, motion sensor 373 may include one or more using image sensors, LIDAR sensors, radar sensors, or proximity sensors. For example, by analyzing captured images the processing device may determine the motion of input unit 202, for example, using ego-motion algorithms. In addition, the processing device may determine the motion of objects in the environment of input unit 202, for example, using object tracking algorithms. Consistent with the present disclosure, processing device 360 may modify a presentation of virtual content based on the determined motion of input unit 202 or the determined motion of objects in the environment of input unit 202. For example, causing a virtual display to follow the movement of input unit 202.

Environmental sensor 374 may include one or more sensors from different types configured to capture data reflective of the environment of input unit 202. In some embodiments, environmental sensor 374 may include one or more chemical sensors configured to perform at least one of the following: measure chemical properties in the environment of input unit 202, measure changes in the chemical properties in the environment of input unit 202, detect the present of chemicals in the environment of input unit 202, measure the concentration of chemicals in the environment of input unit 202. Examples of such chemical properties may include: pH level, toxicity, and temperature. Examples of such chemicals may include: electrolytes, particular enzymes, particular hormones, particular proteins, smoke, carbon dioxide, carbon monoxide, oxygen, ozone, hydrogen, and hydrogen sulfide. In other embodiments, environmental sensor 374 may include one or more temperature sensors configured to detect changes in the temperature of the environment of input unit 202 and/or to measure the temperature of the environment of input unit 202. In other embodiments, environmental sensor 374 may include one or more barometers configured to detect changes in the atmospheric pressure in the environment of input unit 202 and/or to measure the atmospheric pressure in the environment of input unit 202. In other embodiments, environmental sensor 374 may include one or more light sensors configured to detect changes in the ambient light in the environment of input unit 202. Consistent with the present disclosure, processing device 360 may modify a presentation of virtual content based on input from environmental sensor 374. For example, automatically reducing the brightness of the virtual content when the environment of user 100 becomes darker.

Other sensors 375 may include a weight sensor, a light sensor, a resistive sensor, an ultrasonic sensor, a proximity sensor, a biometric sensor, or other sensing devices to facilitate related functionalities. In a specific embodiment, other sensors 375 may include one or more positioning sensors configured to obtain positioning information of input unit 202, to detect changes in the position of input unit 202, and/or to measure the position of input unit 202. Alternatively, GPS software may permit input unit 202 to access an external GPS receiver (e.g., connecting via a serial port or Bluetooth). Consistent with the present disclosure, processing device 360 may modify a presentation of virtual content based on input from other sensors 375. For example, presenting private information only after identifying user 100 using data from a biometric sensor.

The components and arrangements shown in FIG. 3 are not intended to limit any embodiment. As will be appreciated by a person skilled in the art having the benefit of this disclosure, numerous variations and/or modifications may be made to the depicted configuration of input unit 202. For example, not all components may be essential for the operation of an input unit in all cases. Any component may be located in any appropriate part of an input unit, and the components may be rearranged into a variety of configurations while providing the functionality of various embodiments. For example, some input units may not include all of the elements as shown in input unit 202.

Figure 4:
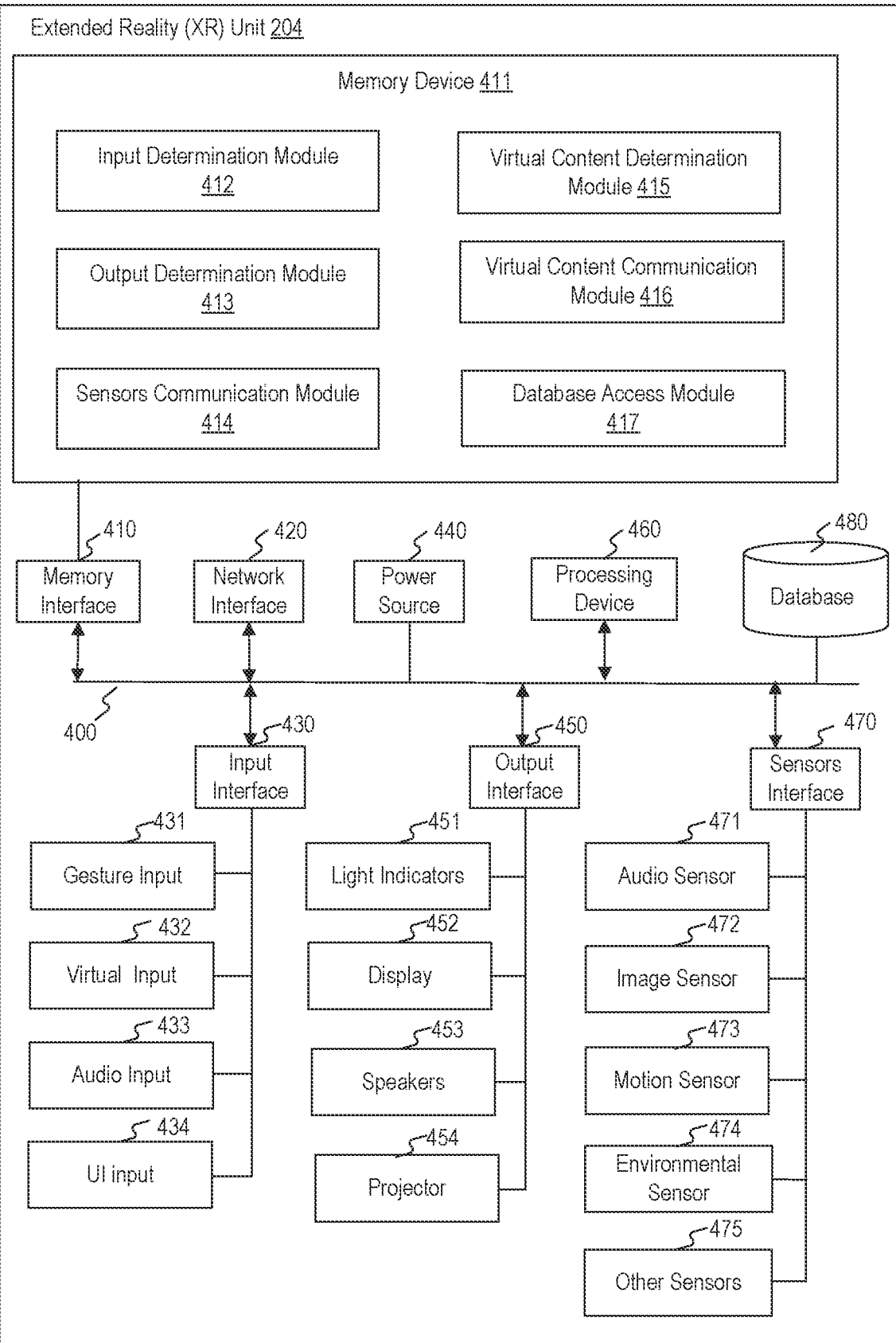
FIG. 4 is a block diagram illustrating some of the components of an extended reality unit, consistent with some embodiments of the present disclosure.

FIG. 4 is a block diagram of an exemplary configuration of XR unit 204. FIG. 4 is an exemplary representation of just one embodiment, and it is to be understood that some illustrated elements might be omitted and others added within the scope of this disclosure. In the embodiment of FIG. 4, XR unit 204 may directly or indirectly access a bus 400 (or other communication mechanism) that interconnects subsystems and components for transferring information within XR unit 204. For example, bus 400 may interconnect a memory interface 410, a network interface 420, an input interface 430, a power source 440, an output interface 450, a processing device 460, a sensors interface 470, and a database 480.

Memory interface 410, shown in FIG. 4, is assumed to have similar functionality as the functionality of memory interface 310 described above in detail. Memory interface 410 may be used to access a software product and/or data stored on a non-transitory computer-readable medium or on memory devices, such as memory device 411. Memory device 411 may contain software modules to execute processes consistent with the present disclosure. In particular, memory device 411 may include an input determination module 412, an output determination module 413, a sensors communication module 414, a virtual content determination module 415, a virtual content communication module 416, and a database access module 417. Modules 412-417 may contain software instructions for execution by at least one processor (e.g., processing device 460) associated with XR unit 204. Input determination module 412, output determination module 413, sensors communication module 414, virtual content determination module 415, virtual content communication module 416, and database access module 417 may cooperate to perform various operations. For example, input determination module 412 may determine User Interface (UI) input received from input unit 202. At the same time, sensors communication module 414 may receive data from different sensors to determine a status of user 100. Virtual content determination module 415 may determine the virtual content to display based on received input and the determined status of user 100. Virtual content communication module 416 may retrieve virtual content not determined by virtual content determination module 415. The retrieval of the virtual content may be from database 380, database 480, mobile communications device 206, or from remote processing unit 208. Based on the output of virtual content determination module 415, output determination module 413 may cause a change in a virtual content displayed to user 100 by projector 454.

In some embodiments, input determination module 412 may regulate the operation of input interface 430 in order to receive gesture input 431, virtual input 432, audio input 433, and UI input 434. Consistent with the present disclosure, input determination module 412 may concurrently receive different types of input data. In one embodiment, input determination module 412 may apply different rules based on the detected type of input. For example, gesture input may have precedence over virtual input. In some embodiments, output determination module 413 may regulate the operation of output interface 450 in order to generate output using light indicators 451, display 452, speakers 453, and projector 454. In one embodiment, light indicators 451 may include a light indicator that shows the status of the wearable extended reality appliance. For example, the light indicator may display green light when the wearable extended reality appliance 110 are connected to input unit 202, and blinks when wearable extended reality appliance 110 has low battery. In another embodiment, display 452 may be used to display operational information. In another embodiment, speakers 453 may include a bone conduction headphone used to output audio to user 100. In another embodiment, projector 454 may present virtual content to user 100.

The operations of a sensors communication module, a virtual content determination module, a virtual content communication module, and a database access module are described above with reference to FIG. 3, details of which are not repeated herein. Modules 412-417 may be implemented in software, hardware, firmware, a mix of any of those, or the like.

Network interface 420, shown in FIG. 4, is assumed to have similar functionality as the functionality of network interface 320, described above in detail. The specific design and implementation of network interface 420 may depend on the communications network(s) over which XR unit 204 is intended to operate. For example, in some embodiments, XR unit 204 is configured to be selectively connectable by wire to input unit 202. When connected by wire, network interface 420 may enable communications with input unit 202; and when not connected by wire, network interface 420 may enable communications with mobile communications device 206.

Input interface 430, shown in FIG. 4, is assumed to have similar functionality as the functionality of input interface 330 described above in detail. In this case, input interface 430 may communicate with an image sensor to obtain gesture input 431 (e.g., a finger of user 100 pointing to a virtual object), communicate with other XR units 204 to obtain virtual input 432 (e.g., a virtual object shared with XR unit 204 or a gesture of avatar detected in the virtual environment), communicate with a microphone to obtain audio input 433 (e.g., voice commands), and communicate with input unit 202 to obtain UI input 434 (e.g., virtual content determined by virtual content determination module 315).

Power source 440, shown in FIG. 4, is assumed to have similar functionality as the functionality of power source 340 described above, only it provides electrical energy to power XR unit 204. In some embodiments, power source 440 may be charged by power source 340. For example, power source 440 may be wirelessly changed when XR unit 204 is placed on or in proximity to input unit 202.

Output interface 450, shown in FIG. 4, is assumed to have similar functionality as the functionality of output interface 350 described above in detail. In this case, output interface 450 may cause output from light indicators 451, display 452, speakers 453, and projector 454. Projector 454 may be any device, apparatus, instrument, or the like capable of projecting (or directing) light in order to display virtual content onto a surface. The surface may be part of XR unit 204, part of an eye of user 100, or part of an object in proximity to user 100. In one embodiment, projector 454 may include a lighting unit that concentrates light within a limited solid angle by means of one or more mirrors and lenses and provides a high value of luminous intensity in a defined direction.

Processing device 460, shown in FIG. 4, is assumed to have similar functionality as the functionality of processing device 360 described above in detail. When XR unit 204 is connected to input unit 202, processing device 460 may work together with processing device 360. Specifically, processing device 460 may implement virtual machine technologies or other technologies to provide the ability to execute, control, run, manipulate, store, etc., multiple software processes, applications, programs, etc. It is appreciated that other types of processor arrangements could be implemented to provide the capabilities disclosed herein.

Sensors interface 470, shown in FIG. 4, is assumed to have similar functionality as the functionality of sensors interface 370 described above in detail. Specifically sensors interface 470 may communicate with audio sensor 471, image sensor 472, motion sensor 473, environmental sensor 474, and other sensors 475. The operations of an audio sensor, an image sensor, a motion sensor, an environmental sensor, and other sensors are described above with reference to FIG. 3, details of which are not repeated herein. It is appreciated that other types and combination of sensors may be used to provide the capabilities disclosed herein.

The components and arrangements shown in FIG. 4 are not intended to limit any embodiment. As will be appreciated by a person skilled in the art having the benefit of this disclosure, numerous variations and/or modifications may be made to the depicted configuration of XR unit 204. For example, not all components may be essential for the operation of XR unit 204 in all cases. Any component may be located in any appropriate part of system 200, and the components may be rearranged into a variety of configurations while providing the functionality of various embodiments. For example, some XR units may not include all of the elements in XR unit 204 (e.g., wearable extended reality appliance 110 may not have light indicators 451).

Figure 5:
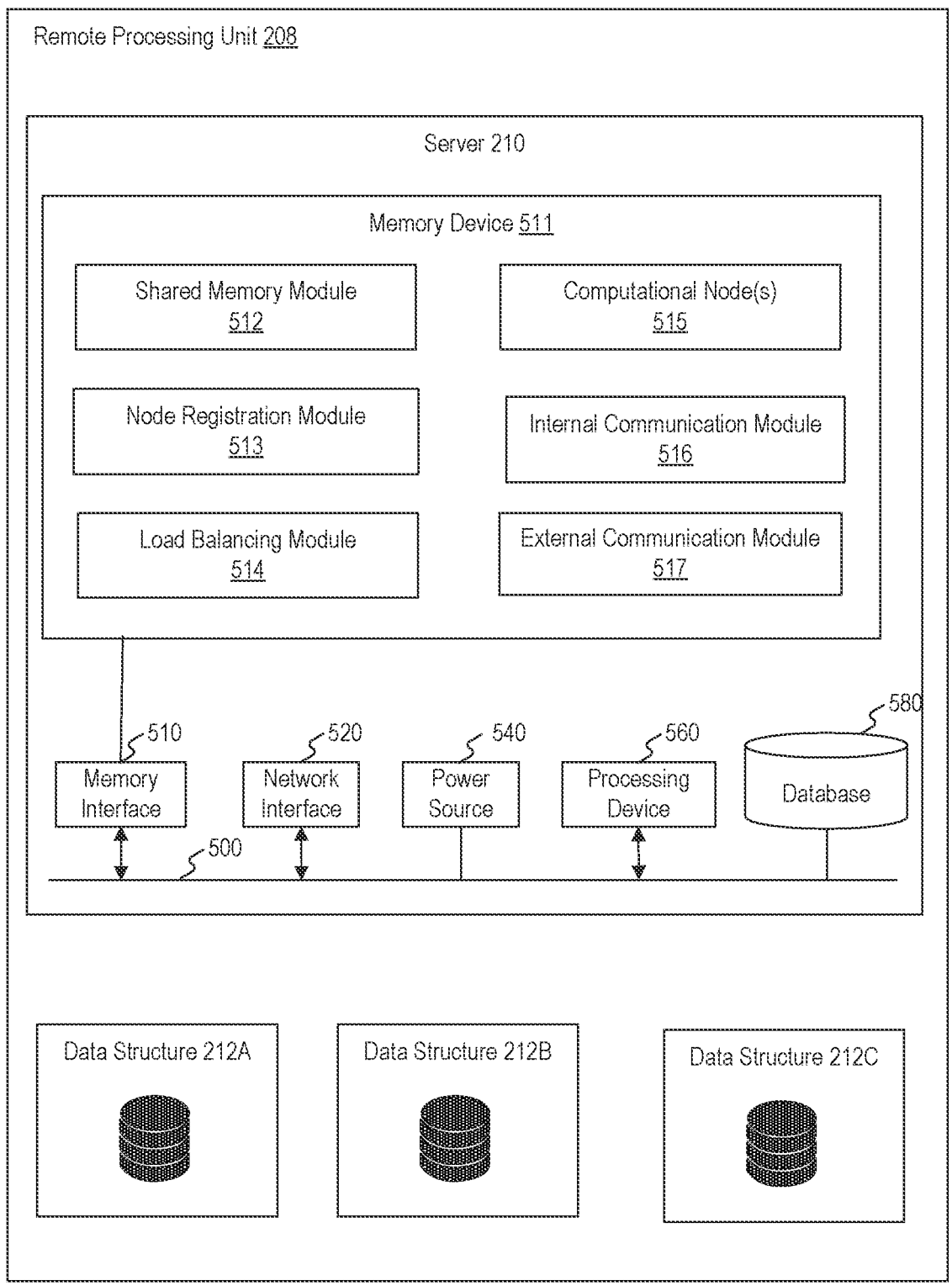
FIG. 5 is a block diagram illustrating some of the components of a remote processing unit, consistent with some embodiments of the present disclosure.

FIG. 5 is a block diagram of an exemplary configuration of remote processing unit 208. FIG. 5 is an exemplary representation of just one embodiment, and it is to be understood that some illustrated elements might be omitted and others added within the scope of this disclosure. In the embodiment of FIG. 5, remote processing unit 208 may include a server 210 that directly or indirectly accesses a bus 500 (or other communication mechanism) interconnecting subsystems and components for transferring information within server 210. For example, bus 500 may interconnect a memory interface 510, a network interface 520, a power source 540, a processing device 560, and a database 580. Remote processing unit 208 may also include a one or more data structures. For example, data structures 212A, 212B, and 212C.

Memory interface 510, shown in FIG. 5, is assumed to have similar functionality as the functionality of memory interface 310 described above in detail. Memory interface 510 may be used to access a software product and/or data stored on a non-transitory computer-readable medium or on other memory devices, such as memory devices 311, 411, 511, or data structures 212A, 2125, and 2120. Memory device 511 may contain software modules to execute processes consistent with the present disclosure. In particular, memory device 511 may include a shared memory module 512, a node registration module 513, a load balancing module 514, one or more computational nodes 515, an internal communication module 516, an external communication module 517, and a database access module (not shown). Modules 512-517 may contain software instructions for execution by at least one processor (e.g., processing device 560) associated with remote processing unit 208. Shared memory module 512, node registration module 513, load balancing module 514, computational module 515, and external communication module 517 may cooperate to perform various operations.

Shared memory module 512 may allow information sharing between remote processing unit 208 and other components of system 200. In some embodiments, shared memory module 512 may be configured to enable processing device 560 (and other processing devices in system 200) to access, retrieve, and store data. For example, using shared memory module 512, processing device 560 may perform at least one of: executing software programs stored on memory device 511, database 580, or data structures 212A-C; storing information in memory device 511, database 580, or data structures 212A-C; or retrieving information from memory device 511, database 580, or data structures 212A-C.

Node registration module 513 may be configured to track the availability of one or more computational nodes 515. In some examples, node registration module 513 may be implemented as: a software program, such as a software program executed by one or more computational nodes 515, a hardware solution, or a combined software and hardware solution. In some implementations, node registration module 513 may communicate with one or more computational nodes 515, for example, using internal communication module 516. In some examples, one or more computational nodes 515 may notify node registration module 513 of their status, for example, by sending messages: at startup, at shutdown, at constant intervals, at selected times, in response to queries received from node registration module 513, or at any other determined times. In some examples, node registration module 513 may query about the status of one or more computational nodes 515, for example, by sending messages: at startup, at constant intervals, at selected times, or at any other determined times.

Load balancing module 514 may be configured to divide the workload among one or more computational nodes 515. In some examples, load balancing module 514 may be implemented as: a software program, such as a software program executed by one or more of the computational nodes 515, a hardware solution, or a combined software and hardware solution. In some implementations, load balancing module 514 may interact with node registration module 513 in order to obtain information regarding the availability of one or more computational nodes 515. In some implementations, load balancing module 514 may communicate with one or more computational nodes 515, for example, using internal communication module 516. In some examples, one or more computational nodes 515 may notify load balancing module 514 of their status, for example, by sending messages: at startup, at shutdown, at constant intervals, at selected times, in response to queries received from load balancing module 514, or at any other determined times. In some examples, load balancing module 514 may query about the status of one or more computational nodes 515, for example, by sending messages: at startup, at constant intervals, at pre-selected times, or at any other determined times.

Internal communication module 516 may be configured to receive and/or to transmit information from one or more components of remote processing unit 208. For example, control signals and/or synchronization signals may be sent and/or received through internal communication module 516. In one embodiment, input information for computer programs, output information of computer programs, and/or intermediate information of computer programs may be sent and/or received through internal communication module 516. In another embodiment, information received though internal communication module 516 may be stored in memory device 511, in database 580, in data structures 212A-C, or other memory device in system 200. For example, information retrieved from data structure 212A may be transmitted using internal communication module 516. In another example, input data may be received using internal communication module 516 and stored in data structure 212B.

External communication module 517 may be configured to receive and/or to transmit information from one or more components of system 200. For example, control signals may be sent and/or received through external communication module 517. In one embodiment, information received though external communication module 517 may be stored in memory device 511, in database 580, in data structures 212A-C, and or any memory device in the system 200. In another embodiment, information retrieved from any of data structures 212A-C may be transmitted using external communication module 517 to XR unit 204. In another embodiment, input data may be transmitted and/or received using external communication module 517. Examples of such input data may include data received from input unit 202, information captured from the environment of user 100 using one or more sensors (e.g., audio sensor 471, image sensor 472, motion sensor 473, environmental sensor 474, other sensors 475), and more.

In some embodiments, aspects of modules 512-517 may be implemented in hardware, in software (including in one or more signal processing and/or application specific integrated circuits), in firmware, or in any combination thereof, executable by one or more processors, alone, or in various combinations with each other. Specifically, modules 512-517 may be configured to interact with each other and/or other modules of system 200 to perform functions consistent with embodiments of the present disclosure. Memory device 511 may include additional modules and instructions or fewer modules and instructions.

Network interface 520, power source 540, processing device 560, and database 580, shown in FIG. 5, are assumed to have similar functionality as the functionality of similar elements described above with reference to FIGS. 4 and 5. The specific design and implementation of the above-mentioned components may vary based on the implementation of system 200. In addition, remote processing unit 208 may include more or fewer components. For example, remote processing unit 208 may include an input interface configured to receive direct input from one or more input devices.

Consistent with the present disclosure, a processing device of system 200 (e.g., processor within mobile communications device 206, a processor within a server 210, a processor within a wearable extended reality appliance, such as, wearable extended reality appliance 110, and/or a processor within an input device associated with wearable extended reality appliance 110, such as keyboard 104) may use machine learning algorithms in order to implement any of the methods disclosed herein. In some embodiments, machine learning algorithms (also referred to as machine learning models in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recurrent neural network algorithms, linear machine learning models, non-linear machine learning models, ensemble algorithms, and more. For example, a trained machine learning algorithm may comprise an inference model, such as a predictive model, a classification model, a data regression model, a clustering model, a segmentation model, an artificial neural network (such as a deep neural network, a convolutional neural network, a recurrent neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters may be set manually by a person or automatically by a process external to the machine learning algorithm (such as a hyper parameter search algorithm), and the parameters of the machine learning algorithm may be set by the machine learning algorithm based on the training examples. In some implementations, the hyper-parameters may be set based on the training examples and the validation examples, and the parameters may be set based on the training examples and the selected hyper-parameters. For example, given the hyper-parameters, the parameters may be conditionally independent of the validation examples.

In some embodiments, trained machine learning algorithms (also referred to as machine learning models and trained machine learning models in the present disclosure) may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value corresponding to the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value corresponding to an item depicted in the image (such as an estimated property of the item, such as size, volume, age of a person depicted in the image, distance from an item depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

Consistent with the present disclosure, a processing device of system 200 may analyze image data captured by an image sensor (e.g., image sensor 372, image sensor 472, or any other image sensor) in order to implement any of the methods disclosed herein. In some embodiments, analyzing the image data may comprise analyzing the image data to obtain a preprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth. In some examples, analyzing the image data may include calculating at least one convolution of at least a portion of the image data, and using the calculated at least one convolution to calculate at least one resulting value and/or to make determinations, identifications, recognitions, classifications, and so forth.

Consistent with another aspects of the disclosure, a processing device of system 200 may analyze image data in order to implement any of the methods disclosed herein. In some embodiments, analyzing the image may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result, and more. In some embodiments, analyzing image data (for example by the methods, steps and modules described herein) may comprise analyzing pixels, voxels, point cloud, range data, etc. included in the image data.

A convolution may include a convolution of any dimension. A one-dimensional convolution is a function that transforms an original sequence of numbers to a transformed sequence of numbers. The one-dimensional convolution may be defined by a sequence of scalars. Each particular value in the transformed sequence of numbers may be determined by calculating a linear combination of values in a subsequence of the original sequence of numbers corresponding to the particular value. A result value of a calculated convolution may include any value in the transformed sequence of numbers. Likewise, an n-dimensional convolution is a function that transforms an original n-dimensional array to a transformed array. The n-dimensional convolution may be defined by an n-dimensional array of scalars (known as the kernel of the n-dimensional convolution). Each particular value in the transformed array may be determined by calculating a linear combination of values in an n-dimensional region of the original array corresponding to the particular value. A result value of a calculated convolution may include any value in the transformed array. In some examples, an image may comprise one or more components (such as color components, depth component, etc.), and each component may include a two-dimensional array of pixel values. In one example, calculating a convolution of an image may include calculating a two-dimensional convolution on one or more components of the image. In another example, calculating a convolution of an image may include stacking arrays from different components to create a three-dimensional array, and calculating a three-dimensional convolution on the resulting three-dimensional array. In some examples, a video may comprise one or more components (such as color components, depth component, etc.), and each component may include a three-dimensional array of pixel values (with two spatial axes and one temporal axis). In one example, calculating a convolution of a video may include calculating a three-dimensional convolution on one or more components of the video. In another example, calculating a convolution of a video may include stacking arrays from different components to create a four-dimensional array, and calculating a four-dimensional convolution on the resulting four-dimensional array.

When using a wearable extended reality appliance, there may be a desire to change a perspective view, such as by zooming-in on an object, or by changing a virtual orientation of an object. It may be desirable to enable this type of control via a touch controller that interacts with the wearable extended reality appliance such that a finger pinch or rotation on the touch sensor changes the perspective view of the scene. The following disclosure describes various systems, methods, and non-transitory computer readable media for controlling perspective in an extended reality environment using a physical touch controller.

Some disclosed embodiments may involve systems, methods, and non-transitory computer readable medium for controlling perspective in an extended reality environment using a physical touch controller. The term non-transitory is intended to describe a computer-readable storage medium excluding propagating electromagnetic signals, but is not intended to otherwise limit the type of physical computer-readable storage device that is encompassed by the phrase computer readable medium. For instance, the term non-transitory computer readable medium is intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. A non-transitory computer readable medium may include magnetic disks, cards, tapes, drums, punched cards, paper tapes, optical discs, barcodes, and magnetic ink characters, or any other tangible medium capable of storing data in a format readable by a mechanical device.

Controlling perspective as used in this disclosure may include, for example, changing a position of a scene in fixed distance, changing a distance of the scene, changing an angle of the scene, changing a size of the scene, causing rotation of the scene, or any other manipulation of the scene that may cause a change in how a viewer may visualize the scene. In one example, controlling perspective may include changing a spatial transformation of the scene. Some non-limiting examples of spatial transformations may include a translation transformation, a rotation transformation, a reflection transformation, a dilation transformation, an affine transformation, a projective transformation, and so forth. In one example, controlling perspective may include changing a first spatial transformation of a first portion of the scene and changing a second spatial transformation of a second portion of the scene (the second spatial transformation may differ from the first spatial transformation, the change to the second spatial transformation may differ from the change to the first spatial transformation, and/or the second portion of the scene may differ from the first portion of the scene). A scene may include, for example, a location, site, place, position, point, spot, locale, arena, stage, set, locus, section, segment, part, clip, sequence, animate or inanimate objects, persons, or any other component of a visual field. Changing a position of a scene in fixed distance may include, for example, translating the scene in a horizontal direction, a vertical direction, a diagonal direction, a rotational direction, or any other direction in a three-dimensional field. Changing a distance of the scene may include, for example, increasing or decreasing an amount of space between the scene and any reference point horizontally, vertically, diagonally, rotationally, or in any other direction in a three-dimensional field. Changing an angle of the scene may include, for example, increasing or decreasing a gradient, slant, tilt, or any other inclination between two reference points. Changing a size of the scene may include, for example, enlarging, augmenting, broadening, expanding, extending, growing, inflating, lengthening, magnifying, swelling, widening, amplifying, dilating, elongating, spreading, stretching, shrinking, decreasing, diminishing, lessening, narrowing, reducing, shortening, compressing, or constricting one or more dimensions of any component, components, or combination of components in the scene. Other manipulations of the scene may involve any visual alteration of the scene in relation to the original scene.

A physical touch controller may include a device that permits manipulation of information on a display through detection of finger contact with a surface or finger motion on a surface. Any reference to a finger herein, may equally apply to other objects, such as any other digit, a pen, a rode, and so forth. Any reference to a contact and/or a motion of a finger herein, may equally apply to a contact and/or a motion of any other object, such as any other digit, a pen, a rode, a plurality of such objects (for example, in a multi-touch surface), and so forth. A physical touch controller may be implemented via software, hardware, or any combination thereof. In some embodiments, a physical touch controller may include, for example, one or more of a computer chip, one or more of a circuit board, one or more electronic circuits, or any combination thereof. Additionally or alternatively, a physical touch controller may include, for example, storage media having executable instructions adapted to communicate with a touch sensor. In certain embodiments, a physical touch controller may be connected to other components such as sensors and processors using wired or wireless systems. For example, a touch controller may be implemented through pressure sensing of fingers (or surrogates for fingers) on a touch sensitive surface or through optical sensors that detect touch or finger movement. In some examples, the physical touch controller may permit manipulation of information on a display through at least one of a touch sensor, a touchpad, a trackpad, a touchscreen, and so forth.

Some disclosed embodiments of the computer readable medium may contain instructions that when executed by at least one processor cause the at least one processor to perform one or more functions. Instructions may include any order, command, directive, program, code, or condition that indicates how something should be done, operated, or processed. The processor that executes the instructions may be a general purpose computer, but may utilize any of a wide variety of other technologies including, for example, a special purpose computer, a microcomputer, mini-computer, mainframe computer, programmed microprocessor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps or the processes of the instant disclosure. In some embodiments, the at least one processor may comprise a plurality of processors that need not be physically in the same location. Each of the processors may be in geographically distinct locations and be connected so as to communicate with each other in any suitable manner. In some embodiments, each of the plurality of processors may be composed of different physical pieces of equipment.

The instructions embodied in the non-transitory computer-readable media may include various instructions that cause the processor to perform a particular task or tasks. Such a set of instructions for performing a particular task may be characterized, for example, as a program, software program, software, engine, module, component, mechanism, unit, or tool. Some embodiments may include a plurality of software processing modules stored in a memory and executed on an at least one processor. The program modules may be in the form of any suitable programming language, which is converted to machine language or object code to allow the at least one processor to read the instructions. The programming language used may include assembly language, Ada, APL, Basic, C, C++, COBOL, dBase, Forth, FORTRAN, Java, Modula-2, Pascal, Prolog, REXX, Visual Basic, JavaScript, or any other set of strings that produce machine code output.

Figure 7:
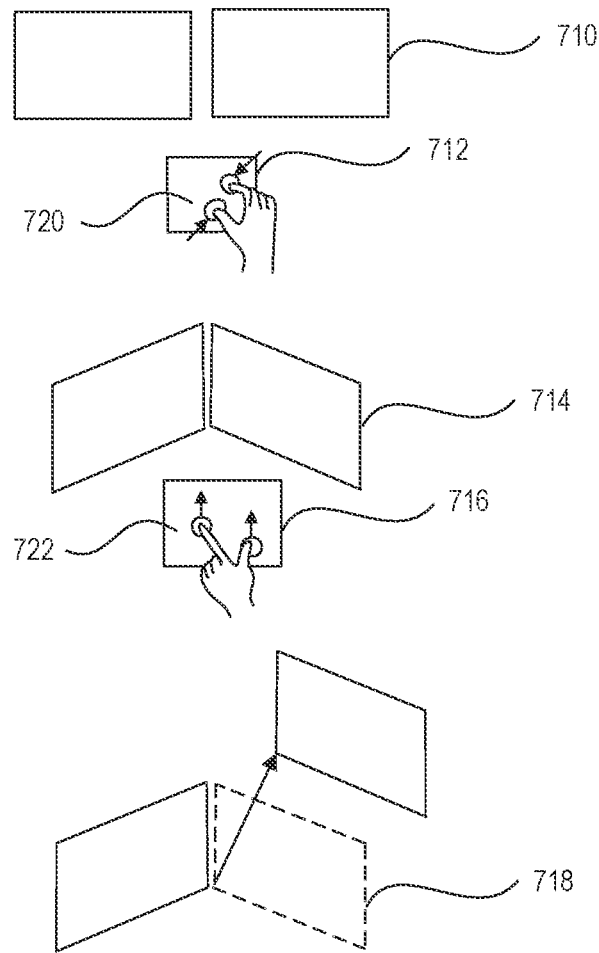
FIG. 7 illustrates an exemplary set of changes in the perspective of a scene, consistent with some embodiments of the present disclosure.

Consistent with some disclosed embodiments, a non-transitory computer readable medium may include instructions that when executed by at least one processor cause the at least one processor to output for presentation via a wearable extended reality appliance, first display signals reflective of a first perspective of a scene. Outputting may include one or more of producing, delivering, or supplying data. The output may be presented in the form of graphical display including, for example, one or more still or moving images, text, icons, video, or any combination thereof. The graphical display may be two-dimensional, three-dimensional, holographic, or may include various other types of visual characteristics. The at least one processor may cause one or more analog or digital signals to be generated and transmitted to a display device for presenting the graphical display for viewing by a user. In some embodiments, the display device may include a wearable extended reality appliance. A wearable extended reality appliance, as discussed in other locations in this disclosure, may implement, for example, augmented reality technology, virtual reality technology, mixed reality technology, any combination thereof, or any other technology that is capable of combining real and virtual environments. The wearable extended reality appliance may take the form of, for example, a hat, visor, helmet, goggles, glasses, or any other object that can be worn. A perspective of a scene as used in this disclosure may include, for example, an orientation, an angle, a size, a direction, a position, an aspect, a spatial transformation, or any other virtual characteristic of a scene or of a part of a scene. The at least one processor may be configured to cause presentation of a graphical display including a first perspective of a scene. By way of example, as illustrated in FIG. 7, the processor may be configured to cause presentation of a first perspective of a scene 710.

Some disclosed embodiments may involve receiving via a touch sensor, first input signals caused by a first multi-finger interaction with the touch sensor. A touch sensor as discussed previously may additionally or alternatively include, for example, a piezoresistive sensor, a piezoelectric sensor, an optical sensor, a capacitive sensor, an elastoresistive sensor, or any other type of sensor that determines information based on a physical interaction. In some embodiments, the touch sensor may be incorporated into a keyboard, mouse, operating rod, optical or trackball mouse, or any other type of tactical input device. In some embodiments, the touch sensor may include a touch screen used either alone or in conjunction with other input equipment. The touch screen may be used for detecting touch operations such as those that may be carried out by the user by using, for example, a finger, a palm, a wrist, a knuckle, or any other body part of the user. Additionally or alternatively, touch operations may be carried out by a user with, for example, a touch pen, a stylus, or any other external input device, by touching the touch screen or moving the device near the touch screen. Regardless of the type of touch sensor used, a touch sensor, as disclosed herein, may be configured to convert physical touch information into input signals.

Figure 6:
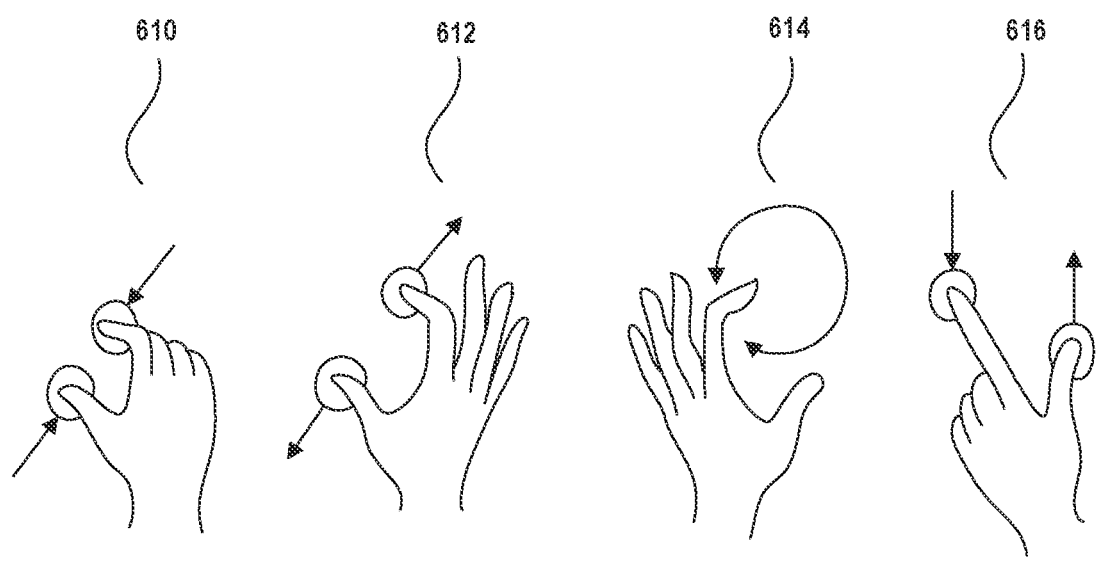
FIG. 6 illustrates examples of various types of multi-finger interactions that may be employed for altering the perspective of a scene, consistent with some embodiments of the present disclosure.

First input signals may include signals that provide information regarding a user's touch based on the user's interaction with a touch sensor. The first input signals may include information regarding one or more parameters that may be determined based on a touch interaction with a touch sensor. For example, the first input signals may include information regarding pressure, force, strain, position, motion, velocity, acceleration, temperature, occupancy, or any other physical or mechanical characteristic. A first multi-finger interaction may include any interaction with the touch sensor that involves a user using two or more fingers to contact the touch sensor (or using two or more objects of any type, such as digits, pens, rods, and so forth, to contact the touch sensor). In some embodiments, a first multi-finger interaction may include, for example, a user pinching two or more fingers together, stretching two or more fingers apart, or performing any other action with two or more fingers on the touch sensor. FIG. 6 illustrates a few examples of various multi-finger interactions that may be employed in connection with some embodiments of the present disclosure, such as pinching in, pinching out, rotating, and sliding. The first multi-finger interaction 610 represents a user bringing his or her thumb and forefinger closer to each other, in a pinching-in motion. The second multi-finger interaction 612 represents a user moving his or her thumb and forefinger farther away from each other, in a pinching-out motion. The third multi-finger interaction 614 represents a user moving his or her thumb and forefinger together in a clockwise or counterclockwise manner, in a rotating motion. The fourth multi-finger interaction 616 represents a user moving his or her thumb and forefinger in opposing directions, in a sliding motion. In another example of a multi-finger interaction, a user may move two or more digits in the same direction. Other multi-finger interactions may also be used.

Some disclosed embodiments may involve causing, in response to the first input signals, output for presentation via the wearable extended reality appliance second display signals configured to modify the first perspective of the scene to thereby cause a second perspective of the scene to be presented via the wearable extended reality appliance. The second display signals may have characteristics similar to the first display signals as described above and may be configured to modify the first perspective of the scene. Modifying a perspective of a scene may include, for example, changing one or more of an orientation, an angle, a size, a direction, a position, an aspect, a parameter of a spatial transformation, a spatial transformation, or any other visual characteristic of the scene or of a part of the scene. Accordingly, a second perspective of the scene presented may include, for example, one or more of a second orientation, a second angle, a second size, a second direction, a second position, a second aspect, a second spatial transformation, or a modification of any other characteristic of the presentation of the scene (or of a part of the scene) in the extended reality environment that is different from the first perspective of the scene.

In some examples, an indication that a physical object is located at a particular location in an environment of the wearable extended reality appliance may be received. In some examples, image data captured using an image sensor included in the first wearable extended reality appliance may be received. For example, the image data may be received from the image sensor, from the first wearable extended reality appliance, from an intermediate device external to the first wearable extended reality appliance, from a memory unit, and so forth. The image data may be analyzed to detect the physical object in the particular location in the environment. In another example, radar, Lidar or Sonar sensors may be used to detect the presence of the physical object at the particular location in the environment, in some examples, the second perspective of the scene may be selected based on the physical object being located in the particular location. In one example, the second perspective of the scene may be selected such that virtual objects in the scene do not appear to collide with the physical object. In another example, the second perspective of the scene may be selected such that particular virtual objects are not hidden (completely or partly) by the physical object to a user of the wearable extended reality appliance (for example, based on the location of the wearable extended reality appliance). In one example, a ray casting algorithm may be used to determine that a particular virtual object is hidden by the physical object to the user of the wearable extended reality appliance. Further, the second display signals may be based on the selection of the second perspective of the scene. In one example, in case no physical object is located at the particular location, in response to the first input signals, first version of second display signals may be outputted for presentation via the wearable extended reality appliance, the first version of the second display signals is configured to modify the first perspective of the scene to thereby cause the second perspective of the scene to be presented via the wearable extended reality appliance, and the second perspective may include a presentation of a virtual object at the particular location. Further, in case a physical object is located at the particular location, in response to the first input signals, second version of second display signals may be outputted for presentation via the wearable extended reality appliance, the second version of the second display signals may be configured to modify the first perspective of the scene to thereby cause an alternative perspective of the scene to be presented via the wearable extended reality appliance, and the alternative perspective may not include the presentation of the virtual object at the particular location and/or may include a presentation of the virtual object at an alternative location different from the particular location.

Some disclosed embodiments may further involve receiving via the touch sensor, second input signals caused by a second multi-finger interaction with the touch sensor. Second input signals may be similar to the first input signal described above and may include signals that provide information regarding one or more parameters that may be determined based on a touch interaction with a touch sensor. A second multi-finger interaction may include any interaction with the touch sensor that involves a user using two or more fingers of a hand to contact the touch sensor. Thus, for example, the second multi-finger interaction may include movement of two or more fingers of the hand similar to the movements described above with respect to the first multi-finger interaction.

Consistent with some disclosed embodiments, the first multi-finger interaction and the second multi-finger interaction may be of a common multi-finger interaction type. A common multi-finger interaction type may encompass interactions including fingers of the same hand, the same type of fingers (e.g., forefingers, thumbs, middle fingers, etc.), the same fingers on opposite hands, the same type of movement, any combination thereof, or any other type of interaction between two fingers that shares a commonality with another type of interaction between two fingers. By way of example, the first multi-finger interaction and the second multi-finger interaction may both include a finger pinch.

Consistent with some disclosed embodiments, the first multi-finger interaction may be of a type that differs from a type of the second multi-finger interaction. For example, a first multi-finger interaction of a type that differs from a type of a second multi-finger interaction may involve an interaction that includes a different type of movement, uses different fingers or a different hand, any combination thereof, or any other type of interaction between two fingers that is different from another type of interaction between two fingers. As an example, the first multi-finger interaction may be a user increasing a distance between a thumb and a forefinger on one hand, while the second multi-finger interaction may be the user decreasing a distance between a thumb and a forefinger on another hand. In another example, the first multi-finger interaction may be a user rotating a thumb and a forefinger clockwise on one hand, while the second multi-finger interaction may be the user rotating a thumb and a forefinger counterclockwise on another hand. In other instances, the first multi-finger interaction may be a user increasing a distance between a thumb and a forefinger clockwise on one hand, while the second multi-finger interaction may be the user rotating a thumb and a forefinger clockwise on another hand.

Some disclosed embodiments may additionally involve, in response to the second input signals, outputting for presentation via the wearable extended reality appliance third display signals configured to modify the second perspective of the scene to thereby cause a third perspective of the scene to be presented via the wearable extended reality appliance. The third display signals may have characteristics similar to the first display signals as described above and may be configured to modify a second perspective of the scene. Modifying the second perspective of a scene may include changes similar to those discussed above with respect to modifying the first perspective of the scene. For example, modifying the second perspective of a scene may also include modifying one or more of an orientation, an angle, a size, a direction, a position, an aspect, a parameter of a spatial transformation, a spatial transformation, or any other visual characteristic of the scene or of a part of the scene. Accordingly, a third perspective of the scene presented may include one or more of a third orientation, a third angle, a third size, a third direction, a third position, a third aspect, a third spatial transformation, or a modification of any other characteristic the presentation of the scene (or of a part of the scene) in the extended reality environment that is different from the second perspective of the scene.

By way of example, FIG. 7 illustrates an exemplary set of changes in the perspective of a scene, consistent with some embodiments of the present disclosure. For example, a processor may be configured to first output for presentation via a wearable extended reality appliance, first display signals reflective of a first perspective of a scene 710. The processor may receive via a touch sensor, first input signals 712 caused by a first multi-finger interaction 620 (e.g., pinch) with the touch sensor. In response to the first input signals 712, the processor may output for presentation via the wearable extended reality appliance second display signals configured to modify the first perspective of the scene to thereby cause a second perspective of the scene 714 to be presented via the wearable extended reality appliance. As illustrated in FIG. 7, first perspective of the scene 710 has been modified to the second perspective of the scene 714. The processor may receive via the touch sensor, second input signals 716 caused by a second multi-finger interaction 622 (e.g. slide) with the touch sensor, for example after first perspective of the scene 710 has been modified to the second perspective of the scene 714. As illustrated in FIG. 7, the second multi-finger interaction may be an upward swiping or dragging movement of a user's thumb and forefinger. In response to the second input signals 716, the processor may output for presentation via the wearable extended reality appliance third display signals configured to modify the second perspective of the scene 714 to thereby cause a third perspective of the scene 718 to be presented via the wearable extended reality appliance. As illustrated in FIG. 7, second perspective of the scene 714 has been modified to the third perspective of the scene 718.

Consistent with some disclosed embodiments, the scene may include a plurality of content windows. A content window may be a region of the extended reality environment configured to display text, still or moving images, or other visual content. For example, a content window may include a web browser window, a word processing window, an operating system window, or any other area on the screen that displays information for a specific program. In another example, a content window may include a virtual display (such as a virtual object mimicking a computer screen as described herein). In some embodiments, content windows may be configured such that in the first perspective of the scene, all of the plurality of content windows may be displayed at a same virtual distance from the wearable extended reality appliance; in the second perspective of the scene, at least one of the plurality of windows is displayed at a virtual distance differing from distances of others of the plurality of windows; and in the third perspective of the scene, the at least one window is displayed with an orientation differing from an orientation of others of the plurality of windows. In one example, a content window being displayed at a distance differing from distances of other windows may include a content window being displayed closer to the wearable extended reality appliance than the other content windows. As another example, a content window being displayed at a distance differing from distances of other content windows may include a content window being displayed farther from the wearable extended reality appliance than the other content windows. Alternatively, a content window being displayed at a distance differing from distances of other content windows may include a content window being displayed with zoomed-in objects, while the other content windows are displayed with zoomed-out objects. A further example of a content window being displayed at a distance differing from distances of other content windows may include a content window being displayed with zoomed-out objects, while the other content windows are displayed with zoomed-in objects. A content window being displayed with an orientation differing from an orientation of other content windows may include any display that changes the angle, slant, tilt, direction, or any aspect of a relative physical position of a content window as compared to the other content windows. For example, a content window being displayed with an orientation differing from an orientation of other content windows may include a content window that is rotated by ninety degrees while other content windows remain at zero degrees. As another example, a content window being displayed with an orientation differing from an orientation of other content windows may include a content window that faces a left side of a wearable extended reality appliance, while other content windows face a right side of the wearable extended reality appliance.

Figure 8:
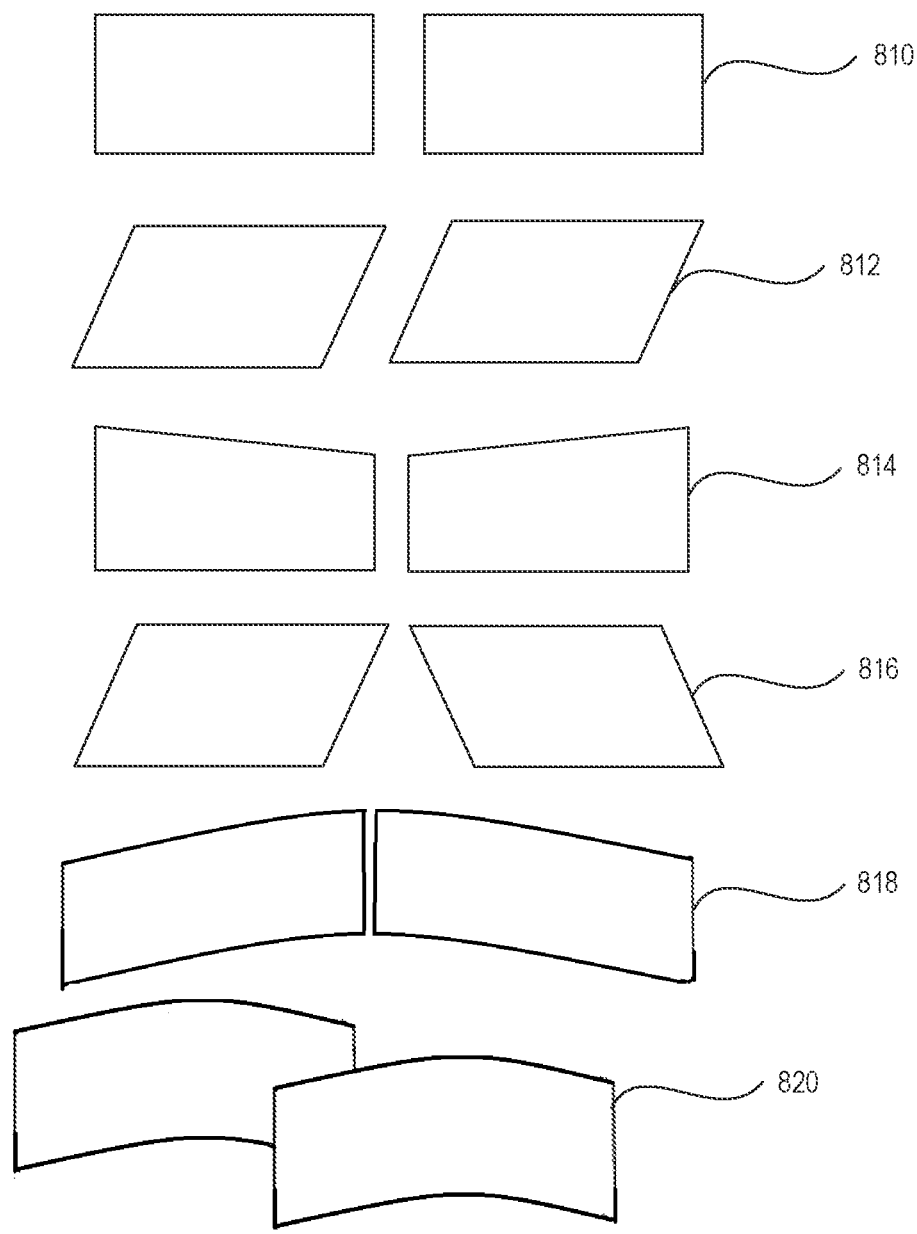
FIG. 8 illustrates examples of various perspectives of a scene, consistent with some embodiments of the present disclosure.

Further examples of perspectives of a scene are shown in FIG. 8. For example, one perspective may include two content windows presented side-by-side, as shown in 810. Another perspective may include the two content windows tilted towards the same direction, as shown in 812, In another perspective, the two content windows may be facing inward towards each other, as shown in 814. Alternatively, the example in 816 shows the two content windows facing outward away from each other and tilted upward. Another example in 818 shows the two content windows being curved toward each other. In yet another example, the two content windows may be curved in the same direction, but one content window may be presented on top of content another window, as shown in 820. These are just a few examples of perspectives of a scene, but any change in the visual presentation of a scene is contemplated for use with the embodiments disclosed herein.

Consistent with some disclosed embodiments, the scene may include a plurality of virtual objects. A virtual object may include a representation that does not exist in the real world, such as an icon; an image of something that may or may not exist in the real world, a two-dimensional virtual object, a three-dimensional virtual object, an animated virtual object, an unanimated virtual object; or any other representation that simulates with non-physical representations, something physical, either real or imaginary. In some embodiments, one or more virtual objects may be configured such that in the first perspective of the scene, one or more of the virtual objects may be displayed at the same distance or at variable virtual distances from the wearable extended reality appliance; in the second perspective of the scene, at least one of the virtual objects is displayed with a size that differs from others of the plurality of virtual objects; and in the third perspective of the scene, the size of the at least one virtual object reverts to a size of the at least one virtual object prior to presentation in the second perspective of the scene. When the one or more virtual objects are displayed at the same distance from the wearable extended reality appliance, a user of the wearable extended reality appliance may view the one or more virtual objects with the same amount of space between the user and each of the one or more virtual objects. When the one or more virtual objects are displayed at variable virtual distances from the wearable extended reality appliance, a user of the wearable extended reality appliance may view each or some of the one or more virtual objects at a different amount of space away from the user. When at least one of the virtual objects is displayed with a size that differs from others of the plurality of virtual objects, a user of the wearable extended reality appliance may view the at least one of the virtual objects as being larger or smaller than the others of the plurality of virtual objects. When the size of the at least one virtual object reverts to a size of the at least one virtual object prior to presentation in the second perspective of the scene, a user of the wearable extended reality appliance may view the at least one virtual object in a size that is smaller or bigger than its size in the second perspective of the scene.

Consistent with some disclosed embodiments, input from the touch sensor may enable selective position control of a plurality of virtual objects to orient the plurality of virtual objects at variable virtual distances from the wearable extended reality appliance. Variable virtual distances may refer to a perceived distance of a virtual object from the appliance wearer. Just as a virtual object is not physical, so too is its distance not real. Rather, the distance of a virtual object from a wearer is as virtual as the virtual object itself. In one example, the distance may manifest as a size of a rendering of the virtual object, as a position of the virtual object when rendered from different viewing points (for example, from two viewing points of the two eyes of a viewer, from a moving viewing point of a viewer, etc.), as the virtual object hiding or being hidden by other objects (physical or virtual) that overlap with the virtual object in the viewing angle of a viewer, and so forth, Input from the touch sensor may enable such virtual distances to change (i.e., changes the presentation to cause a wearer to perceive a change in virtual distance). Such user input may be configured to occur prior to the first input signals such that the presentation through the wearable extended reality appliance may be configured to enable a user to see the touch sensor. Enabling a user to see the touch sensor may be desired where the plurality of virtual objects blocks a visual field of the user, such that the user is not able to see the touch sensor in order to be able to interact with the touch sensor. Selective position control may include the ability to change the size, orientation, distance, or any other spatial attribute of one or more of a virtual object in comparison to another virtual object. Accordingly, in some embodiments, a user may be able to selectively change distances of one or more virtual objects so that the virtual objects are located at variable distances from the wearable extended reality appliance.

Consistent with some disclosed embodiments, the selective position control may include docking the plurality of virtual objects to a physical space, and enabling a wearer of the wearable extended reality appliance to walk in the physical space and adjust a position of each virtual object separately. Docking the plurality of virtual objects to a physical space may include maintaining a size, orientation, distance, or any other spatial attribute of the plurality of virtual objects with reference to a physical space. This type of selective position control may allow a user to move within the physical space while maintaining a size, orientation, distance, or any other spatial attribute of the plurality of virtual objects maintained as the user moves. For example, the user may be able to move toward and select a virtual object, and adjust any of a size, orientation, distance, or any other spatial attribute of that virtual object, while others of the size, orientation, distance, or any other spatial attribute of the other virtual objects may remain unchanged. The user may move within the physical space to another virtual object, and adjust any of a size, orientation, distance, or any other spatial attribute of that virtual object, while others of the size, orientation, distance, or any other spatial attribute of the other virtual objects may remain unchanged. The user may proceed and do the same for the some or all virtual objects as the user moves about the physical space. While the user adjusts any of a size, orientation, distance, or any other spatial attribute of each virtual object, the other non-adjusted characteristics or other spatial attribute of the other virtual objects may remain unchanged.

Consistent with some disclosed embodiments, the second perspective of the scene may be selected based on the first input signals and on whether a housing that includes the touch sensor is placed on a physical surface at the time of the first multi-finger interaction. For example, a location of an input device may aid in defining a perspective of the presentation of the scene in the extended reality environment. Display characteristics may differ, for example, when an associated touch sensor is on a table as opposed to being held by a user. Or, for example, the relative position (side to side) of the user with respect to the touch sensitive display may impact a preferred perspective of the presentation of the scene in the extended reality environment. In some examples, at least one parameter of the second perspective may be determined based on the physical surface. For example, a virtual surface may be determined based on the physical surface (for example, parallel to the physical surface, overlapping with the physical surface, perpendicular to the physical surface, at a selected orientation with respect to the virtual surface, etc.), and the virtual object may be moved on the virtual surface. In one example, the direction and/or the distance of the motion of the virtual object on the virtual surface may selected based on the first input signals. For example, in response to first input signals, the virtual object may be moved in a first direction and a first distance on the virtual surface, and in response to second input signals, the virtual object may be moved in a second direction and a second distance on the virtual surface. In another example, a new location on the virtual surface for the virtual object may be selected based on the first input signals.

Perspective selection based in part on whether the housing is placed on a physical surface at that time may also be desirable to allow certain types of display depending on whether a user of the wearable extended reality appliance is mobile or stationary at a given time. For example, when a user is mobile, certain types of scene perspectives may not be desirable because they may obstruct a safe movement of the user, for example, by blocking a visual field of the user. When the user is mobile, it is more likely that the user will be holding or otherwise attached to the housing, rather than placing it on a physical surface at the time of the first multi-finger interaction. When a user is stationary, the user may place the housing on a physical surface, allowing the user to select other perspectives that do not require the user to view portions of a visual field before the user. When the user is stationary, it is more likely that the user will place the housing on a physical surface at the time of the first multi-finger interaction, rather than holding or otherwise being attached to the housing. In one example, the selection of the second perspective of the scene may be further based on the type of surface, for example on whether the surface is a top surface of a table. In another example, the third perspective of the scene may be selected based on the second input signals and on whether the housing is placed on a physical surface at the time of the second multi-finger interaction.

In certain embodiments, the first input signals from the touch sensor may reflect a two-dimensional coordinate input while the second display signals are configured to modify the first perspective of the scene to introduce a three-dimensional change to the scene. A two-dimensional coordinate input may include an input affecting a geometric setting having only two measurements, such as length and width, while lacking depth. A three-dimensional change to the scene may include a change in the scene having three measurements, such as length, width, and depth. For example, a first perspective of the scene may include a cube. In this example, the first input signals from the touch sensor may reflect an input comprising the user moving their thumb and forefinger in opposing directions, in a sliding motion. The second display signals in this example may be configured to modify the cube by increasing or decreasing the depth of the cube.

In some embodiments, the first input signals from the touch sensor may reflect a Cartesian coordinate input and the second display signals configured to modify the perspective of the scene are in a spherical coordinate system. A Cartesian coordinate input may include an input affecting a geometric setting defined by three types of points, wherein each type of point is on a distinct orthogonal axis. A spherical coordinate system may include a three-dimensional space defined by three types of points, wherein the types of points include two angles on orthogonal axes, and a distance from the origin of the coordinate system to a type of point created by the two angles on orthogonal axes. For example, a first perspective of the scene may include a cube. In this example, the first input signals from the touch sensor may reflect an input comprising the user moving their thumb and forefinger in opposing directions, in a sliding motion. The second display signals in this example may be configured to modify the cube by increasing or decreasing the depth of the cube. The Cartesian input may be used modify the perspective of the scene in spherical coordinates by converting the Cartesian coordinates of the input into spherical coordinates for the modification, by using any mathematical technique for conversion between coordinate systems.

In some embodiments, each type of a multi-finger interaction may control one of a plurality of actions for modifying the perspective of the scene to be presented via the wearable extended reality appliance. For example, one or more actions may include zooming in, zooming out, rotating, and sliding, and a multi-finger interaction representing a user bringing his or her thumb and forefinger closer to each other, in a pinching-in motion, may control the zooming in action. As another example, a multi-finger interaction representing a user moving his or her thumb and forefinger farther away from each other, in a pinching-out motion, may control the zooming out action. By way of another example, multi-finger interaction representing a user moving his or her thumb and forefinger together in a clockwise or counterclockwise manner, in a rotating motion, may control the rotating action. As another example, a multi-finger interaction representing a user moving his or her thumb and forefinger in opposing directions, in a sliding motion, may control the sliding motion.

In some embodiments, the plurality of actions for modifying the perspective of the scene may include at least two of: changing a perspective position relative to the scene, changing a distance from the scene, changing an angle of the scene, and changing a size of the scene. However, these modifications are not limited to the entire scene and the change in perspective position relative to the scene, change in distance, change in angle, and change in size may be applied to one or more of a selected object in the scene.

In some embodiments, the first input signals and the second input signals may be associated with a first mode of operation of the touch sensor for controlling perspective. A mode of operation of the touch sensor may include, for example, a means, manner, approach, method of operation, procedure, process, system, technique, or any other functional state of the touch sensor. A first mode of operation may be different from a second mode of operation in terms of means, manner, approach, method of operation, procedure, process, system, technique, or any other functional state of the touch sensor. For example, a first mode of operation may include the touch sensor generating input signals representative of a user increasing or decreasing a distance between their thumb and forefinger, while a second mode of operation may include the touch sensor generating input signals representative of a user moving their thumb and forefinger together in a clockwise or counterclockwise direction. As another example, a first mode of operation may include the touch sensor generating input signals representative of a user performing multi-finger interactions within a defined region of the touch sensor, while a second mode of operation may include the touch sensor generating input signals representative of the user performing multi-finger interactions anywhere on the touch sensor.

In some embodiments, the at least one processor may be configured to prior to receiving the first input signals, receiving via the touch sensor, initial input signals associated with a second mode of operation of the touch sensor for controlling a pointer presented via the wearable extended reality appliance. Initial input signals as used in this disclosure may include, for example, signals that provide information regarding a user's touch based on the user's interaction with the touch sensor to control a position of a pointer in the extended reality environment presented via the wearable extended reality appliance. The initial input signals may include information regarding pressure, force, strain, position, motion, acceleration, occupancy, and any other parameter that may be determined based on a touch interaction with a touch sensor. A pointer may include, for example, an arrow, dial, director, guide, indicator, mark, signal, or any other visual indication of position in content or an extended reality environment presented via the wearable extended reality appliance.

Some embodiments may involve, in response to the initial input signals, selecting a virtual object in the scene. Selecting a virtual object in the scene may include choosing the virtual object in the scene for further manipulation. The selection of the virtual object in the scene may be accomplished by using the initial input signals to control the pointer to click, select, highlight, pin, draw a box around, or perform any other type of marking of the virtual object. For example, the virtual object may be a tree within a scene of a forest. The user may select a tree in the forest by guiding a position of the pointer to the tree by dragging their finger on the touch sensor and clicking on the tree to mark it as selected. In some embodiments, the at least one processor may be configured to in response to the first input signals and the second input signals, causing changes in the display of the selected virtual object to be presented via the wearable extended reality appliance. Changes in the display of the selected virtual object may include changing a perspective position relative to the object, changing a distance from the object, changing an angle of the object, and changing a size of the object. For example, the virtual object may be a tree within a scene of a forest. The user may increase a size of the tree by inputting first input signals through the touch sensor by increasing a distance between their thumb and forefinger. The user may then rotate the tree by inputting second input signals through the touch sensor by moving their thumb and forefinger together in a clockwise or counterclockwise direction.

In some embodiments, the instructions are configured such that the first display signals, the second display signals, and the third display signals are transmitted via a first communication channel to the wearable extended reality appliance, and the first input signals and the second input signals are received via a second communication channel from a computing device other than the wearable extended reality appliance. As used in this disclosure, a communication channel may include either a wired communication channel or a wireless communication channel. A wired communication channel may utilize networking cables, coaxial cables, Ethernet cables, or any other channel that transmits information over a wired connection. A wireless communication channel may utilize WiFi, Bluetooth™ NFC, or any other channel that transmits information without a wired connection. A computing device may be any device other than the wearable extended reality appliance, including a general computer, such as a personal computer (PC), a UNIX workstation, a server, a mainframe computer, a personal digital assistant (PDA), a cellular phone, a smartphone, a tablet, some combination of these, or any other device for performing calculations automatically.

In some embodiments, the computing device may be a smartphone connectable to the wearable extended reality appliance, and the touch sensor may be a touchscreen of the smartphone. As another example, the computing device may be a smartphone or smart watch connectable to the wearable extended reality appliance, and the touch sensor may be a touchscreen of the smartwatch. In such embodiments, the first and second multi-finger interactions may occur on the touchscreen of the smartphone or the smart watch.

In some embodiments, the computing device may include a keyboard, connectable to the wearable extended reality appliance, and wherein the touch sensor is associated with the computing device. The keyboard may be a standard typewriter-style keyboard (e.g., a QWERTY-style keyboard) or another suitable keyboard layout, such as a Dvorak layout or a chorded layout. In one embodiment, the keyboard may include at least 30 keys. The keyboard may include alphanumeric keys, function keys, modifier keys, cursor keys, system keys, multimedia control keys, or other physical keys that perform a computer-specific function when pressed. The keyboard may also include virtual or programmable keys, such that the function of the key changes depending on a function or application to be performed on the integrated computational interface device. In some embodiments, the keyboard may include a dedicated input key for executing actions associated with the wearable extended reality appliance. In some embodiments, the keyboard may include a dedicated input key for changing illumination of a content (for example, of an extended reality environment, or a virtual content, etc.) projected via the wearable extended reality appliance. The touch sensor may be incorporated into the keyboard through a touch pad that is part of the keyboard. The touch sensor may also be incorporated into the keyboard as one or more touch sensors disposed on one or more keys of the keyboard. In such a configuration, the touch sensor is not wearable and is not connected to or configured to move with the wearable extended reality appliance.

Some embodiments may involve obtaining default settings for displaying content using the wearable extended reality appliance. Default settings may be stored in memory, and may be preset by a manufacturer, distributer, or user. Settings may include color, size, resolution, orientation, or any other conditions associated with a display. Default settings may include any a preselected option for such conditions adopted by a computer program or other mechanism when no alternative is specified at the time of use by a user or programmer. The default settings may be received from a user or determined based on a type of wearable extended reality appliance used, a time, a location, or any other type of heuristic data. Further embodiments of the non-transitory computer readable medium include selecting the first perspective of the scene based on the default settings.

In some embodiments, the default settings are determined based on a previous perspective of the scene. A previous perspective of the scene may include any perspective prior to a given time point for presenting a scene, such as a perspective from a previous use of the wearable extended reality appliance. For example, if in a previous use, a perspective of the scene was zoomed in by a certain amount, a default setting may be set such that the default display of the scene is in that perspective that was zoomed in by a certain amount. In other embodiments, the instructions may direct the processor to select the first perspective of the scene based on user preferences. User preferences may include settings that are customized by a user of the wearable extended reality appliance, such as a color, size, resolution, orientation, or any other conditions associated with a display that may be modified. For example, a user of the wearable extended reality appliance may set user preferences that dictate for a first perspective to be displayed with only black and white colors. In this example, the instructions may direct the processor to select the first perspective of the scene to be displayed with only black and white colors, based on these user preferences.

In some embodiments, the default settings being associated with a keyboard paired to the wearable extended reality appliance. The paired keyboard may be the user's work keyboard, home keyboard, an Office keyboard, a field keyboard, or any other type of peripheral device that enables a user to input text into any electronic machinery. A pairing may include either a wired pairing or a wireless pairing. A wired pairing may utilize coaxial cables, Ethernet, or any other channel that transmits information over a wired connection. A wireless pairing may utilize WiFi, Bluetooth™ or any other channel that transmits information without a wired connection. For example, a user of the wearable extended reality appliance may enter default settings into the wearable extended reality appliance by typing information regarding the default settings through a keyboard that is wirelessly paired to the wearable extended reality appliance. In one example, the pairing may enable a modification of the virtual object using the keyboard. For example, the virtual object may include a presentation of text typed using the keyboard.

Figure 9:
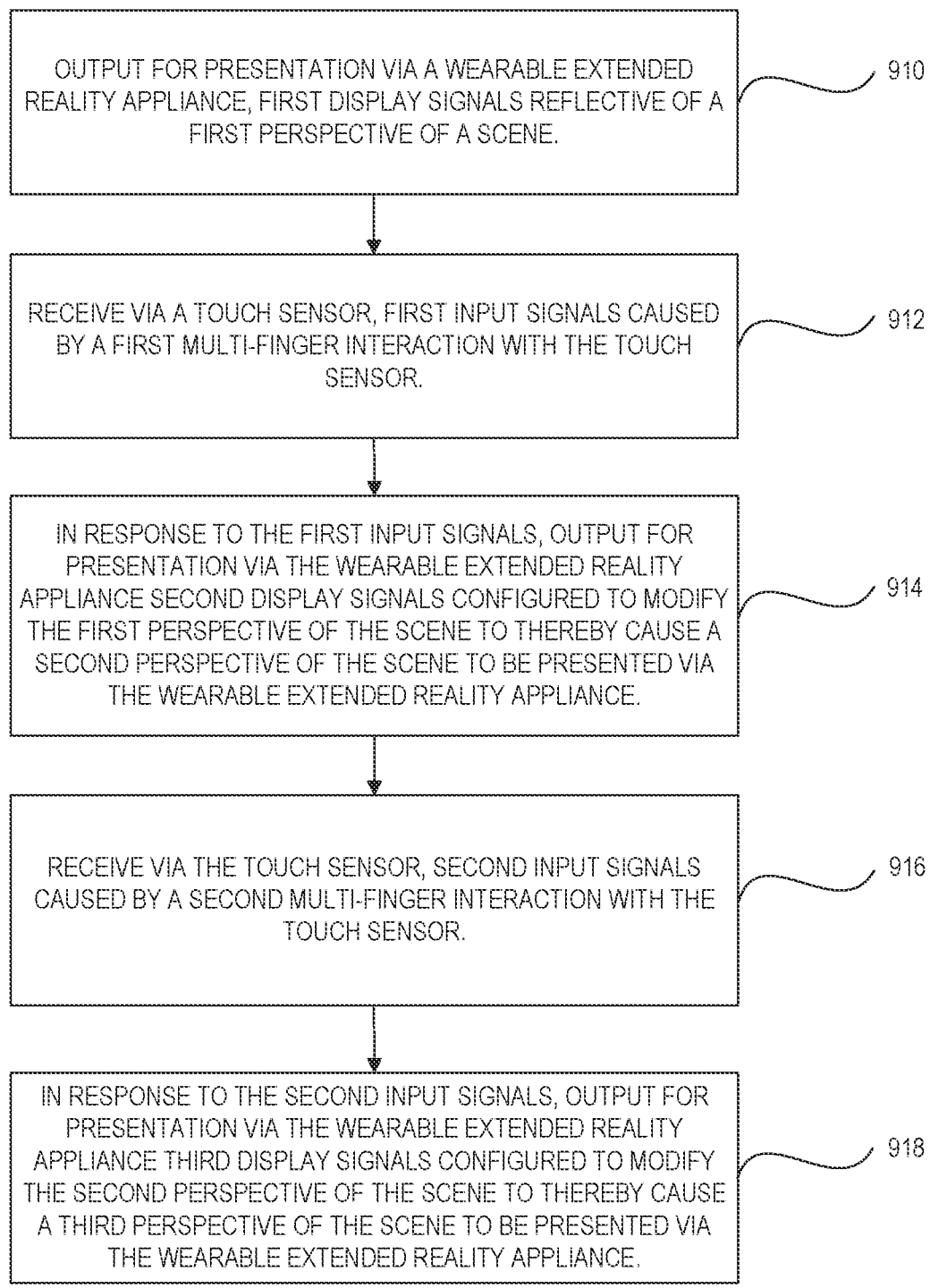
FIG. 9 is a flowchart illustrating an exemplary process for altering a perspective of a scene, consistent with some embodiments of the present disclosure.

Other disclosed embodiments may include a method for controlling perspective in an extended reality environment using a physical touch controller. By way of example, FIG. 9 shows a flowchart illustrating an exemplary process 900 for altering a perspective of a scene, consistent with some embodiments of the present disclosure. The method includes outputting for presentation via a wearable extended reality appliance, first display signals reflective of a first perspective of a scene, as indicated in block 910. The method also includes receiving via a touch sensor, first input signals caused by a first multi-finger interaction with the touch sensor, as shown in block 912. The method further includes in response to the first input signals, outputting for presentation via the wearable extended reality appliance second display signals configured to modify the first perspective of the scene to thereby cause a second perspective of the scene to be presented via the wearable extended reality appliance. This step is illustrated in block 914. As shown in block 916, the method also includes receiving via the touch sensor, second input signals caused by a second multi-finger interaction with the touch sensor. Block 918 illustrates the step of in response to the second input signals, outputting for presentation via the wearable extended reality appliance third display signals configured to modify the second perspective of the scene to thereby cause a third perspective of the scene to be presented via the wearable extended reality appliance.

Some embodiments of the present disclosure may relate to enabling gesture interaction with invisible virtual objects. A virtual object as displayed by a wearable extended reality appliance may be docked to a physical object (e.g., such that the virtual object may have a fixed position relative to the physical object). When the location where the virtual object is docked is outside a field of view portion associated with a display system of the wearable extended reality appliance, such that the virtual object is not displayed by the display system, a user may interact with the virtual object by gesture interaction with the docking location. In another example, when the location where the virtual object is docked in a field of view portion associated with a display system of the wearable extended reality appliance, but the virtual object is hidden by another object (physical or virtual) such that the virtual object is not displayed by the display system, a user may interact with the virtual object by gesture interaction with the docking location. The gesture interaction with the docking location may be captured (e.g., by an image sensor), and may be used to determine the user's interaction with the virtual object. More details regarding enabling gesture interaction with invisible virtual objects are described below.

Some disclosed embodiments may relate to enabling gesture interaction with invisible virtual objects, the embodiments being expressed as methods, systems, apparatuses, and non-transitory computer-readable media. When either form of expression is described below, it is to be understood that the disclosure of each are equally applicable to the others. For example, one or more processes embodied in the non-transitory computer-readable medium may be performed as a method, in a system, or in an apparatus. Some aspects of such processes may occur electronically over a network that may be wired, wireless, or both. Other aspects of such processes may occur using non-electronic means. In a broadest sense, the processes are not limited to particular physical and/or electronic instrumentalities, but rather may be accomplished using many differing instrumentalities. For example, some disclosed embodiments may include a method, system, or apparatus for enabling gesture interaction with invisible virtual objects. The method may include various processes as described herein. The system may include at least one processor configured to perform various processes as described herein. The apparatus may include at least one processor configured to perform various processes as described herein.

The non-transitory computer-readable medium may contain instructions that when executed by at least one processor cause the at least one processor to perform various processes as described herein. A non-transitory computer-readable medium may include any type of physical memory on which information or data readable by at least one processor may be stored. A non-transitory computer-readable medium may include, for example, random access memory (RAM), read-only memory (ROM), volatile memory, non-volatile memory, hard drives, compact disc read-only memory (CD-ROM), digital versatile discs (DVDs), flash drives, disks, any optical data storage medium, any physical medium with patterns of holes, programmable read-only memory (PROM), erasable programmable read-only memory (EPROM), FLASH-EPROM or any other flash memory, non-volatile random-access memory (NVRAM), caches, registers, any other memory chip or cartridge, or networked versions of the same. A non-transitory computer-readable medium may refer to multiple structures, such as a plurality of non-transitory computer-readable media, located at a local location or at a remote location. Additionally, one or more non-transitory computer-readable media may be utilized in implementing a computer-implemented method. Accordingly, a non-transitory computer-readable medium may include tangible items and may exclude carrier waves or transient signals.

The instructions contained in the non-transitory computer-readable medium may include, for example, software instructions, computer programs, computer code, executable instructions, source code, machine instructions, machine language programs, or any other type of directions for a computing device. The instructions contained in the non-transitory computer-readable medium may be based on one or more of various types of desired programming languages, and may include (e.g., embody) various processes for enabling gesture interaction with invisible virtual objects as described herein.

At least one processor may execute the instructions contained in the non-transitory computer-readable medium to cause various operations to be performed for enabling gesture interaction with invisible virtual objects as described herein. The processor may include, for example, integrated circuits, microchips, microcontrollers, microprocessors, central processing units (CPUs), graphics processing units (GPUs), digital signal processors (DSPs), field programmable gate arrays (FPGAs), or other units suitable for executing instructions or performing logic operations. The processor may include a single-core or multiple-core processor. In some examples, the processor may be a single-core processor configured with virtualization technologies. The processor may, for example, implement virtualization technologies or other functionalities to provide the ability to execute, control, run, manipulate, or store multiple software processes, applications, or programs. In another example, the processor may include a multiple-core processor (e.g., dual-core, quad-core, or with any desired number of cores) configured to provide parallel processing functionalities to allow a device associated with the processor to execute multiple processes simultaneously. Other types of processor arrangements may be implemented to provide the capabilities described herein.

Some disclosed embodiments may relate to enabling gesture interaction with invisible virtual objects. A gesture may include any finger or hand motion, for example, a drag, a pinch, a spread, a swipe, a tap, a pointing, a scroll, a rotate, a flick, a touch, a zoom-in, a zoom-out, a thumb-up, a thumb-down, a touch-and-hold, or any other action of a hand. In some examples, a gesture may include an action of an eye, mouth, face, or other part(s) of a person's body. A virtual object may refer to a visual representation rendered by a computing device and configured to represent an object. A virtual object may include, for example, an inanimate virtual object, an animate virtual object, virtual furniture, a virtual decorative object, a virtual widget, a virtual screen, or any other type of virtual representation. A user may interact with a virtual object via a gesture. In some examples, a virtual object does not need to be displayed to a user in order for the user to interact with the virtual object, as described in greater detail herein. For example, once a user docks a virtual object of a volume control to a corner of a desk, every time the user touches the corner of the desk, a sensor (e.g. a camera) may detect the touch gesture and may enable volume adjustment even though the virtual object of the volume control is not displayed at the time the interaction is initiated. Docking of a virtual object to a physical object may cause, for example, the virtual object to have a fixed position relative to the physical object. More details regarding various processes for enabling gesture interaction with invisible virtual objects (e.g., including docking) are described below.

Some disclosed embodiments may involve receiving image data captured by at least one image sensor of a wearable extended reality appliance (WER-Appliance). The image data may include representations of a plurality of physical objects in a field of view associated with the at least one image sensor of the wearable extended reality appliance. For example, a user may use a wearable extended reality appliance. The wearable extended reality appliance may include at least one image sensor. The at least one image sensor may include or may be implemented in a manner similar to image sensor 372 or image sensor 472. In some examples, the at least one image sensor may be configured to continuously or periodically capture image data of a location in which the wearable extended reality appliance is present (e.g., images of the physical space settings that the at least one image sensor may be facing). Capture of image data may include; for example, receiving by an image sensor of optical signals emanated from the environment in which the image sensor is present, such as visible light, infrared light, electromagnetic waves, or any other desired radiation. Capture of image data may include, for example, converting the received optical signals into data that may be stored or processed by a computing device. At least one processor may receive image data captured by the at least one image sensor of the wearable extended reality appliance. In some examples, the at least one processor may include, or may be implemented in a similar manner as, processing device 360, processing device 460, processing device 560, or any other processor associated with the wearable extended reality appliance.

The at least one image sensor of the wearable extended reality appliance may have a field of view. A field of view may refer to a spatial extent that may be observed or detected at any given moment. For example, a field of view of an image sensor may include a solid angle via which the image sensor may be sensitive to radiation (e.g., visible light, infrared light, or other optical signals). In some examples, a field of view may include an angle of view. A field of view may be measured horizontally, vertically, diagonally, or in any other desired manner.

The image data captured by the at least one image sensor of the wearable extended reality appliance may include representations of a plurality of physical objects in a field of view associated with the at least one image sensor of the wearable extended reality appliance. The plurality of physical objects may include desks, tables, keyboards, mice, touch pads; lamps, cups, telephones, mobile devices, printers, screens, shelfs, machines, vehicles, doors, windows, chairs, buttons, surfaces, or any other type of physical items that may be observed by an image sensor. The plurality of physical objects may be in the field of view of the at least one image sensor of the wearable extended reality appliance, and image data including representations of the plurality of physical objects may be captured by the at least one image sensor.

Figure 10:
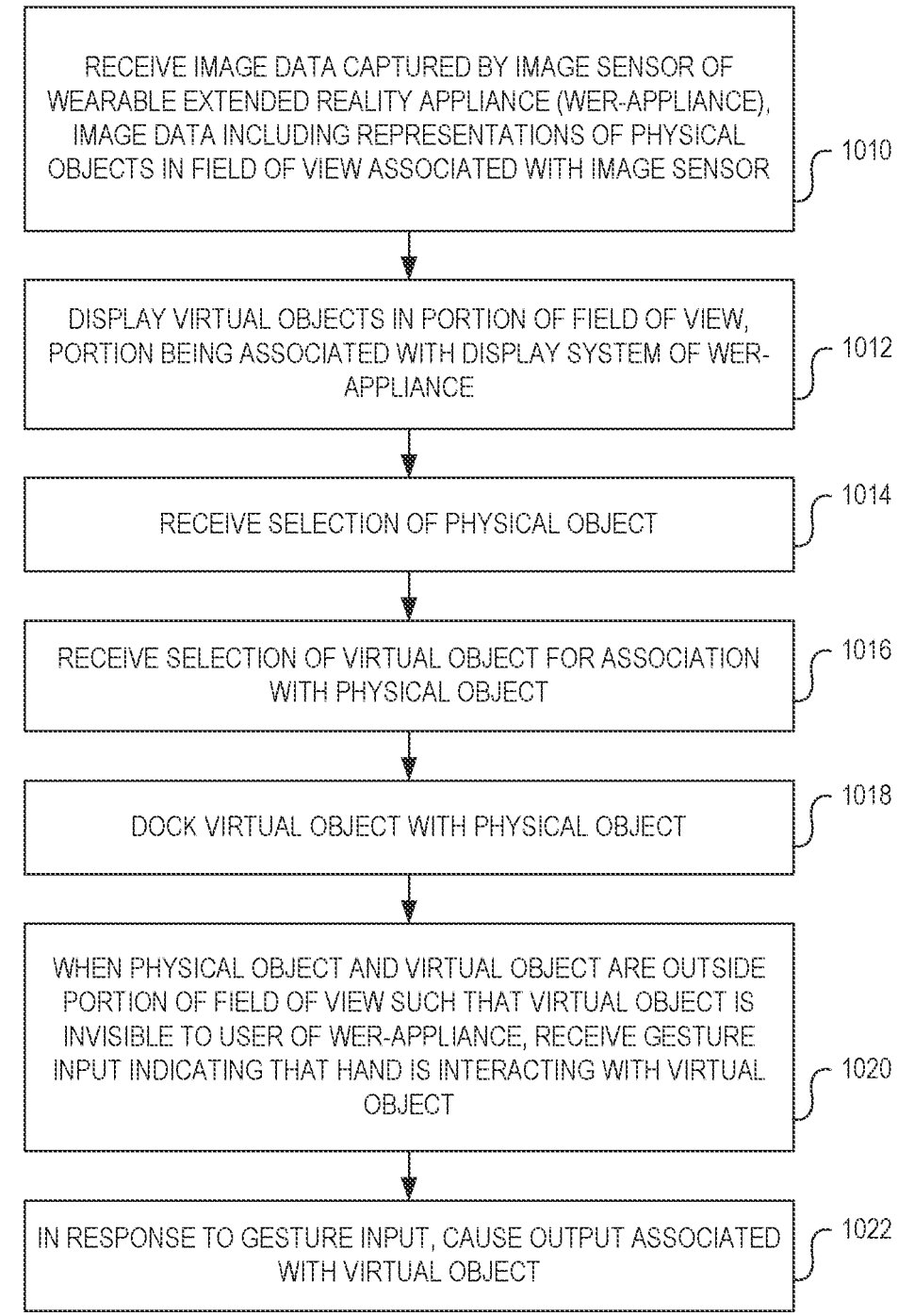
FIG. 10 is a flowchart illustrating an exemplary process for enabling gesture interaction with invisible virtual objects, consistent with some embodiments of the present disclosure.

FIG. 10 is a flowchart illustrating an exemplary process 1000 for enabling gesture interaction with invisible virtual objects consistent with some embodiments of the present disclosure. With reference to FIG. 10, in step 1010, instructions contained in a non-transitory computer-readable medium when executed by a processor may cause the processor to receive image data captured by at least one image sensor of a wearable extended reality appliance, the image data including representations of a plurality of physical objects in a field of view associated with the at least one image sensor of the wearable extended reality appliance.

Figure 11:
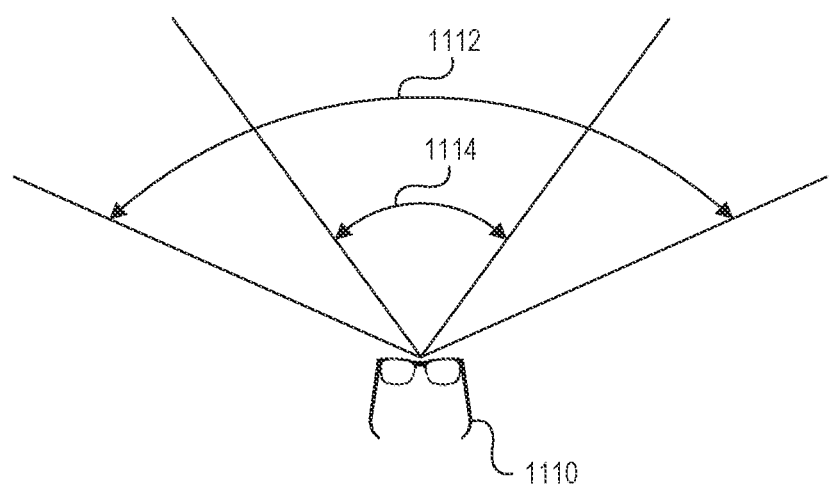
FIG. 11 is a schematic diagram illustrating a field of view horizontally, consistent with some embodiments of the present disclosure.
Figure 12:
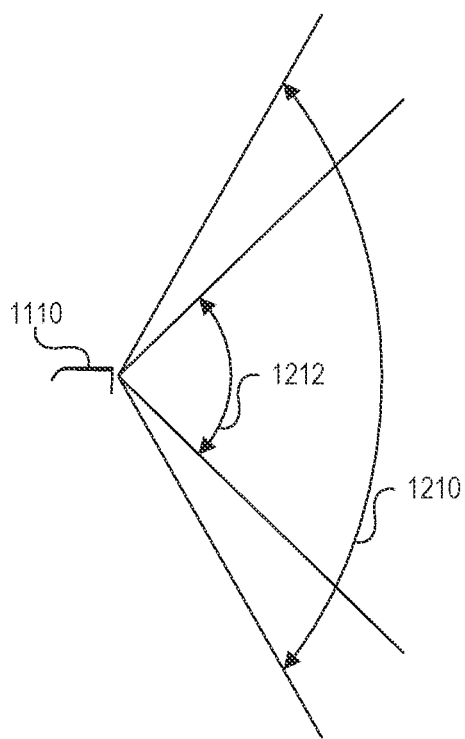
FIG. 12 is a schematic diagram illustrating a field of view vertically, consistent with some embodiments of the present disclosure.

FIG. 11 is a schematic diagram illustrating a field of view horizontally consistent with some embodiments of the present disclosure. With reference to FIG. 11, a wearable extended reality appliance 1110 may include at least one image sensor. A field of view of the at least one image sensor may have a horizontal range 1112. FIG. 12 is a schematic diagram illustrating a field of view vertically consistent with some embodiments of the present disclosure. With reference to FIG. 12, the field of view of the at least one image sensor of wearable extended reality appliance 1110 may have a vertical range 1210.

Figure 13:
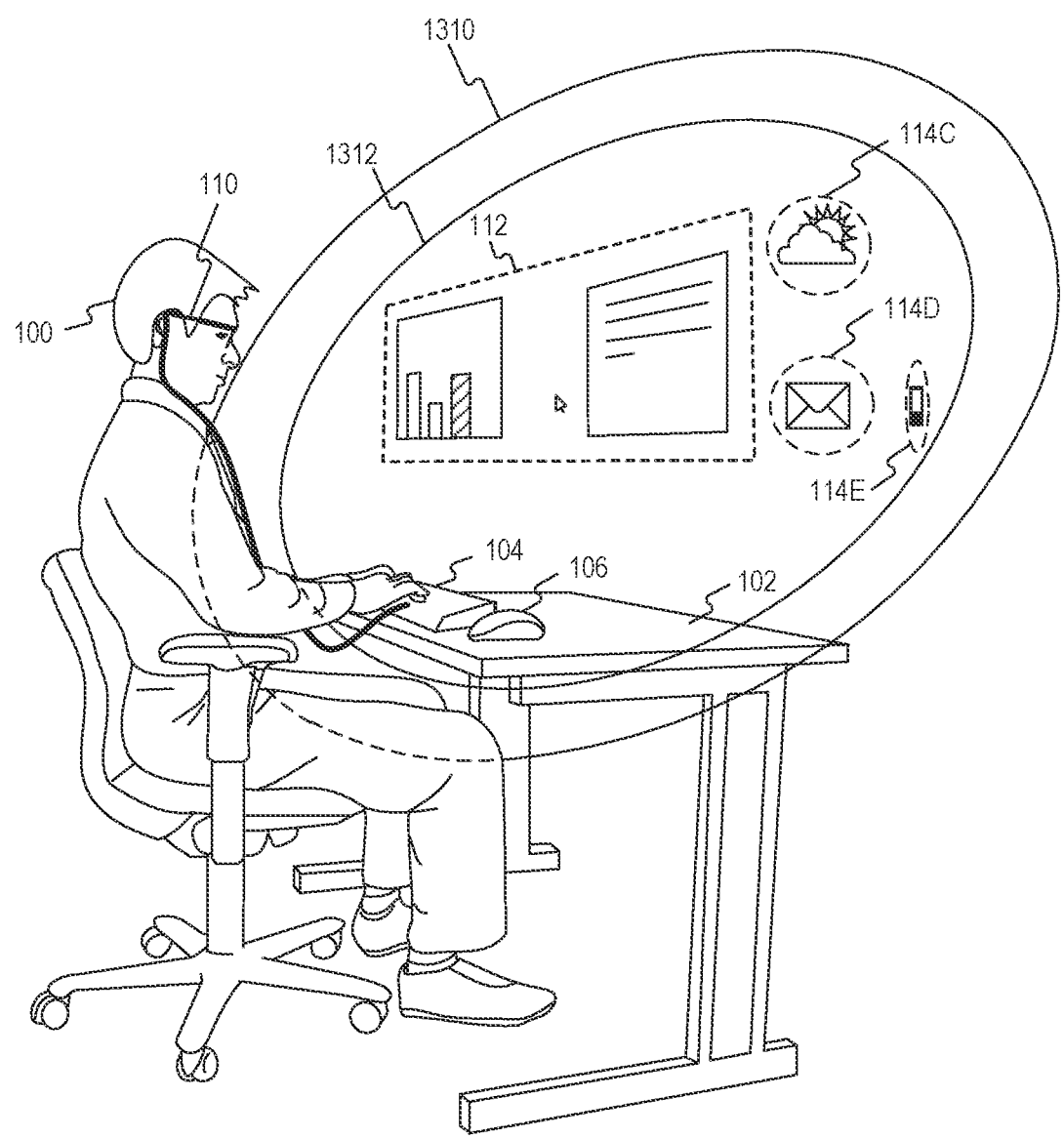
FIG. 13 is a schematic diagram illustrating use of an exemplary wearable extended reality appliance, consistent with some embodiments of the present disclosure.

FIG. 13 is a schematic diagram illustrating a user using an example wearable extended reality appliance consistent with some embodiments of the present disclosure. One or more elements as shown in FIG. 13 may be same as, or may be similar to, one or more elements as described in connection with FIG. 1. For example, with reference to FIG. 13, user 100 may be sitting behind table 102. User 100 may use a wearable extended reality appliance (e.g., wearable extended reality appliance 110). Keyboard 104 and mouse 106 may be placed on table 102. The wearable extended reality appliance (e.g., wearable extended reality appliance 110) may display virtual content to user 100, such as virtual screen 112 and virtual widgets 114C, 114D, 114E. The wearable extended reality appliance (e.g., wearable extended reality appliance 110) may include at least one image sensor. The at least one image sensor may have a field of view 1310, which may be represented by a solid angle from a point of the wearable extended reality appliance. The at least one image sensor may be configured to capture image data including representations of a plurality of physical objects in field of view 1310. The plurality of physical objects may include, for example, table 102, keyboard 104, and mouse 106.

Figure 14:
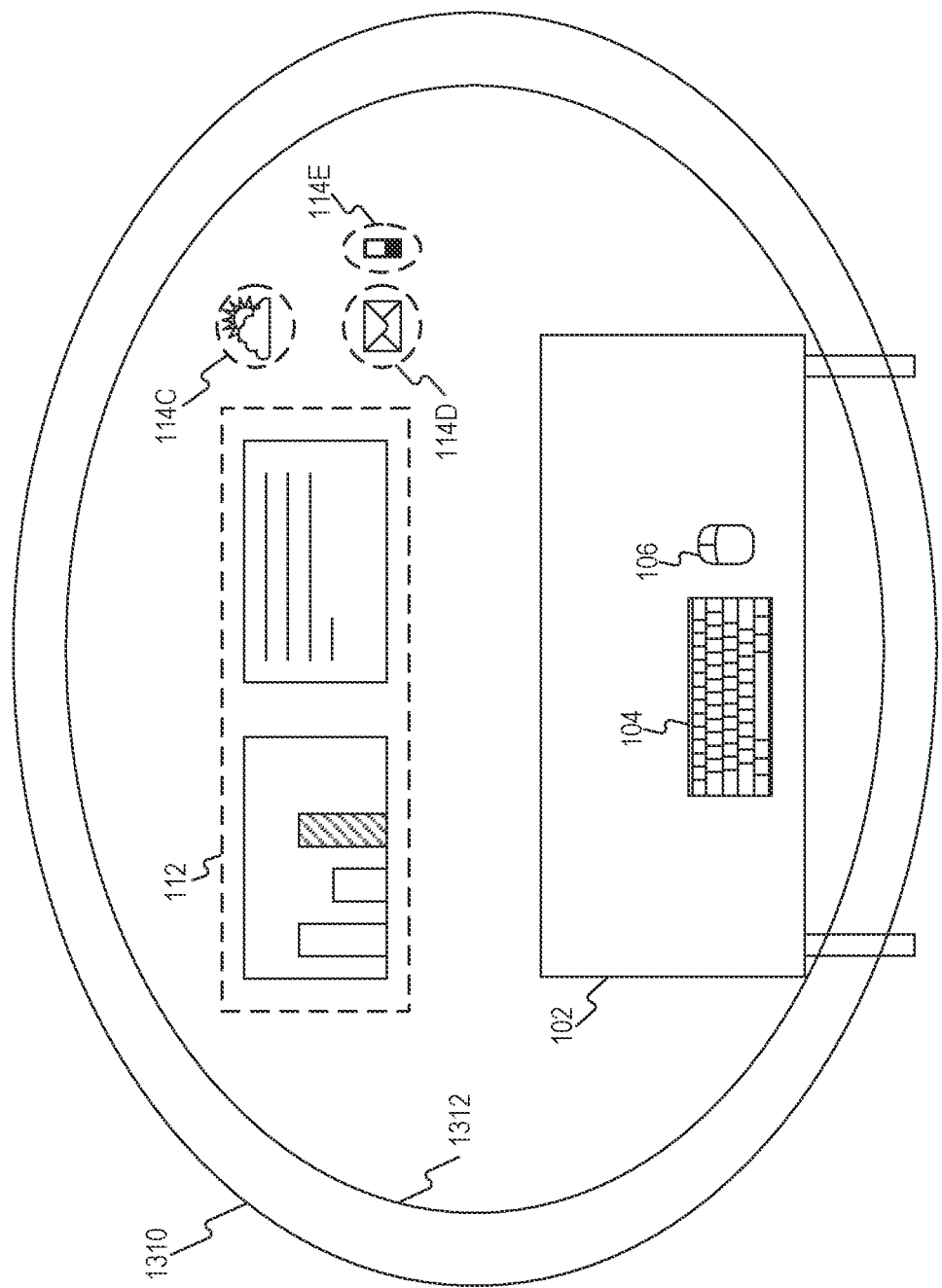
FIG. 14, FIG. 15, FIG. 16, FIG. 17, FIG. 18, and FIG. 19 are schematic diagrams illustrating various use snapshots of a system for enabling gesture interaction with invisible virtual objects, consistent with some embodiments of the present disclosure.
Figure 15:
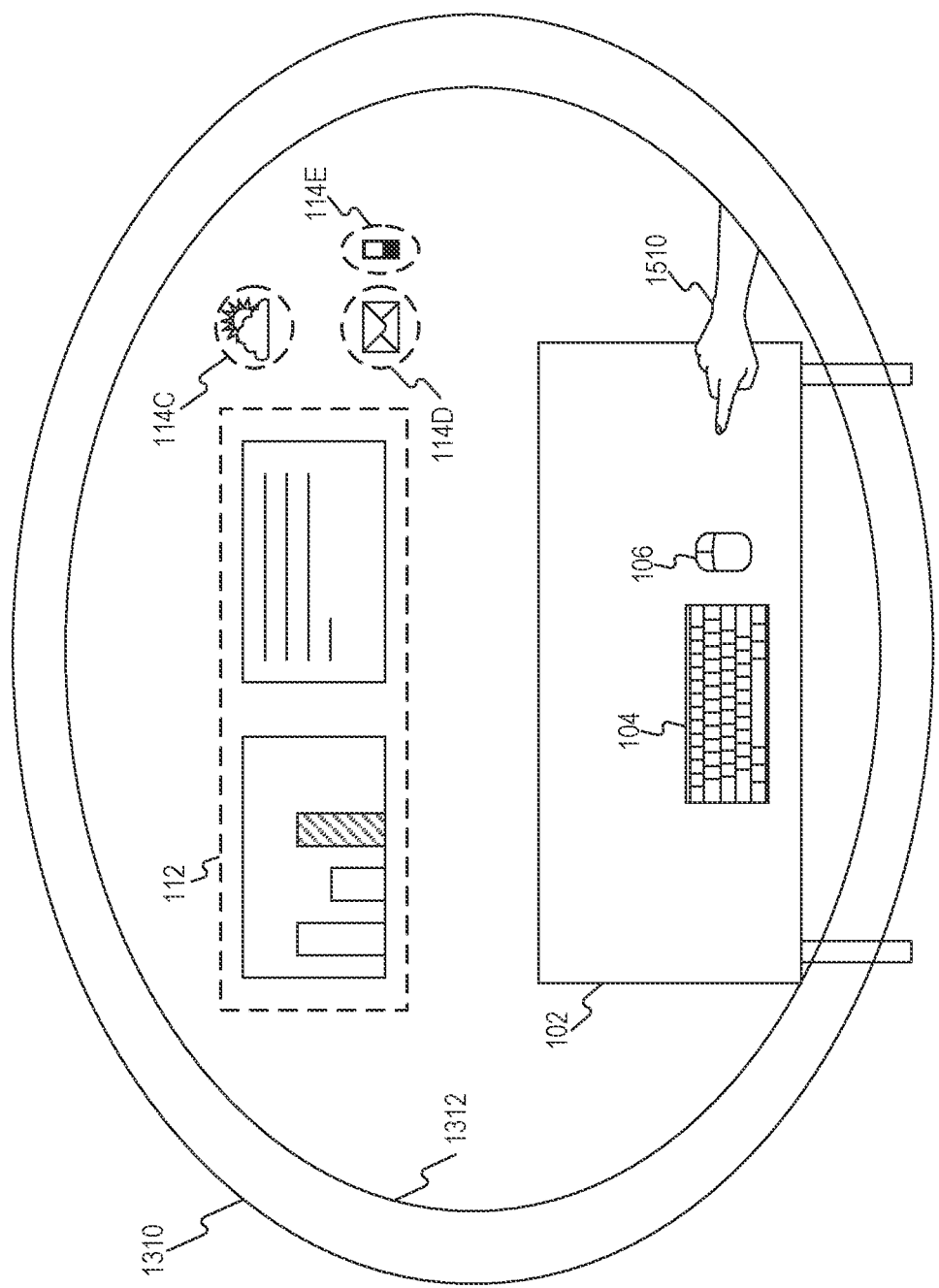

FIG. 14, FIG. 15, FIG. 16, FIG. 17, FIG. 18, and FIG. 19 illustrates various use snapshots of an example system for enabling gesture interaction with invisible virtual objects consistent with some embodiments of the present disclosure. FIG. 14, FIG. 15, FIG. 16, FIG. 17, FIG. 18, and FIG. 19 may illustrate one or more elements as described in connection with FIG. 13 from another perspective (e.g., the perspective of user 100, the perspective of the wearable extended reality appliance of user 100, or the perspective of the at least one image sensor of the wearable extended reality appliance of user 100). With reference to FIG. 14, keyboard 104 and mouse 106 may be placed on table 102. A wearable extended reality appliance may display virtual content to a user, such as virtual screen 112 and virtual widgets 114C, 114D, 114E. The wearable extended reality appliance may include at least one image sensor. The at least one image sensor may have field of view 1310, and may be configured to capture image data including representations of a plurality of physical objects in field of view 1310. The plurality of physical objects may include, for example, table 102, keyboard 104, and mouse 106.

Some disclosed embodiments may involve displaying a plurality of virtual objects in a portion of the field of view, wherein the portion of the field of view is associated with a display system of the wearable extended reality appliance. As previously discussed, a virtual object may include, for example, an inanimate virtual object, an animate virtual object, virtual furniture, a virtual decorative object, a virtual widget, a virtual screen, or any other type of virtual representation. The wearable extended reality appliance may display a plurality of virtual objects to a user via a display system. The display system of the wearable extended reality appliance may include, for example, an optical head-mounted display, a monocular head-mounted display, a binocular head-mounted display, a see-through head-mounted display, a helmet-mounted display, or any other type of device configured to show images to a user. In some examples, the display system of the wearable extended reality appliance may include a display configured to reflect projected images and to allow a user to see through the display. The display may be based on waveguide techniques, diffraction optics, holographic optics, polarized optics, reflective optics, or other types of techniques for combining images projected by a computing device and optical signals emanated from physical objects.

The display system of the wearable extended reality appliance may be configured to display virtual content (e.g., one or more virtual objects) to a user in a portion of the field of view of the at least one image sensor of the wearable extended reality appliance. The portion of the field of view may be associated with the display system of the wearable extended reality appliance. For example, virtual content output by the display system of the wearable extended reality appliance may occupy a solid angle that may be within a solid angle representing the field of view of the at least one image sensor of the wearable extended reality appliance. In some examples, the display system of the wearable extended reality appliance may have a field of view in which virtual content may be displayed. The field of view of the display system may correspond to the portion of the field of view of the at least one image sensor. In some examples, a solid angle representing the field of view of the display system may have an apex (e.g., a point from which objects may be viewed) same as, or approximate to, an apex of a solid angle representing the field of view of the at least one image sensor.

With reference to FIG. 10, in step 1012, instructions contained in a non-transitory computer-readable medium when executed by a processor may cause the processor to display a plurality of virtual objects in a portion of the field of view, wherein the portion of the field of view is associated with a display system of the wearable extended reality appliance.

For example, with reference to FIG. 11, wearable extended reality appliance 1110 may include at least one image sensor. A field of view of the at least one image sensor may have horizontal range 1112. A portion of the field of view of the at least one image sensor may have a horizontal range 1114. Horizontal range 1114 may be within horizontal range 1112. In some examples, the vertex of horizontal range 1112 may be same as, or approximate to (e.g., less than 1 mm from each other, less than 1 cm from each other, less than 10 cm from each other, etc.), the vertex of horizontal range 1114.

As another example, with reference to FIG. 12, the field of view of the at least one image sensor of wearable extended reality appliance 1110 may have vertical range 1210, A portion of the field of view of the at least one image sensor may have a vertical range 1212. Vertical range 1212 may be within vertical range 1210. In some examples, the vertex of vertical range 1210 may be same as, or approximate to (e.g., less than 1 mm from each other, less than 1 cm from each other, less than 10 cm from each other, etc.), the vertex of vertical range 1212.

With reference to FIG. 13, a wearable extended reality appliance (e.g., wearable extended reality appliance 110) may include at least one image sensor. The at least one image sensor may have field of view 1310, which may be represented by a solid angle from a point of the wearable extended reality appliance. A portion of field of view 1310 may be 1312. Field of view portion 1312 may be represented by a solid angle within the solid angle representing field of view 1310. Field of view portion 1312 may be associated with a display system of the wearable extended reality appliance. The wearable extended reality appliance may display a plurality of virtual objects (e.g., virtual screen 112 and virtual widgets 114C, 114D, 114E) in field of view portion 1312. Continuing the example and with reference to FIG. 14, field of view portion 1312 may be within field of view 1310, and the wearable extended reality appliance may display a plurality of virtual objects (e.g., virtual screen 112 and virtual widgets 114C, 114D, 114E) in field of view portion 1312.

In some examples, the field of view associated with the at least one image sensor of the wearable extended reality appliance may be wider than the portion of the field of view associated with the display system of the wearable extended reality appliance. In some examples, the horizontal range and/or vertical range of the portion of the field of view associated with the display system may be 45-90 degrees. In other implementations, the portion of the field of view associated with the display system may be increased to the field of view or the visual field in humans. For example, the portion of the field of view associated with the display system may be increased to approximately 200 degrees for the horizontal range and approximately 150 degrees for the vertical range. As another example, the field of view associated with the at least one image sensor may accordingly be increased to be wider than the portion of the field of view associated with the display system.

In some examples, a horizontal range of the field of view associated with the at least one image sensor of the wearable extended reality appliance may be more than 120 degrees and a horizontal range of the portion of the field of view associated with the display system of the wearable extended reality appliance may be less than 120 degrees. In some examples, a vertical range of the field of view associated with the at least one image sensor of the wearable extended reality appliance may be more than 120 degrees and a vertical range of the portion of the field of view associated with the display system of the wearable extended reality appliance may be less than 120 degrees.

In some examples, a horizontal range of the field of view associated with the at least one image sensor of the wearable extended reality appliance may be more than 90 degrees and a horizontal range of the portion of the field of view associated with the display system of the wearable extended reality appliance may be less than 90 degrees. In some examples, a vertical range of the field of view associated with the at least one image sensor of the wearable extended reality appliance may be more than 90 degrees and a vertical range of the portion of the field of view associated with the display system of the wearable extended reality appliance may be less than 90 degrees.

In some examples, a horizontal range of the field of view associated with the at least one image sensor of the wearable extended reality appliance may be more than 150 degrees and a horizontal range of the portion of the field of view associated with the display system of the wearable extended reality appliance may be less than 150 degrees. In some examples, a vertical range of the field of view associated with the at least one image sensor of the wearable extended reality appliance may be more than 130 degrees and a vertical range of the portion of the field of view associated with the display system of the wearable extended reality appliance may be less than 130 degrees.

Additionally or alternatively, the horizontal range and/or vertical range of the portion of the field of view associated with the display system of the wearable extended reality appliance may be configured to be any desired number of degrees for displaying virtual content to a user. For example, the field of view associated with the at least one image sensor of the wearable extended reality appliance may be configured to be wider than the portion of the field of view associated with the display system of the wearable extended reality appliance (e.g., in terms of the horizontal range and/or the vertical range).

In some examples, the plurality of virtual objects displayed in the portion of the field of view associated with the display system of the wearable extended reality appliance may include a first virtual object that may run on a first operating system and a second virtual object that may run on a second operating system. An operating system may include software that controls the operation of a computer and directs the processing of programs. Multiple operating systems may be employed for controlling and/or presenting virtual objects. For example, the first operating system may be implemented in association with a keyboard (e.g., keyboard 104), and the second operating system may be implemented on a wearable extended reality appliance (e.g., wearable extended reality appliance 110). Additionally or alternatively, an input unit (e.g., input unit 202), a wearable extended reality appliance (e.g., extended reality unit 204), or a remote processing unit (e.g., remote processing unit 208) may have respective operating systems. In another example, the first operating system may run on a remote cloud, and the second operating system may run on a local device (such as the wearable extended reality appliance, the keyboard, a smartphone in a vicinity of the wearable extended reality appliance, and so forth). The first virtual object may run on one of the operating systems. The second virtual object may run on another one of the operating systems.

Some disclosed embodiments may involve receiving a selection of a specific physical object from the plurality of physical objects. For example, the at least one image sensor of the wearable extended reality appliance may continuously or periodically monitor the scenes in the field of view of the at least one image sensor, and at least one processor may, based on the monitored scenes, detect an indication of a selection of a specific physical object from the plurality of physical objects. The indication of the selection of the specific physical object may include, for example, a gesture by a user indicating a selection of the specific physical object (e.g., a pointing at the specific physical object, a touch-and-hold on the specific physical object, or a tap on the specific physical object). In some examples, at least one processor may determine, based on the gesture by the user, a particular point or area on, or approximate to, the selected specific physical object. The particular point or area may be used for receiving a docking virtual object. In some examples, the selected specific physical object may be a portion of a physical object (e.g., a particular point or area on a table). In some other examples, the selection of a specific physical object from the plurality of physical objects may be received from an external device, may be received from a data-structure specifying selections of physical objects, may be received from a memory unit, may be received from a user, may be received from an automated process (for example, from an object detection algorithm used to analyze the image data to detect the specific physical object and thereby selecting it), and so forth.

In some examples, the selection of the specific physical object may be from a list or menu including the plurality of physical objects. For example, based on receiving the image data captured by the at least one image sensor including representations of the plurality of physical objects, the at least one processor may analyze the image data to assign labels to respective physical objects of the plurality of physical objects, and may generate a list or menu including the labels identifying respective physical objects. A user of the wearable extended reality appliance may invoke the list or menu and select the specific physical object from the list or menu. The user may additionally indicate a particular point or area on, or approximate to, the selected specific physical object for receiving a docking virtual object.

The specific physical object may include any physical object as selected from the plurality of physical objects. In some examples, the specific physical object may include a portion of a touch pad. In some examples, the specific physical object may include a non-control surface. The non-control surface may include a surface that is not configured to provide control signals for a computing device, such as a surface of a table, a surface of a clothing item, and so forth. In some examples, the specific physical object may include a keyboard. In some examples, the specific physical object may include a mouse. In some examples, the specific physical object may include a table or a portion thereof. In some examples, the specific physical object may include a sensor.

With reference to FIG. 10, in step 1014, instructions contained in a non-transitory computer-readable medium when executed by a processor may cause the processor to receive a selection of a specific physical object from the plurality of physical objects. For example, with reference to FIG. 15, a hand gesture 1510 may indicate a tap on table 102. At least one processor may detect hand gesture 1510, for example, based on image data captured by at least one image sensor having field of view 1310, and may determine, based on hand gesture 1510, an indication of a selection of a specific physical object (e.g., table 102). In some examples, the at least one processor may additionally determine, based on hand gesture 1510, a particular point or area on, or approximate to, the selected specific physical object (e.g. the point or area of table 102 that is tapped on by hand gesture 1510) for receiving a docking virtual object. In some examples, the selected specific physical object may be a portion of a physical object (e.g., a particular point or area on table 102).

Some disclosed embodiments may involve receiving a selection of a specific virtual object from the plurality of virtual objects for association with the specific physical object. For example, the at least one image sensor of the wearable extended reality appliance may continuously or periodically monitor the scenes in the field of view of the at least one image sensor. At least one processor may, based on the monitored scenes, detect an indication of a selection of a specific virtual object from the plurality of virtual objects. The indication of the selection of the specific virtual object may include, for example, a gesture by a user indicating a selection of the specific virtual object (e.g.; a pointing at the specific virtual object, a touch-and-hold on the specific virtual object, or a tap on the specific virtual object). In some examples, the selection of the specific virtual object may be from a list or menu including the plurality of virtual objects. For example, at least one processor may generate a list or menu including the plurality of virtual objects. A user of the wearable extended reality appliance may invoke the list or menu and select the specific virtual object from the list or menu. The specific virtual object may be selected for association with the specific physical object. In some other examples, the selection of the specific virtual object from the plurality of virtual objects for association with the specific physical object may be received from an external device, may be received from a data-structure associating desired selection of virtual objects with different physical objects, may be received from a memory unit, may be received from a user, may be received from an automated process (for example, from an algorithm ranking virtual objects compatibility with physical objects, etc.), and so forth.

Figure 16:
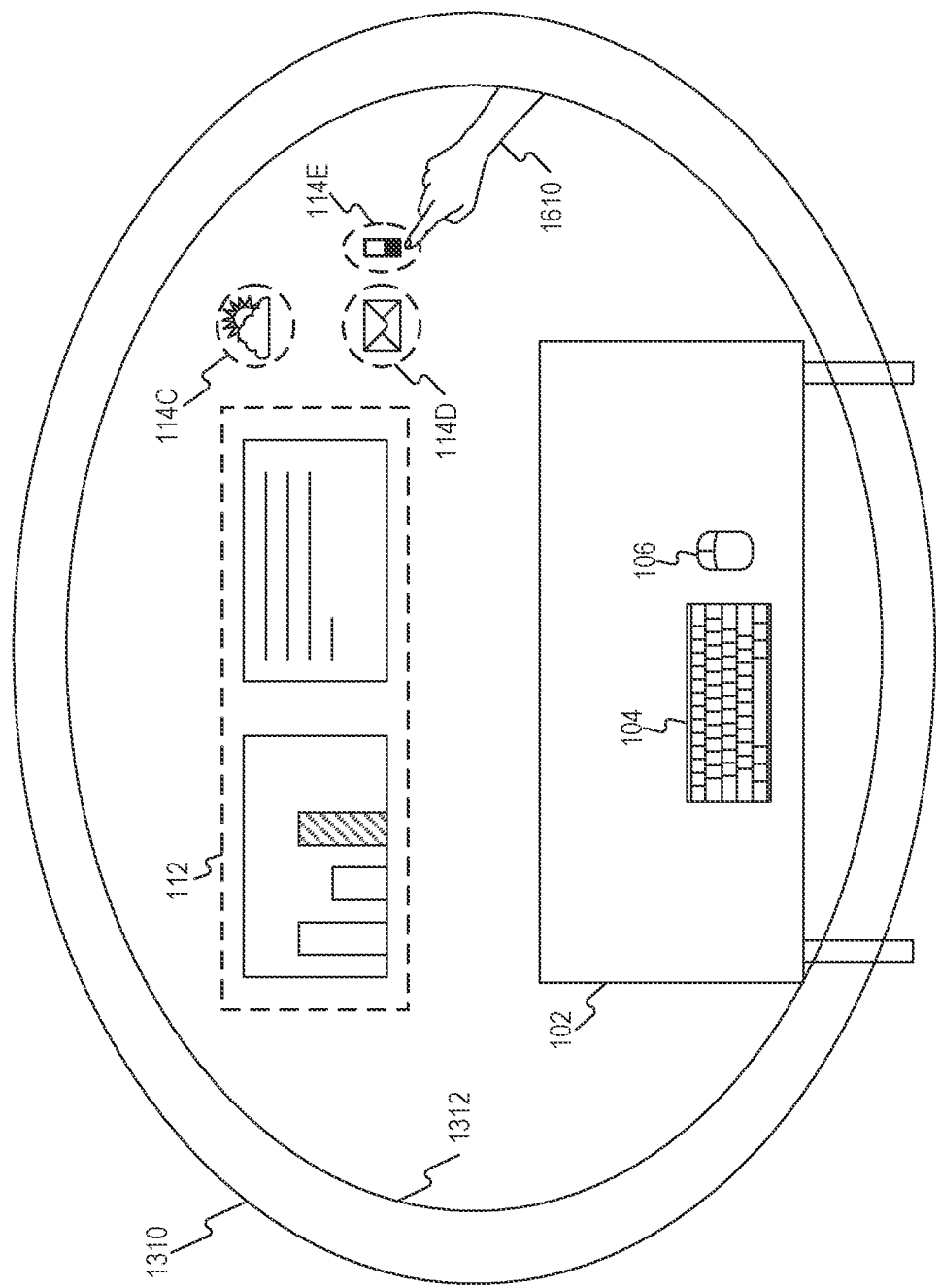

With reference to FIG. 10, in step 1016, instructions contained in a non-transitory computer-readable medium when executed by a processor may cause the processor to receive a selection of a specific virtual object from the plurality of virtual objects for association with the specific physical object. With reference to FIG. 16, a hand gesture 1610 may indicate a tap on virtual widget 114E. At least one processor may detect hand gesture 1610, for example, based on image data captured by at least one image sensor having field of view 1310, and may determine, based on hand gesture 1610, an indication of a selection of a specific virtual object (e.g., virtual widget 114E) for association with the specific physical object (e.g., table 102).

In some examples, the selection of the specific physical object and the selection of the specific virtual object may be both determined from analysis of the image data captured by the at least one image sensor of the wearable extended reality appliance. The image data may include representations of one or more scenes in the field of view of the at least one image sensor. One or more gestures may come into the field of view of the at least one image sensor and be captured by the at least one image sensor. At least one processor may determine, based on the image data, that the one or more gestures may indicate a selection of the specific physical object and/or a selection of the specific virtual object. In some examples, the selection of the specific physical object and the selection of the specific virtual object may be both determined from detecting a single predefined gesture. The single predefined gesture may include, for example, any one of various gestures including a tap, a touch-and-hold, a pointing, or any other desired gesture indicating a selection of an object. In one example, a data-structure may associate gestures with selection of pairs of one physical object and one virtual object, and the data-structure may be accessed based on the single predefined gesture to select the specific physical object and the specific virtual object. In some other examples, the image data captured by the at least one image sensor of the wearable extended reality may be analyzed using an object detection algorithm to detect a particular physical object of a particular category (and/or the location of the particular physical object); and the specific physical object may be selected to be the detected particular physical object. Further, the specific virtual object may be selected based on the particular physical object detected in the image data, and/or based on properties of the particular physical object determined by analyzing the image data. For example, dimensions of the particular physical object may be determined by analyzing the image data, and a virtual object compatible with the determined dimensions may be selected as the specific virtual object.

Some disclosed embodiments may involve docking the specific virtual object with the specific physical object. Docking the specific virtual object with the specific physical object may include, for example, placing the specific virtual object in a fixed location relative to the specific physical object. Additionally or alternatively, docking the specific virtual object with the specific physical object may include attaching the specific virtual object to the specific physical object. Attaching may occur in any way that establishes an association. For example, a physical command (e.g., a hard or soft button press), a voice command, a gesture, a hover, or any other action predefined to cause docking may be employed, depending on the system designer's choice. The specific virtual object may be attached to a particular point or area on, or approximate to, the specific physical object. The particular point or area on, or approximate to, the specific physical object may be specified, for example, by a user of the wearable extended reality appliance. Docking the specific virtual object with the specific physical object may be based on the selection of the specific physical object and the selection of the specific virtual object. In some examples, the selected specific physical object may be a portion of a physical object (e.g., a particular point or area on a table), and the specific virtual object may be docked to the portion of the physical object.

In some examples, docking the specific virtual object with the specific physical object may be based on receiving a user input indication to dock the specific virtual object with the specific physical object (e.g., a gesture of a drag of the specific virtual object to the specific physical object). Docking the specific virtual object with the specific physical object may allow the specific virtual object to stay in a location that may be fixed relative to the specific physical object. Based on the docking, the specific virtual object may be displayed to be in the location that may be fixed relative to the specific physical object.

In some examples, docking the specific virtual object with the specific physical object may include connecting the specific virtual object's position to the specific physical object. The docked specific virtual object may move together with the specific physical object to which the specific virtual object is docked. The specific physical object may be associated with a dockable area where virtual objects may be placed to be docked to the specific physical object. The dockable area may include, for example, an area (e.g., a surface) of the specific physical object, and/or an area surrounding the specific physical object. For example, a dockable area of a table may include a surface of the table. As another example, a dockable area of a keyboard may include an area surrounding the keyboard (e.g., when the keyboard is placed on a supporting surface), and/or a surface of the keyboard (e.g., a portion thereof that have no buttons or keys). In some examples, the specific virtual object may be dragged to a dockable area (e.g., of the specific physical object). In some examples, moving the specific virtual object may cause highlighting of dockable areas (e.g., using virtual content displayed by the wearable extended reality appliance), making indications of the dockable areas visibly displayed to a user to place and dock the specific virtual object.

With reference to FIG. 10, in step 1018, instructions contained in a non-transitory computer-readable medium when executed by a processor may cause the processor to dock the specific virtual object with the specific physical object.

Figure 17:
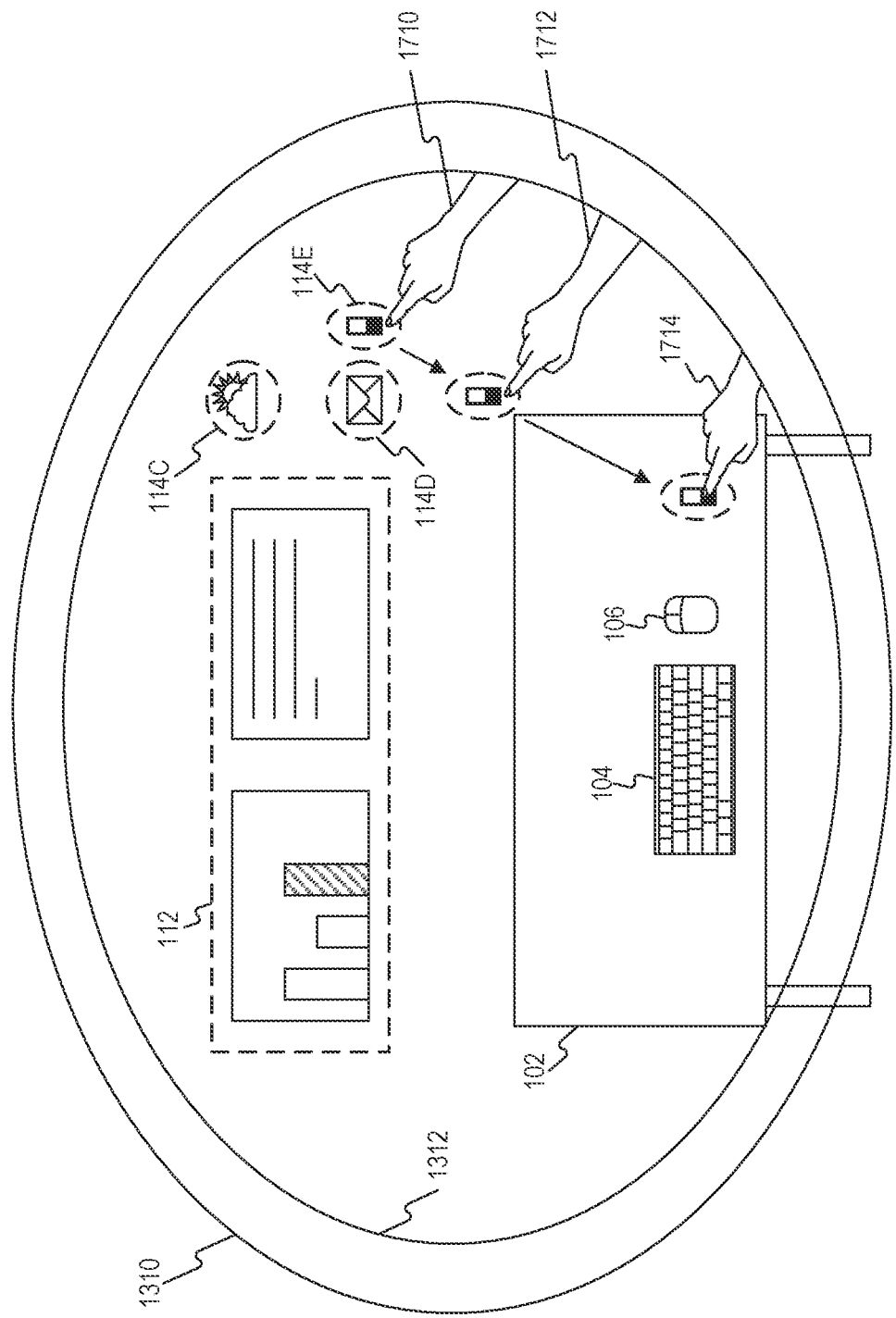
Figure 18:
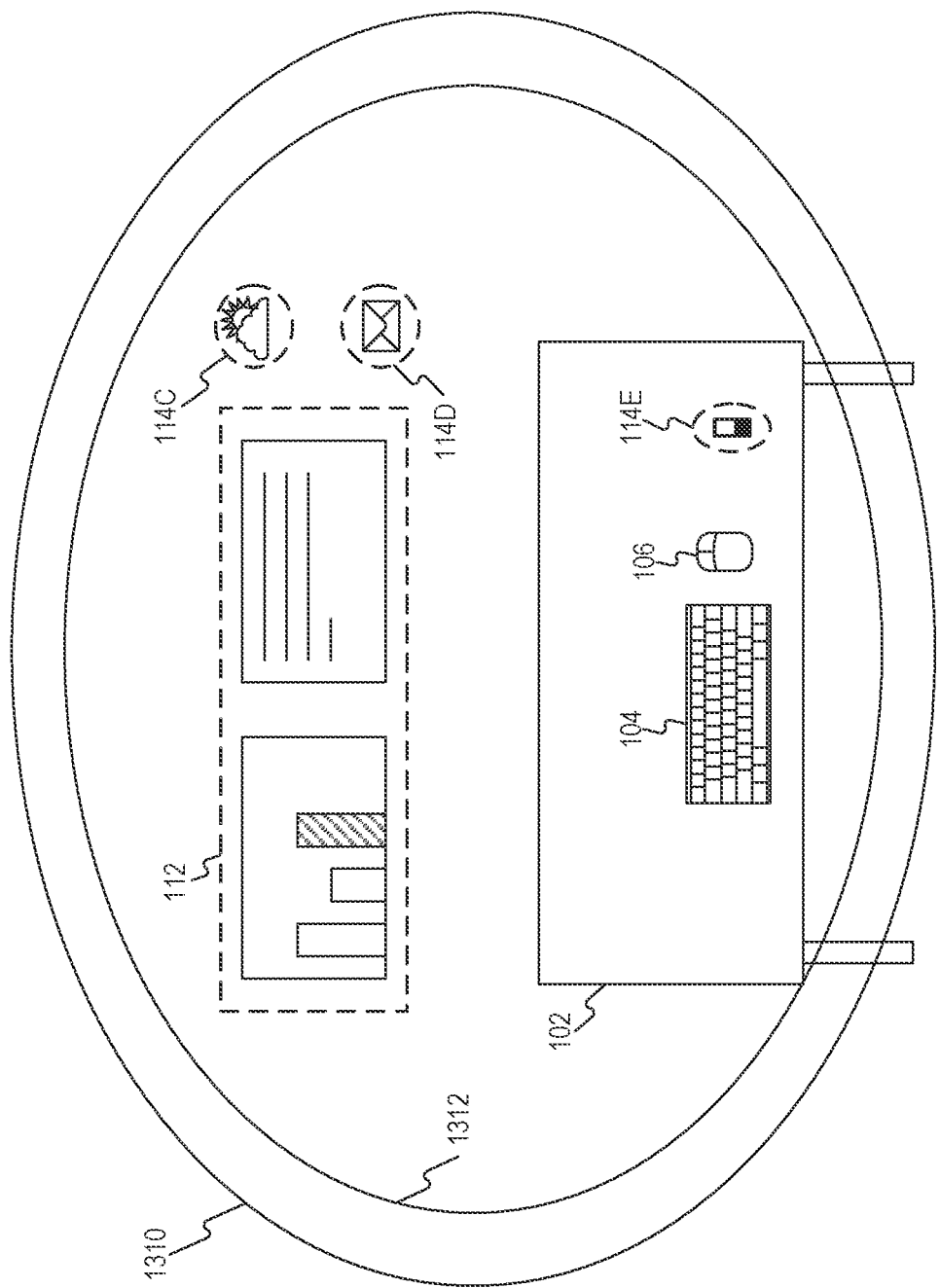

With reference to FIG. 17, a hand gesture 1710, 1712, 1714 may indicate a drag of virtual widget 114E to table 102. At least one processor may detect hand gesture 1710, 1712, 1714, for example, based on image data captured by at least one image sensor having field of view 1310, and may determine, based on hand gesture 1710, 1712, 1714, an indication to dock the specific virtual object (e.g., virtual widget 114E) with the specific physical object (e.g., table 102). The specific virtual object may be docked at a particular point or area on, or approximate to, the specific physical object. The particular point or area may be specified by a user. In some examples, the selected specific physical object may be a portion of a physical object (e.g., a particular point or area on table 102), and the specific virtual object may be docked to the portion of the physical object. With reference to FIG. 18, the specific virtual object (e.g., virtual widget 114E) is docked to the specific physical object (e.g., table 102, or the particular point or area on table 102).

In some examples, the specific physical object may be a keyboard and at least some of the plurality of virtual objects may be associated with at least one rule defining virtual object behavior when the wearable extended reality appliance moves away from a docked keyboard. The virtual object behavior may include, for example, undocking a docked virtual object, rendering a docked virtual object inactive, hiding a docked virtual object, rendering a virtual object unable to dock, or other desired actions. The at least one rule defining the virtual object behavior may be configured to cause at least one processor to perform one or more of the virtual object behaviors for one or more corresponding virtual objects, based on the wearable extended reality appliance moving away from a docked keyboard by a threshold distance (e.g., 1 meter, 2 meters, 3 meters, 5 meters, 10 meters, or any other desired amount of length). In some examples, the at least one rule may be based on at least one of: a type of keyboard, time of day, or other virtual objects docked to the keyboard. A rule may include any instructions that cause an effect based on an occurrence or a condition of an occurrence. For example, movement of a keyboard relative to a virtual object may cause some change with respect to the virtual object. (e.g., the virtual object may move with the keyboard. Alternatively or additionally, the effect may be based on a condition. For example, the at least one rule may be configured to cause at least one processor to perform a first virtual object behavior for a virtual object for a keyboard in an office, and to perform a second virtual object behavior for the virtual object for a keyboard in a home. As another example, the at least one rule may be configured to cause at least one processor to perform a first virtual object behavior for a virtual object during non-business hours, and to perform a second virtual object behavior for the virtual object during business hours. As a further example, the at least one rule may be configured to cause at least one processor to perform a first virtual object behavior for a virtual object if no other virtual objects are docked to the keyboard, and to perform a second virtual object behavior for the virtual object if other virtual objects are docked to the keyboard.

In some embodiments, when the specific physical object and the specific virtual object are outside the portion of the field of view associated with the display system of the wearable extended reality appliance such that the specific virtual object is invisible to a user of the wearable extended reality appliance, these embodiments may include receiving a gesture input indicating that a hand is interacting with the specific virtual object. After the specific virtual object is docked with the specific physical object, a user may move the wearable extended reality appliance, and a position and/or orientation of the wearable extended reality appliance may change. Based on the change of the position and/or orientation, the portion of the field of view associated with the display system of the wearable extended reality appliance may not cover the location where the specific virtual object is docked. Accordingly, the specific virtual object may not be displayed to the user and may become invisible to the user. When the location where the specific virtual object is docked outside the portion of the field of view associated with the display system, the user may make a gesture to interact with the location where the specific virtual object is docked.

At least one image sensor of the wearable extended reality appliance may capture image data in the field of view of the at least one image sensor, and may detect a gesture input. The gesture input may include, for example, a drag, a pinch, a spread, a swipe, a tap, a pointing, a grab, a scroll, a rotate, a flick, a touch, a zoom-in, a zoom-out, a thumb-up, a thumb-down, a touch-and-hold, or any other action of one or more fingers or hands. In some examples, the gesture input may be determined from analysis of the image data captured by the at least one image sensor of the wearable extended reality appliance. Based on the image data (for example, based on an analysis of the image data with a gesture recognition algorithm), at least one processor may determine that the gesture input may indicate that a hand or portion thereof is interacting with the specific virtual object. The hand interacting with the specific virtual object may be determined based on the hand interacting with the specific physical object. In some examples, the hand that is interacting with the specific virtual object may be a hand of the user of the wearable extended reality appliance. In some examples, the hand that is interacting with the specific virtual object may be a hand of a person other than the user of the wearable extended reality appliance.

In some examples, the gesture input may be determined from analysis of additional sensor data acquired by an additional sensor associated with an input device connectable to the wearable extended reality appliance. The additional sensor may be located in, connected to or associated with any other physical element. For example, the additional sensor may be associated with a keyboard. Thus, even when a user looks away from the keyboard rendering the keyboard outside the user's field of view, the additional sensor on the keyboard may sense the gesture. The additional sensor is preferably, but not necessarily, an image sensor. Moreover, a keyboard-associated sensor is but one example. The additional sensor may be associated with any item. For example, the additional sensor may include a sensor on a glove, such as a haptic glove, a wired glove, or data glove. The additional sensor may include a hand-position sensor (e.g., an image sensor or a proximity sensor included in the item. Additionally or alternatively, the additional sensor may include sensor(s) as described herein in relation to a hand-position sensor included in a keyboard. The sensor(s) may be included in an input device other than a keyboard. The additional sensor data may include a position and/or pose of the hand or of portions of the hand. In some examples, the specific physical object may include a portion of a touch pad, and the gesture input may be determined based on analysis of touch input received from the touch pad. In some examples, the specific physical object may include a sensor, and the gesture input may be received from the sensor and/or may be determined based on data received from the sensor. In some examples, when the specific physical object and the specific virtual object are in the portion of the field of view associated with the display system of the wearable extended reality appliance but are hidden by another object (virtual or physical), such that the specific virtual object is invisible to a user of the wearable extended reality appliance, some disclosed embodiments may include receiving a gesture input indicating that a hand is interacting with the specific virtual object, for example from an analysis of additional sensor data acquired by an additional sensor associated with an input device connectable to the wearable extended reality appliance as described above.

With reference to FIG. 10, in step 1020, instructions contained in a non-transitory computer-readable medium when executed by a processor may cause the processor to, when the specific physical object and the specific virtual object are outside the portion of the field of view associated with the display system of the wearable extended reality appliance such that the specific virtual object is invisible to a user of the wearable extended reality appliance, receive a gesture input indicating that a hand is interacting with the specific virtual object.

Figure 19:
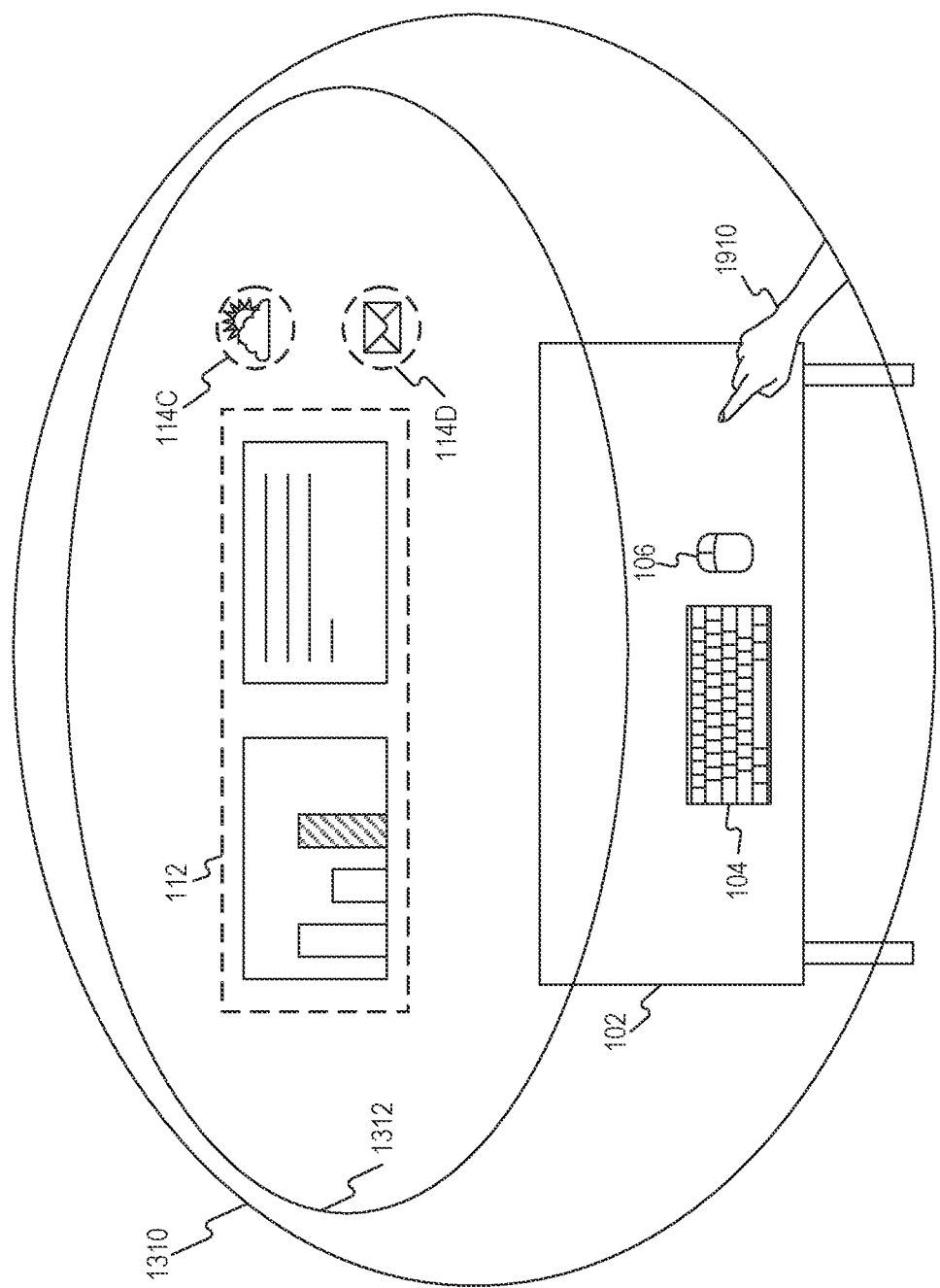

With reference to FIG. 19, a position and/or orientation of a wearable extended reality appliance may change, and field of view 1310 and field of view portion 1312 may change their respective coverage areas. The particular point or area where the specific virtual object (e.g., virtual widget 114E) is docked has moved outside of field of view portion 1312, and virtual widget 114E has become invisible to a user. A gesture 1910 may indicate interaction with the point or area where the virtual widget 114E is docked. Gesture 1910 may occur in field of view 1310, and may be captured by at least one image sensor of the wearable extended reality appliance. At least one processor may, based on gesture 1910, determining that a hand may be interacting with virtual widget 114E.

Some disclosed embodiments may involve, in response to the gesture input, causing an output associated with the specific virtual object. The output associated with the specific virtual object may be based on the gesture input and may be generated, for example, as if the gesture input is interacting with the specific virtual object, even though the specific virtual object may be invisible to a user of the wearable extended reality appliance. For example, if the gesture input is a tap, the output associated with the specific virtual object may include activating the specific virtual object. If the gesture input is a scroll-up or a scroll-down, the output associated with the specific virtual object may include, for example, moving up or down a scroll bar. In some examples, causing the output associated with the specific virtual object may include altering a previous output associated with the specific virtual object. Thus, even though the specific virtual object may be outside the user's field of view, a user may be permitted to manipulate the virtual object. Such manipulations may include, for example, changing a volume (when the virtual object is a volume control); rotating or repositioning another virtual object associated with the specific virtual object (when the specific virtual object is a positioning control); changing a display parameter (when the specific virtual object is a display parameter control); moving the specific virtual object from outside the user's field of view to within the user's field of view; activating a functionality, or any other action, depending on system designer's choice.

With reference to FIG. 10, in step 1022, instructions contained in a non-transitory computer-readable medium when executed by a processor may cause the processor to, in response to the gesture input, cause an output associated with the specific virtual object. With reference to FIG. 19, gesture 1910 may include, for example, a scroll-up. In response to gesture 1910, at least one processor may cause output associated with virtual widget 114E. For example, virtual widget 114E may be a volume bar, and the output associated with virtual widget 114E may be increasing the volume.

As alluded to earlier, in some examples, the specific virtual object may be a presentation control, and the output may include a change in a presentation parameter associated with the presentation control. The presentation control may include, for example, a start button, a next-page button, a previous-page button, an end button, a pause button, a last-viewed button, a volume bar, a zoom-in button, a zoom-out button, a perspective selection, a security control, a privacy mode control, or any other function for controlling a presentation. In response to a gesture input indicating interaction with the presentation control (e.g., which may be invisible to a user), at least one processor may cause a change in a presentation parameter associated with the presentation control (e.g., a change in a page number of a presentation). In some examples, the presentation parameter may include at least one of volume, zoom level, perspective, security, or privacy mode. For example, the volume of a presentation may be changed. As other examples, the zoom level of a presentation may be changed or the perspective of a presentation may be changed. For example, the change in the presentation parameter may cause a security level of a presentation to be changed to modify access of viewers to the presentation based on security credentials or levels associated with the viewers. As yet another example, the change in the presentation parameter may cause a privacy mode of the presentation to be changed, to modify access of viewers to the presentation based on trust levels of the viewers.

In some examples, the specific virtual object may be an icon of an application, and the output may include virtual content associated with the application inside the portion of the field of view associated with the display system of the wearable extended reality appliance. For example, the specific virtual object may be an icon of an application, such as a weather application, an email application, a web browser application, an instant messaging application, a shopping application, a navigation application, or any other computer program for carrying out one or more tasks. In response to a gesture input indicating interaction with the application icon (e.g., which may be invisible to a user), at least one processor may, for example, activate the application and cause display of virtual content of the application inside the portion of the field of view associated with the display system of the wearable extended reality appliance.

Some disclosed embodiments may involve recommending default positions for the plurality of virtual objects based on associated functionalities. The default positions may be particular points or areas to which virtual objects may be docked. At least one processor may determine functionalities associated with the plurality of virtual objects displayed in the portion of the field of view associated with the display system of the wearable extended reality appliance, for example by accessing a data-structure associating virtual objects with functionalities. Based on the functionalities, the at least one processor may determine default positions for the plurality of virtual objects. For example, if a virtual object is associated with functions to control volume, the default positions for the virtual object may include, for example, an upper area of a keyboard, a corner of a table, or any other desired location for docking the virtual object. If a virtual object is associated with functions of an application (e.g., an email application), the default positions for the virtual object may include, for example, a center area of a table or any other desired location for docking the virtual object. In another example, if a particular virtual object functionality is associated with one or more gestures benefiting from tactile feedback, the default position for the particular virtual object may be on a surface. At least one processor may provide recommendations of default positions to a user, for example, when a virtual object is selected for docking. In some examples, the recommended default positions may be displayed to the user as overlay indications on top of physical objects in the portion of the field of view associated with the display system of the wearable extended reality appliance.

In some examples, the wearable extended reality appliance may be configured to pair with a plurality of differing keyboards. Some disclosed embodiments may involve causing a display of the specific virtual object to vary based on a selected paired keyboard. The differing keyboards may be specific physical objects for docking a specific virtual object. For example, a first keyboard may be in a home, and may be associated with first settings for the specific virtual object. A second keyboard may be in an office and may be associated with second settings for the specific virtual object. The first settings may be different from the second settings. The differing keyboards may be paired with the wearable extended reality appliance (e.g., may be used as input devices for the wearable extended reality appliance). A specific virtual object (e.g., a volume bar) may be docked with the first keyboard and may be docked with the second keyboard. The specific virtual object may be configured with different settings, and may be displayed differently, when docked with different keyboards. For example, the specific virtual object may be configured with the first settings when docked with the first keyboard in a home, and may be configured with the second settings when docked with the second keyboard in an office. As another example, the specific virtual object may be displayed to have a larger size when docked with the first keyboard in a home than when docked with the second keyboard in an office.

Some disclosed embodiments may involve virtually displaying the specific virtual object in proximity to the specific physical object, upon identifying entrance of the specific physical object in the portion of the field of view associated with the display system of the wearable extended reality appliance. The specific physical object (e.g., a particular point or area on a table) may enter the portion of the field of view associated with the display system of the wearable extended reality appliance. At least one processor may identify entrance of the specific physical object in the portion of the field of view, for example, based on image data captured by at least one image sensor of the wearable extended reality appliance. The newly captured image data may be compared with stored image data and to recognize the physical object based on the comparison. This may occur even when only a portion of the physical object enters the field of view, because the comparison may occur on only a portion of the physical object (e.g., a comparison may be performed on less than the full set of image data for the physical object). Once the physical object or a portion thereof is recognized, the at least one processor may cause virtual presentation of the specific virtual object in proximity to the specific physical object (e.g., even when the specific physical object has not fully entered the portion of the field of view). In some examples, a specific virtual object may be docked to a location in proximity to a specific physical object (e.g., a keyboard). For example, a volume bar may be docked to a location next to a keyboard. At least one processor may cause virtual presentation of the specific virtual object in proximity to the specific physical object, upon identifying entrance of the specific physical object in the portion of the field of view.

Some disclosed embodiments may involve determining whether the hand that is interacting with the specific virtual object is a hand of the user of the wearable extended reality appliance. (As used throughout, references to a hand include a full hand or a portion of a hand.) Hand source recognition may occur in any one of a number of ways, or a combination of ways. For example, based on a relative position of the hand, the system may determine that the hand is that of a user of the wearable extended reality appliance. This may occur because hands of wearers may have an orientation in the field of view that is a telltale sign that the hand is that of the wearer. This may be determined by performing image analysis on the current hand image and comparing it with stored images or image data associated with orientations of hands of wearers. Similarly, hands of persons other than the wearer may have differing orientations and in a similar manner to determining that a hand is one of a wearer of the extended reality appliance, the system may determine that a detected hand is of a person other than the wearer.

By way of another example, hands of differing individuals may differ. The system may come to recognize hands as being those of an extended reality device wearer, by examining unique characteristics of skin or structure. Over time as a wearer uses the system, features of the wearer's hands may be stored in a data-structure and image analysis may be performed to confirm that a current hand in an image is that of the wearer. In a similar, way, hands of individuals other than the wearer may be recognized, enabling the system to distinguish between a plurality of individuals based on characteristics of their hands. This feature may enable unique system control. For example, if multiple individuals interact with the same virtual object in the same virtual space, control and movement of the virtual object may vary based on the person interacting with the virtual object.

Thus, at least one processor may determine whether the hand that is interacting with the specific virtual object (e.g., gesture 1910) is a hand of the user of the wearable extended reality appliance, for example, based on image data captured by at least one image sensor of the wearable extended reality appliance. The at least one processor may analyze the image data for hand identification, for example, by determining hand features based on the image data and comparing the determined hand features with stored features of a hand of the user of the wearable extended reality appliance. In some examples, the at least one processor may perform hand identification based on particular objects associated with a hand (e.g., a particular ring for identifying a hand of the user). Some disclosed embodiments may involve, in response to the hand that is interacting with the specific virtual object being a hand of the user of the wearable extended reality appliance and the gesture input, causing the output associated with the specific virtual object. For example, if the hand that is interacting with the specific virtual object (e.g., gesture 1910) is a hand of the user of the wearable extended reality appliance, at least one processor may cause the output associated with the specific virtual object. Additional disclosed embodiments may involve, in response to the hand that is interacting with the specific virtual object not being a hand of the user of the wearable extended reality appliance, forgoing causing the output associated with the specific virtual object. For example, if the hand that is interacting with the specific virtual object (e.g., gesture 1910) is not a hand of the user of the wearable extended reality appliance, at least one processor may forgo causing the output associated with the specific virtual object.

When working in an extended reality environment, it may be difficult for users to know whether the system recognizes an object intended for kinesics selection (e.g., through gesturing or through gazing), or when the kinesics selection is precise enough to indicate a single object. Therefore, providing to the users intermediate feedback indicating that the kinesics selection is not precise enough to indicate a single object may be helpful. At the beginning of a gesture for example, when a gesture is less specific, a group of virtual objects in the direction of the gesture may be highlighted. As the user hones-in on the intended selection, objects at the periphery may become unhighlighted until only the selected object remains highlighted. This may indicate to the user that the initial gesture is in a right direction, but need to be further refined to indicate a single virtual object.

Various embodiments may be described with reference to a system, method, apparatuses, and/or computer readable medium. It is intended that the disclosure of one is a disclosure of all. For example, it is to be understood that the disclosure of one or more processes embodied in a non-transitory computer-readable medium, as described herein, may also constitute a disclosure of methods implemented by the computer readable medium, as well as systems and/or apparatuses for implementing processes embodied in the non-transitory computer-readable medium, for example, via at least one processor. Thus, in some embodiments, a non-transitory computer readable medium may contain instructions that when executed by at least one processor may cause the at least one processor to perform incremental convergence operations in an extended environment. Some aspects of such processes may occur electronically over a network that may be wired, wireless, or both. Other aspects of such processes may occur using non-electronic means. In the broadest sense, the processes disclosed herein are not limited to particular physical and/or electronic instrumentalities; rather, they may be accomplished using any number of differing instrumentalities. As described above, the term non-transitory computer readable medium should be expansively construed to cover any medium capable of storing data in any memory in a way that may be read by any computing device having at least one processor to carry out operations, methods, or any other instructions stored in the memory.

A non-transitory computer-readable medium may include, for example, random access memory (RAM), read-only memory (ROM), volatile memory, non-volatile memory, hard drives, compact disc read-only memory (CD-ROM), digital versatile discs (DVDs), flash drives, disks, any optical data storage medium, any physical medium with patterns of holes, programmable read-only memory (PROM), erasable programmable read-only memory (EPROM), FLASH-EPROM or any other flash memory, non-volatile random-access memory (NVRAM), caches, registers, any other memory chip or cartridge, or networked versions of the same. A non-transitory computer-readable medium may refer to multiple structures, such as a plurality of non-transitory computer-readable media, located at a local location or at a remote location. Additionally, one or more non-transitory computer-readable media may be utilized in implementing a computer-implemented method. Accordingly, a non-transitory computer-readable medium may include tangible items and may exclude carrier waves or transient signals.

The instructions contained in the non-transitory computer-readable medium may include, for example, software instructions, computer programs, computer code, executable instructions, source code, machine instructions, machine language programs, or any other type of directions for a computing device. The instructions contained in the non-transitory computer-readable medium may be based on one or more of various types of desired programming languages, and may include (e.g., embody) various processes for detecting, measuring, processing, and/or implementing, or otherwise providing feedback based on, incremental convergence in an extended reality environment as described herein.

At least one processor may be configured to execute instructions contained in the non-transitory computer-readable medium to cause various processes to be performed for implementing incremental convergence in an extended reality environment as described herein. The processor may include, for example, integrated circuits, microchips, microcontrollers, microprocessors, central processing units (CPUs), graphics processing units (GPUs), digital signal processors (DSPs), field programmable gate arrays (FPGAs), or other units suitable for executing instructions or performing logic operations. The processor may include a single-core or multiple-core processor. In some examples, the processor may be a single-core processor configured with virtualization technologies. The processor may, for example, implement virtualization technologies or other functionalities to provide the ability to execute, control, run, manipulate, or store multiple software processes, applications, or programs. In another example, the processor may include a multiple-core processor (e.g., dual-core, quad-core, or with any desired number of cores) configured to provide parallel processing functionalities to allow a device associated with the processor to execute multiple processes simultaneously. Other types of processor arrangements may be implemented to provide the capabilities described herein.

Some disclosed embodiments may relate to performing incremental convergence operations in an extended reality environment (such as a virtual reality environment, an augmented reality environment, a mixed reality environment, and so forth). The term incremental convergence may relate to, or otherwise denote, any increase or decrease, as well as the starting and stopping of, a user's physical interaction with an extended reality environment. The user's physical interactions with the extended reality environment may function as a kinesics input which may enable the user to select, or otherwise interact with, virtual objects within a coordinate system of the extended reality environment. The interactions with the extended reality environment may include hand gestures, body gestures, eye-movements, and/or any gesture-based interaction or combination of gesture-based interactions. Incremental convergence operations may relate to processes for honing-in on a selection or an item. This may occur incrementally in that over time, target identification sharpens or moves closer to a final selection or a particular item. Incremental convergence may occur, in some instances, based on feedback that helps direct a selection. For example, feedback may be provided to a user during the kinesics selection process of a virtual object within an extended reality environment, as the user hones-in toward, or otherwise engages with, at least one of a plurality of virtual objects displayed on a user interface of the extended reality environment.

Some disclosed embodiments may involve displaying a plurality of dispersed virtual objects across a plurality of virtual regions. The virtual objects may relate to virtual content including any type of data representation that may be visually displayed to the user, and which the user may interact with, in an extended reality environment via an extended reality appliance. Virtual objects may be considered dispersed if they are not all located in precisely the same location. For example, virtual objects may be considered dispersed if they appear at different locations on a virtual display or in an extended reality environment. Objects located next to each other are one example of objects that are dispersed. A virtual display or an extended reality environment may have regions that are near each other or spaced apart from each other. In either instance, the objects may be considered dispersed across a plurality of regions.

The virtual objects may include any visual presentation rendered by a computer or a processing device such as an inanimate virtual object or animate virtual object. In some instances, the virtual objects may be configured to change over time or in response to triggers. In some embodiments, the virtual objects of the plurality of dispersed virtual objects may include at least one virtual widget and/or options in a virtual menu. The virtual objects, such as at least one virtual widget and/or options in a virtual menu, may be used to issue commands, begin dialog sequences, change a mode of interaction and/or give the user quick access to information without having to fully open the associated virtual object. Additionally, or alternatively, the virtual objects may include at least one icon which may activate a script for causing an action associated with the particular virtual object associated with the icon and/or may otherwise be linked to related programs or applications.

The plurality of dispersed virtual objects may relate to any number of virtual objects which may be visually displayed, or otherwise presented, to the user across a user interface of the extended reality environment. For example, a plurality of dispersed virtual objects may be scattered across a virtual computer screen (also referred to as virtual display herein) displaying the virtual objects generated by an operating system. In some embodiments, the plurality of virtual regions are a plurality of virtual regions of an extended reality environment and displaying the plurality of dispersed virtual objects may include causing a wearable extended reality appliance to display the plurality of dispersed virtual objects.

The user interface of the extended reality environment may be configured to display a plurality of virtual regions. The plurality of virtual regions may relate to at least two discrete or connected subsets of space within the entire space of the user interface. Each one of the plurality of virtual regions may be defined by at least one of its boundary, an interior area, an exterior area, or elements included in the virtual region (such as virtual objects). The boundary may or may not be presented visually. For example, in a visual sense, the boundary of a given virtual region may be denoted by any type of closed geometry which encompasses a subset of the entire space of the user interface and may form an interface between the interior area and the exterior area of the virtual region. The interior area of the virtual region may relate to the subset of space inside of the boundary of the virtual region and may include at least one of the plurality of dispersed virtual objects. Thus, a given virtual region may contain a single virtual object or a number of the plurality of virtual objects. The exterior area of the virtual region may relate to the subset of space outside of the boundary of the virtual region and may include a number of the plurality of dispersed virtual objects excluding the virtual object or virtual objects included in the interior of the virtual region. Virtual objects located in the exterior area of a virtual region may be located in the interior area of another one of the plurality of virtual regions. In other embodiments, colors or other visual characteristics may denote differing regions. And in other embodiments, regions may run together without a perceptible divider.

The plurality of virtual regions may include at least a first virtual region and a second virtual region that differs from the first virtual region. The term differs from may indicate that the first virtual region may include at least one virtual object of the plurality of dispersed virtual objects not included in the second virtual region, and the second virtual region may include at least one virtual object of the plurality of dispersed virtual objects not included in the first virtual region. Thus, the plurality of virtual regions include at least one non overlapping area with a given virtual object. Additionally, or alternatively, all of the virtual objects in the first virtual region may not be included in the second virtual region, and all of the virtual objects in the second virtual region may not be included in the first virtual region. In some embodiments, the first virtual region may be selected based on an initial kinesics input. As will be discussed in detail below, an initial kinesis input may include any gesture-based interaction in which the user begins to express an interest in, or otherwise pay attention to, a virtual region, such as a first virtual region, for example by initially pointing and/or looking toward the first virtual region.

In some embodiments, the boundaries of the first virtual region may be adaptable in real time in response to the kinesics input. For example, the boundary of the first virtual region may be dynamically adaptable to include or exclude a different number of the plurality of dispersed virtual objects based on a user's kinesics input within the coordinate system of the extended reality environment. In one instance, the boundary of a first virtual region may encompass a first number of the plurality of virtual objects based on a threshold degree of certainty that a user may intend to make a kinesics selection of one of the first number of the plurality of virtual objects. In one non-limiting example, if the at least one processor determines that a user may intend to select at least one of a number of adjacent virtual objects of the plurality of virtual objects based on the user pointing toward said virtual objects, the boundary may be defined so as to include each of those virtual objects which the user may intend to interact with above a threshold degree of certainty, for example a 50% degree of certainty. In another instance, the boundary of the first virtual region may encompass a second number of the plurality of virtual objects, which is less than the first number of the plurality of virtual objects, based on a greater threshold degree of certainty that the user may intend to make a kinesics selection of one of the second number of the plurality of virtual objects.

Figure 20:
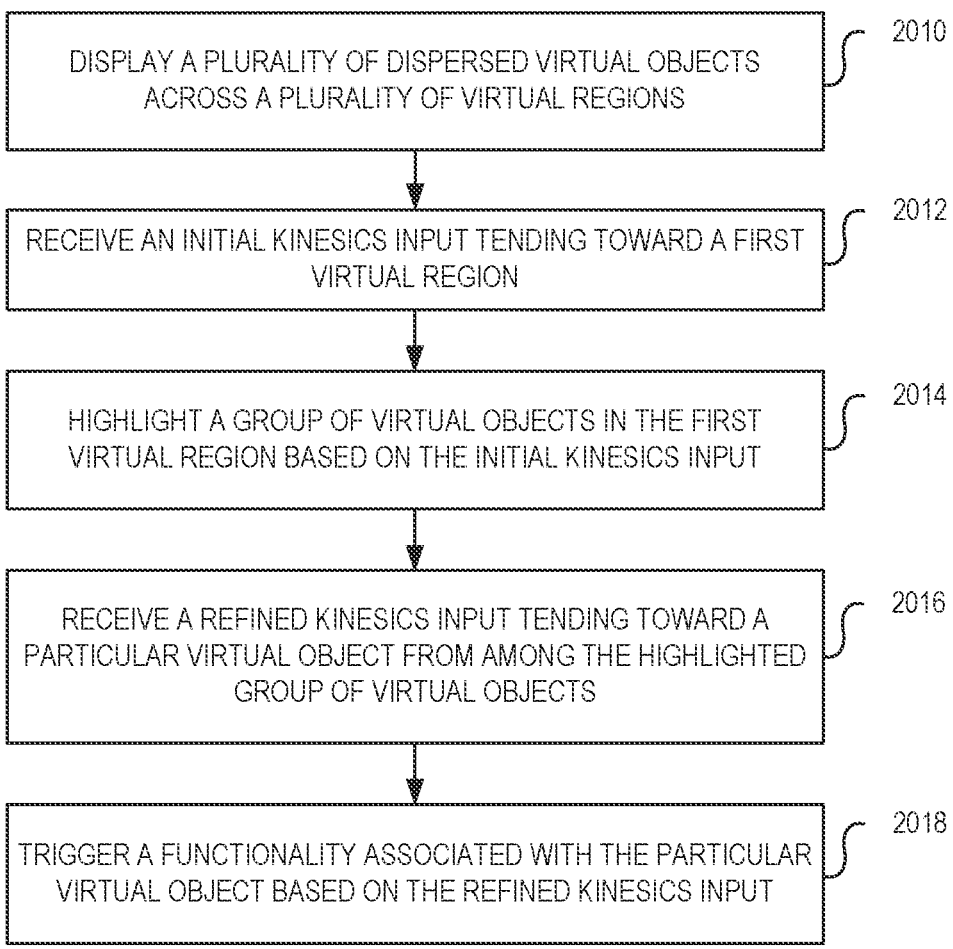
FIG. 20 is a flowchart illustrating an exemplary process for providing feedback based on incremental convergence in an extended reality environment, consistent with some embodiments of the present disclosure.

FIG. 20 is a flowchart illustrating an exemplary process 2000 for providing feedback based on incremental convergence in an extended reality environment, consistent with some embodiments of the present disclosure. With reference to step 2010 of FIG. 20, instructions contained in a non-transitory computer-readable medium when executed by at least one processor may cause the at least one processor to display a plurality of dispersed virtual objects across a plurality of virtual regions. By way of example, FIG. 21 illustrates one non-limiting example of an extended reality environment displaying a plurality of dispersed virtual objects across a plurality of virtual regions, consistent with some embodiments of the present disclosure.

Figure 21:
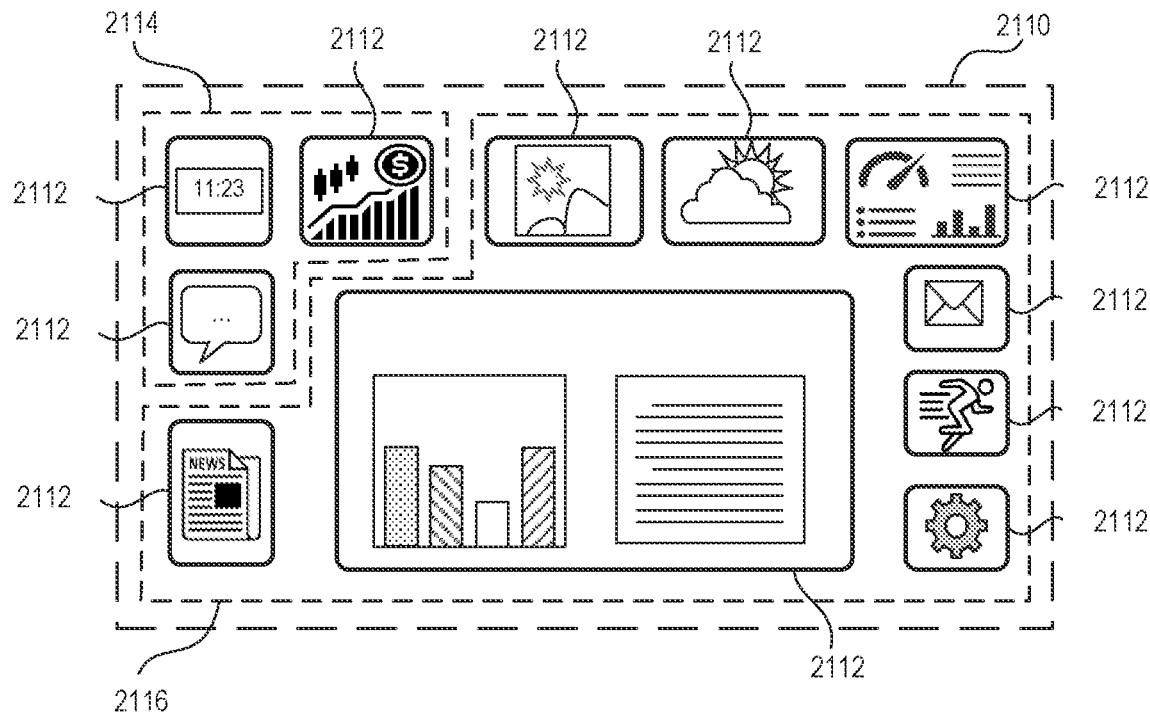
FIG. 21 illustrates an exemplary extended reality environment displaying a plurality of dispersed virtual objects, consistent with some embodiments of the present disclosure.

With reference to FIG. 21, a user interface 2110 is presented within an exemplary extended reality environment from the perspective of a user of the extended reality environment. The user interface 2110 may display to the user virtual content including a plurality of dispersed virtual objects 2112 across the user interface 2110 such that the user may interact with the plurality of dispersed virtual objects 2112. The plurality of dispersed virtual objects 2112 presented to the user of the extended reality environment may include at least one interactive virtual widget and/or options in a virtual menu. Within a given one of the plurality of dispersed virtual objects 2112, there may be additional virtual objects with which the user may interact with. In some examples, the user interface 2110 may relate to a virtual computer screen configured to display the plurality of dispersed virtual objects 2112 generated by an operating system to the user such that the user may interact with the plurality of dispersed virtual objects 2112.

The plurality of dispersed virtual objects 2112 may be displayed across a plurality of virtual regions of the user interface 2110. For example, the user interface 2110 may include a first virtual region 2114 including a first subset of the plurality of dispersed virtual objects 2112 and a second virtual region 2116 including a second subset of the plurality of dispersed virtual objects 2112. A boundary of the first virtual region 2114 is depicted as a short-dashed line and shown to encompass a first subset of the plurality of dispersed virtual objects 2112 and a boundary of the second virtual region 2116 is depicted as a short-dashed line and shown to encompass a second subset of the plurality of dispersed virtual objects 2112 such that each of the plurality of dispersed virtual objects 2112 are included in the first virtual region 2114 or the second virtual region 2116. It is to be understood that the boundaries of the virtual regions may not be visible to the user and are depicted herein for illustrative purposes. Moreover, the boundaries of the first virtual region 2114 and the second virtual region 2116 in this illustration have been drawn to include an arbitrarily selected first subset and second subset of the plurality of dispersed virtual objects 2112 for simplicity and may vary to include different numbers of the plurality of dispersed virtual objects 2112 based on a number of factors including a user's past and/or present interactions with the extended reality environment.

Some disclosed embodiments may involve receiving an initial kinesics input tending toward the first virtual region. The term kinesics input may relate to a user's natural human movements and/or gestures. Such movements may occur within a real coordinate system which may be tracked and/or captured as input data that may be translated to virtual actions within a virtual coordinate system of the extended reality environment. The kinesics input of the user may include hand gestures, body gestures (e.g., movements of the user's head or body), eye-movements or other eye movements, and/or any other gesture-based interaction, facial movements, or combination of gesture-based interactions. In another example, the kinesics input of the user may include a movement of a computer cursor in the virtual display and/or in the extended reality environment. The user's kinesics input or inputs may be detected and converted into virtual interactions with the extended reality environment thereby enabling the user to select, or otherwise interact with, virtual objects within the extended reality environment.

In some embodiments of the disclosure, the receiving of a kinesics input may relate to the capturing and or recognition of at least one kinesics input by components of a wearable extended reality appliance such as a stereoscopic head-mounted display, head-motion tracking sensors (e.g., gyroscopes, accelerometers, magnetometers, image sensors, structured light sensors), eye-tracking sensors, and/or any other component capable of recognizing at least one of the various sensible kinesics inputs of the user and translating the sensed kinesics input or inputs into readable electrical signals. In some examples, these components may be utilized to detect, or otherwise measure, the velocity and/or acceleration of the user's kinesics inputs; detect, or otherwise measure, the time difference between certain kinesics inputs in order to distinguish the intentions of a user based on the user's slight gesture-based interactions.

Moreover, the term initial kinesics input may relate to any kinesics input in which the user begins to express an interest in, or otherwise pay attention to, a virtual region, such as a first virtual region, containing at least one virtual object. A user may express an interest in, or otherwise pay attention to, a first virtual region containing at least one virtual object by generating a kinesics input including at least one slight movement toward the first virtual region containing at least one virtual object. This slight movement toward the first virtual region may enable the user to receive near seamless feedback of the sensed kinesics input within the extended reality environment and intuitively discover the result of a sensed kinesics input. For example, a user intending to make a kinesics selection of a virtual object within an extended reality environment by way of an initial kinesics input, such as initially pointing and/or looking toward a first virtual region containing a group of virtual objects, may be provided initial an/or intermediate feedback based on the initial kinesics input when the intention of the interaction is not specific enough to identify an intention to select a particular virtual object of interest.

In some examples, the first region and/or the second region may be predetermined, for example based on a system configuration. In some other examples, the first region and/or the second region may be dynamically created, modified and/or abandoned. In some examples, the first region and/or the second region may be determined based on the plurality of dispersed virtual objects. In one example, a change to the plurality of dispersed virtual objects (such as an addition of a virtual object, a removal of a virtual object, a change to a position of a virtual object, a change to a status of a virtual object, etc.) may cause a change to the first region and/or the second region. Some non-limiting examples of such status of virtual object may include virtual object associated with no notification, virtual object associated with notification, closed virtual object, open virtual object, active virtual object, inactive virtual object, and so forth.

In one example, at a given point in time (for example, at system startup, upon a change, etc.), a clustering algorithm may be used to cluster the virtual objects to regions, for example based on at least one of positions of the virtual objects, identities of the virtual objects, or statuses of the virtual objects. In another example, at a given point in time (for example, at system startup, upon a change, etc.), a segmentation algorithm may be used to segment at least part of the extended reality environment and/or at least part of the virtual display to regions.

In some examples, the first region and/or the second region may be determined based on dimensions of the virtual display and/or of the extended reality environment. In one example, a change to the dimensions of the virtual display and/or of the extended reality environment may cause a change to the first region and/or the second region. In one example, at a given point in time (for example, at system startup, upon a change, etc.), the virtual display and/or the extended reality environment may be divided to regions, for example to a grid of a predetermined number of equal size (or nearly equal size) regions, to regions of predetermined fixed size, and/or to regions of varying size.

In some examples, the first region and/or the second region may be determined based on conditions associated with the extended reality appliance (such as ambient illumination conditions in an environment of the extended reality appliance, motion of the extended reality appliance, usage mode of the extended reality appliance, and so forth). In one example, a change to the conditions associated with the extended reality appliance may cause a change to the first region and/or the second region. In one example, a brighter ambient illumination in the environment of the extended reality appliance may trigger usage of larger regions. In another example, a moving extended reality appliance may have larger regions than an extended reality appliance that does not move.

In some examples, the first region and/or the second region may be determined based on the kinesics input, for example, based on at least one of a direction, a position, a pace, or an acceleration associated with the kinesics input. For example, a machine learning model may be trained using training examples to determine regions based on kinesics inputs. An example of such training example may include a sample kinesics input and a sample distribution of sample virtual objects, together with a label indicating desired regions corresponding to the sample kinesics input and the sample distribution. In another example, a kinesics input associated with a faster motion may cause a determination of a region farther from a position associated with the kinesics input than a kinesics input associated with a slower motion.

With reference to step 2012 of FIG. 20, instructions contained in a non-transitory computer-readable medium when executed by at least one processor may cause the at least one processor to receive an initial kinesics input tending toward a first virtual region. In one example, the initial kinesics input may be received after the display of the plurality of dispersed virtual objects across the plurality of virtual regions by step 2010. By way of example, FIG. 22 illustrates one non-limiting example of a user's initial kinesics input tending toward the first virtual region of the extended reality environment of FIG. 21, consistent with some embodiments of the present disclosure.

Figure 22:
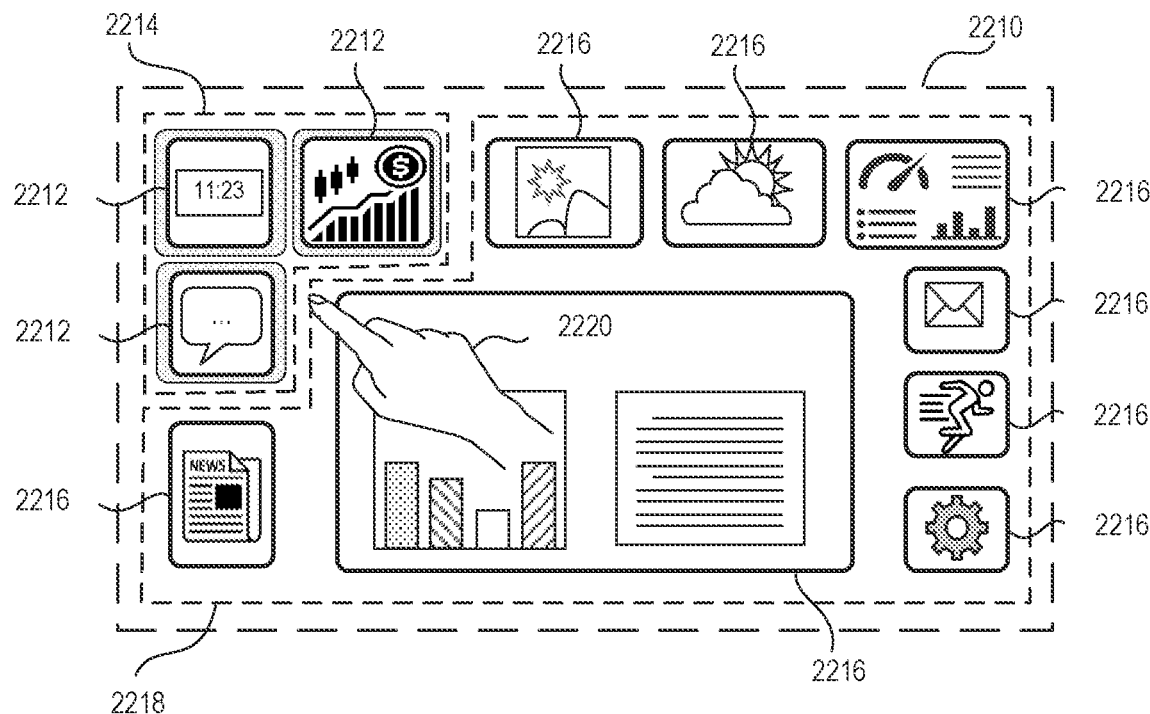
FIG. 22 illustrates one example of a kinesics input provided by a user and resulting feedback displayed within the extended reality environment of FIG. 21, consistent with some embodiments of the present disclosure.

With reference to FIG. 22, the user interface 2210 of the extended reality environment contains a first subset of the plurality of dispersed virtual objects 2212 within the first virtual region 2214 which are grouped together in an area distinct from a second subset of the plurality of dispersed virtual objects 2216 within the second virtual region 2218. The first virtual region 2214 may be dynamically defined to contain any number of the plurality of dispersed virtual objects with which the user 2220 begins to express an interest in, or otherwise pay attention to, by generating an initial kinesics input including at least one gesture toward said virtual object or objects. For example, the first subset of the plurality of dispersed virtual objects 2212 to be included within the first virtual region 2214 may be determined based on an initial kinesics input from the user 2220. If it is determined that the user 2220 may wish to interact with the first subset of the plurality of dispersed virtual objects 2212, the first virtual region 2214 may be defined to include said virtual objects 2212. In response to any given initial kinesics input, the number of virtual objects 2212 included in the first virtual region 2214 may vary based on the specificity and/or a determined certainty level associated with the initial kinesics input of the user 2220.

In the non-limiting example illustrated in FIG. 22, the user 2220 is shown to express an interest in at least one virtual object of the first subset of the plurality of dispersed virtual objects 2212 within the first virtual region 2214 by way of a hand gesture pointing toward the first virtual region 2214 containing a first subset of the plurality of dispersed virtual objects 2212. At the point in time illustrated in FIG. 22, the initial kinesics input of the user 2220 intending to make a kinesics selection of at least one of the first subset of the plurality of dispersed virtual objects 2212 may not be specific enough to clearly detect a particular one of the virtual objects 2212 with which the user 2220 may wish to interact with. However, the at least one processor may determine that the initial kinesics input of the user 2220 is not intending to make a kinesics selection of at least one of the second subset of the plurality of dispersed virtual objects 2216 based on the user's hand gesture.

It is to be understood that the hand of the user 2220 illustrated in the figures does not necessarily represent a virtual image of the hand that is visible to the user 2220. Rather, in the example illustrated, the depicted virtual hand of the user 2220 is intended to be an illustration of one type of kinesics input within a real coordinate system which may be captured and converted into virtual interactions within a corresponding virtual coordinate system of the extended reality environment thereby enabling the user to select, or otherwise interact with, the virtual objects within the extended reality environment. However, in some embodiments, a virtual image of the hand of the user 2220 may also be superimposed in the extended reality environment. Moreover, in some embodiments the initial kinesics input of the user 2220 may additionally, or alternatively include eye-gestures of the user 2220.

In some embodiments, the initial kinesics input may include a combination of a gaze detection and a gesture detection. The gaze detection and gesture detection of the initial kinesics input may relate to the capturing and/or recognition of hand and/or body gestures and/or eye-movements of the user. In a general sense, the gaze detection and gesture detection may occur in a manner similar to the detection of the user's kinesics input previously discussed. The gaze detection and gesture detection of the user's gestures and eye-movements may occur simultaneously and may both be used to cause the at least one processor to determine the intention of the user's combined initial kinesics input. In one example, when the detected gaze tends towards the first virtual region and the detected gesture tends towards the second virtual region, the non-transitory computer-readable medium may cause the at least one processor to highlight the group of virtual objects in the first virtual region. In another example, when the detected gaze tends toward the first virtual region and the detected gesture tends toward an area without virtual objects, the non-transitory computer-readable medium may cause the at least one processor to highlight the group of virtual objects in the first virtual region.

In some examples, the determination of the certainty level associated with the kinesics input, such as the initial kinesics input, may include determining a certainty level associated with the gaze detection and a certainty level associated with the gesture detection. Additionally, or alternatively, the determination of prioritizing a detected gaze over a detected gesture, and vice versa, may be informed, or otherwise given weight, based on prior stored user interactions with the extended reality environment; preselected and/or analyzed user preferences; and/or analysis of kinesics inputs, including past and/or real-time kinesics inputs, using artificial intelligence, machine learning, deep learning, and/or neural network processing techniques.

With reference to FIG. 22, the user 2220 may simultaneously express a first interest in at least one virtual object of the first subset of the plurality of dispersed virtual objects 2212 within the first virtual region 2214 by way of a first gesture toward the first virtual region 2214 and may express a second interest in at least one virtual object of the second subset of the plurality of dispersed virtual objects 2216 within the second virtual region 2218 by way of a second gesture toward the second virtual region 2218. Alternatively, the second interest of the user may be directed toward an area other than the first virtual region 2214 which does not include virtual objects by way of a second gesture.

For example, the user 2220 may simultaneously express one interest in at least one virtual object within one virtual region via an eye-glance and may express a second interest in at least another virtual object within a different virtual region, or in a region not containing a virtual object, via a hand gesture. In some instances, when the gesture toward the first virtual region 2214 relates to an eye-glance of the user 2220 and the gesture toward the second virtual region 2218 relates to a hand gesture, the non-transitory computer-readable medium may cause the at least one processor to highlight the group of virtual objects 2212 in the first virtual region 2214 based on the detected gaze and the detected gesture. In other instances, when the gesture toward the first virtual region 2214 relates to an eye-glance of the user 2220 and the hand gesture tends toward an area without virtual objects, the non-transitory computer-readable medium may cause the at least one processor to highlight the group of virtual objects 2212 in the first virtual region 2214 based on the detected gaze and the detected gesture.

Some disclosed embodiments may involve highlighting a group of virtual objects in the first virtual region based on the initial kinesics input. The group of virtual objects in the first virtual region which may be highlighted in response to an initial kinesics input may include any set of virtual objects in a region where the user may express an interest or pay attention. This may occur, for example, by a gesture and/or a gaze in the direction of the group. In response to any given initial kinesics input, the number of virtual objects included in the group of virtual objects in the first virtual region may depend upon the specificity of the kinesics input of the user and/or a threshold degree of certainty pertaining to the intention of the kinesics input. Additionally, the first virtual region may be dynamically defined to contain a group of adjacent virtual objects with which the user begins to express an interest in, or otherwise pay attention to, by generating an initial kinesics input toward the group of virtual objects. In some embodiments, the highlighted group of virtual objects in the first virtual region may include at least two virtual objects of the plurality of dispersed virtual objects. In one example, the highlighted group of virtual objects in the first virtual region may include all of the virtual objects in the first virtual region. In another example, the highlighted group of virtual objects in the first virtual region may include some but not all of the virtual objects in the first virtual region.

The group of virtual objects in the first virtual region may be highlighted in response to an initial kinesics input tending toward the group of virtual objects in the first virtual region. In some embodiments, the highlighting of a group of virtual objects may relate to the presenting of any visual indicator perceivable by the user which may serve to emphasize, or otherwise differentiate, the group of objects in the first virtual region relative to virtual objects outside of the first virtual region (e.g., virtual objects in the second region). In some embodiments, highlighting the group of virtual objects in the first virtual region based on the initial kinesics input may include changing an appearance of each virtual object in the group of virtual objects in the first virtual region. For example, the highlighting may include enlarging at least one virtual object in the group; changing the colors of at least one virtual object in the group, for example causing or otherwise changing a shadow or glow around the frame of at least one virtual object in the group and/or causing at least one virtual object in the group to blink; and/or moving at least one virtual object in the group relative to virtual objects in the second virtual region. Additionally, or alternatively, highlighting a group of virtual objects in the first virtual region based on the initial kinesics input may involve providing a visual indication of the group of virtual objects in the first virtual region based on the initial kinesics input.

In some embodiments, the highlighting may include separately highlighting each of the virtual objects within the group of virtual objects in the first virtual region and/or highlighting any portion of the first virtual region containing the group of virtual objects. The group of virtual objects may be highlighted equally or may be highlighted to varying degrees depending on the degree of specificity with which the user may indicate an interest in any given virtual object or objects among the group of virtual objects. In some embodiments, highlighting the group of virtual objects includes causing a wearable extended reality appliance to highlight the group of virtual objects.

In other embodiments, highlighting the group of virtual objects in the first virtual region based on the initial kinesics input may include displaying or adding controls that enable interaction with at least one virtual object in the group of virtual objects of the first virtual region. For example, the displayed controls may include buttons on a virtual object, such as a virtual widget which may activate a script for, or otherwise be linked to, programs or applications when selected by the user. In other embodiments, the highlighting may relate to any physical indicator perceivable by the user which may serve to emphasize, or otherwise differentiate, the group of objects in the first virtual region by, for example, providing physical feedback (e.g., haptic feedback) to the user in response to a kinesics input.

With reference to step 2014 of FIG. 20, instructions contained in a non-transitory computer-readable medium when executed by at least one processor may cause the at least one processor to highlight a group of virtual objects in the first virtual region based on the initial kinesics input. By way of example, FIG. 22 illustrates one non-limiting example of an instance in which a group of virtual objects in the first virtual region are highlighted based on the initial kinesics input of the user, consistent with some embodiments of the present disclosure.

With reference to FIG. 22, as the user 2220 expresses an interest in at least one virtual object of the group of virtual objects included in the first subset of the plurality of dispersed virtual objects 2212 within the first virtual region 2214, the group of virtual objects 2212 in the direction of the initial kinesics input may be highlighted in a way that is visually perceivable to the user 2220, Once it is determined that the user 2220 may potentially wish to kinesthetically select one of the virtual objects in the group of virtual objects 2212, the group of virtual objects 2212 are highlighted in response to the initial kinesics input of the user 2220 tending toward the first virtual region 2214. In the example illustrated in FIG. 22, the visual appearance of each virtual object of the group of virtual objects 2212 in the first virtual region 2214 are shown to be emphasized, or otherwise differentiated, from the second subset of dispersed virtual objects 2216 in the second virtual region 2218 due to an added shadow around the frame of the virtual objects 2212.

Figure 23:
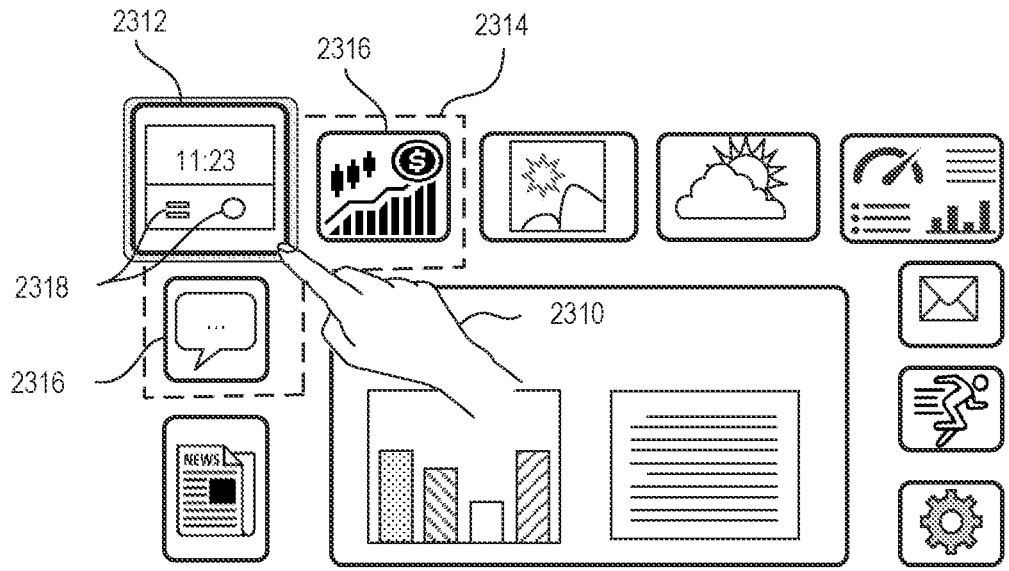
FIG. 23 illustrates one example of a kinesics input provided by a user and resulting feedback displayed within the extended reality environment of FIG. 21, consistent with some embodiments of the present disclosure.

Additionally, or alternatively, the highlighting of at least one virtual object of the group of virtual objects 2212 in the first virtual region 2214 may include displaying or adding controls associated with the at least one virtual object of the group of virtual objects 2212 with which the user 2220 may interact with. With reference to FIG. 23, the user 2310 illustrates controllers 2318 included in a highlighted virtual object 2312 which enables user interaction with at least one virtual object 2312 in the group of virtual objects of the first virtual region 2314. The highlighting of at least one virtual object of the group of virtual objects may serve to provide the user near seamless feedback within the extended reality environment based on the sensed kinesics input and enable the user to intuitively discover the result of a sensed kinesics input.

Some disclosed embodiments may involve receiving a refined kinesics input tending toward a particular virtual object from among the highlighted group of virtual objects. In a general sense, receipt of a refined kinesics input may be similar to receipt of the kinesics input previously discussed. The refined kinesics input may relate to a more precise gesture, gaze, or other action of the user. Such greater precision may enable a commensurate selection refinement. For example, in response to perceiving the highlighted group of virtual objects, the user may hone the accuracy or precision of a kinesics input relative to the initial kinesics input toward a single virtual object of interest among the highlighted group of virtual objects. The refined kinesics input may be received, detected, or otherwise recognized, such that a degree of certainty associated with the refined kinesics input may be determined by the at least one processor to be greater than a determined degree of certainty associated with the initial kinesics input.

In some embodiments, receipt of the refined kinesics input may result in cancelling the highlighting of at least some of the virtual objects in the group of virtual objects. For example, a user intending to make a kinesics selection of a virtual object within an extended reality environment by way of an initial kinesics input may be provided intermediate feedback, such as a highlighted group of virtual objects, based on the initial kinesics input when the intention of the interaction is less specific. As the user hones-in on a more specific area of the first virtual region toward a particular virtual object which may be intended for selection, subsequent feedback may be provided to the user by unhighlighting virtual objects in the periphery of the particular virtual object until only a single virtual object intended for selection remains highlighted based on the user's refined motions. Alternatively, all of the virtual objects in the group of virtual objects may become unhighlighted in response to the refined kinesics input. Additionally, or alternatively, cancelling the highlighting of at least some of the virtual objects in the group of virtual objects may involve stopping providing the visual indication of at least some of the virtual objects in the group of virtual objects.

In some embodiments, the initial kinesics input may be associated with a first type of kinesics input and the refined kinesics input may be associated with a second type of kinesics input that differs from the first type of kinesics input. For example, the first kinesics input may be a gaze, while the second kinesics input may be a gesture such as pointing. Or, the first kinesics input may be a head turning toward a particular area of the display while the second kinesics input may be a focused gaze on a particular region or item. In a general sense, the first type of kinesics input and the second type of kinesics input may include any combination of gesture-based interactions such as hand gestures, body gestures (e.g., movement of the user's head or body), and eye-movements.

With reference to step 2016 of FIG. 20, instructions contained in a non-transitory computer-readable medium when executed by at least one processor may cause the at least one processor to receive a refined kinesics input tending toward a particular virtual object from among the highlighted group of virtual objects. In one example, the refined kinesics input tending toward the particular virtual object from among the highlighted group of virtual objects may be received after the highlighting of the group of virtual objects in the first virtual region by step 2014 and/or after receiving the initial kinesics input by step 2012. By way of example, FIG. 23 illustrates one non-limiting example of a user's refined kinesics input, as compared to the initial kinesics input illustrated in FIG. 22, in which the refined kinesics input is tending toward a particular virtual object from among the highlighted group of virtual objects, consistent with some embodiments of the present disclosure. While the initial kinesics input and the refined kinesics input illustrated in FIG. 22 and FIG. 23 both depict a hand gesture of the user, it is to be understood that each of the initial kinesics input and the refined kinesics input may include any combination of gesture-based interactions including hand gestures and/or eye-movements.

With reference to FIG. 23, the user 2310 is shown to express a specific interest in a particular virtual object 2312 from among the previously highlighted group of virtual objects within the first virtual region 2314 via a refined kinesics input. At the point in time illustrated in FIG. 23, the refined kinesics input of the user 2310 is more clearly tending toward the particular virtual object 2312 rather than the other virtual objects 2316 within the first virtual region 2314, Thus, a degree of certainty related to the refined kinesics input illustrated in FIG. 23 is greater than a degree of certainty related to the initial kinesics input illustrated in FIG. 22, and the refined kinesics input more specifically indicates that the user 2310 may wish to make a kinesics selection of a particular virtual object 2312. In response to the refined kinesics input, subsequent feedback may be provided to the user 2310 by unhighlighting the other virtual objects 2316 within the first virtual region 2314 in the periphery of the particular virtual object 2312 until only the particular virtual object 2312 determined by the at least one processor to be intended for selection beyond a predetermined degree of certainty remains highlighted based on the user's refined motions.

Some disclosed embodiments may involve triggering a functionality associated with the particular virtual object based on the refined kinesics input. The term "triggering a functionality" associated with the particular virtual object, may include any occurrence resulting from an identification of a particular virtual object. Such an occurrence may involve changing an appearance of the virtual object, or initiating operation of code tied to the virtual object. Thus, selection of a virtual object may result in the presentation of a virtual menu, the presentation of additional content, or the triggering of an application. When a functionality associated with the particular virtual object is triggered, the virtual content and/or features of a particular virtual object may change from an unengaged state, or an otherwise highlighted state based on the initial kinesics input, to an engaged state in response to the selection, or engagement with, the virtual object via a refined kinesics input. In some embodiments, the functionality associated with the particular virtual object includes causing the wearable extended reality appliance to start displaying a particular virtual content.

The functionality associated with the particular virtual object may include causing an action associated with the particular virtual object such as becoming additionally highlighted. Additionally, or alternatively, the functionality associated with the particular virtual object may include enlarging the particular virtual object; revealing additional virtual objects for selection within, or otherwise related to, the particular virtual object; revealing or concealing additional viewing areas containing virtual content associated with the particular virtual object; and/or causing any virtual content or process functionally associated with the particular virtual object to initiate based on the refined kinesics input. In some embodiments, when the particular virtual object is an icon, the triggered functionality may include causing an action associated with the particular virtual object including activating script associated with the icon.

With reference to step 2018 of FIG. 20, instructions contained in a non-transitory computer-readable medium when executed by at least one processor may cause the at least one processor to trigger a functionality associated with the particular virtual object based on the refined kinesics input. By way of example, FIG. 23 illustrates one non-limiting example of a refined kinesics input provided by the user triggering a resulting functionality associated with the particular virtual object within the extended reality environment, consistent with some embodiments of the present disclosure.

Figure 24:
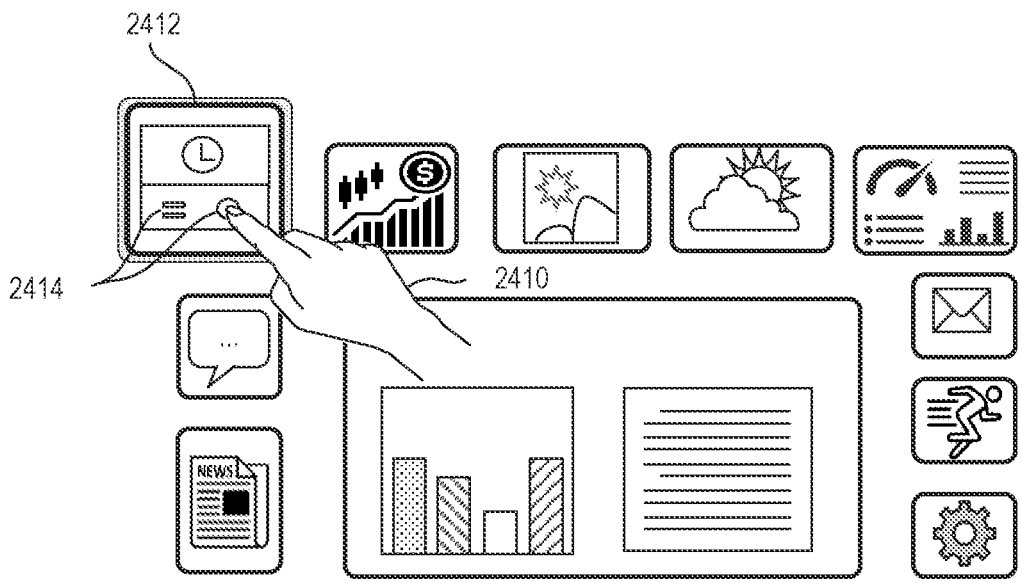
FIG. 24 illustrates one example of a kinesics input provided by the user and a resulting action of a virtual object within the extended reality environment of FIG. 21, consistent with some embodiments of the present disclosure.

With reference to FIG. 23, in response to the refined kinesics input of the user 2310, at least one functionality associated with the particular virtual object 2312 intended for selection may be triggered by at least one processor causing an action associated with the particular virtual object 2312. For example, one functionality associated with the particular virtual object 2312 that is triggered in this example is enlarging the particular virtual object in response to the refined kinesics input of the user 2310. Another functionality associated with the particular virtual object 2312 that is triggered in this example is revealing additional virtual controllers 2318 for selection within the particular virtual object 2312. As illustrated in FIG. 24, once an action associated with the particular virtual object 2412 is triggered, such as revealing additional virtual objects 2414 for selection within the particular virtual object 2412, the user 2410 may interact with said additional virtual objects 2414.

Other embodiments may include tracking elapsed time after receiving the initial kinesics input. The tracking of time may be used to determine whether a functionality should be triggered or highlighting should be cancelled based on the amount of elapsed time between receiving the initial kinesics input and receiving the refined kinesics input. For example, when the refined kinesics input is received during a predefined time period following the initial kinesics input, the functionality associated with the particular virtual object may be triggered. When the refined kinesics input is not received during the predefined time period, the highlighting of the group of virtual objects in the first virtual region may be cancelled.

In some embodiments, the term predefined time period following the initial kinesics input may relate to the measurement of time after the initial kinesics input is received. For example, the predefined time period following the initial kinesics input may relate to a time period beginning at or after the initial kinesics input has been detected, or otherwise recognized, and/or converted into virtual interactions with the extended reality environment causing a group of virtual objects in the first virtual region to become highlighted. In some instances, tracking elapsed time may begin as the user begins an initial kinesics input from a stopped position or from another preliminary kinesics input. In other instances, tracking elapsed time may begin as the user ends the initial kinesics input or otherwise slows the initial kinesics input below a threshold level of engagement. The time at which receiving the refined kinesics input begins may be based on a measure of the distance of the user's initial kinesics input from a particular one of the group of virtual objects and/or virtual region containing said virtual objects and/or a measure of the velocity and/or acceleration, or a change thereof, related to the user's initial kinesics input or inputs.

Other embodiments may include, prior to receipt of the initial kinesics input, receiving a preliminary kinesics input tending toward the second virtual region and highlighting a group of virtual objects in the second virtual region based on the preliminary kinesics input. In a general sense, the preliminary kinesics input may be similar to the kinesics input previously discussed. The term preliminary kinesics input may relate to any kinesics input in which the user may begin to express an interest in, or otherwise pay attention to, a region containing at least one virtual object prior to expressing an interest in another region containing at least one different virtual object. In some examples, there may be at least one virtual object in the group of virtual objects from the second virtual region that is included in the group of virtual objects in the first virtual region upon receipt of the initial kinesics input following a preliminary kinesics input.

Upon receipt of the initial kinesics input, the highlighting of the group of virtual objects in the second virtual region may be cancelled and the group of virtual objects in the first virtual region may be highlighted. In one implementation, cancelling the highlighting may relate to the restoring or changing of a group of virtual objects that were highlighted in response to a preliminary kinesics input to an unhighlighted state in response to the initial kinesics input. For example, a group of virtual objects in the second virtual region which were highlighted in response to a preliminary kinesics input may be restored to an unhighlighted state, and a new group of virtual objects in the first virtual region may transition from an unhighlighted state to a highlighted state in response to the initial kinesics input. In one example, the unhighlighting of the group of virtual objects in the second virtual region may occur as the group of virtual objects in the first virtual region become highlighted. In another example, the unhighlighting of the group of virtual objects in the second virtual region may begin to fade, or otherwise transition to an unhighlighted state, as the group of virtual objects in the first virtual region become highlighted, or otherwise transition to a highlighted state.

FIG. 25 is a flowchart illustrating an exemplary process 2500 for the highlighting of a group of virtual objects which were highlighted in response to a preliminary kinesics input and the canceling of the highlighting of the group of virtual objects in response to an initial kinesics input, consistent with some embodiments of the present disclosure. With reference to FIG. 25, in step 2510, instructions contained in a non-transitory computer-readable medium when executed by at least one processor may cause the at least one processor to, prior to receipt of the initial kinesics input, receive a preliminary kinesics input tending toward the second virtual region. In step 2512, the at least one processor may be caused to highlight a group of virtual objects in the second virtual region based on the preliminary kinesics input. In step 2514, the at least one processor may be caused to, upon receipt of the initial kinesics input, cancel the highlighting of the group of virtual objects in the second virtual region and highlight the group of virtual objects in the first virtual region.

Other embodiments may include determining a certainty level associated with the initial kinesics input and selecting a visual property of the highlighting based on the certainty level. The term certainty level may relate to a threshold degree of certainty that a number of the plurality of dispersed virtual objects may be intended for selection by the user based on a kinesics input, such as an initial kinesics input. If a number of the plurality of dispersed virtual objects are determined by the at least one processor to fall within a threshold degree of certainty for potentially being selected based on an initial kinesics input, the group of virtual objects may be included in the group of virtual objects that are highlighted based on the initial kinesics input. In one non-limiting example of determining a certainty level associated with the initial kinesics input, if it is determined that the user expresses an interest in, or otherwise pays attention to, a number of virtual objects at or above an assessed certainty level, for example a 50% level of certainty, the interaction may cause the group of virtual objects to become highlighted. If it is determined that the user pays attention to a number of virtual objects below an assessed certainty level, for example a 50% level of certainty, the interaction may not cause the virtual objects to become highlighted.

In some embodiments, the non-transitory computer-readable medium may cause the at least one processor to analyze past virtual object selections to determine a user profile and determine the certainty level associated with the kinesics input, such as an initial kinesics input, based on the user profile. Analyzing past virtual object selections may include any artificial intelligence, machine learning, deep learning, and/or neural network processing techniques. Such techniques may, for example, enable machine learning through absorption of significant volumes of unstructured data such as sensed kinesics inputs, prior selection recognition processes, and/or videos, as well as user preferences analyzed over a period of time. Any suitable computing system or group of computing systems may be used to implement the analysis of past and/or present virtual object selections, or any other interactions within the extended reality environment, using artificial intelligence. Additionally, data corresponding to the analyzed past and/or present virtual object selections, user profile, and certainty levels associated with the users past and/or present kinesics inputs may be stored in and/or accessed from any suitable database and/or data structure including one or more memory devices. For example, at least one data base may be configured and operable to log and/or reference the user's past interactions with an extended reality environment to identify a certainty level associated with new kinesics inputs.

Other embodiments may include determining a certainty level associated with the refined kinesics input, and forgoing triggering the functionality associated with the particular virtual object when the certainty level is lower than a threshold. In a general sense, the determining of a certainty level associated with the refined kinesics input may occur in a manner similar to the determining of a certainty level associated with the initial kinesics input previously discussed. If a particular virtual object is determined by the at least one processor to fall within a threshold degree of certainty for potentially being triggered based on a refined kinesics input, the triggering of a functionality associated with the particular virtual object may not be initiated or may otherwise be caused to cease initiation. It is to be understood that the determination of the certainty level associated with a refined kinesics input including gestures and eye-movements, may include determining a certainty level associated with the gaze detection and a certainty level associated with the gesture detection. The determination of prioritizing a detected gaze over a detected gesture, and vice versa, of a refined kinesics input may be informed, or otherwise given weight, in a manner similar to the initial kinesics input previously discussed.

The forgoing of the functionality associated with the particular virtual object in response to the refined kinesics input may occur in a manner similar to the cancelling of the highlighting of at least some of the virtual objects in the group of virtual objects in response to a kinesics input. The forgoing of the functionality associated with the particular virtual object may relate to restoring the particular virtual object to an unengaged state or back to a highlighted state in response to the low level of certainty associated with the refined kinesics input. In one non-limiting example of determining a certainty level associated with the refined kinesics input, if it is determined that the user's expressed interest in a particular virtual object is below an assessed certainty level, for example a 90% level of certainty, the interaction may be found to involve a non-specific intention of selection and may cause the triggering of functionality associated with the particular virtual object to not initiate or to cease initiation. If it is determined that the user's expressed interest in a particular virtual object is at or above an assessed certainty level, for example a 90% level of certainty, the interaction may be found to involve a specific intention of selection and may cause an intermediate action associated with the particular virtual object to occur such as enlarging the virtual object or presenting additional virtual objects for selection within the particular virtual object prior to the selection of the virtual object. If it is determined that the user expressed an interest in a particular virtual object within a near 100% level of certainty, the interaction may cause some action associated with the particular virtual object to be triggered.

In some embodiments, the non-transitory computer-readable medium may cause the at least one processor to access user action history indicative of at least one action that was executed before the initial kinesics input and determine the certainty level associated with the refined kinesics input based on the user action history. In a general sense, action history may be stored, accessed, and/or analyzed in a manner similar to the past virtual object selections, user profile, and certainty levels associated with the users prior kinesics inputs, as previously discussed. Moreover, the user action history may relate to action history including data from an ongoing session and/or prior sessions and may relate to any type of gesture-based interaction. In some examples, user action history may relate to data including past and/or current patterns of interaction with the extended reality environment. The action history pertaining to an ongoing session and/or prior sessions may be used by the at least one processor to determine the certainty level associated with a newly initiated refined kinesics input.

In some embodiments, the threshold certainty level may be selected based on the particular virtual object. In one example, a user's prior selection history, user profile, and/or user action history associated with a particular virtual object may cause the threshold certainty level for selection of said virtual object to be greater or lower than the threshold certainty level for selection of another virtual object, such as a less-frequently used virtual object. In another example, if the selection of the particular virtual object may cause a disruption to the user (e.g., pausing or terminating a stream of data) or cause the user to lose data (e.g., closing an application or powering off a device), the threshold may be selected to require a higher certainty level before triggering a functionality associated with the particular virtual object. Additionally, or alternatively, the threshold degree of certainty of the particular virtual object may be increased and/or decreased based on a determined increase and/or decrease in need for said virtual object based on at least one external factor, such as a notification and/or an alert related to said virtual object or a concurrently running program seeking to send/receive information to/from a program associated with said virtual object.

Some embodiments may include determining a first certainty level associated with the initial kinesics input, forgoing highlighting the group of virtual objects in the first virtual region when the first certainty level is lower than a first threshold, determining a second certainty level associated with the refined kinesics input, and forgoing triggering the functionality associated with the particular virtual object when the second certainty level is lower than a second threshold. In a general sense, the first certainty level associated with the initial kinesics input and the second certainty level associated with the refined kinesics input may be similar to the certainty level associated with the initial kinesics input and the certainty level associated with the refined kinesics input, respectively, as previously discussed. Additionally, in a general sense, the forgoing highlighting the group of virtual objects and the forgoing triggering the functionality may performed in a manner similar to the forgoing triggering the functionality previously discussed. In some embodiments, the second threshold for forgoing triggering the functionality associated with the particular virtual object may be greater than the first threshold for highlighting the group of virtual objects in the first virtual region.

FIG. 26 is a flowchart illustrating an exemplary process 2600 for determining certainty levels associated with kinesics inputs and not implementing, or otherwise ceasing to implement, the highlighting of virtual objects or the triggering of functionality associated with a virtual object when the certainty levels are below threshold levels. With reference to FIG. 26, in step 2610, instructions contained in a non-transitory computer-readable medium when executed by at least one processor may cause the at least one processor to determine a first certainty level associated with the initial kinesics input. In step 2612, the at least one processor may be caused to forgo highlighting the group of virtual objects in the first virtual region when the first certainty level is lower than a first threshold. In step 2614, the at least one processor may be caused to determine a second certainty level associated with the refined kinesics input. In step 2616, the at least one processor may be caused to forgo triggering the functionality associated with the particular virtual object when the second certainty level is lower than a second threshold.

Users of a wearable extended reality appliances may become immersed in the displayed extended reality environment and may become oblivious to the physical environment around them. The physical environment may be considered to include the area where the user of the wearable extended reality appliance is located. For example, if the user is located indoors, the physical environment may be a room where the user is located. As another example, if the user is located outdoors, the physical environment may be a distance of a predefined radius around where the user is located. In some embodiments, the predefined radius may be determined by a range of one or more sensors in communication with the wearable extended reality appliance. For example, the one or more sensors may include audio sensor 471, image sensor 472, motion sensor 473, environmental sensor 474, or other sensors 475 as shown in FIG. 4. In other examples, the physical environment may be an area that would be visible to the user if the user did not use the wearable extended reality appliance. In other examples, the physical environment may be an area that is visible to an image sensor included in the wearable extended reality appliance. In some embodiments, the wearable extended reality appliance may be configured to detect changes to the physical environment around the user and to automatically adjust one or more display parameters of an extended reality display being provided by the wearable extended reality appliance, thereby heightening the user's awareness of the environmental changes. For example, a change to the physical environment may include another person (i.e., a non-user) walking toward or into the field of view of the wearable extended reality appliance, and in response to this change, virtual objects may be moved out of the way to permit the user to view the other person. As another example, a change to the physical environment may include a change in the ambient light level near the user, and in response to this change, the brightness of the extended reality display may be changed such that the extended reality display has a better visibility given the current ambient light level.

People (i.e., non-users) walking by the user of the wearable extended reality appliance may be unaware of the degree of the user's immersion in the extended reality environment. In some embodiments, an indication may be provided to non-users that the user of the wearable extended reality appliance may be unable to see them. For example, an indicator light (e.g.; one or more light indicators 451 as shown in FIG. 4) may be provided on an exterior portion of the wearable extended reality appliance to alert non-users that the user may be unable to see them. As another example, the virtual objects presented by the wearable extended reality appliance may be moved out of the way to permit the user to view (or to better view) the one or more non-users.

Some disclosed embodiments may include methods, systems, and computer readable media (three forms of articulation) for facilitating an environmentally adaptive extended reality display in a physical environment. It is to be understood that this disclosure is intended to cover all three forms of articulation, and any detail described, even if described in connection with only one form of articulation, is intended as a disclosure of all three.

An environmentally adaptive extended reality display is one that changes one or more display parameters (i.e., adapts the extended reality display) in response to changes in the physical environment around a user of the extended reality display. It is to be understood that in this context, the term "display" may refer to the display itself, as well as the software or controller associated with the display, regardless of whether the software or controller is physically located within a housing of the display. Changing the display parameters may include adjustments to how the extended reality display (and/or an extended reality environment) is perceived by the user of the wearable extended reality appliance. The display parameters and how the display parameters may be adjusted will be described in greater detail below.

Some disclosed embodiments may be implemented via a non-transitory computer readable medium containing instructions for performing the operations of the method. In some embodiments, the method may be implemented on a system that includes at least one processor configured to perform the operations of the method. In some embodiments, the method may be implemented by one or more processors associated with the wearable extended reality appliance. For example, a first processor may be located in the wearable extended reality appliance and may perform one or more operations of the method. As another example, a second processor may be located in an integrated computational interface device associated with the wearable extended reality appliance, and the second processor may perform one or more operations of the method. As another example, the first processor and the second processor may cooperate to perform one or more operations of the method. The cooperation between the first processor and the second processor may include load balancing, work sharing, or other known mechanisms for dividing a workload between multiple processors.

Some disclosed embodiments may involve virtually displaying content via a wearable extended reality appliance operating in a physical environment. The extended reality display may be a display associated with a wearable extended reality appliance, and the extended reality display may be able to be seen by a user of the wearable extended reality appliance. The physical environment may be considered to include the area where the user of the wearable extended reality appliance is located and may change if the user moves. For example, if the user is located indoors, the physical environment may be a room where the user is located. As another example, if the user is located outdoors, the physical environment may be a distance of a predefined radius around where the user is located. In some embodiments, the predefined radius may be determined by a range of one or more sensors in communication with the wearable extended reality appliance. For example, the one or more sensors may include audio sensor 471, image sensor 472, motion sensor 473, environmental sensor 474, or other sensors 475 as shown in FIG. 4. In other examples, the physical environment may be an area that would be visible to the user if the user did not use the wearable extended reality appliance. In other examples, the physical environment may be an area that is visible to an image sensor included in the wearable extended reality appliance. The physical environment may change, for example, if the user moves to a different room while indoors, moves from indoors to outdoors, or moves around outdoors.

In some embodiments, displaying content via the wearable extended reality appliance may be associated with at least one adjustable extended reality display parameter. The at least one adjustable extended reality display parameter may include adjustments to one or more properties, characteristics, or features that may be used to control or adjust the appearance of an extended reality display (or of an extended reality environment) to a user of the wearable extended reality appliance. For example, the parameters of the extended reality display that may be adjusted may include: picture settings, such as brightness, contrast, sharpness, or display mode (e.g. a game mode with predefined settings); color settings, such as color component levels or other color adjustment settings; a position of the virtual content relative to a location of the user's head; a size, a location, a shape, or an angle of the virtual content within the user's field of view as defined by the wearable extended reality appliance; or other settings that may permit the user to view at least part of the physical environment while continuing to wear the wearable extended reality appliance without the extended reality display interfering with or obstructing their view of the at least part of the physical environment (or with the extended reality display less interfering with or less obstructing their view of the at least part of the physical environment).

In some embodiments, the extended reality display parameters may include one or more user-specific extended reality display parameters. For example, the user may prefer a first brightness parameter while working on a document and a second brightness parameter while watching a movie, or a shorter virtual distance from the virtual content when working on a virtually presented document than when watching a virtually presented movie. In some embodiments, the user-specific extended reality display parameters may be stored and accessed by a rule when that rule is implemented. In some embodiments, the user-specific extended reality display parameters and the rule may be stored in a memory associated with the wearable extended reality appliance, in a memory associated with another device in communication with the wearable extended reality appliance (e.g., an integrated computational interface device), or in a remote storage accessible by the wearable extended reality appliance or the other device (e.g., a cloud-based storage). In some embodiments, the user-specific extended reality display parameters and the rule may be stored in the same memory. In some embodiments, the user-specific extended reality display parameters and the rule may be stored in different memories. In some embodiments, the rule may be accessed and implemented (i.e., executed) by a processor in communication with the wearable extended reality appliance (e.g., processing device 460 shown in FIG. 4). In some embodiments, the user-specific extended reality display parameters may be automatically changed, for example, when the user switches from working on a document to watching a movie.

Some disclosed embodiments may involve obtaining image data from the wearable extended reality appliance. In some embodiments, the image data may be obtained from an image sensor, such as a CCD or CMOS sensor located on or otherwise associated with the wearable extended reality appliance. For example, the image sensor 472 as shown in FIG. 4 may be employed in the wearable extended reality appliance. The image data received or generated by the image sensor may be associated with the physical environment of the user and may include one or more still images, a series of still images, or video.

Some disclosed embodiments may involve detecting in the image data a specific environmental change unrelated to the virtually displayed content. An environmental change may include a change to the physical environment around the user of the wearable extended reality appliance. Changes to the physical environment around the user may occur, for example, when the user changes physical location (e.g., by moving to a different room when indoors, moving from indoors to outdoors, or while walking or moving around outdoors). Another example of an environmental change may include an object moving into a field of view of the image sensor (e.g., a person walking in front of the user). In some embodiments, the specific environmental change may be detected by a processor associated with the wearable extended reality appliance. In some embodiments, the specific environmental change may be detected by one or more sensors in communication with the wearable extended reality appliance. Such sensors may include image sensors, motion sensors, LIDAR sensors (i.e., another type of image sensor), audio sensors, proximity sensors, or any other sensors that may identify an environmental change from one time frame to another. For example, the one or more sensors may include audio sensor 471, image sensor 472, motion sensor 473, environmental sensor 474, or other sensors 475 as shown in FIG. 4. In some examples, the image data may be analyzed to detect the specific environmental change. For example, a machine learning model (such as a Convolution Neural Network Long Short-Term Memory model, a Convolution Neural Network Recurrent Neural Network model, etc.) may be trained using training examples to determine environmental changes from images and/or videos. An example of such training example may include a time series of images, together with a label indicating an environmental change of a particular type at a particular image of the time series of images. A non-limiting example of such type of environmental changes may include a change from a first particular environmental condition to a second particular environmental condition. The trained machine learning model may be used to analyze the image data to detect the specific environmental change. In an additional example, each image in a time series of images (or of part of the images) may be analyzed using a visual classification model to identify an environmental condition associated with the image. In one example, when a transition from one identified environmental condition to another environmental condition occurs, the specific environmental change may be detected. In another example, the identified environmental conditions may be analyzed to detect changes in high confidence, for example using a Markov model, and thereby detecting the specific environmental change.

Some disclosed embodiments may involve accessing a group of rules associating environmental changes with changes in the at least one adjustable extended reality display parameter. An adjustable extended reality display parameter may include any perceptible presentation alteration associated with the extended reality display or an extended reality environment. Such parameters may include, by way of example only, opacity, brightness, content shifts, content replacements, repositioning of virtual objects, resizing virtual objects, displayed visual markers or warnings, additional data presentation, data removal, or any other perceptible change that might occur via the display. In some embodiments, the group of rules may be accessed by a processor associated with the wearable extended reality appliance. The group of rules may define one or more particular actions (e.g., display parameter adjustments) to be made in response to a detected environmental change. In some embodiments, there may be a one-to-one correspondence between a rule and an environmental change (i.e., each rule corresponds to a different environmental change). In some embodiments, one rule may correspond to several different environmental changes. In some embodiments, the correspondence between the group of rules and the detected environmental changes may be stored in a correspondence table or similar data structure. In some embodiments, the group of rules may be stored in a memory located in the wearable extended reality appliance, in a memory located in another device in communication with the wearable extended reality appliance (e.g., an integrated computational interface device), or in a remote storage accessible by the wearable extended reality appliance (e.g., a cloud-based storage). In some embodiments, the group of rules may be implemented as a series of logical "if/then" statements that may be evaluated (e.g., by a processor) when the specific environmental change is detected. In some embodiments, the group of rules may be implemented as a decision logic executed at a processor, for example, that may be aided by a machine learning or artificial intelligence algorithm. The machine learning algorithm may be trained using a training data set containing modifications to one or more extended reality display parameters associated with corresponding environmental changes. The trained machine learning model may be used to determine the one or more changes in extended reality display parameters based on an input of a change in an environmental condition.

In some embodiments, the group of rules may be predefined based on features, functionality, or technical capabilities of the wearable extended reality appliance. In some embodiments, different groups of rules may apply to different models or versions of the wearable extended reality appliance. In some embodiments, different models or versions of the wearable extended reality appliance may have different features, functionality, or technical capabilities and some rules or groups of rules may only be applicable to features, functionality, or technical capabilities specific to a particular model or version of the wearable extended reality appliance. In such circumstances, all rules may not necessarily be executable by all models or versions of the wearable extended reality appliance. For example, a first version of the wearable extended reality appliance may include an ambient light sensor configured to detect changes in the ambient light level in the physical environment around the user. Accordingly, the group of rules associated with the first version of the wearable extended reality appliance may also include one or more rules relating to adjusting one or more extended reality display parameters in response to input received from the ambient light sensor. Another version of the wearable extended reality appliance may not include the ambient light sensor and the group of rules associated with the second version of the wearable extended reality appliance may not include rules relating to input received from the ambient light sensor. In some embodiments, the group of rules may be updated based on corresponding updates to the features, functionality, or technical capabilities of the wearable extended reality appliance.

There are a number of rules that might be implemented based on design choice. For example, if a person is detected entering the field of view, one or more of the following extended reality display parameter changes might occur, based on rules that, upon detection of the person, cause the adjustment to occur present a warning on a display that a person is nearby; perform image recognition to identify the person and present the person's name and/or select a change to the extended reality display parameters based on the identity of the person: identify a location of the person (for example, using a person detection algorithm) and select a change to the extended reality display parameters based on the location; identify a distance from the person (for example, based on a size of the person in the image data, using a regression model configured to estimate distances from people, etc.) and select a change to the extended reality display parameters based on the distance; identify an activity of the person (for example using a visual activity recognition algorithm) and select a change to the extended reality display parameters based on the activity; change an opacity level of the display so that the person becomes at least partially visible; present an external warning in the form of audio or light to indicate to the person that the user is immersed in viewing virtual content and may not be aware of the presence of others in the environment; moving virtual content on the extended reality display (or in an extended reality environment) to an area other than where the person is located: pausing the presentation of the virtual content; changing the virtual content; shrinking the virtual content: or any other adjustment that helps make the user or a person in the user's environment more situationally aware. In some examples, a face recognition algorithm may be used to analyze the image data to identify a person detected entering the field of view and/or approaching the user. In one example, in response to a first identity of the person, a specific rule to adjust one or more extended reality display parameters may be implemented (for example as described below), and in response to a second identity of the person, implementing the specific rule to adjust one or more extended reality display parameters may be avoided. In another example, in response to a first identity of the person, a first specific rule to adjust one or more extended reality display parameters may be implemented (for example as described below), and in response to a second identity of the person, a second specific rule to adjust one or more extended reality display parameters may be implemented (for example as described below), the second rule may differ from the first rule. For example, the first identity may correspond to a person known to the user, and the second identity may correspond to a person unknown to the user. In another example, the first identity may correspond to a supervisor of user, and the second identity may correspond to a subordinate of the user.

Similarly, as the user moves, the user's movements might cause similar changes, either with a person or an object, and any one of the foregoing exemplary adjustments may be implemented by associated rules to increase situational awareness.

In some embodiments, the group of rules may include user-defined rules. For example, a user-defined rule may include user-specific or user-preferred extended reality display parameters for one or more of the adjustable extended reality display parameters. For example, the user may prefer a first brightness setting while working on a document and a second brightness setting while watching a movie, and a user-defined rule may permit the brightness setting to automatically change from the first brightness setting to the second brightness setting when it is detected that the user switches from working on a document to watching a movie. In another example, the user may prefer a shorter virtual distance to the virtual content when working on a virtually presented document than when watching a virtually presented movie. In yet another example, the user may prefer one size for virtual content when interacting with other people in the physical environment, and a different size for virtual content otherwise. Or, by way of another example, a user may choose how the display parameters change when a person enters the field of view.

Some disclosed embodiments may involve determining that the specific environmental change corresponds to a specific rule of the group of rules. For example, a processor associated with the wearable extended reality appliance may detect a specific environmental change and may select a specific rule corresponding to the detected environmental change. In some embodiments, the environmental change may be associated with a specific rule based on a correspondence table or other lookup mechanism in a data structure. In some embodiments, the environmental change may be determined by the processor to belong to a classification of environmental changes, and the specific rule may be associated with the classification. For example, all encounters with inanimate objects might trigger one rule, while all encounters with animate objects (e.g., people, pets, robots) may trigger another rule.

Some disclosed embodiments may involve implementing the specific rule to adjust one or more extended reality display parameters based on the specific environmental change. For example, if the specific environmental change is that an object comes into the user's field of view (e.g., a person walks in front of the user), the specific rule to be implemented may include shrinking the size of the virtual objects and/or moving the virtual objects to a side of the user's field of view (and/or to a different position in an extended reality environment) such that the user can clearly see the person in front of the user.

In some embodiments, the adjusted extended reality display parameters may include permanent changes to the extended reality display (and/or to the extended reality environment), meaning that the adjusted extended reality display parameters remain in effect until the extended reality display parameters are again adjusted, either by another environmental change or by a manual action of the user to adjust the extended reality display parameters. In some embodiments, the user may have an option to manually return the adjusted extended reality display parameter to a prior state, meaning that the extended reality display parameters may be returned to the settings that existed prior to the detected environmental change. For example, a virtual widget may be presented on the extended reality display (and/or in the extended reality environment) to return the adjusted extended reality display parameter to the prior state. In some embodiments, the virtual widget may be an interactive user interface element and may require user input to return the adjusted extended reality display parameter to the prior state. As another example, there may be a physical button or other type of physical control on the wearable extended reality appliance to return the adjusted extended reality display parameter to the prior state. As another example, there may be a physical button or other type of physical control on an integrated computational interface device associated with the wearable extended reality appliance to return the adjusted extended reality display parameter to the prior state.

In some embodiments, the adjusted extended reality display parameters may be in effect while the environmental change is ongoing, and the extended reality display (and/or the extended reality environment) may return to a prior state when the environmental change is no longer occurring. For example, if a person walks in front of the user, the brightness of the extended reality display may be dimmed such that the user can see the person and when the person exits the user's field of view, the extended reality display may return to a prior brightness setting. In some embodiments, the extended reality display (and/or the extended reality environment) may automatically return to the prior state when the environmental change is no longer occurring. In some embodiments, the user may be prompted to confirm that they want to return the extended reality display (and/or the extended reality environment) to the prior state when the environmental change is no longer occurring. For example, a virtual widget may be presented on the extended reality display (and/or in the extended reality environment) to prompt the user to confirm that they want to return the adjusted extended reality display parameter to the prior state.

In some embodiments, the adjusted extended reality display parameters may remain in effect for a predetermined period of time. In some embodiments, the predetermined period of time may be associated with a rule. For example, a rule may include the predetermined period of time in a rule definition or the predetermined period of time may be stored with the rule. In some embodiments, the extended reality display may automatically return to the prior state after the predetermined period of time has expired. In some embodiments, the user may be prompted to confirm that they want to return the extended reality display (and/or the extended reality environment) to the prior state after the predetermined period of time has expired, for example, by presenting a virtual widget on the extended reality display (and/or in the extended reality environment).

Figure 27:
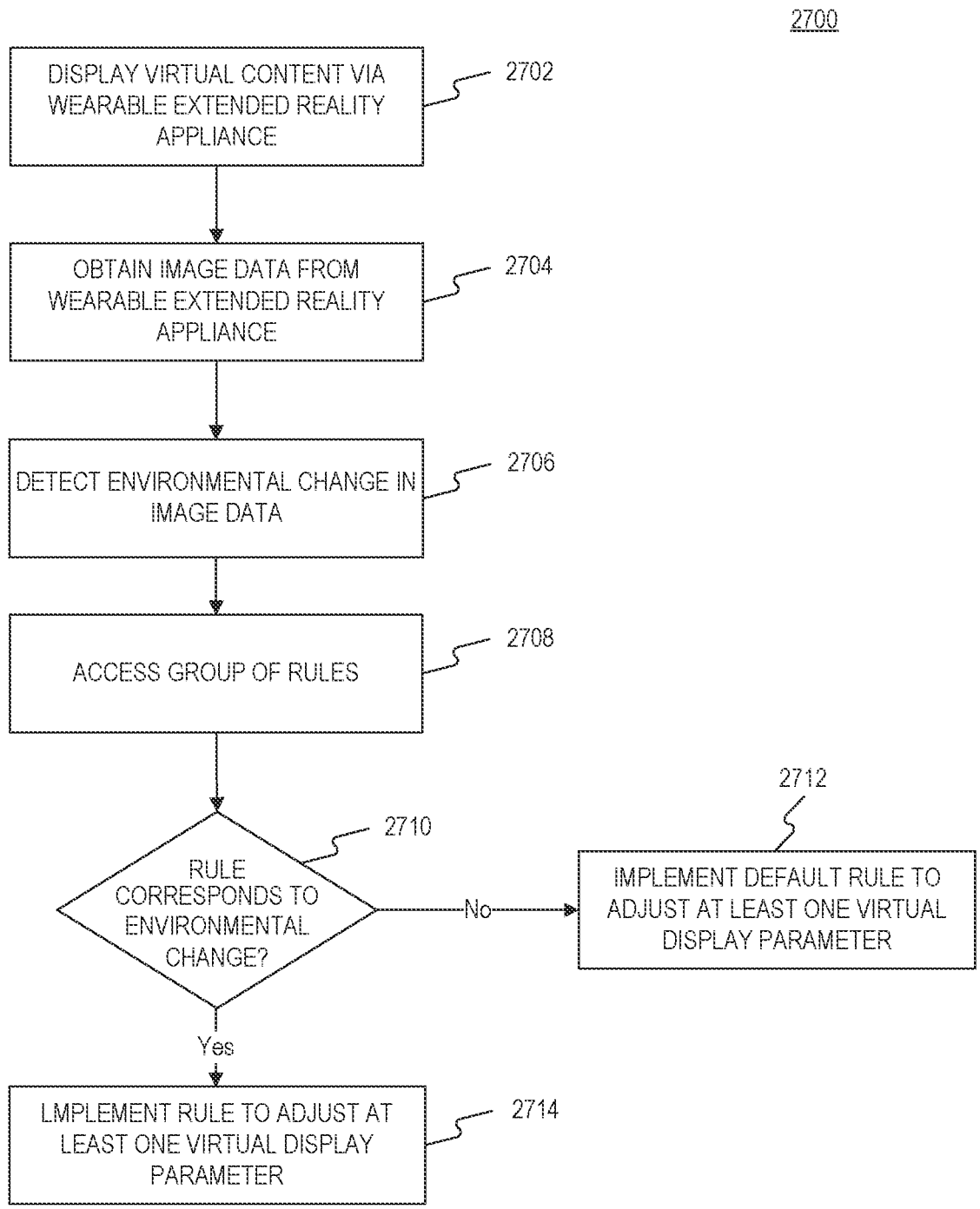
FIG. 27 is a flowchart of an exemplary method for facilitating an environmentally adaptive extended reality display in a physical environment, consistent with some embodiments of the present disclosure.

FIG. 27 is a flowchart of an exemplary method 2700 for facilitating an environmentally adaptive extended reality display in a physical environment. FIG. 27 is an exemplary representation of just one embodiment, and it is to be understood that some illustrated elements might be omitted and others added within the scope of this disclosure. One or more operations of the method 2700 may be performed by a processor associated with a wearable extended reality appliance. For example, a first processor may be located in the wearable extended reality appliance and may perform one or more operations of the method 2700. As another example, a second processor may be located in an integrated computational interface device associated with the wearable extended reality appliance, and the second processor may perform one or more operations of the method 2700. As another example, the first processor and the second processor may cooperate to perform one or more operations of the method 2700. The cooperation between the first processor and the second processor may include load balancing, work sharing, or other known mechanisms for dividing a workload between multiple processors.

Virtual content may be displayed to a user of the wearable extended reality appliance (operation 2702). Image data may be obtained from the wearable extended reality appliance (operation 2704), for example via an image sensor in the wearable extended reality appliance. A change in the user's environment may be detected in the image data (operation 2706), for example by a processor associated with the wearable extended reality appliance. In some embodiments, the detecting may be performed by one or more processors and/or one or more sensors in communication with the wearable extended reality appliance. In one example, the image data may be analyzed to detect the change in the user's environment, for example as described above.

Upon detecting a change in the user's environment, a group of rules may be accessed (operation 2708). In some embodiments, the group of rules may be accessed by a processor associated with the wearable extended reality appliance, or by a different processor. In some embodiments, the group of rules may be stored in a memory located in the wearable extended reality appliance, in a memory located in a device in communication with the wearable extended reality appliance (e.g., the integrated computational interface device), or in a remote storage accessible by the wearable extended reality appliance (e.g., a cloud-based storage).

A determination may be made whether there is a rule in the group of rules that corresponds to the detected environmental change (operation 2710). In some embodiments, the determination may be made by a processor associated with the wearable extended reality appliance. If there is no rule that corresponds to the detected environmental change (operation 2710, "no" branch), then a default rule may be implemented to adjust at least one extended reality display parameter (operation 2712). In some embodiments, the default rule may be implemented by a processor associated with the wearable extended reality appliance. In some embodiments, a type of environmental change may occur for which there is not a corresponding rule. In such circumstances, instead of taking no action, a default rule may be implemented to adjust at least one extended reality display parameter. For example, a default rule may be to adjust the opacity of the extended reality display to a 50% setting such that the user may perceive the change in the physical environment. As another example, a default rule may be to move the virtual screens to the sides of the extended reality display such that the user may perceive the change in the physical environment. Other types of default rules may be possible, but the default rule should include one or more adjustments to the at least one extended reality display parameter such that the user may perceive the change in the physical environment.

If there is a rule that corresponds to the detected environmental change (operation 2710. "yes" branch), then the rule may be implemented on the wearable extended reality appliance to adjust at least one extended reality display parameter of the extended reality display (operation 2714). In some embodiments, the rule may be implemented by a processor associated with the wearable extended reality appliance.

In some embodiments, in addition to the picture setting and color settings noted above, the at least one adjustable extended reality display parameter may include at least one of: a number of screens associated with the virtually displayed content, a size of at least one virtual screen associated with the virtually displayed content, a position of at least one virtual screen associated with the virtually displayed content, a shape of at least one virtual screen associated with the virtually displayed content, an angle of at least one virtual screen associated with the virtually displayed content, an opacity of the virtually displayed content, a virtual distance of the virtually displayed content from the wearable extended reality appliance, or a type of widgets included in the virtually displayed content. For example, when a user encounters an environmental change, the number of screens presented to the user might change. If the field of view opens, more screens might be presented; if the field of view becomes more crowded, less screens may be presented. In much the same way, screen sizes, positions, shapes, angles, opacity, distance, or content type can change to accommodate changes in the physical environment.

For example, the virtually displayed content may include or be presented on multiple virtual screens. Each virtual screen (also referred to as a virtual display herein) may be a different display window for viewing a different type of content (e.g., a first virtual screen for a video associated with a meeting and a second virtual screen for a text document). In some embodiments, the adjustable extended reality display parameter may be applied to one or more of the multiple virtual screens. In some embodiments, the virtual screens to which the adjustable extended reality display parameter is applied may be determined based on a priority associated with the virtual screen and/or the content shown on the virtual screen. For example, the first virtual screen including a video associated with a meeting may have a higher priority than the second virtual screen including a text document, such that the display parameter of the second virtual screen may be adjusted and the display parameter of the first virtual screen may not be adjusted. In some embodiments, the display parameter of the first virtual screen may be adjusted and the display parameter of the second virtual screen may not be adjusted. In some embodiments, the virtual screens that may have their display parameter adjusted may be based on an ordering determined by a length of time that the virtual screens have been shown on the extended reality display. For example, a virtual screen that has been shown for a longer period of time may have the display parameter adjusted while a virtual screen that has been shown for a shorter period of time may not have the display parameter adjusted. As another example, the virtual screen that has been shown for the shorter period of time may have the display parameter adjusted while the virtual screen that has been shown for the longer period of time may not have the display parameter adjusted. In some embodiments, the virtual screens to have the display parameter adjusted may be randomly determined. In some embodiments, the adjustable extended reality display parameter may be applied to all virtual screens on the extended reality display.

In some embodiments, a rule may indicate that the number of virtual screens displayed is reduced (i.e., some of the virtual screens are not displayed). For example, if the virtually displayed content includes seven virtual screens, the rule may indicate that the extended reality display should be adjusted to only show two virtual screens. In some embodiments, a rule may indicate that the opacity of the extended reality display is to be reduced by 50% and to implement this rule, the opacity of all of the displayed virtual screens may be reduced by 50%.

In some embodiments, the adjustable extended reality display parameter may include changing a size of at least one virtual screen associated with the virtually displayed content. For example, a rule may indicate that any virtual screens larger than a predetermined size should be shrunk to a smaller predetermined size. As another example, a rule may indicate that one or more virtual screens be minimized or otherwise reduced to a predetermined minimum size.

In some embodiments, the adjustable extended reality display parameter may include changing a position of at least one virtual screen associated with the virtually displayed content. For example, a rule may indicate that one or more virtual screens be moved to one portion of the user's field of view (e.g., left side, right side, an upper corner, or a lower corner). In some embodiments, different virtual screens may be moved to different portions of the extended reality display and/or of the extended reality environment. For example, one or more virtual screens may be moved to a left side of the extended reality display and/or of the extended reality environment while one or more other virtual screens may be moved to a right side of the extended reality display and/or of the extended reality environment.

In some embodiments, the adjustable extended reality display parameter may include changing a shape of at least one virtual screen associated with the virtually displayed content. For example, a rule may indicate that a shape of a virtual screen should be changed, such as changing a wide rectangular virtual screen to a small square virtual screen. As another example, if the user has changed the default shape of a virtual screen, a rule may indicate that the virtual screen be returned to its default shape. As another example, a rule may indicate a target shape of the virtual screen and the virtual screen may be adjusted to the target shape.

In some embodiments, the adjustable extended reality display parameter may include changing an angle of at least one virtual screen associated with the virtually displayed content. For example, a rule may indicate that the viewing angle of one or more virtual screens is changed to effectively angle the one or more virtual screens at least partially out of the user's field of view so that the user may be able to better view the physical environment.

In some embodiments, the adjustable extended reality display parameter may include changing an opacity of the virtually displayed content. For example, a rule may indicate that the opacity of the virtually displayed content be reduced to enable the user to better see through the virtually displayed content to view the physical environment.

In some embodiments, the adjustable extended reality display parameter may include changing a virtual distance of the virtually displayed content on the wearable extended reality appliance. For example, a rule may indicate that the virtually displayed content appears to be moved farther away from the user (i.e., made to appear smaller) or appear to be moved closer to the user (i.e., made to appear larger).

In some embodiments, the adjustable extended reality display parameter may include changing a type of widgets included in the virtually displayed content. In some embodiments, a widget may be a virtual screen of a predetermined size that displays one type of content. For example, a weather widget may display weather-related information. In some embodiments, different types of widgets may be associated with different types of content. In some embodiments, multiple widgets may be displayed on the extended reality display and/or in the extended reality environment. For example, the extended reality display and/or the extended reality environment may include a weather widget, a clock widget, and a local news video widget. For example, a rule may indicate that if the user is walking, then the local news video widget should not be displayed (i.e., the local news video widget may be disabled or closed).

In some embodiments, adjusting the at least one adjustable extended reality display parameter includes changing a combination of extended reality display parameters associated with the virtually displayed content. That is, an adjustment is not limited to only one of the exemplary parameters described herein. Multiple adjustments can be made in parallel or sequentially. Sequential adjustments may be made, for example, in a dynamic environment. If a person enters a field of view at a first distance, a first adjustment may be made, and as the person gets closer an additional adjustment or multiple additional adjustments may be made. For example, a rule may indicate that the size of at least one virtual screen and the opacity of the at least one virtual screen are both changed, either at the same time or sequentially. Continuing the example from above, the size of at least one virtual screen may be changed at the same time as the opacity of the at least one virtual screen is changed, before the opacity of the at least one virtual screen is changed, or after the opacity of the at least one virtual screen is changed. In some embodiments, different extended reality display parameters may be adjusted differently for different virtual screens. For example, a virtual display screen with video content may be reduced in size while a virtual display screen that includes identifications of objects within the user's field of view (e.g., a bird watching augmented reality application) may have its opacity reduced.

Some disclosed embodiments may involve obtaining data from an input device separated from the wearable extended reality appliance. For example, a headset may be paired with or otherwise receive information from a smartphone, a tablet, a keyboard, a standalone sensor, or any other device. In some embodiments, the integrated computational interface device may include an input device that is physically separate or spaced apart from the wearable extended reality appliance. The input device may be in wireless communication with the wearable extended reality appliance. The data may be obtained from one or more sensors connected to or in communication with the input device. By way of example, in an embodiment where the input device is the input unit 202 shown in FIG. 3, the data may be obtained from one or more sensors connected to or in communication with the sensors interface 370 (e.g., audio sensor 371, image sensor 372, motion sensor 373, environmental sensor 374, or other sensors 375).

In some embodiments, determining the specific environmental change unrelated to the virtually displayed content may be based on the obtained data from the input device and the image data from the wearable extended reality appliance. The input device, for example, may have one or more sensors that may be configured to measure or detect one or more physical characteristics of the environment of the user. Such physical characteristics may include, by way of example, temperature, pressure, sound level, light level, proximity, identity, or other parameter related to the surrounding environment. For example, the one or more sensors may include the environmental sensor 374 as shown in FIG. 3, configured to sense one or more of the physical characteristics mentioned above. A change in the ambient light level in the physical environment may be detected by a light sensor associated with the input device.

In some embodiments, the specific environmental change may also be determined based on image data from the wearable extended reality appliance. For example, the input device may include an image sensor, as described herein. The detection of an environmental change can therefore be based on both image data and other data (or image data from two different sensors). By way of one example, the presence of an individual may be determined based on image data from an image sensor, and proximity may be based on data from a proximity sensor. One example of an image sensor is image sensor 372 or motion sensor 373 as shown in FIG. 3. An object moving into the field of view of the wearable extended reality appliance may be detected by an image sensor associated with the wearable extended reality appliance, and additional data may be provided by the motion sensor. By way of another example, determining a type of object that moves into the field of view of the wearable extended reality appliance may utilize the image data from the wearable extended reality appliance and audio data from the input device. The image of a car together with the sound of the car engine might be used to confirm that a car is in motion.

In some embodiments, determining the specific environmental change may be performed by the input device (for example, by a processor associated with the input device) after receiving the image data from the wearable extended reality appliance. In some embodiments, determining the specific environmental change may be performed by the wearable extended reality appliance (for example, by a processor associated with the wearable extended reality appliance) after receiving the obtained data from the input device. In some embodiments, determining the specific environmental change may be performed by a device separate from both the input device and the wearable extended reality appliance; for example, by a server in a cloud computing environment after receiving the obtained data from the input device and the image data from the wearable extended reality appliance. In embodiments where the specific environmental change is not detected by the wearable extended reality appliance, the specific environmental change may be communicated to the wearable extended reality appliance to enable the wearable extended reality appliance to adjust the at least one extended reality display parameter based on the detected specific environmental change.

In some embodiments, adjusting the at least one adjustable extended reality display parameter may cause an eye of a user of the wearable extended reality appliance to be visible to people in the physical environment. For example, when the user is using the wearable extended reality appliance, the virtual objects displayed by the wearable extended reality appliance may face the user. People in the physical environment near the user may be able to see the virtual objects from the other side of the wearable extended reality appliance but may not be able to see the user's eyes because the user's eyes may be at least partially obscured by the virtual objects. By adjusting the at least one adjustable extended reality display parameter (e.g., changing the opacity of the virtually displayed content and/or reducing the size of at least one virtual screen associated with the virtually displayed content), one or both of the user's eyes may become visible to people in the physical environment.

Some disclosed embodiments may involve having an additional group of rules that may be accessed and implemented if the user of the wearable extended reality appliance wants to interact with another person. In some embodiments, the user of the wearable extended reality appliance may be able to interact with non-users (i.e., other people in the physical environment near the user) without the user removing the wearable extended reality appliance. Some disclosed embodiments may involve determining a type of human interaction of another individual with a user of the wearable extended reality appliance. For example, the difference between a human walking across the field of view of the user (who may be unlikely to interact with the user) may be distinguished from a human approaching the user (who may be likely to interact with the user). In some embodiments, the determining the type of human interaction may be performed by a processor associated with the wearable extended reality appliance.

In some embodiments, the processor may be configured to determine the type of human interaction by analyzing image data in a set of images (for example, images received from one or more image sensors), by analyzing sounds received from one or more audio sensors, or a combination of both. In some embodiments, the processor may be configured to determine the type of human interaction by determining changes in an ambient light level (for example, by an ambient light sensor) in the environment of the user because of another person casting a shadow on the user when the other person approaches. In some embodiments, the processor may be configured to determine the type of human interaction by analyzing motion sensor data received from one or more motion sensors configured to detect motion within a predefined distance from the user. In some embodiments, the processor may be configured to determine the type of human interaction by analyzing data from one or more of the methods noted above; for example, by analyzing image data, ambient light data, and motion data.

Some disclosed embodiments may involve accessing an additional group of rules associating types of human interaction with changes in the at least one adjustable extended reality display parameter. Human interaction may involve any degree of interplay between the wearer and a person in a field of view. The interaction may range from no interaction whatsoever, to recognition, approach, outreach, communication, potential collision, or any other degree of interplay. Rules may vary based on the interaction type. A person crossing a field of view at a distance may trigger a first rule (e.g., ignore): while a person walking toward the wearer may trigger a second rule that may or may not depend on distance from the wearer. At one extreme, all extended reality display might cease, and the person may become visible to the wearer. At intermediate levels, opacity may increase, content may shift, or other changes described earlier may occur. In some embodiments, a first group of rules may be associated with adjustments of one or more extended reality display parameters based on one or more environmental changes. A second group of rules, different from the first group, may be associated with adjustments of one or more extended reality display parameters based on one or more types of human interaction. In some embodiments, the first and second group of rules may be combined into one group of rules. For example, when it is determined that a human is approaching the user (instead of, for example, an automobile passing through the user's field of view), the additional group of rules (e.g., the second group of rules) for adjusting extended reality display parameters may be accessed. The additional group of rules may be constructed, stored, accessed, and implemented in a similar manner as the first group of rules associated with a detected environmental change. For example, by a processor associated with the wearable extended reality appliance.

Some disclosed embodiments may involve implementing at least one rule of the additional group of rules to adjust the at least one adjustable extended reality display parameter based on the determined type of interaction. The additional group of rules (e.g., a second group of rules) may be associated with the determined type of interaction by a correspondence table or similar data structure. For example, if a person approaches the wearer, the rule may cause the at least one adjustable extended reality display parameter to change (e.g., adjusting the opacity of the virtually displayed content and/or reducing the size of at least one virtual screen associated with the virtually displayed content) so that the wearer can see the non-user and interact with the non-user without needing to remove the wearable extended reality appliance.

Some disclosed embodiments may involve presenting via the wearable extended reality appliance an interactive element for enabling a user of the wearable extended reality appliance to abort the adjustment to the at least one adjustable extended reality display parameter. For example, a virtual button or other virtual element may be presented via a user interface presented by the wearable extended reality appliance (for example in an extended reality environment) that the user may interact with the element to control the display parameter. For example, after the at least one adjustable extended reality display parameter is automatically adjusted by virtue of a rule, the user of the wearable extended reality appliance may be shown an interactive element in the extended reality environment to confirm that the user wishes to keep the adjusted extended reality display parameter or to allow the user to return the extended reality display parameter to its prior state (i.e., abort the adjustment to the at least one adjustable extended reality display parameter). For example, the interactive element may be implemented as a pop-up window, an alert, or other user interface control that requires user input before being removed from the extended reality environment. For example, the user's choices may be presented as buttons, radio buttons, checkboxes, a drop-down list, a list box, a toggle, or other type of user interface selector.

In some embodiments, the interactive element may be presented to the user prior to the at least one adjustable extended reality display parameter being adjusted. In this embodiment, the user of the wearable extended reality appliance may be shown the interactive element in the extended reality environment to confirm that the user wishes to adjust the extended reality display parameters or that the user wishes to retain the current extended reality display parameters.

In some embodiments, the user of the wearable extended reality appliance may interact with the interactive element by manipulating a virtual control in the interactive element; by manipulating a physical control on the wearable extended reality appliance; or by manipulating a physical control on a device in communication with the wearable extended reality appliance, such as an interactive computational interface device.

Some disclosed embodiments may involve implementing a rule to adjust the at least one adjustable extended reality display parameter upon detecting a change in a content type associated with the virtual content displayed via the wearable extended reality appliance. For example, if the user switches from working on a document to watching a movie, the extended reality display parameters may change to settings appropriate for watching a movie. For example, the virtual screen may be enlarged to a maximum possible size.

Some disclosed embodiments may involve detecting a change in a content type associated with the virtual content displayed via the wearable extended reality appliance. The virtual content displayed via the wearable extended reality appliance may include several different types of content. For example, the virtual content may include video, audio, text, interactive content, multimedia content, Web-based content, or other types of content in various formats. In some embodiments, the user may have different preferences for one or more extended reality display parameters based on different types of content. For example, the user may prefer a first brightness parameter while working on a document and a second brightness parameter while watching a movie. In some embodiments, the content type change may be detected by a processor when the user switches, for example, from working on a document to watching a movie.

Some disclosed embodiments may involve accessing an additional group of rules associating content type changes with changes in the at least one adjustable virtual reality display parameter. For example, there may be a separate group of rules associated with content type changes which may be different from other groups of rules, such as the group of rules associated with environmental changes. The additional group of rules associated with content type changes may be constructed, stored, accessed, and implemented in a similar manner as with the group of rules associated with a detected environmental change. When the content type change is detected, the additional group of rules may be accessed. In some embodiments, the additional group of rules may be accessed by a processor associated with the wearable extended reality appliance.

Some disclosed embodiments may involve determining that the detected content type change corresponds to a particular rule of the additional group of rules. For example, the correspondence between the content type change and the particular rule may be provided in a correspondence table or similar data structure. In some embodiments, different rules may be determined based on a first content type (that the user is interacting with prior to the content type change) and a second content type (that the user is interacting with after the content type change). For example, a first rule may apply if the user switches from working on a document to watching a movie, and a second rule may apply if the user switches from watching a movie to working on a document.

Some disclosed embodiments may involve implementing the particular rule to adjust the at least one adjustable extended reality display parameter based on the detected content type change. For example, a processor may be configured to adjust the at least one adjustable extended reality display parameter based on a content type change. For example, once the content type change from the user switching from working on a document to watching a movie has been detected (e.g., by a processor), the particular rule associated with the content type change to watching a movie may be implemented (e.g., by the processor) to adjust the at least one adjustable extended reality display parameter to parameters for watching the movie. For example, the brightness parameter of the extended reality display may be adjusted from a first brightness parameter associated with working on a document to a second brightness parameter associated with watching a movie. In another example, a virtual distance to the virtual content may change from a shorter distance associated with working on a document to a longer distance associated with watching a movie.

Some disclosed embodiments may involve avoiding adjusting extended reality display parameters if the user has entered a "do-not-disturb" mode on the wearable extended reality appliance. A do-not-disturb mode may be an operational mode of the wearable extended reality appliance in which the user wishes to be able to concentrate on the virtual content without interruption. For example, if the user is in a virtual meeting, the user may wish to avoid interrupting the meeting. In such instances, the rules governing adjustments to extended reality display parameters may change (e.g., so as to avoid interrupting the wearer's view of the meeting in progress).

Some disclosed embodiments may involve receiving a selection of a do-not-disturb mode. The selection of the do-not-disturb mode may be received by the wearable extended reality appliance or by an input device in communication with the wearable extended reality appliance (e.g., an interactive computational interface device) via user input. Alternatively, the selection may occur automatically. For example, if a do-not-disturb rule exists for video conferences, the implementation of a video conference may automatically trigger the rule without additional user input. This is but one example, the do-not-disturb mode may be automatically entered based on a content type associated with content currently presented on the extended reality display and/or in the extended reality environment.

In some embodiments, when the do-not-disturb mode adjusting the at least one adjustable extended reality display parameter may be avoided based on the detected specific environmental change. For example, if the user is in a virtual meeting with the do-not-disturb mode selected (i.e., the do-not-disturb mode is active) and an environmental change is detected, the extended reality display parameters may be adjusted, notwithstanding the do-not-disturb mode. For example, if an imminent collision is projected, the do-not-disturb mode rules may be overridden by a competing safety rule. In such an instance the opacity adjustment may be overridden to permit the wearer to view the person with whom a collision is imminent.

Some disclosed embodiments may involve causing a display of an indication that the wearable extended reality appliance is in a do-not-disturb mode. In some instances, and indication may be displayed to the user of the wearable extended reality appliance as a widget or other indicator in the extended reality environment. Additionally or alternatively, an indicator may be displayed on an exterior-facing portion of the wearable extended reality appliance (e.g., a light indicator 451 as shown in FIG. 4) such that other people in the physical environment of the user (i.e., non-users) may perceive a visual indication that the wearable extended reality appliance is in the do-not-disturb mode. In some embodiments, an indicator may be displayed on an input device (e.g., an integrated computational interface device) in communication with the wearable extended reality appliance (e.g., a light indicator 351 as shown in FIG. 3) such that other people in the physical environment of the user (i.e., non-users) may perceive a visual indication that the wearable extended reality appliance is in the do-not-disturb mode.

In some embodiments, the selection of the do-not-disturb mode is tunable, and a level of the do-not-disturb mode is selectable by a user of the wearable extended reality appliance. For example, the do-not-disturb mode may be configurable (i.e., tunable) such that there are different levels of the do-not-disturb mode. At different levels of the do-not-disturb mode, certain rules may be implemented while other rules may not be implemented. For example, if the user is in a virtual meeting, the user may prefer to not be disturbed for any reason (in some embodiments, corresponding to a high-level setting of the do-not-disturb mode) and no rules to adjust the at least one adjustable extended reality display parameter may be implemented if there is an environmental change. As another example, if the user is working on a document (in some embodiments, corresponding to a low-level setting of the do-not-disturb mode), the user may prefer to be alerted to certain environmental changes but not all environmental changes, so some rules to adjust the at least one adjustable extended reality display parameter may be implemented if there is an environmental change.

In some embodiments, the selection of the do-not-disturb mode level may automatically determine which rules may be implemented upon detecting an environmental change. In some embodiments, the user may be able to select which rules may be implemented upon detecting an environmental change in the selected do-not-disturb mode. For example, after the user selects a do-not-disturb mode level, the user may be presented with a list of rules that may be implemented at the selected do-not-disturb level and the user may select individual rules to be implemented. The list of rules may be presented to the user in the extended reality environment and the user may select the individual rules via a user interface element, such as a set of checkboxes, a drop-down list, a list box, or other type of user interface element that permits the user to select one or more of a plurality of options. The flexibility of selecting the level of the do-not-disturb mode (and in some embodiments, also selecting the particular rules to be implemented at the selected do-not-disturb mode level) may enhance the user's experience while engaged with the wearable extended reality appliance.

In some embodiments, the level of the do-not-disturb mode may be tunable via an interactive element in the extended reality environment. For example, the interactive element may include a slider, a checkbox, a radio button, a button, a drop-down list, a list box, or other type of user interface input control that permits a user to select one of a plurality of options for selecting the level of the do-not-disturb mode. For example, when changing from an augmented reality (AR) mode to a virtual reality (VR) mode (or vice versa), a slider control may be used for the virtual interactive element.

In some embodiments, the level of the do-not-disturb mode may be tunable via a physical control (e.g., a slider or a knob) located on the wearable extended reality appliance or on an input device in communication with the wearable extended reality appliance (e.g., an integrated computational interface device).

Figure 28:
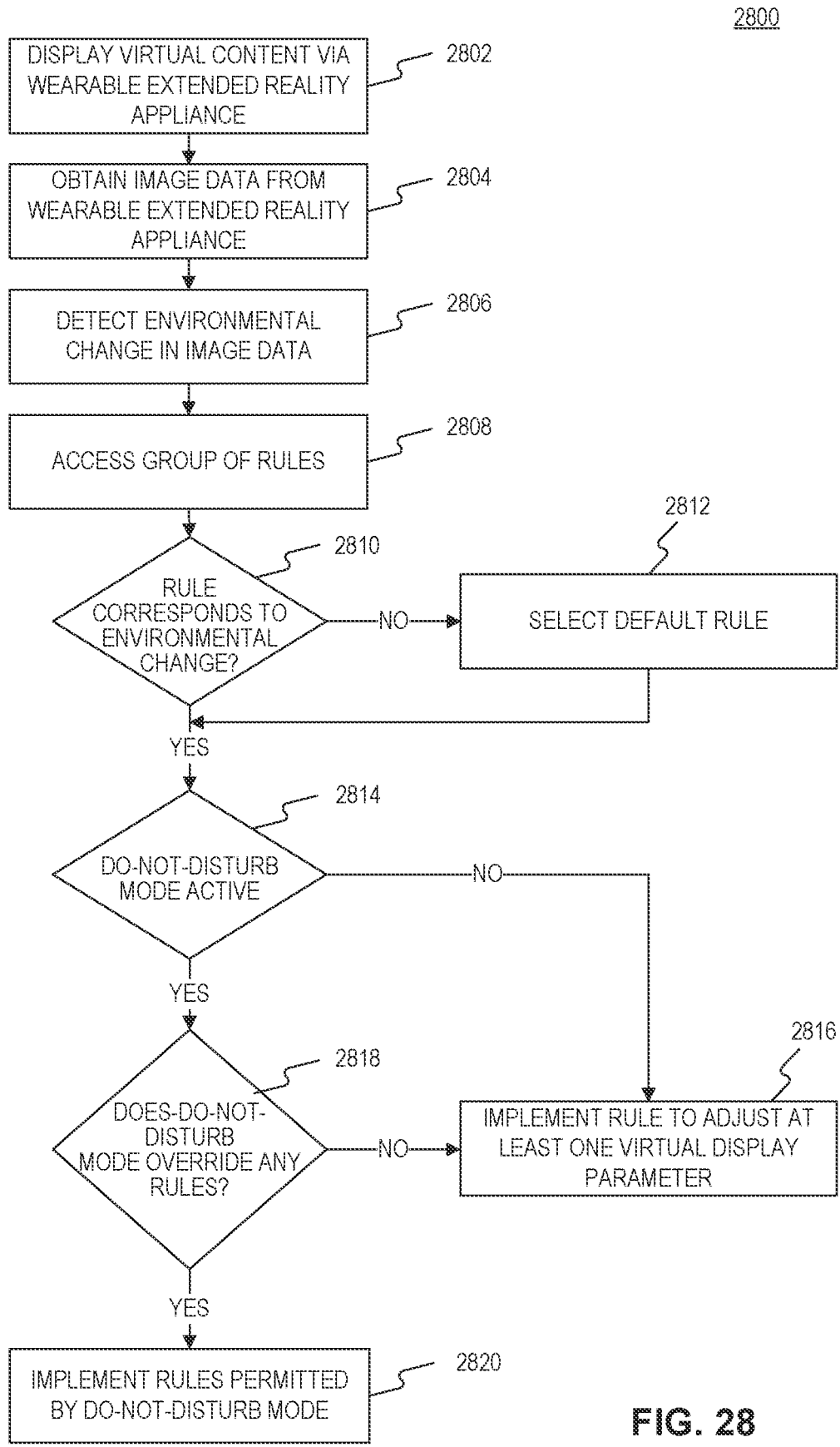
FIG. 28 is a flowchart of an exemplary method for facilitating an environmentally adaptive extended reality display in a physical environment where the wearable extended reality appliance includes a do-not-disturb mode, consistent with some embodiments of the present disclosure.

FIG. 28 is a flowchart of an exemplary method 2800 for facilitating an environmentally adaptive extended reality display in a physical environment where the wearable extended reality appliance includes a do-not-disturb mode. FIG. 28 is an exemplary representation of just one embodiment, and it is to be understood that some illustrated elements might be omitted and others added within the scope of this disclosure.

Virtual content may be displayed to a user of a wearable extended reality appliance (operation 2802). Image data may be obtained from the wearable extended reality appliance (operation 2804), for example via an image sensor in the wearable extended reality appliance. A change in the user's environment may be detected in the image data (operation 2806). In some embodiments, the specific environmental change may be detected by a processor associated with the wearable extended reality appliance. In some embodiments, the detecting may be performed by one or more sensors in communication with the wearable extended reality appliance.

Upon detecting a change in the user's environment, a group of rules may be accessed (operation 2808). In some embodiments, the group of rules may be accessed by a processor associated with the wearable extended reality appliance. In some embodiments, the group of rules may be stored in a memory located in the wearable extended reality appliance, in a memory located in a device in communication with the wearable extended reality appliance (e.g., an integrated computational interface device), or in a remote storage accessible by the wearable extended reality appliance (e.g., a cloud-based storage).

A determination may be made whether there is a rule in the group of rules that corresponds to the detected environmental change (operation 2810). In some embodiments, the determination may be made by a processor associated with the wearable extended reality appliance. If there is no rule that corresponds to the detected environmental change (operation 2810, "no" branch), then a default rule may be selected as the rule to be implemented to adjust at least one extended reality display parameter (operation 2812). In some embodiments, the default rule may be selected by a processor associated with the wearable extended reality appliance. In some embodiments, a type of environmental change may occur for which there is not a corresponding rule. In such circumstances, instead of taking no action, a default rule may be implemented to adjust at least one extended reality display parameter. For example, a default rule may be to adjust the opacity of the extended reality display to a 50% setting such that the user may perceive the change in the physical environment. As another example, a default rule may be to move the virtual screens to the sides of the extended reality display and/or extended reality environment such that the user may perceive the change in the physical environment. Other types of default rules may be possible, but the default rule should include one or more adjustments to the at least one extended reality display parameter such that the user may perceive the change in the physical environment.

If there is a rule that corresponds to the detected environmental change (operation 2810, "yes" branch) or if the default rule has been selected (operation 2812), then a determination may be made whether the do-not-disturb mode of the wearable extended reality appliance is active (operation 2814). In some embodiments, the determination whether the do-not-disturb mode is active may be made by a processor associated with the wearable extended reality appliance. In some embodiments, the do-not-disturb mode may be automatically entered or may be manually entered. The operation of the method 2800 does not change based on how the do-not-disturb mode was made active.

If the do-not-disturb mode is not active (operation 2814, "no" branch), then the rule that corresponds to the detected environmental change or the default rule is implemented on the wearable extended reality appliance to adjust at least one extended reality display parameter of the extended reality display (operation 2816). In some embodiments, the rule or the default rule may be implemented by a processor associated with the wearable extended reality appliance.

If the do-not-disturb mode is active (operation 2814, "yes" branch), then a determination may be made whether the do-not-disturb mode overrides any rules that may correspond to the detected environmental change (operation 2818). In some embodiments, the determination may be made by a processor associated with the wearable extended reality appliance. If the do-not-disturb mode does not override any rules (operation 2818, "no" branch), then the rule that corresponds to the detected environmental change or the default rule may be implemented on the wearable extended reality appliance to adjust at least one extended reality display parameter of the extended reality display (operation 2816).

If the do-not-disturb mode overrides at least one rule (operation 2818, "yes" branch), then the rules that correspond to the detected environmental change or the default rule that are permitted by the do-not-disturb mode are implemented on the wearable extended reality appliance to adjust at least one extended reality display parameter of the extended reality display (operation 2820). In some embodiments, the rule or the default rule may be implemented by a processor associated with the wearable extended reality appliance.

In some embodiments, the do-not-disturb mode may override any rules, including the default rule. In some embodiments, if the default rule is chosen to be implemented, the default rule may override the do-not-disturb mode.

In some embodiments, the environmental changes may include at least some of: movement of a user of the wearable extended reality appliance, change in a pose of a user of the wearable extended reality appliance, interaction of a user of the wearable extended reality appliance with another individual, interaction of a user of the wearable extended reality appliance with an object, change in an ambient light level in the physical environment, change in a noise level in the physical environment, or change in temperature in the physical environment. For example, the environmental changes may include active changes (e.g., the user moving or another individual or object moving near the physical environment of the user) and passive changes (e.g., a change in temperature or a change in the ambient light level). In some embodiments, different groups of rules may be associated with different types of environmental changes. For example, a first group of rules may be associated with active changes (such as moving virtual screens to a side of the extended reality environment to enable a user of the wearable extended reality appliance to view the physical environment) and a second group of rules may be associated with passive changes (such as changing the brightness of the extended reality display to accommodate a change in the ambient light level in the physical environment such that the user of the wearable extended reality appliance may continue to view the virtual content without having to make any manual adjustments to the extended reality display parameters).

In some embodiments, the first group of rules may have a priority in implementation over the second group of rules. For example, if an object in the physical environment is moving toward the user and an associated rule indicates that the extended reality display should be dimmed or moved such that the user can see outside the wearable extended reality appliance to observe the object, this rule may have priority over a rule associated with a change in the ambient light level in the physical environment, such that the rule associated with the moving object may be implemented prior to or instead of the rule associated with the change in the ambient light level.

In some embodiments, when the detected specific environmental change includes movement of a user of the wearable extended reality appliance, adjusting the at least one adjustable extended reality display parameter may include shrinking the virtually displayed content. For example, the user may be moving in the physical environment and all virtual screens may be reduced in size such that the user can see through the wearable extended reality appliance to view the physical environment and that the user may move safely in the physical environment without their view being obstructed by the virtual objects. In some embodiments, other extended reality display parameters may be adjusted along with shrinking the virtually displayed content or instead of shrinking the virtually displayed content. For example, the opacity of the extended reality display may be reduced such that the user can see through the wearable extended reality appliance to view the physical environment and that the user may move safely in the physical environment without their view being obstructed by the virtual objects. As another example, the virtual screens of the extended reality display may be moved (e.g., the virtual screens may be moved to a left side, a right side, a top, a bottom, or a corner of the extended reality environment) such that the user can see through the wearable extended reality appliance to view the physical environment and that the user may move safely in the physical environment without their view being obstructed by at least some of the virtual screens of the extended reality environment. In some embodiments, different virtual screens may be moved to different portions of the extended reality environment.

In some embodiments, when the detected specific environmental change includes entrance of an individual to a field of view of the wearable extended reality appliance, adjusting the at least one adjustable extended reality display parameter includes moving the virtually displayed content. For example, when entrance of an individual into a field of view of the wearable extended reality appliance is detected, all virtual screens may be moved to a side of the extended reality environment, a top or bottom portion of the extended reality environment, or a corner of the extended reality environment such that the user can see through the wearable extended reality appliance to view the individual without their view being obstructed by the virtual screens. As another example, when entrance of an individual into the field of view of the wearable extended reality appliance is detected, one or more virtual screens may be moved to one side of the extended reality environment while one or more other virtual screens may be moved to an opposite side of the extended reality environment. In some embodiments, other extended reality display parameters may be adjusted along with moving the virtually displayed content or instead of moving the virtually displayed content. For example, the opacity of the extended reality display may be reduced such that the user can see through the wearable extended reality appliance to view the individual without their view being obstructed by the extended reality display.

In some embodiments, when the detected specific environmental change includes a change in a pose of a user of the wearable extended reality appliance, adjusting the at least one adjustable extended reality display parameter includes changing a virtual size of the virtually displayed content and changing a virtual distance from the virtually displayed content. For example, it may be possible to detect changes in the user's body position relative to the physical environment that do not involve the user moving over a distance. If a user changes pose to a laying back position (e.g., from a sitting position to a reclining or laying down position), adjusting the at least one adjustable extended reality display parameter may include enlarging the virtually displayed content and increasing the virtual distance of the virtually displayed content from the user (i.e., the virtual content appears to the user as moving away from the user while getting larger). As another example, if the user is changing their pose to a leaning forward pose (e.g., from a sitting pose or a laying down pose to the leaning forward pose), adjusting the at least one adjustable extended reality display parameter may include decreasing the virtual distance of the virtually displayed content from the user (i.e., the virtual content appears to the user as moving toward the user). In some embodiments, other extended reality display parameters may be adjusted along with changing the virtual size of the virtually displayed content and changing the virtual distance from the virtually displayed content or instead of changing the virtual size of the virtually displayed content and changing the virtual distance from the virtually displayed content. For example, a viewing angle of the virtual objects may be adjusted corresponding to the user's change in pose.

In some embodiments, when the detected specific environmental change includes an environmental movement, adjusting the at least one adjustable extended reality display parameter includes changing an opacity of the virtually displayed content. The specific environmental change may be due to a motion of the wearable extended reality appliance (for example, due to a user of the wearable extended reality appliance walking or being located in a moving vehicle) or to objects starting to move in the physical environment. For example, in response to a stationary environment changing to a moving environment (e.g., the user starts walking), adjusting the at least one adjustable extended reality display parameter may include decreasing the opacity of the virtually displayed content to permit the user to better view the physical environment without their view being obstructed by the virtual objects. As another example, in response to a moving environment changing to a stationary environment (e.g., the user stops walking), adjusting the at least one adjustable extended reality display parameter may include increasing the opacity of the virtually displayed content to permit the user to better view the virtually displayed content and possibly obstructing the user's view of the physical environment. In some embodiments, other extended reality display parameters may be adjusted along with the opacity change or instead of the opacity change. For example, a size and/or a position of the virtually displayed content may be adjusted.

In some embodiments, when the detected specific environmental change includes kinesis of a user of the wearable extended reality appliance, adjusting the at least one adjustable extended reality display parameter may include decreasing an opacity of the virtually displayed content. The term kinesis may include any one or more of: walking, running, changing of a physical location of the user, or initiation of the walking, running, or changing of the physical location. In some embodiments, decreasing the opacity of the virtually displayed content permits the user of the wearable extended reality appliance to better view the physical environment and safely move in the physical environment while being able to view the virtual content. In some embodiments, other extended reality display parameters may be adjusted along with the opacity change or instead of the opacity change. For example, a size of the virtually displayed content may be reduced (i.e., one of more virtual screens of the virtually displayed content may be shrunk). As another example, the virtually displayed content may be moved away from a direction of movement of the user.

In some embodiments, when the detected specific environmental change includes a cessation of kinesis by a user of the wearable extended reality appliance, adjusting the at least one adjustable extended reality display parameter may include increasing an opacity of the virtually displayed content. For example, when the user of the wearable extended reality appliance stops moving, the opacity of the virtually displayed content may be increased to permit better viewing of the virtually displayed content and may at least partially obstruct the user's view of the physical environment. In some embodiments, the opacity may be returned to a prior state (e.g., to the opacity setting prior to when the kinesis began). In some embodiments, other extended reality display parameters may be adjusted along with the opacity change or instead of the opacity change. For example, a size of the virtually displayed content may be enlarged or returned to a size of the virtually displayed content prior to when the kinesis began. As another example, if the virtually displayed content was previously moved away from a direction of movement of the user, the virtually displayed content may be moved back into a field of view of the user or may be moved to be more centered within the field of view of the user.

In some embodiments, if the virtually displayed content includes audio, virtually displaying the content may include causing the wearable extended reality appliance to output the audio, and implementing the specific rule may include adjusting at least one of a volume associated with the output of the audio or a virtual location of an audio source associated with the output of the audio. Audio associated with the virtual content may be output by the wearable extended reality appliance via speakers. By way of example, speakers 453 or other output device connected to output interface 450, as shown in FIG. 4, may output audio. In some embodiments, adjusting the volume associated with the output of the audio may include decreasing the volume of the audio or muting the audio, to enable the user to react to or respond to the detected environmental change. In some embodiments, adjusting the virtual location of the audio source may include, for example, moving the virtual location of the audio to a side of the user opposite a side of the user where the detected environmental change is occurring. For example, if an external noise is detected to the left side of the user, the virtual location of the audio may be adjusted to be on the right side of the user such that the user may listen to the external noise that caused the environmental change while continuing to listen to the audio associated with the displayed virtual content.

In some embodiments, there may be an additional group of rules that may be implemented to adjust the at least one adjustable extended reality display parameter regardless of any other settings or parameters associated with the wearable extended reality appliance (e.g., an emergency group of rules). In some embodiments, the emergency group of rules may override the do-not-disturb mode. In some embodiments, the level of the do-not-disturb mode may be selectable to permit implementation of all rules from the emergency group of rules or only certain rules from the emergency group of rules. In some embodiments, the emergency group of rules may not be overridden by the user.

For example, if it is detected that an object in the physical environment is moving toward the user or if the user is moving in the physical environment toward an object, a rule from the emergency group of rules may be implemented to clear the extended reality display and/or the extended reality environment of all virtual content (or of all virtual content of a particular type) such that the user may clearly see the physical environment and may avoid a collision with the object. For example, the opacity of the virtually displayed content may be reduced to a low level to permit the user to clearly see the physical environment through the wearable extended reality appliance. As another example, all of the virtual screens may be shrunk or moved out of the field of view of the user to permit the user to clearly see the physical environment through the wearable extended reality appliance. As another example, an audio alert may be output to the user of the wearable extended reality appliance via speakers 453 or other output device connected to output interface 450, as shown in FIG. 4.

As another example, the user may set a rule in the emergency group of rules to be alerted if an incoming communication is received from a particular individual. When the incoming communication is received from the particular individual, the communication may be displayed in the extended reality environment in front of any other virtual objects that may be in the extended reality environment, and the display parameters associated with the other virtual objects may be adjusted to permit the user to focus their attention on the incoming communication.

Figure 29A:
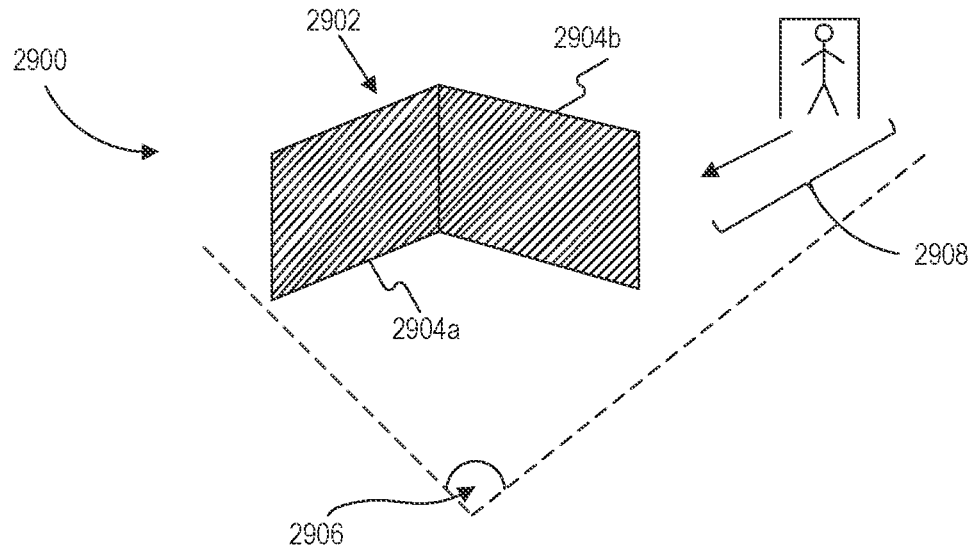
FIG. 29A is an exemplary schematic illustration of a wearable extended reality appliance being used prior to an environmental change, consistent with some embodiments of the present disclosure.
Figure 29B:
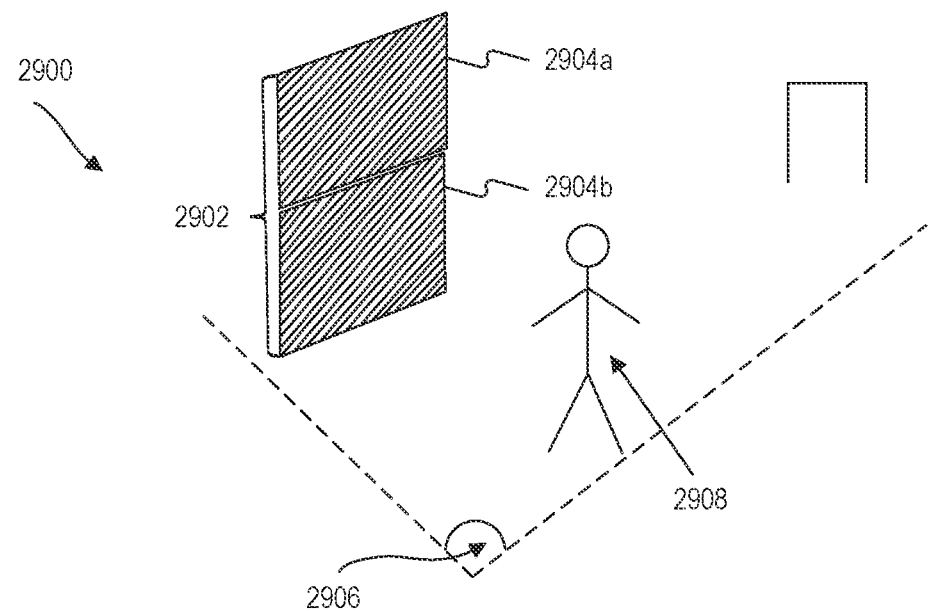
FIG. 29B is an exemplary schematic illustration of an adjustment of at least one extended reality display parameter implemented in response to an environmental change, consistent with some embodiments of the present disclosure.
Figure 29C:
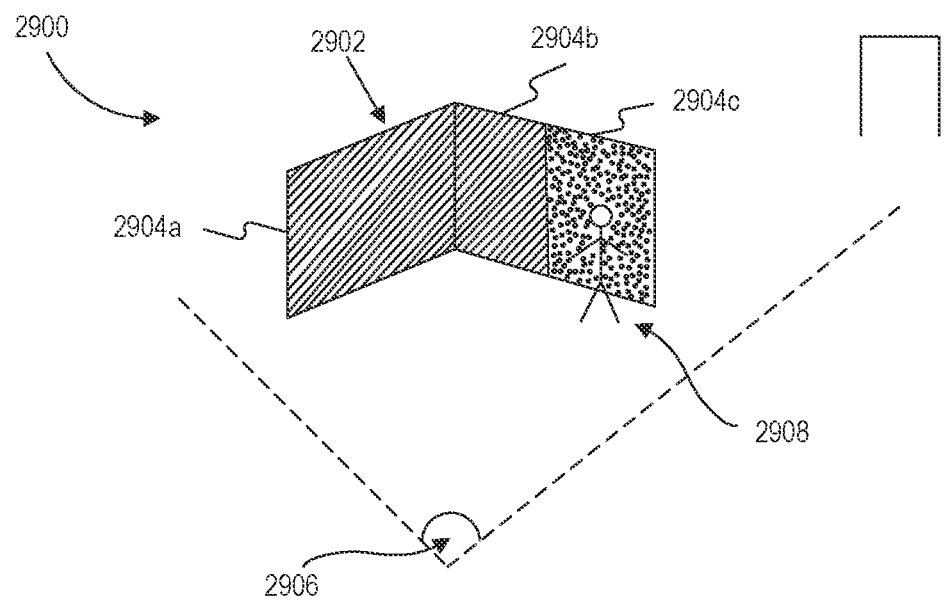
FIG. 29C is an exemplary schematic illustration of another adjustment of at least one extended reality display parameter implemented in response to an environmental change, consistent with some embodiments of the present disclosure.

FIG. 29A to 29C show an example from the perspective of a user wearing the wearable extended reality appliance and two example changes to the extended reality display and/or to the extended reality environment when an environmental change occurs. For purposes of illustration, the wearable extended reality appliance is not shown in FIGS. 29A to 29C. FIG. 29A represents a "before" situation, i.e., before the specific rule to adjust the at least one adjustable extended reality display parameter is implemented. FIGS. 29B and 29C represent two different examples of an "after" situation, i.e., after the specific rule to adjust the at least one adjustable extended reality display parameter is implemented.

FIG. 29A is an exemplary schematic illustration of the wearable extended reality appliance being used prior to an environmental change. An extended reality environment 2900 is shown to the user of the wearable extended reality appliance. The extended reality environment 2900 includes virtual content 2902 having one or more screens 2904. As shown in FIG. 29A, virtual content 2902 includes virtual screens 2904a and 2904b. In some embodiments, virtual content 2902 may include any number of virtual screens 2904. A field of view 2906 of an image sensor associated with the wearable extended reality appliance is shown by dashed lines in FIG. 29A. An environmental change 2908 (shown in FIG. 29A as a person entering a room where the user is located) occurs within field of view 2906.

FIG. 29B is an exemplary schematic illustration of a first example of an adjustment of at least one extended reality display parameter implemented in response to an environmental change. As shown in FIG. 29B, environmental change 2908 occurs within field of view 2906 near a location of the user (e.g., the person approaches the user. In some embodiments, the specific rule to adjust the at least one adjustable extended reality display parameter based on the specific environmental change may be implemented when environmental change 2908 occurs within field of view 2906.

In some embodiments, the specific rule to adjust the at least one adjustable extended reality display parameter based on the specific environmental change may be implemented when environmental change 2908 occurs within a predetermined distance from the user and not just when environmental change 2908 is detected within field of view 2906. For example, it may be possible to distinguish between an environmental change 2908 that occurs a distance from the user but within field of view 2906, such as if the person entered the same room as the user but moved along a portion of the room and not toward the user. While this movement may still be within field of view 2906, it may not be close enough to the user to cause the specific rule to be implemented.

When environmental change 2908 is located within field of view 2906 near the user's current physical location, the specific rule to adjust the at least one adjustable extended reality display parameter based on the specific environmental change may be implemented. As shown in FIG. 29B, when the specific rule is implemented, virtual screen 2904a may be displayed in a stacked formation on top of virtual screen 2904b (i.e., virtual screen 2904b may be moved from its original position on the right side of extended reality environment 2900 to the left side of extended reality environment 2900). By moving virtual screens 2904a and 2904b to the left side of extended reality environment 2900, the user may see and interact with the person without removing the wearable extended reality appliance.

FIG. 29C is an exemplary schematic illustration of a second example of an adjustment of at least one extended reality display parameter implemented in response to an environmental change. When environmental change 2908 is located within field of view 2906 near the user's current physical location, the specific rule to adjust the at least one adjustable extended reality display parameter based on the specific environmental change may be implemented. When the specific rule is implemented, virtual screens 2904a and 2904b may be displayed with their original opacity parameter while the opacity parameter of virtual screen 2904c may be reduced so that the user may see through virtual screen 2904c and may interact with the person without removing the wearable extended reality appliance.

In some embodiments, a first specific rule to adjust the at least one adjustable extended reality display parameter based on the specific environmental change may be implemented when environmental change 2908 occurs within field of view 2906, and a second specific rule to adjust the at least one adjustable extended reality display parameter based on the specific environmental change may be implemented if environmental change 2908 approaches the user's physical location (i.e., environmental change 2908 occurs within a predetermined distance from the user's physical location). For example, as shown in FIGS. 29A and 29C, the first rule may include changing the opacity of virtual screen 2904c to a first value when the person enters field of view 2906 (as shown in FIG. 29A) and the second rule may include changing the opacity of virtual screen 2904c to a second value when the person is close to the physical location of the user (as shown in FIG. 29C).

FIGS. 29A to 29C are an exemplary representation of two embodiments, and it is to be understood that some illustrated elements might be omitted and others added within the scope of this disclosure. Furthermore, other types of environmental changes 2908 and adjustments to the extended reality display and/or to the extended reality environment are contemplated. The specific type of environmental change and corresponding adjustments to the extended reality display and/or to the extended reality environment described in connection with FIGS. 29A to 29C should not be viewed as being limited to the specific examples described herein and are intended to be encompassed by the claims.

Some disclosed embodiments may relate to non-transitory computer readable medium containing instructions for selectively controlling display of virtual objects, the computer readable medium containing instructions that when executed by at least one processor cause the at least one processor to perform various steps. Non-transitory computer readable medium may refer to any type of physical memory on which information or data readable by at least one processor can be stored as discussed herein. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, a PROM, an EPROM, a FLASH-EPROM or any other flash memory, NVRAM, a cache, a register, any other memory chip or cartridge, and networked versions of the same. Selective control may refer to directing, manipulating, altering, operating or changing (for example a display) in a desired or predefined manner. A display may refer to any type of data representation that may be presented by an extended reality appliance to a user as discussed herein. The presented virtual content may include a virtual object, inanimate virtual object, animate virtual object configured to change over time or in response to triggers, virtual two-dimensional content, virtual three-dimensional content, a virtual overlay over a portion of a physical environment or over a physical object, a virtual addition to a physical environment or to a physical object, a virtual promotion content, a virtual representation of a physical object, a virtual representation of a physical environment, a virtual document, a virtual character or persona, a virtual computer screen, a virtual widget, or any other format for presenting information virtually. Consistent with the present disclosure, the display may include any visual presentation rendered by a computer or a processing device. In one embodiment, the display may include a virtual object that is a visual presentation rendered by a computer in a confined region and configured to represent an object of a particular type (such as an inanimate virtual object, an animate virtual object, virtual furniture, a virtual decorative object, virtual widget, or other virtual representation). The rendered visual presentation may change to reflect changes to a status object or changes in the viewing angle of the object, for example, in a way that mimics changes in the appearance of physical objects. In another embodiment, the virtually presented content may include a virtual computer screen (also referred to as virtual display herein) configured to present information.

Some disclosed embodiments may include virtually presenting a plurality of virtual objects in an environment via a wearable extended reality appliance operable in a first display mode and in a second display mode, wherein in the first display mode, positions of the plurality of virtual objects are maintained in the environment regardless of detected movements of the wearable extended reality appliance, and in the second display mode, the plurality of virtual objects move in the environment in response to detected movements of the wearable extended reality appliance. A plurality of objects may refer to two or more objects. An environment may refer to a surrounding, setting, context, or any other condition or conditions in which one or more objects are located. Some non-limiting examples of an environment may include an extended reality environment, an augmented reality environment, a mixed reality environment, and a virtual reality environment. A display mode may refer to any form of presentation. In a first display mode, information may be presented in one form, and in a second display mode, information may be presented in another form. The differing forms may, differ for example, in one or more of substance, animation, manner of presentation, or manner of interaction or alteration in response to inputs. A second display mode may be a display mode different from a first display mode. Virtual objects may be maintained in an environment in the sense that they may remain in the environment. For example, even if a user of a wearable extended reality appliance changes orientation, in some embodiments, virtual objects that were in the user's field of view prior to the orientation change may still remain in the user's field of view. Detected movement or movements of a wearable extended reality appliance may refer to a recognized change of position, orientation, or rotation of the wearable extended reality appliance. Non-limiting examples of such movement may include, for example, a user displacing the wearable extended reality appliance by one inch, one foot, one yard, or by any other distance; the user rotating the wearable extended reality appliance by 1°, 10°, 90°, 180°, 270°, 360°, or by any other angle; the user tilting any one side of the wearable extended reality appliance in any direction; or any other change in place, position, orientation, or rotation of the wearable extended reality appliance. The wearable extended reality appliance may be equipped with one or more sensors (e.g., an image sensor, an orientation sensor, or a motion sensor) for detecting movement of the wearable extended reality appliance.

Some embodiments may include virtually presenting a plurality of virtual objects (e.g., a virtual computer screen, a virtual widget, an animate virtual object; or an inanimate virtual object) in an environment (e.g., an extended reality environment) via a wearable extended reality appliance (e.g., smart glasses) operable in a first display mode (e.g., a matrix mode) and in a second display mode (e.g., a non-matrix mode). In a matrix mode, the locations of the plurality of virtual objects may remain unchanged regardless of a position of the user. In contrast, in a non-matrix mode, the locations of the plurality of virtual objects may follow the user as he or she moves. In some embodiments in the first display mode, positions of the plurality of virtual objects are maintained in the environment regardless of detected movements (e.g., a displacement) of the wearable extended reality appliance. In some embodiments in the second display mode, the plurality of virtual objects may move in the environment in response to detected movements of the wearable extended reality appliance. Positions of the plurality of virtual objects may refer to their location, place, orientation, or any other manner of arrangement. Non-limiting examples of positions of the plurality of virtual objects may include the plurality of virtual objects standing, sitting, or laying on a virtual or real surface or on another virtual object. For example, in the first display mode, two virtual objects may be positioned on top of a desk and one virtual object (e.g., a virtual screen) may be positioned vertically in front of a user. In some embodiments in the first display mode, the plurality of virtual objects may remain in these positions regardless detected movements of the wearable extended reality appliance. In other embodiments, the plurality of virtual objects may move with or adjacent to the user in response to detected movements of the wearable extended reality appliance.

Figure 30:
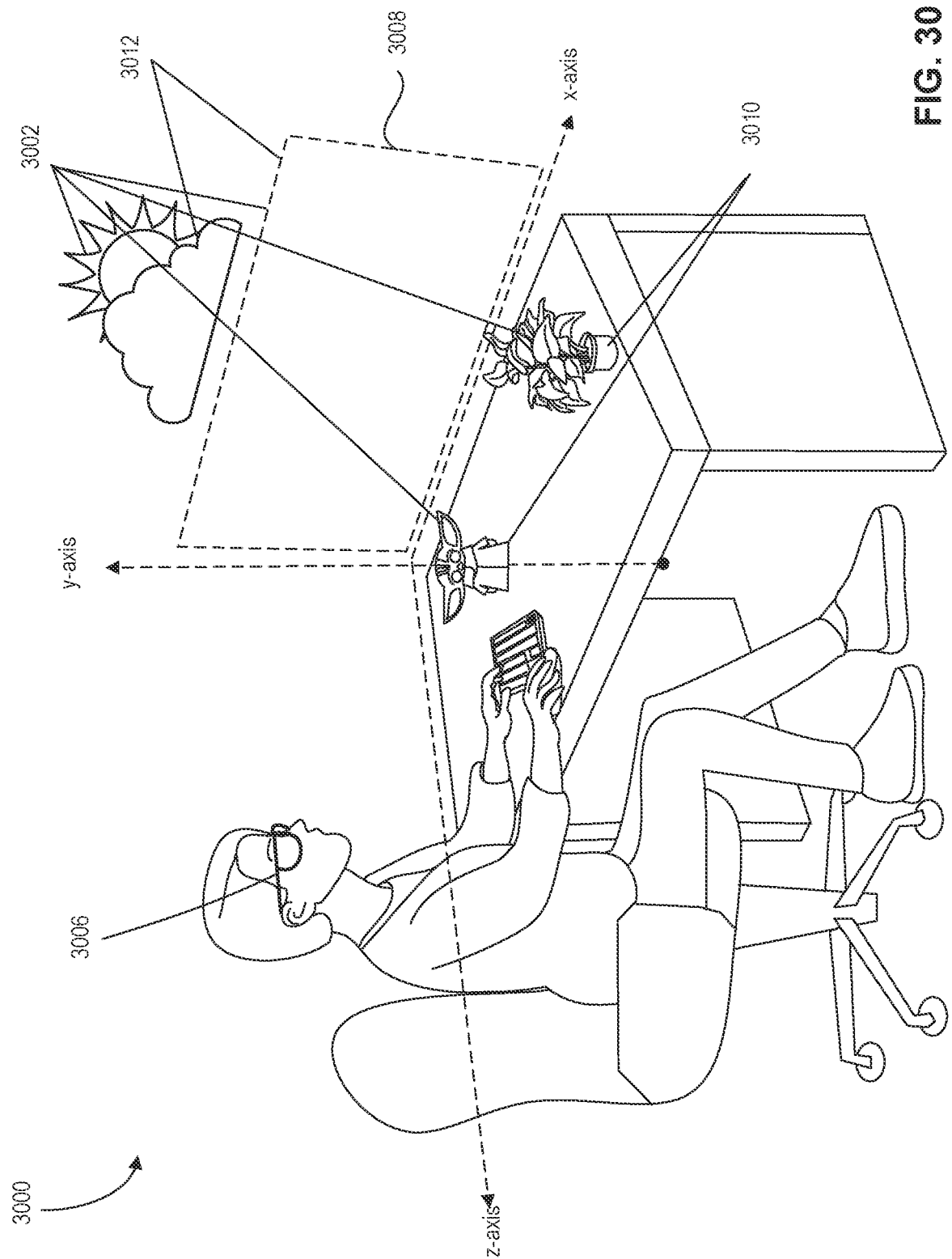
FIG. 30 illustrates an exemplary environment with a plurality of virtual objects and a wearable extended reality appliance, consistent with some embodiments of the present disclosure.
Figure 31A:
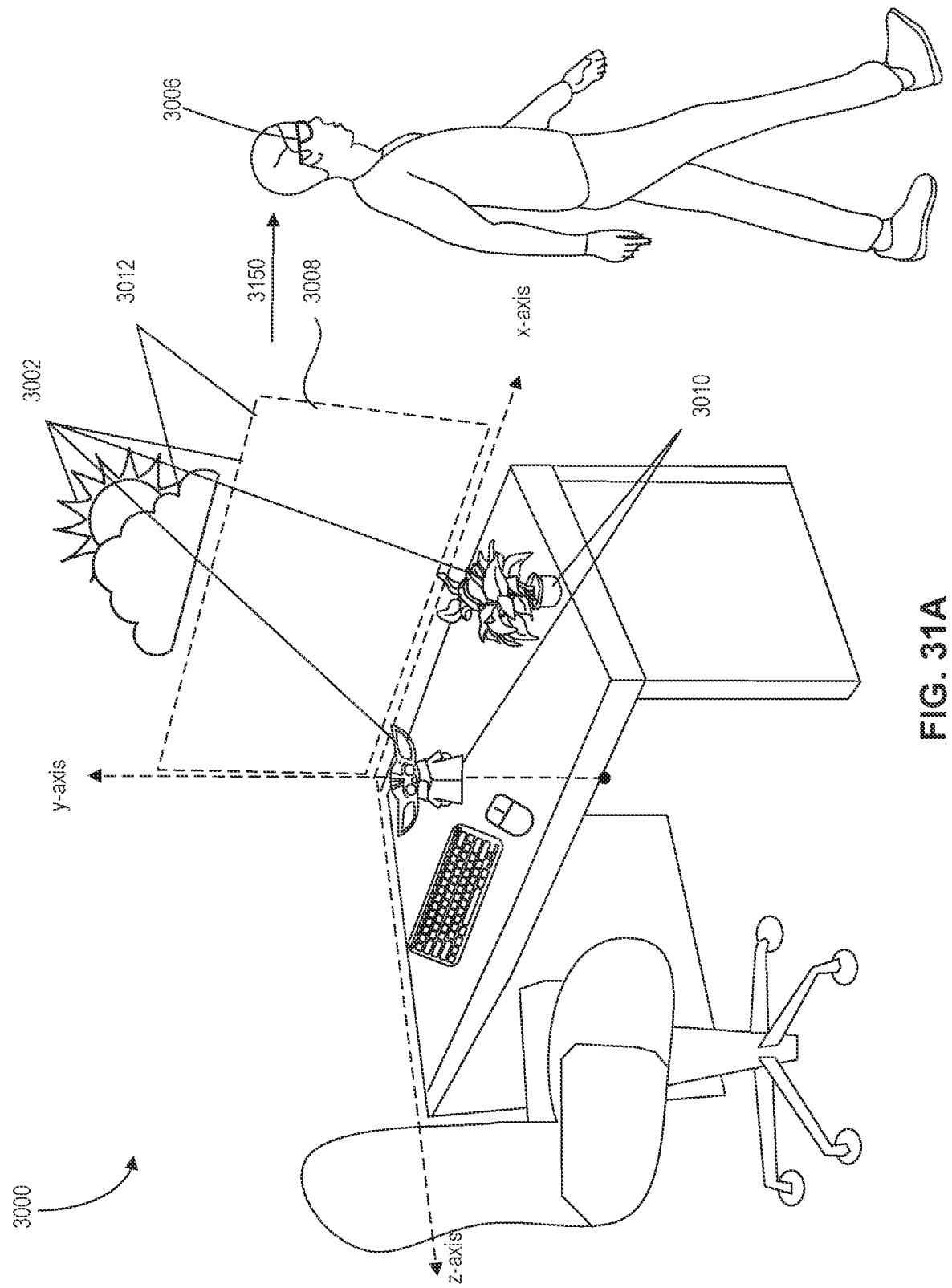
FIG. 31A illustrates an exemplary environment with a plurality of virtual objects in a first display mode, consistent with some embodiments of the present disclosure.
Figure 31B:
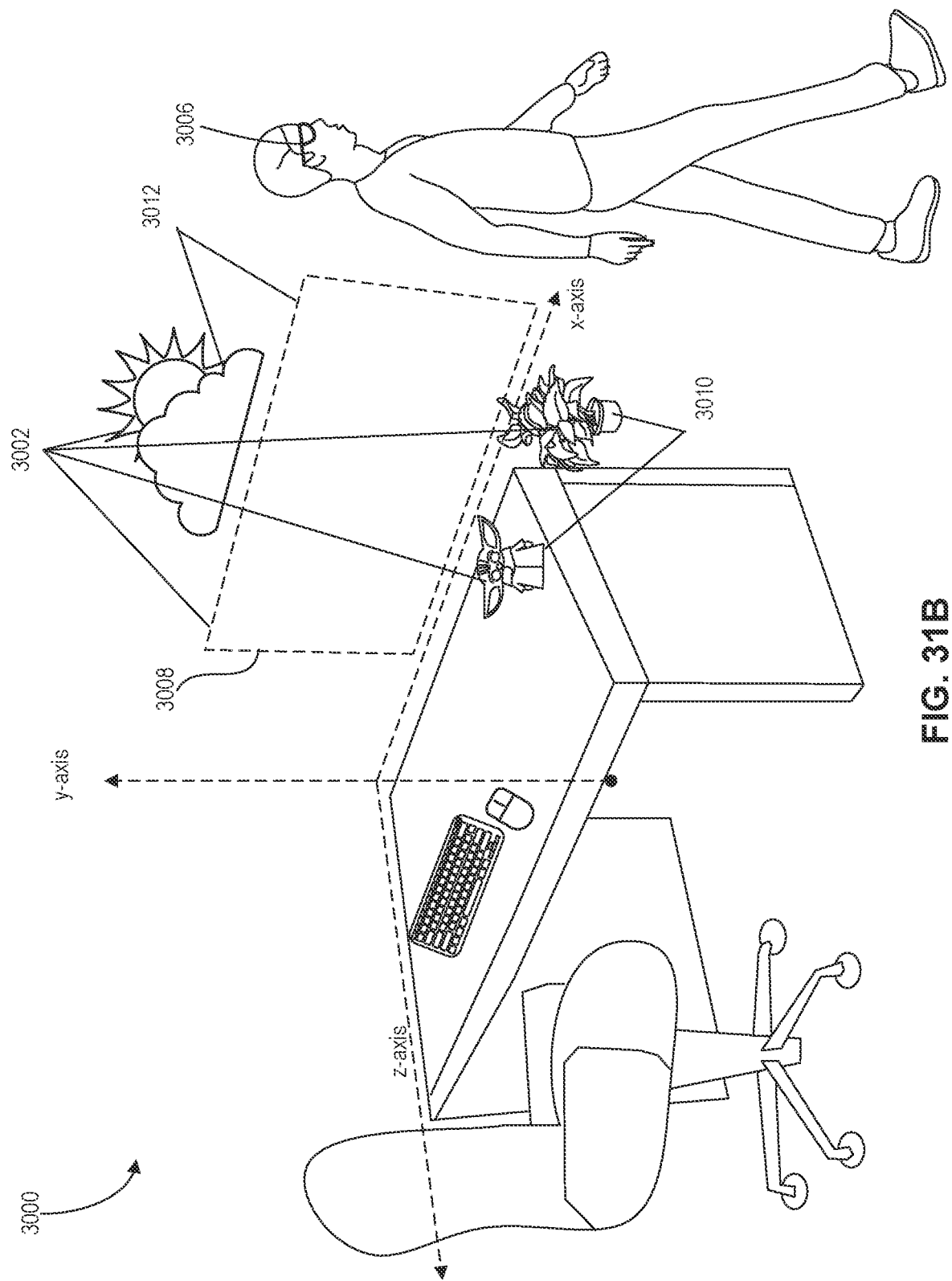
FIG. 31B illustrates an exemplary environment with a plurality of virtual objects in a second display mode, consistent with some embodiments of the present disclosure.

By way of example, FIG. 30 illustrates an exemplary environment 3000 including a plurality of virtual objects 3002 (e.g., a virtual computer screen 3008, a virtual widget, an animate virtual object, and an inanimate virtual object) and a wearable extended reality appliance 3006 (e.g., smart glasses). By way of example, FIG. 31A illustrates an exemplary environment 3000 wherein the plurality of virtual objects 3002 are in a first display mode. In the first display mode, positions of the plurality of virtual objects 3002 are maintained in the environment 3000 regardless of detected movements of the wearable extended reality appliance 3006. For example, the distances of the plurality of virtual objects relative to the origin of a Cartesian system may not change relative to the x, y, or z-axes. By way of example, FIG. 31B illustrates an exemplary environment 3000 wherein the plurality of virtual objects 3002 are in a second display mode. In the second display mode, the plurality of virtual objects 3002 have moved relative to their original positions (as shown in FIG. 31A) in the environment 3000 in response to detected movements of the wearable extended reality appliance 3006.

Consistent with some disclosed embodiments, the plurality of virtual objects presented via the wearable extended reality appliance may be positioned on one or more virtual planes. In one implantation, at least one or more virtual planes may be curved. A virtual plane may refer to a flat, level, horizontal, vertical, diagonal, uniform, or curved virtual surface such that (in the case of a non-curved plane) a straight line joining any two points on that virtual surface would wholly lie on that virtual surface. A curved virtual plane may refer to an arched, elliptical, rounded, or any other shaped surface that deviates from being a flat surface over some or all of its parts. Although points on the curved plane vary in three directions, since the curvature of the plane is known, within the scope of this disclosure, planes may include curved surfaces. Some non-limiting examples of a curved plane may include a plane curved inward (e.g., concave) or outward (e.g., convex). A plurality of virtual objects (e.g., a virtual computer screen, a virtual widget, an animate virtual object, and an inanimate virtual object) presented via a wearable extended reality appliance (e.g., smart glasses) may be positioned on one or more virtual planes (e.g., a horizontal virtual plane, a vertical virtual plane, or a curved plane). For example, two virtual objects may be positioned on a horizontal virtual plane (e.g., a surface of a desk) and a different virtual object (e.g., a virtual display screen) may be positioned on a vertical virtual plane in front of a user. At least one or more virtual planes (e.g., one virtual plane) may be curved (e.g., concave).

By way of example, FIG. 30 illustrates an exemplary environment 3000 including a plurality of virtual objects 3002 (e.g., a virtual computer screen 3008, a virtual widget, an animate virtual object, and an inanimate virtual object). A first set of virtual objects 3012 (e.g., the virtual computer screen 3008 and the virtual widget) are positioned on a virtual plane (e.g., a plane defined by the x-axis and the y-axis). A second set of virtual objects 3010 (e.g., the animate virtual object and the inanimate virtual object) are positioned on a virtual plane (e.g., a plane defined by the x-axis and z-axis).

Consistent with some embodiments, the plurality of virtual objects presented via the wearable extended reality appliance may include a first set of virtual objects presented on a substantially vertical surface and a second set of virtual objects presented on a substantially horizontal surface, and embodiments may further include determining a direction of the movement of the wearable extended reality appliance. A first set of virtual objects may refer to one group and a second set of virtual objects may refer to a second group. For example, a first set of virtual objects may include one or more virtual objects selected from all the virtual objects being presented via the wearable extended reality appliance. The second set of virtual objects may be wholly different from the first set or may include some or all of the virtual objects included in the first set.

A substantially vertical surface may refer to a surface that is predominantly, mostly, or wholly parallel to a direction of gravity. The first set of virtual objects may be presented on the substantially vertical surface. In the context of some embodiments, the term a substantially horizontal surface may refer to a surface that is predominantly, mostly, or wholly at an orthogonal to the direction of gravity. The second set of virtual objects may be presented on the substantially horizontal surface.

A direction of movement may refer to a bearing, trajectory, path, orientation, angle, or course of movement. Some non-limiting examples of a direction of movement may include a positive displacement along a coordinate axis; a negative displacement along a coordinate axis; a positive and/or negative displacement along more than one coordinate axes; or an angular rotation relative to one or more coordinate axes. In one example, determining a direction may refer to an establishing, deciding, calculating, or an ascertaining the direction of movement.

The plurality of virtual objects presented in a virtual environment may be divided into a first set of virtual objects and a second set of virtual objects. The first set of virtual objects may be presented on a vertical virtual plane in front of a user. The second set of virtual objects may be presented on a desk surface. Further, a direction of movement of the wearable extended reality appliance may be determined based on a displacement (e.g., change in position) along one or more of the coordinate axes.

By way of example, FIG. 30 illustrates an exemplary environment 3000 including a plurality of virtual objects 3002 (e.g., a virtual computer screen 3008, a virtual widget, an animate virtual object, and an inanimate virtual object). The plurality of virtual objects 3002 presented via a wearable extended reality appliance 3006 (e.g., smart glasses) may include a first set of virtual objects 3012 (e.g., the virtual computer screen 3008 and the virtual widget) on a substantially vertical surface (e.g., the plane defined by the x-axis and y-axis) and a second set of virtual objects 3010 (e.g., the animate virtual object and the inanimate virtual object) on a substantially horizontal surface (e.g. the plane defined by the x-axis and z-axis).

Some disclosed embodiments may include detecting a movement of the wearable extended reality appliance. Detecting movement involves ascertaining that a change of position and/or orientation has occurred. For example, the at least one processor may be configured to detect a displacement and/or rotation of the wearable extended reality appliance relative to a current position or orientation of the wearable extended reality appliance. In some embodiments, the wearable extended reality appliance may include at least one sensor (e.g., an image sensor, orientation sensor, or a motion sensor) capable of detecting changes in position and/or orientation of the wearable extended reality appliance. For example, an image sensor may take multiple images of the surroundings or environment associated with the wearable extended reality appliance and compare the images or pixels with one another using an ego-motion algorithm to detect movement (e.g., change in position or orientation). As another example, a motion sensor (e.g., an accelerometer) may be configured to detect a change in velocity, acceleration, or vibration associated with the wearable extended reality appliance to determine a change in position or orientation of the wearable extended reality appliance.

By way of example, FIG. 31A illustrates an exemplary environment 3000 including a wearable extended reality appliance 3006 (e.g., smart glasses). Detecting a movement 3150 of wearable extended reality appliance 3006 may include detecting a displacement (e.g., a displacement along both the x-axis and the y-axis) or change in orientation (e.g., relative to the x-, y-, and z-axis) of the wearable extended reality appliance 3006 from its prior position as shown in FIG. 30-1.

Some disclosed embodiments may include receiving a selection of the first display mode or the second display mode for use in virtually presenting the plurality of virtual objects while the wearable extended reality appliance moves. A selection of the first display mode may refer to a choice, pick or preference of the first display mode. Non-limiting examples of a selection may include a user-inputted selection (e.g., pressing a button or gazing at a button or other control), or a computer-generated selection (e.g., automatically choosing a mode based on specific circumstances). For example, some embodiments may include receiving a selection of the first display mode (e.g., the matrix mode) for use in virtually presenting a plurality of virtual objects (e.g., a virtual computer screen, a virtual widget, an animate virtual object, and an inanimate virtual object) while a wearable extended reality appliance (e.g., smart glasses) moves. In this example, in the first display mode, the positions of the plurality of virtual objects may be maintained without changing their positions in an environment. In another example, some embodiments may include receiving a selection of the second display mode (e.g., the non-matrix mode) for use in virtually presenting the plurality of virtual objects while the wearable extended reality appliance moves. In this example, in the second display mode, the positions of the plurality of virtual objects may move in the environment.

Some disclosed embodiments may include upon repositioning the at least one virtual object, receiving an additional input indicative of a selection of the second display mode. At least one virtual object may be repositioned from one virtual plane to a different virtual plane. Upon repositioning the virtual object, a wearable extended reality appliance may receive an input from a user via an input device indicating a selection of a second display mode in which the plurality of virtual objects move in response to detected movements of the wearable extended reality appliance. For example, input may be received from a keyboard by pressing a key, from a point device by moving the pointing device, from a touch pad by moving a finger or fingers on it, from verbal commands by speech to text translation, or via any other type of input device.

Further, after receiving the additional input indicative of the selection of the second display mode and in response to an additional detected movement of the wearable extended reality appliance, the one or more virtual planes and the different virtual plane may be moved in the environment consistent with the additional detected movement of the wearable extended reality appliance. Non-limiting examples of moving one or more virtual planes and a different virtual plane may include moving any vertical virtual plane along a coordinate axis to a different coordinate axis, moving any horizontal virtual plane to a vertical virtual plane, or moving any vertical virtual plane to a horizontal virtual plane. For example, after receiving an input from a user pressing a key on a keyboard indicating a selection of the second display mode and in response to a rotation of 100 of a wearable extended reality appliance, the one or more virtual planes and the different virtual plane may be moved. This movement may be consistent with the additional detected movement of the wearable extended reality appliance. For example, when the additional detected movement is a rotation of 100 from the x-axis towards the z-axis, the one or more virtual planes and the different virtual plane may move from the virtual plane formed with the x-axis and the y-axis to a virtual plane formed with the y-axis and the z-axis.

Some disclosed embodiments may further include moving the one or more virtual planes consistent with the detected movement of the wearable extended reality appliance when the selected display mode is the second display mode. For example, the one or more virtual planes and the different virtual plane may be moved. For example, when the additional detected movement of the wearable extended reality appliance includes a rotation of 100 from the x-axis towards the z-axis, the one or more virtual planes and the different virtual plane may move from the virtual plane formed with the x-axis and the y-axis to a virtual plane formed with the y-axis and the z-axis to be consistent.

Some disclosed embodiments may further include moving the first set of virtual objects based on the detected movement of the wearable extended reality appliance while maintaining a position of the second set of virtual objects when the selected display mode is the second display mode. For example, while in the second display mode, the first set of virtual objects may be moved based on a detected movement of a wearable extended reality appliance. The detected movement may be a positive displacement of the wearable extended reality appliance along the x-axis and the animate virtual object and the inanimate virtual object may also move by the positive displacement along the x-axis. Further, the positions of the second set of objects, may be fixed or maintained in the same position regardless of the positive displacement of the wearable extended reality appliance.

Figure 32:
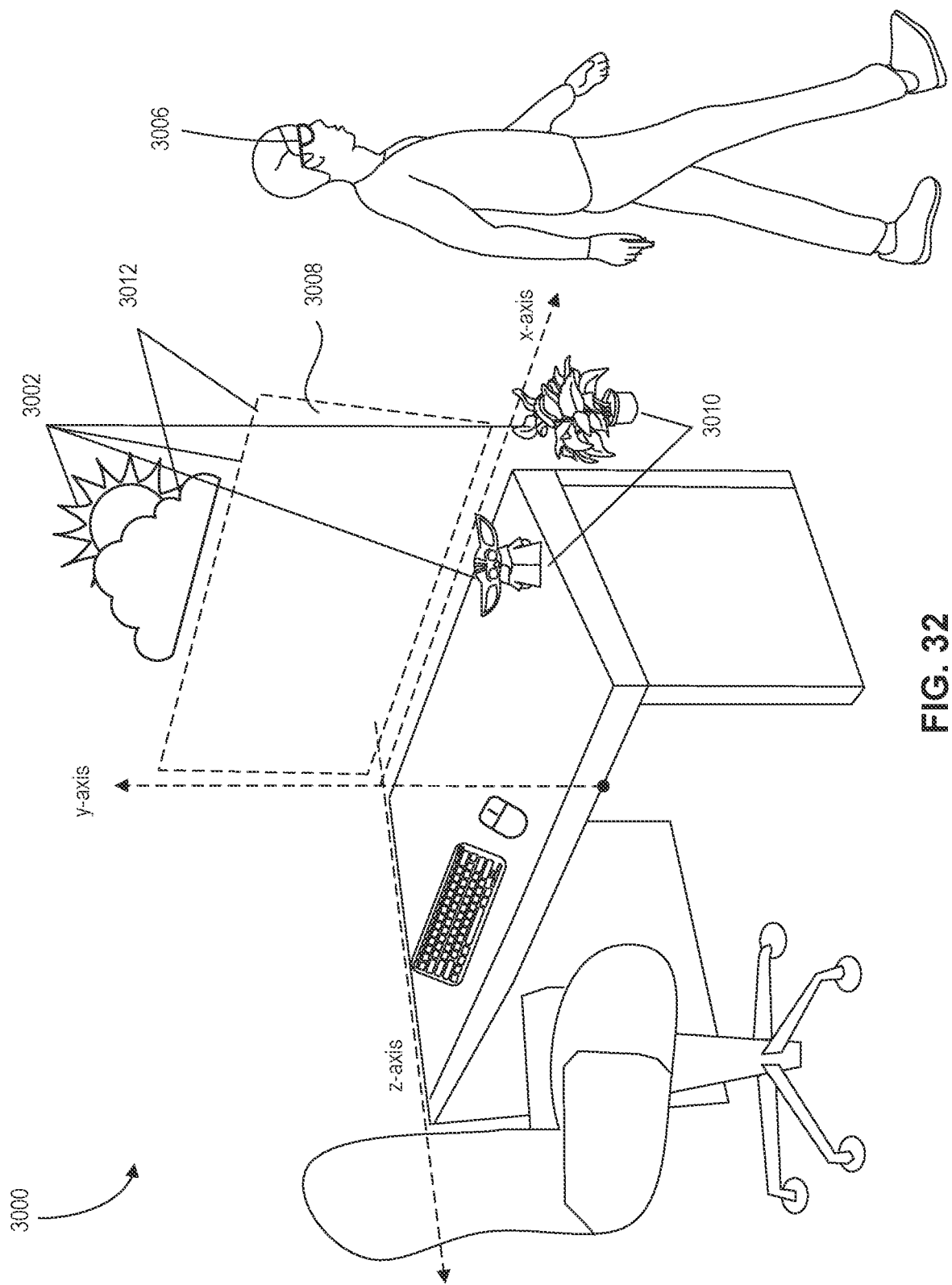
FIG. 32 illustrates an exemplary environment with a plurality of virtual objects, consistent with some embodiments of the present disclosure.

By way of example, FIG. 32 illustrates an exemplary environment 3000 with a set of virtual objects 3010 (e.g., an animate virtual object and an inanimate virtual object) and a different set of virtual objects 3012 (e.g., a virtual computer screen 3008 and a virtual widget). The set of virtual objects 3010 (e.g., the animate virtual object and an inanimate virtual object) may move by the same positive displacement along the x-axis as the detected positive displacement of a wearable extended reality appliance 3006 (e.g.; smart glasses) shown by the movement 3150 of the wearable extended reality appliance 3006. Further, the positions of the different set of virtual objects 3012 (e.g., the virtual computer screen 3008 and the virtual widget) may be fixed or maintained regardless of the positive displacement of the wearable extended reality appliance.

Some disclosed embodiments may further include rotating the first set of virtual objects while positions of the first set of virtual objects may be maintained based on the determined direction of the movement of the wearable extended reality appliance and maintaining the second set of virtual objects in a non-rotated state when the selected display mode is the first display mode. For example, a set of virtual objects (e.g., an animate virtual object and an inanimate virtual object) may be rotated by 90° The positions of the set of virtual objects may be maintained when the determined direction of the movement of a wearable extended reality appliance (e.g., smart glasses) is a positive displacement along the x-axis (e.g., indicating that a user has momentarily walked away from a work desk). In other examples, the positions of the set of virtual objects may not be maintained when the direction is not a positive displacement along the x-axis (e.g., indicating that the user is done working for the day). Additionally in some embodiments, a different set of virtual objects (e.g., a virtual computer screen and a virtual widget) may be maintained in a non-rotated state. Both steps may occur when a selected display mode is a first display mode. Alternatively, one or none of these steps may occur when the selected display mode is not in the first display mode.

Figure 33:
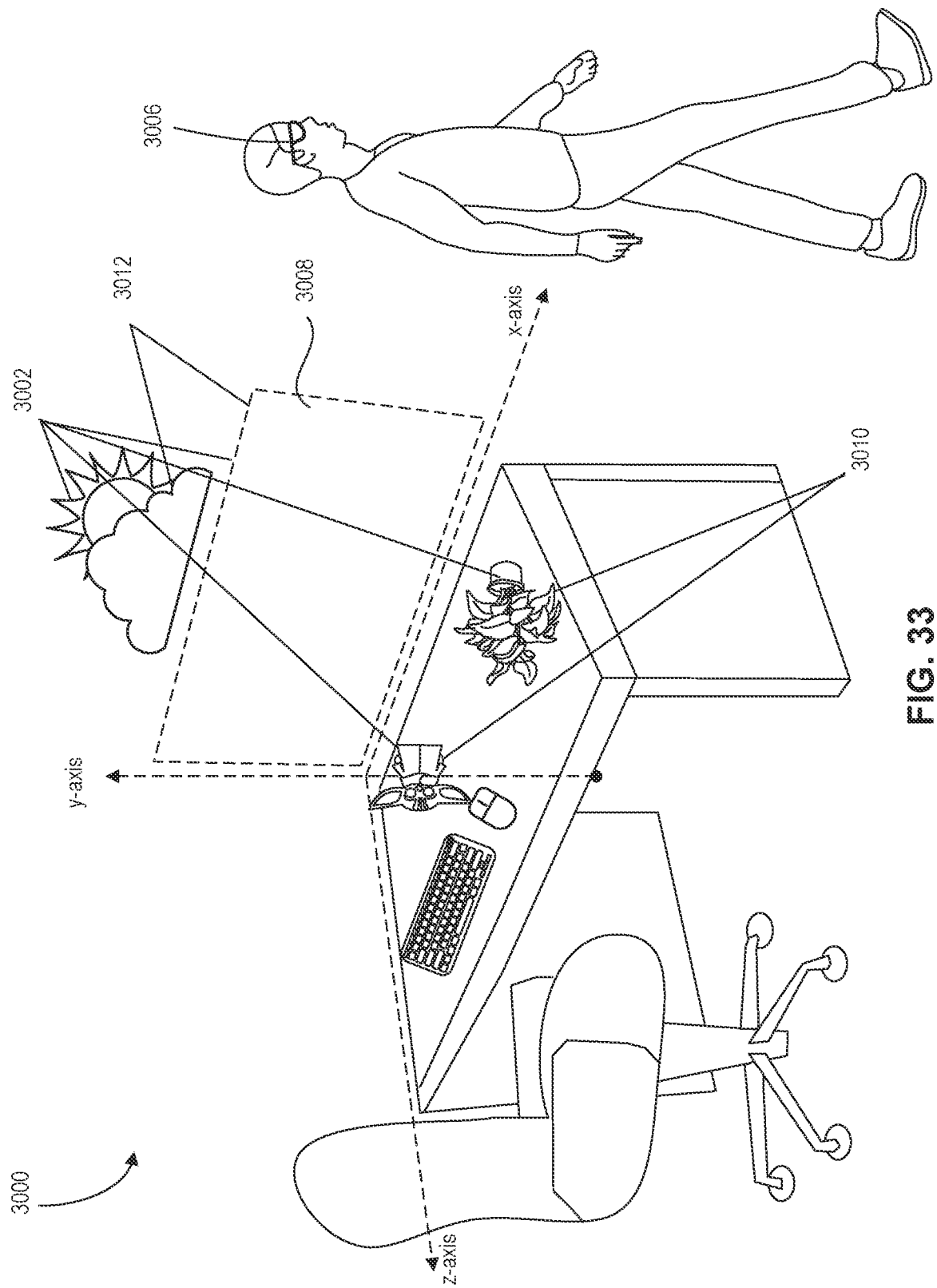
FIG. 33 illustrates an exemplary environment with a plurality of virtual objects, consistent with some embodiments of the present disclosure.

By way of example, FIG. 33 illustrates an exemplary environment 3000 with a set of virtual objects 3010 (e.g., an animate virtual object and an inanimate virtual object) and a different set of virtual objects 3012 (e.g., a virtual computer screen 3008 and a virtual widget). The set of virtual objects 3010 (e.g., an animate virtual object and an inanimate virtual object) may be rotated by 90°. The positions of the set of virtual objects 3010 may be maintained when the determined direction of the movement 3150 of a wearable extended reality appliance 3006 (e.g., smart glasses) is a positive displacement along the x-axis (e.g., indicating that a user has momentarily walked away from a work desk). Additionally in some embodiments, the different set of virtual objects 3012 (e.g., a virtual computer screen 3008 and a virtual widget) may be maintained in a non-rotated state.

Some disclosed embodiments may further include receiving input from a computing device connectable to the wearable extended reality appliance, and the selection of the first display mode or the second display mode may be based on the received input. Non-limiting examples of a computing device may include a laptop; a phone, a computer, a desktop computer, or a tablet. For example, a computing device may receive input by an input device such as a press of a key on a keyboard, a click by a mouse, a rotation of a joystick, a rotation of a trackball, an image from an image sensor, a scanner, a bar code reader, a biometric sensor, or a microphone. These non-limiting examples may be wirelessly and/or physically connectable or attachable to a wearable extended reality appliance (e.g., smart glasses). The term based on, with regards the selection of the display mode, may refer to deciding or determining a choice partially, a part of, or wholly in relation to the received input. For example, some embodiments may further include receiving input where a user presses a key on a keyboard wirelessly connectable to the wearable extended reality appliance, and a selection of a first display mode (e.g., a matrix mode) or a second display mode (e.g., a non-matrix mode) may be based on the received input. For example, when the user presses "1" on the keyboard, the selection of the first display mode is received. Alternatively, when the user presses "2" on the keyboard, the selection of the second display mode is received. Although a keyboard is one example, a user may provide inputs using one or more other input devices as discussed above.

Some disclosed embodiments may further include receiving image data from an image sensor included in the wearable extended reality appliance, and the selection of the first display mode or the second display mode may be based on an analysis of the received image data. For example, some embodiments may further include receiving image data from a camera included in the wearable extended reality appliance (e.g., smart glasses), and the selection of the first display mode (e.g., a matrix mode) or the second display mode (e.g., a non-matrix mode) may be based on the analysis of the received image data, for example using a gesture recognition algorithm to identify a gesture indicative of the selection. By way of one example, the selection based on the analysis of the received image data may include an analysis of received image data revealing that a user has moved twenty feet away and thus the second display mode may be selected. As another example, the analysis of received image data may reveal that the user has not moved at all and thus the first display mode may be selected. In another example, the image data may be analyzed to determine whether other people are present in a vicinity of the user of the wearable extended reality appliance, and the selection may be based on whether other people are present or not (for example, a selection of the first display mode may be avoided when other people are present). In yet another example, the image data may be analyzed to determine a layout of a space (such as a room) around the wearable extended reality appliance, and the selection may be based on layout (for example, avoiding a selection of the first display mode when the space is small).

Some disclosed embodiments may further include receiving audio data from a microphone included in the wearable extended reality appliance or in a computing device connectable to the wearable extended reality appliance, and the selection of the first display mode or the second display mode may be based on an analysis of the received audio data. Audio data refers to information derived from sound signals. Audio data, may, for example, represent sound or may be derivatives of sound. Non-limiting examples of audio data may include files in wave format, mp3 format, or WMA format. Or audio data might be information derived from a sound file such as a pattern or sound signature. A microphone may refer to an instrument for converting sound waves into electrical energy variations which may then be amplified, transmitted, or recorded. Examples of microphones may include dynamic microphones, condenser microphones, and ribbon microphones. Either such a microphone or a processor that receives sound signals from the microphone may process the sound digitally. A microphone may be included in a wearable extended reality appliance (e.g., smart glasses) or in a computing device wirelessly connectable to the wearable extended reality appliance, and a selection of a first display mode (e.g., a matrix mode) or a second display mode (e.g., a non-matrix mode) may be based, at least in part, on an analysis of received audio data. By way of an example, a selection based on the analysis of received audio data may include a voice recognition analysis of received audio data revealing that a user said "Select the second display mode." In response, the second display mode may be selected. As another example, the analysis of received audio data may reveal that the user has said "Select the first display mode." in response, the first display mode may be selected.

Some disclosed embodiments may further include determining a value of at least one parameter characterizing the movement of the wearable extended reality appliance, and the selection of the first display mode or the second display mode may be based on the determined value of the at least one parameter. A value may refer to a quantity or quality that is assigned or is determined by calculation or measurement. A parameter may refer to any of a set of properties whose values determine the characteristics or behavior of something. Such properties may include, for example, a change in position or orientation of the wearable extended reality appliance, a change in velocity or acceleration of the wearable extended reality appliance, no change in position, orientation, velocity, or acceleration, a change in more than one of position, orientation, velocity, and acceleration.

By way of example, some embodiments may include determining the value of at least one parameter characterizing a movement (e.g., a rotation of 5°) of a wearable extended reality appliance (e.g., smart glasses). A selection of a first display mode (e.g., a matrix mode) or a second display mode (e.g., a non-matrix mode) may be based (e.g., partially) on the determined value of the at least one parameter. Non-limiting examples of the selection based on the determined value of the at least one parameter may include a selection of the first display mode when the determined value is positive or a selection of the second display mode when the determined value is negative. For example, a positive rotation of the wearable extended reality appliance may be characterized as a selection of the first display mode. Alternatively, a negative rotation of the wearable extended reality appliance may be characterized as a selection of the second display mode.

Consistent with some embodiments, the at least one parameter may include at least one of a distance, a velocity, an acceleration, or a direction. Distance may refer to a length, size, space, span, width, or any amount of space between two things. Some non-limiting examples may include a distance of one millimeter, one inch, one foot, or any other distance. In the context of some disclosed embodiments, the term velocity may refer to a rate of change of a position with respect to a frame of reference. Some non-limiting examples of velocity may be 2 meters per second to the north, 5 meters per second to the east, or 2 meters per second to the south. Acceleration may refer to a rate of change of a velocity of an object with respect to time. Some non-limiting examples of acceleration may be 2 meters per second squared, 5 meters per second squared, or 1 meter per second squared. Direction may refer to a course along which someone or something moves. For example, the at least one parameter may include a positive displacement of a wearable extended reality appliance (e.g., smart glasses) along the x-axis by two meters, a velocity of 1 meter per second along the x-axis, an acceleration of 0.1 meters per second squared along the x-axis, and a positive direction along the x-axis.

Some disclosed embodiments may further include selecting the first display mode when the determined value of the at least one parameter is greater than a threshold. Alternatively, other embodiments may further include selecting the second display mode when the determined value of at least one parameter is less than the threshold. A threshold may refer to a reference or limit value, or level, or a range of reference or limit values or levels. In operation, when a determined value of at least one parameter exceeds the threshold (or is below it, depending on a particular use case), the at least one processor may select a first display mode and, when the determined value of at least one parameter is less than the threshold (or above it, depending on the particular use case), the at least one processor may select a second display mode. The value of the threshold may be predetermined or may be dynamically selected based on various considerations. Some non-limiting examples of the threshold may include a positive displacement of a wearable extended reality appliance (e.g., smart glasses) along the x-axis by ten meters, a velocity of 10 meters per second along the x-axis, an acceleration of 1 meter per second squared along the x-axis, and a positive direction along the x-axis. When the at least one parameter is a positive displacement of the wearable extended reality appliance along the x-axis by two meters, a velocity of 1 meter per second along the x-axis, an acceleration of 0.1 meters per second squared along the x-axis, and a negative direction along the x-axis then the steps select a first display mode. Alternatively, the steps do not select the first display mode.

In response to the selected display mode, some embodiments may include outputting for presentation via the wearable extended reality appliance display signals configured to present the plurality of virtual objects in a manner consistent with the selected display mode. A presentation may include, for example, portraying, depicting, or rendering subject matter, matter, material, or substance that may be computer-generated, computerized, simulated, digital, or generated using software instructions. At least one processor may be configured to transmit display signals to cause a display device to present text, one or more pictures, a screenshot, a media clip, or other textual or graphical subject matter. Display signals may include, for example, analog or digital electrical signals that may cause a display device to present content in the form of a virtual or digital representation. The virtual or digital representation may include, for example, one or more still or moving images, text, icons, video, or any combination thereof. The graphical presentation may be two-dimensional, three-dimensional, holographic, or may include various other types of visual characteristics. For example, in response to a selected display mode, a wearable extended reality appliance (e.g. smart glasses) may be configured to output display signals configured to present a plurality of virtual objects (e.g., a virtual computer screen, a virtual widget, an animate virtual object, and an inanimate virtual object) in a manner consistent with the selected display mode. By way of example, when a first display mode (e.g., a matrix mode) is selected, the wearable extended reality appliance may output signals that may present the plurality of virtual objects in a fixed position in an environment regardless of detected movements of the wearable extended reality appliance. By way of another example, when a second display mode (e.g., a non-matrix mode) is selected, the wearable extended reality appliance may output signals that may present the plurality of virtual objects in a moved position in the environment in response to detected movements of the wearable extended reality appliance.

By way of example, FIG. 30 illustrates an exemplary environment 3000. In response to a selected display mode, the wearable extended reality appliance 3006 (e.g., smart glasses) may output display signals configured to present a plurality of virtual objects 3002 (e.g., a virtual computer screen 3008, a virtual widget, an animate virtual object, and an inanimate virtual object) in a manner consistent with the selected display mode. For example, in FIG. 31A the plurality of virtual objects 3002 are presented in the selected display mode, a first display mode (e.g., a matrix mode) in which virtual objects 3002 do not move even when the wearable extended reality appliance 3006 moves. As another example, in FIG. 31B, the plurality of virtual objects 3002 are presented in the selected display mode, a second display mode (e.g., a non-matrix mode) in which the plurality of virtual objects 3002 move when the wearable extended reality appliance 3006 moves.

Some disclosed embodiments may include detecting an input for repositioning at least one virtual object of the plurality of virtual objects on a different virtual plane when the selected mode is the first display mode. Some examples of receiving an input may include receiving activation of a button, a key, a keyboard, a computer mouse, a touchpad, a touchscreen, a joystick, or another mechanism from which input may be received. For example, in some embodiments, a user may provide one or more inputs by pressing one or more keys of a keyboard. As another example, a user may provide one or more inputs by changing a position of a joystick by linear or rotational motion of the joystick. By way of another example, a user may provide one or more inputs by performing one or more gestures (e.g., pinch, zoom, swipe, or other finger movements) while touching a touchscreen. In yet another example, a user may provide one or more inputs with hand gestures. Repositioning may refer to a change, adjustment, or alteration in place, position, or orientation of an object. For example, a user may press one or more keys of a keyboard for repositioning at least one virtual object. The user may wish to reposition the at least one virtual object by displacing the virtual object to a different virtual plane. The keyboard may generate a signal in response to the user pressing a key. At least one processor associated with a wearable extended reality appliance and/or another processor associated with some embodiments may receive the signal and detect the pressing of a key based on that signal.

By way of example, FIG. 36 illustrates an exemplary environment 3000 with a first set of virtual objects 3012 (e.g., the virtual computer screen 3008 and the virtual widget) and a second set of virtual objects 3010 (e.g. the animate virtual object and the inanimate virtual object). For example, a user may press a black key on a keyboard 3414 for repositioning at least one virtual object on a different plane. FIG. 36 illustrates the first set of virtual objects 3012 repositioned to a different virtual plane formed by the y-axis and the z-axis from a virtual plane formed by the x-axis and y-axis as illustrated in FIG. 31A.

Consistent with some embodiments, the plurality of virtual objects presented via the wearable extended reality appliance may include at least one virtual object docked to a physical object, and embodiments may further include determining a direction of the movement of the wearable extended reality appliance. The docking to the physical object may refer to an action of connecting a device or object to another device or object either virtually or physically. Non-limiting examples of docking may include virtually connecting a virtual computer screen to a physical keyboard or virtually connecting a virtual computer screen to both a physical keyboard and a physical joystick. For example, a plurality of virtual objects (e.g., a virtual computer screen, a virtual widget, an animate virtual object, and an inanimate virtual object) via a wearable extended reality appliance (e.g., smart glasses) may include a virtual computer screen docked wirelessly to a keyboard. Further, in some embodiments a direction of a movement of the wearable extended reality appliance may be determined as discussed above.

Figure 34:
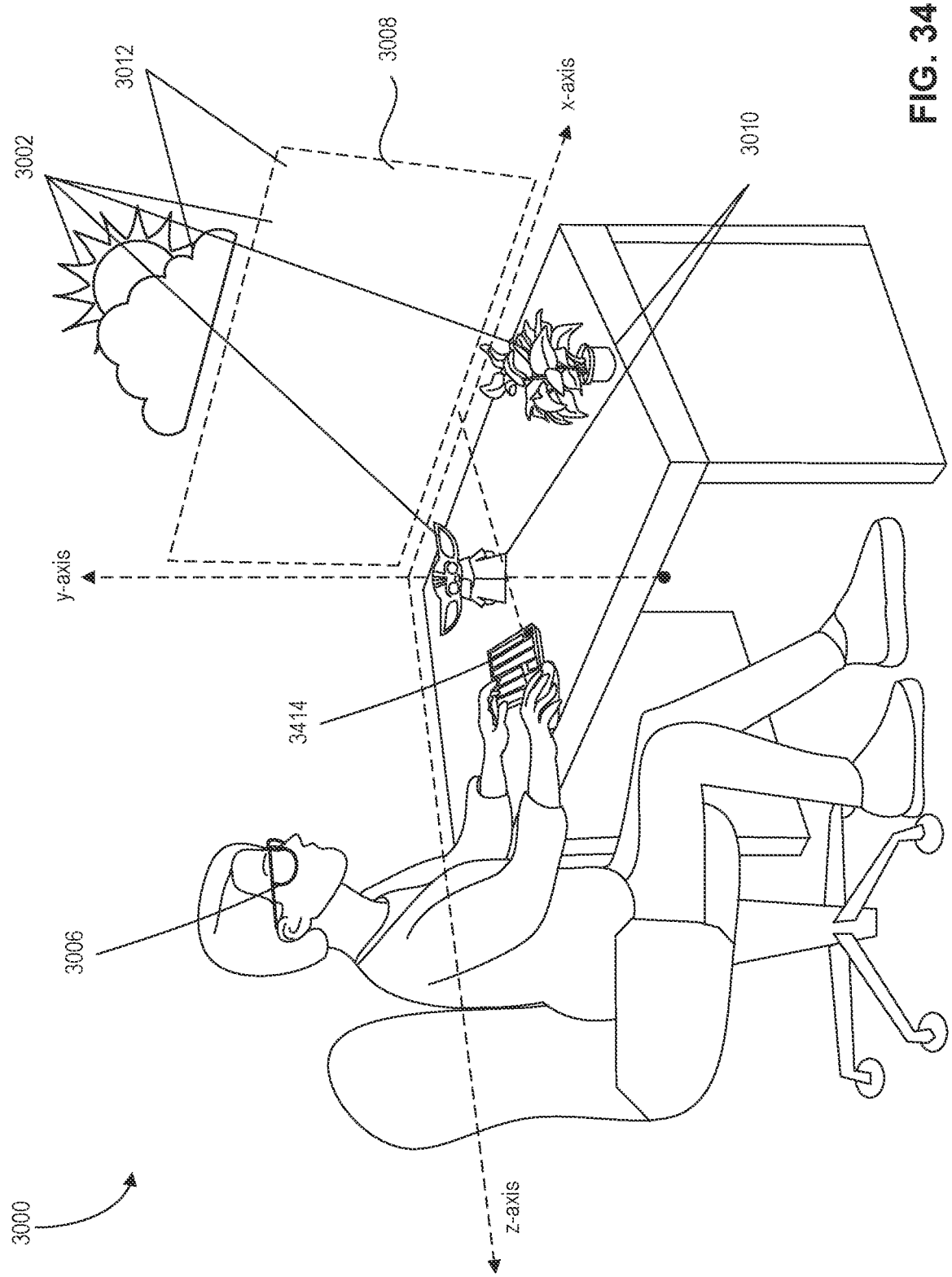
FIG. 34 illustrates an exemplary environment with a plurality of virtual objects and at least one virtual object docked to a physical object, consistent with some embodiments of the present disclosure.

By way of example, FIG. 34 illustrates an exemplary environment 3000. In some embodiments, a plurality of virtual objects 3002 (e.g., a virtual computer screen 3008, a virtual widget, an animate virtual object, and an inanimate virtual object) presented via a wearable extended reality appliance 3006 (e.g., smart glasses) may include the virtual computer screen 3008 wirelessly docked to a physical object (e.g., a keyboard 3414). Further, embodiments may determine a direction of a movement 3150 of the wearable extended reality appliance 3006.

Some disclosed embodiments may further include rotating virtual objects other than the at least one virtual object docked to the physical object while positions of the rotating virtual objects may be maintained based on the determined direction of the movement of the wearable extended reality appliance when the selected display mode is the first display mode. As discussed above, one or more virtual objects may be docked to a physical object. In some embodiments, when a selected display mode is a first display mode (e.g., a matrix mode), the one or more docked virtual objects may not be moved when the physical object is moved from one position or orientation to another position or orientation. For example, when a physical object such as a keyboard is rotated by 90°, virtual objects that are not docked with the keyboard may be rotated by 90°. In contrast, the positions and orientations of one or more virtual objects that are docked to the keyboard may not be changed when the keyboard is rotated by 90°.

By way of example. FIG. 33 illustrates an exemplary environment 3000. As illustrated in FIG. 33 virtual objects 3010 may be rotated by 90° while virtual computer screen 3008 wirelessly docked to a physical object (e.g., a keyboard 3414) may not be rotated. Relative positions of the rotated virtual objects 3010 may be maintained based on a determined direction of a movement 3150 of a wearable extended reality appliance 3006 (e.g., smart glasses) when a selected display mode is a first display mode (e.g., a matrix mode).

Some disclosed embodiments may further include moving the virtual objects other than the at least one virtual object docked to the physical object based on the detected movement of the wearable extended reality appliance when the selected display mode is the second display mode. As discussed above, one or more virtual objects may be docked to a physical object. In some embodiments, when a selected display mode is a second display mode (e.g., a non-matrix mode), the one or more docked virtual objects may not be moved based on a detected movement of the wearable extended reality appliance. Instead, the one or more virtual objects that are not docked to the physical object may be moved in the direction of movement of the wearable extended reality appliance.

Figure 35:
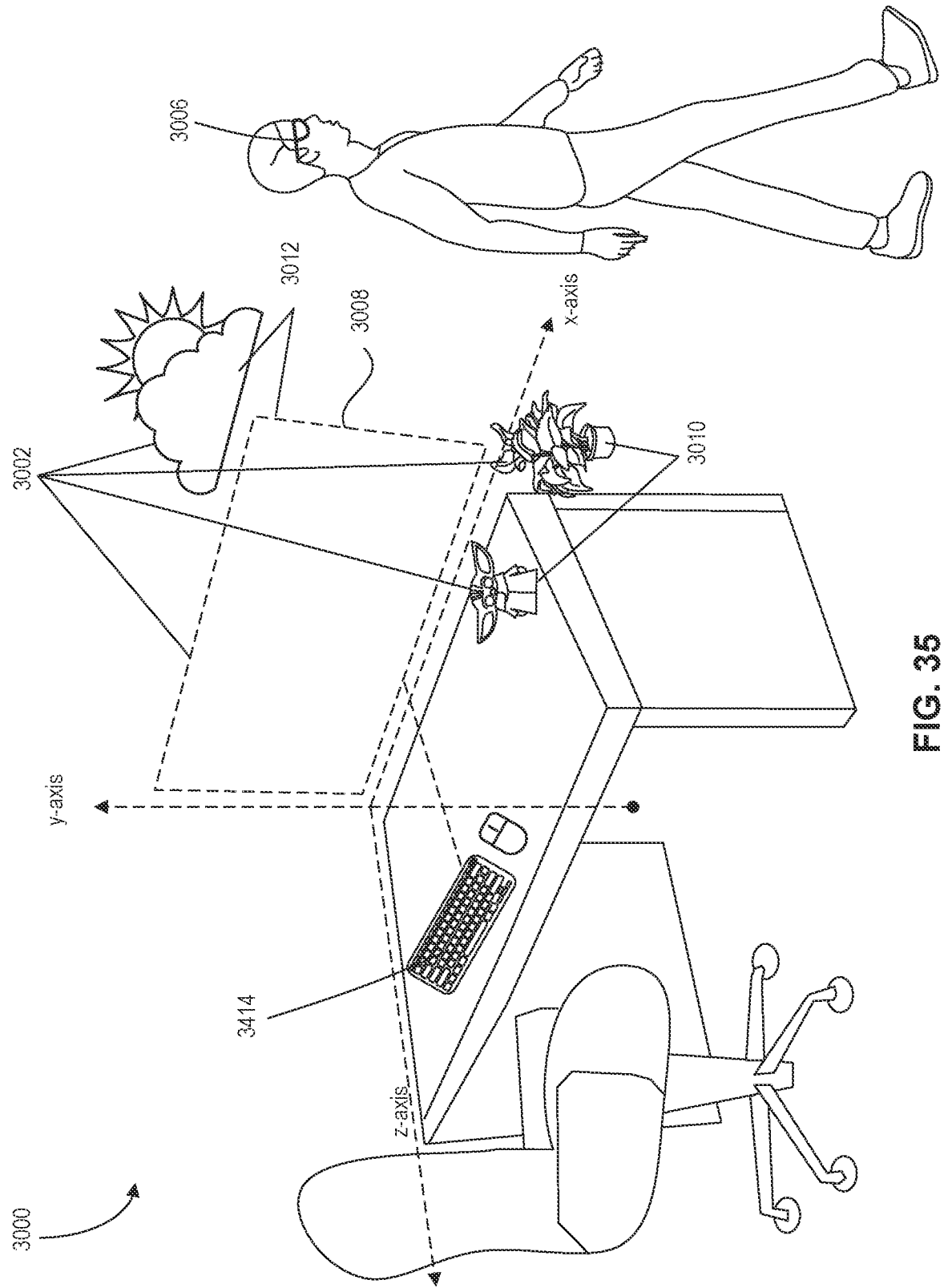
FIG. 35 illustrates an exemplary environment with a plurality of virtual objects, consistent with some embodiments of the present disclosure.

By way of example, FIG. 35 illustrates an exemplary environment 3000. In some embodiments, a plurality of virtual objects 3002 (e.g. a virtual computer screen 3008, a virtual widget, an animate virtual object, and an inanimate virtual object) may be presented via a wearable extended reality appliance 3006 (e.g., smart glasses). The virtual computer screen 3008 may be docked to a physical object (e.g., a keyboard 3414). In the second display mode (e.g., a non-matrix mode), when a movement 3150 of the wearable extended reality appliance 3006 is detected, the one or more virtual objects 3010 (e.g.; an animate virtual object and an inanimate virtual object) that are not docked with to the physical object may be moved in the direction of movement 3150 of the wearable extended reality appliance 3006. However, the virtual computer screen 3008 docked to the physical object may not be moved based on a detected movement 3150 of the wearable extended reality appliance 3006.

Consistent with some embodiments, a particular virtual object of the plurality of virtual objects may present an output of a software application, and when the selected display mode is the first display mode: (i) receiving an indication of an event associated with the software application and (ii) in response to the event, outputting for presentation via the wearable extended reality appliance second display signals configured to present at least the particular virtual object in a manner consistent with the second display mode. An output may refer to sending a signal to a wearable extended reality appliance or to any display device. A software application may refer to a computer program designed to carry out a specific task other than one relating to the operation of a computer itself, typically to be used by end-users. Non-limiting examples of software application may include Microsoft Word, spreadsheets, VLC media player, Google Chrome, a video game, an app, or any other software program or module that performs a function. An indication may refer to any visual or auditory sign, mark, signal, or other sign or piece of information that signifies something. An event may refer to an occurrence in connection with a software application. Non-limiting examples of events may include presenting a virtual task pane on a virtual computer screen, a virtual animate object moving or outputting audio, a virtual inanimate object changing color, a virtual widget app presented as a type of weather (e.g., a sun, a cloud, rain, thunder, or snow). Other non-limiting examples may include a received notification or message, an incoming call or video call, or an alarm sounding. For example, a virtual computer screen included in a plurality of virtual objects (e.g., the virtual computer screen, a virtual widget, an animate virtual object, and an inanimate virtual object) may present an output of a software application (e.g., Google Chrome). Additionally, when a selected display mode is a first display mode (e.g., a matrix mode) a virtual task pane may be presented on the virtual computer screen. Further, and in response to the event, display signals configured to present at least the particular virtual object in a manner consistent with a second display mode (e.g., a non-matrix mode) may be output for presentation via a wearable extended reality appliance (e.g., smart glasses). For example, to be consistent with the second display mode, the display signals may present at least the particular virtual object in a moved position.

When the selected display mode is the first display mode, some embodiments may include (i) receiving image data from an image sensor included in the wearable extended reality appliance, (ii) analyzing the image data to identify a physical event, and (iii) in response to the physical event, outputting for presentation via the wearable extended reality appliance second display signals configured to present at least one of the plurality of virtual objects in a manner consistent with the second display mode. A physical event may refer, for example, to a person entering an environment, a person approaching a user, the user or another person walking through the environment, the user leaving a predetermined space (such as a room), change to illumination conditions in the environment of the user, and so forth. For example, when a selected display mode is a first display mode (e.g.; a matrix mode), image data from a camera included in a wearable extended reality appliance (e.g., smart glasses) may be received. The image data may be analyzed using, for example, one or more image processing algorithms, to identify a person entering the environment. In response to the physical event (e.g., detecting the person entering the environment), the wearable extended reality appliance may output for presentation second display signals configured to present at least one of the plurality of virtual objects (e.g., a virtual computer screen) in a manner consistent with the second display mode (that is, causing the plurality of virtual objects to move in the environment in response to detected movements of the wearable extended reality appliance), and in some examples, the outputting of other display signals may be halted (such as the outputting of the display signals configured to present the at least one of the plurality of virtual objects in a manner consistent with the first display mode). In some examples, the image data may be analyzed to determine a property of the physical event. Further, in response to a first determined property of the physical event, second display signals configured to display at least one of the plurality of virtual objects in a manner consistent with the second display mode may be outputted for presentation via the wearable extended reality appliance, an in response to a second determined property of the physical event, outputting the second display signals may be withheld and/or avoided. In some examples, a machine learning model may be trained using training examples to identify properties of physical events from images and/or videos. An example of such training example may include a sample image and/or a sample video of a sample physical event, together with a label indicating a property of the sample physical event. The trained machine learning model may be used to analyze the image data and determine the property of the physical event. In some examples, a convolution of at least part of the image data may be calculated to obtain a result value of the calculated convolution. In one example, in response to a first result value of the calculated convolution, a first property of the physical event may be determined, an in response to a second result value of the calculated convolution, a second property of the physical event may be determined, the second property may differ from the first property. In some examples, the physical event may include a person entering the environment of the user, the property of the physical event may be whether or not the person is using a wearable extended reality appliance, and the image data may be analyzed using a binary visual classifier to classy it to one or two classes, 'person using a wearable extended reality appliance' or 'person not using a wearable extended reality appliance', and thereby determine the property. In some examples, the physical event may include a person entering the environment of the user, the property of the physical event may be an identity of the person, and the image data may be analyzed using a face recognition algorithm to determine identity of the person.

According to another embodiment of the present disclosure, a method for selectively controlling display of virtual objects may be provided. Consistent with some embodiments, the method may include virtually presenting a plurality of virtual objects in an environment via a wearable extended reality appliance operable in a first display mode and in a second display mode, wherein in the first display mode, positions of the plurality of virtual objects are maintained in the environment regardless of detected movements of the wearable extended reality appliance, and in the second display mode, the plurality of virtual objects moves in the environment in response to detected movements of the wearable extended reality appliance. The method may further include detecting a movement of the wearable extended reality appliance. The method may additionally include receiving a selection of the first display mode or the second display mode for use in presenting the plurality of virtual objects while the wearable extended reality appliance moves. The method may include outputting for presentation via the wearable extended reality appliance display signals configured to present the plurality of virtual objects in a manner consistent with the selected display mode in response to the display mode selection.

Figure 37A:
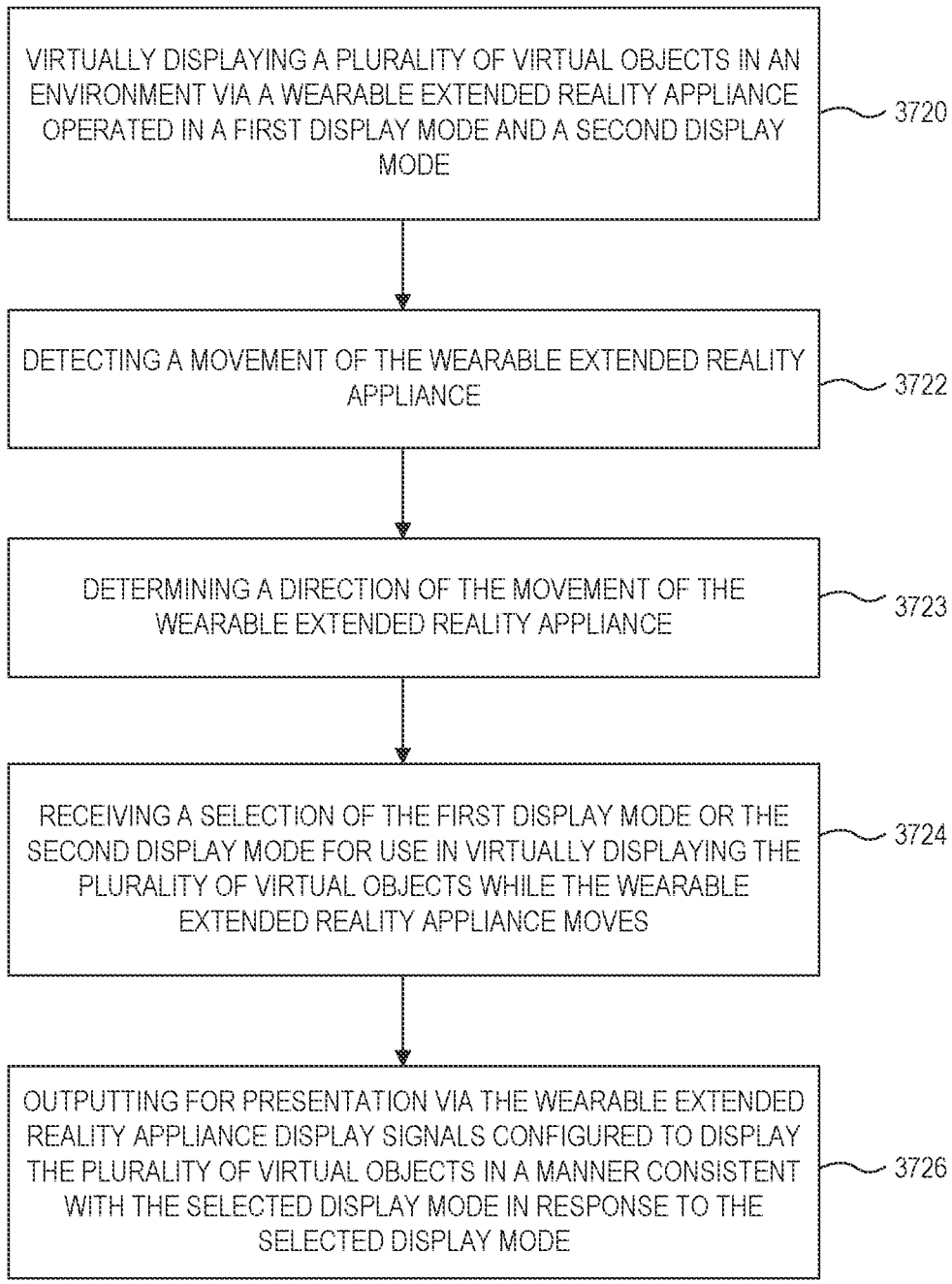
FIG. 37A illustrates an exemplary method for selectively controlling a display of virtual objects, consistent with some embodiments of the present disclosure.

FIG. 37A illustrates an exemplary method 3700 for selectively controlling display of virtual objects. Method 3700 may be performed by one or more or more processors (e.g., 360, 460, or 560) associated with input unit 202 (see FIG. 3), XR unit 204 (see FIG. 4), and/or remote processing unit 208 (see FIG. 5). The steps of the disclosed method 3700 may be modified in any manner, including by reordering steps and/or inserting or deleting steps. Method 3700 may include a step 3720 of virtually presenting a plurality of virtual objects 3002 (e.g., a virtual computer screen 3008, a virtual widget, an animate virtual object, and an inanimate virtual object) in an environment 3000 via a wearable extended reality appliance 3006 (e.g., smart glasses) operable in a first display mode and in a second display mode. In some embodiments in the first display mode, positions of the plurality of virtual objects 3002 are maintained in the environment 3000 regardless of detected movements of the wearable extended reality appliance 3006. In some embodiments in the second display mode, the plurality of virtual objects 3002 moves in the environment 3000 in response to detected movements of the wearable extended reality appliance 3006. Method 3700 may include a step 3722 of detecting a movement 3150 of the wearable extended reality appliance 3006. Method 3700 may include a step 3724 of receiving a selection of the first display mode or the second display mode for use in presenting the plurality of virtual objects 3002 while the wearable extended reality appliance 3006 moves. Method 3700 may include a step 3726 of outputting for presentation via the wearable extended reality appliance 3006 display signals configured to present the plurality of virtual objects 3002 in a manner consistent with the selected display mode in response to the display mode selection. Method 3700 may further include a step 3722 of determining a direction (e.g., positive displacement along the x-axis) of a movement 3150 of the wearable extended reality appliance 3006.

According to another embodiment of the present disclosure, a system for selectively controlling display of virtual objects may be provided. Consistent with some embodiments, the system may include at least one processor. The at least one processor may be configured to virtually present a plurality of virtual objects in an environment via a wearable extended reality appliance operable in a first display mode and in a second display mode, wherein in the first display mode, positions of the plurality of virtual objects are maintained in the environment regardless of detected movements of the wearable extended reality appliance, and in the second display mode, the plurality of virtual objects moves in the environment in response to detected movements of the wearable extended reality appliance. The at least one processor may be configured to detect a movement of the wearable extended reality appliance. The at least one processor may also be configured to receive a selection of the first display mode or the second display mode for use in presenting the plurality of virtual objects while the wearable extended reality appliance moves. The at least one processor may further be configured to output for presentation via the wearable extended reality appliance display signals configured to present the plurality of virtual objects in a manner consistent with the selected display mode in response to the display mode selection.

Figure 37B:
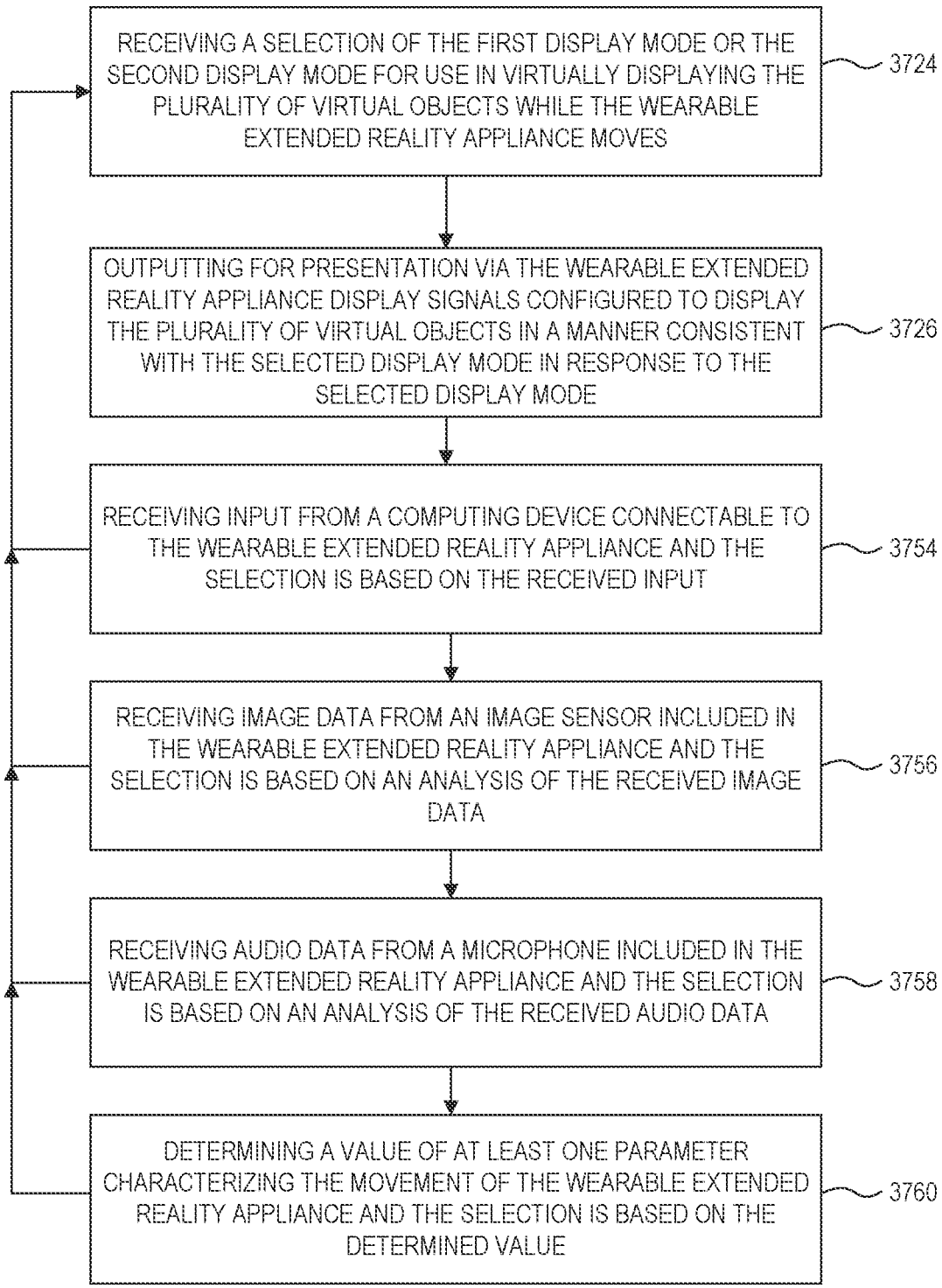
FIG. 37B illustrates an exemplary method for selectively controlling a display of virtual objects, consistent with some embodiments of the present disclosure.

FIG. 37B illustrates another exemplary method 3750 for selectively controlling display of virtual objects. Method 3750 may be performed by one or more or more processors (e.g., 360, 460, or 560) associated with input unit 202 (see FIG. 3), XR unit 204 (see FIG. 4), and/or remote processing unit 208 (see FIG. 5). The steps of the disclosed method 3750 may be modified in any manner, including by reordering steps and/or inserting or deleting steps. Method 3750 may include a step 3754 of receiving input from a computing device connectable to a wearable extended reality appliance 3006, and the selection may be based on the received input. For example, and input may be received where a user presses a key on a keyboard wirelessly connectable to the wearable extended reality appliance 3006. Further, a selection of a first display mode or a second display mode may be based on the received input. For example, when the user presses "1" on the keyboard, the selection of the first display mode is received. Alternatively, when the user presses "2" on the keyboard, the selection of the second display mode is received. Method 3750 may include a step 3756 of receiving image data from an image sensor included in the wearable extended reality appliance 3006. Further, the selection of the first display mode or the second display mode may be based on an analysis of the received image data. For example, image data may be received from a camera included in the wearable extended reality appliance 3006 which reveals that a user has moved twenty feet away and thus the second display mode may be selected so that a plurality of virtual objects 3002 move with the user. Alternatively, image data may reveal that the user has not moved and thus the first display mode may be selected so that the plurality of virtual objects 3002 remain in their initial position and/or orientation. Method 3750 may include a step 3758 of receiving audio data from a microphone included in the wearable extended reality appliance 3006. Further, the selection of the first display mode or the second display mode may be based on an analysis of the received audio data. For example, the analysis may reveal that the user has said "Select the second display mode" and thus the second display mode may be selected. Alternatively, the analysis may reveal that the user has said "Select the first display mode" and thus the first display mode may be selected. Method 3750 may include a step 3760 of determining a value of at least one parameter characterizing the movement 3150 of the wearable extended reality appliance 3006. Further, the selection of the first display mode or the second display mode may be based on the determined value of the at least one parameter.

Figure 38:
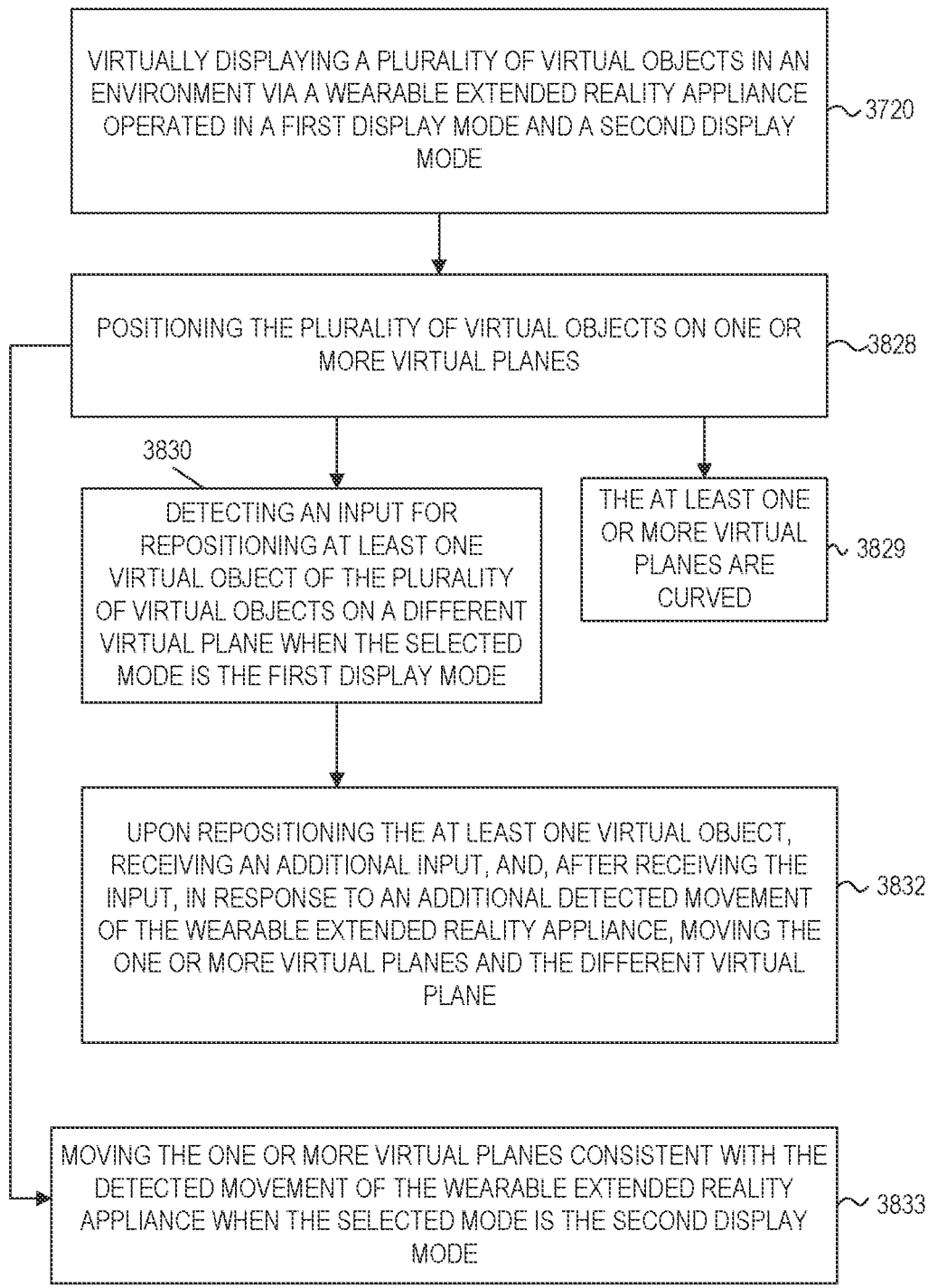
FIG. 38 illustrates an exemplary method for virtually presenting a plurality of virtual objects, consistent with some embodiments of the present disclosure.

FIG. 38 illustrates another exemplary method 3800 for selectively controlling display of virtual objects. Method 3800 may be performed by one or more or more processors (e.g., 360, 460, or 560) associated with input unit 202 (see FIG. 3), XR unit 204 (see FIG. 4), and/or remote processing unit 208 (see FIG. 5). The steps of the disclosed method 3800 may be modified in any manner, including by reordering steps and/or inserting or deleting steps. Method 3800 may include a step 3828 of positioning the plurality of virtual objects 3002 on one or more virtual planes. Further, method 3800 may include a step 3829 wherein the at least one or more virtual planes may be curved. Method 3800 may include a step of 3830 of detecting an input for repositioning at least one virtual object of a plurality of virtual objects 3002 on a different virtual plane as described herein. Method 3800 may include a step of 3832 of moving one or more virtual planes and a different virtual plane upon repositioning the at least one virtual object and after receiving an additional input as described herein. Method 3800 may include a step of 3833 of moving the one or more virtual planes consistent with a detected movement 3150 of the wearable extended reality appliance 3006 as described herein.

Figure 39:
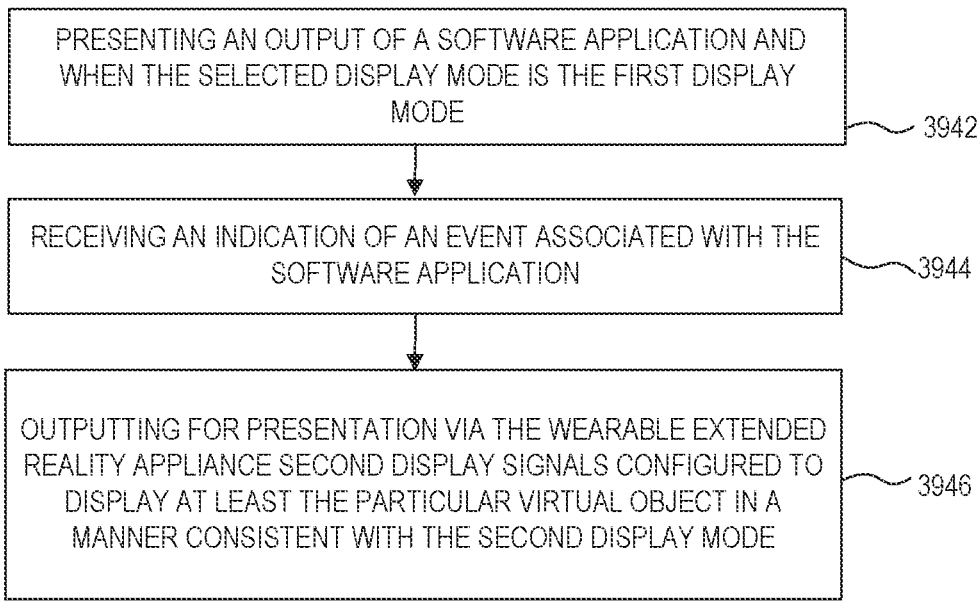
FIG. 39 illustrates an exemplary method wherein a particular virtual object of the plurality of virtual objects presents an output of a software application, consistent with some embodiments of the present disclosure.

FIG. 39 illustrates an exemplary method 3900 that may include a step 3942 wherein a particular virtual object (e.g., a virtual computer screen 3008 of a plurality of virtual objects 3002 (e.g. a virtual computer screen 3008, a virtual widget, an animate virtual object, and an inanimate virtual object) presents an output of a software application (e.g., Google Chrome). When a selected display mode is a first display mode (e.g., a matrix mode), method 3900 may include a step 3944 of receiving an indication of an event associated with the software application (e.g., presenting a virtual task pane on the virtual computer screen). When the selected display mode is the first display mode, method 3900 may include a step 3946 of outputting for presentation via a wearable extended reality appliance 3006 (e.g., smart glasses) second display signals configured to present at least the particular virtual object in a manner consistent with the second display mode in response to the event.

Figure 40:
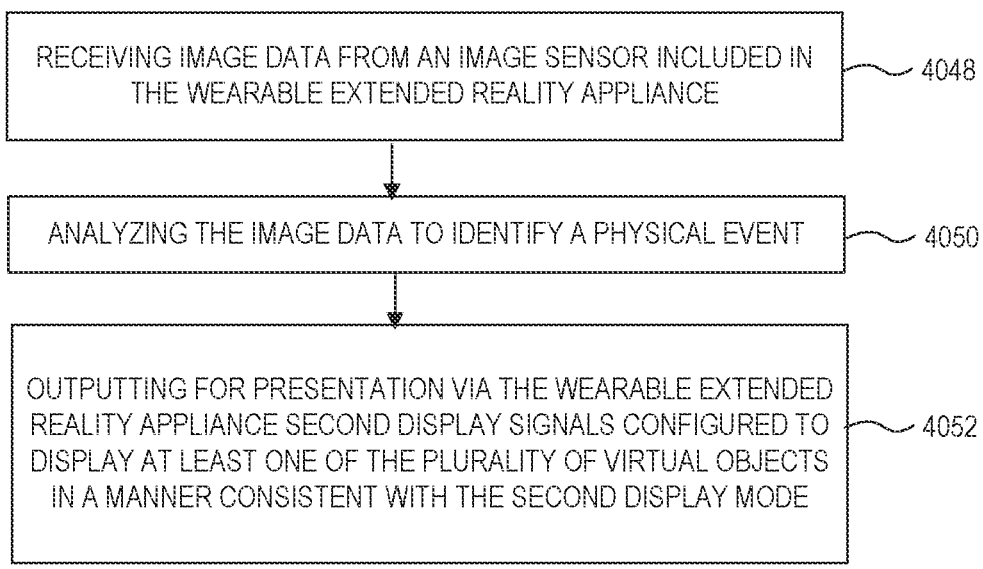
FIG. 40 illustrates an exemplary method wherein image data is received from an image sensor and is analyzed, consistent with some embodiments of the present disclosure.

FIG. 40 illustrates an exemplary method 4000 that may be configured to include a step 4048 of receiving image data from an image sensor included in a wearable extended reality appliance 3006 (e.g., smart glasses). Method 4000 may include a step 4050 of analyzing the image data to identify a physical event. Method 4000 may also include a step 4052 of outputting for presentation via the wearable extended reality appliance second display signals configured to present at least one of a plurality of virtual objects 3002 (e.g., a virtual computer screen 3008, a virtual widget, an animate virtual object, and an inanimate virtual object) in a manner consistent with a second display mode in response to the physical event.

Some disclosed embodiments may relate to moving a virtual cursor along two traversing virtual planes, including methods, systems, apparatuses, and non-transitory computer-readable media. A virtual cursor may include any visual indicator movable on an extended reality display and that may be affected by input from a user, for example, for showing a location of input or focus. Such a virtual cursor may take the form of an arrow, hand, icon, pointer, a wait cursor, an I-beam pointer, a mouse pointer, a text cursor, or any other object reflecting position or focus. A virtual cursor may be configured for one or more functions, such as selecting, moving, resizing, dragging, activating and/or triggering functionality, opening context window, drawing, writing, working in the background, being busy, being unavailable, indicating an area of focus, or any other desired function. A virtual cursor may have any desired size, shape, color, or visual effects such as blinking, having pointer tails, or having animations.

A virtual plane may include a two-dimensional object or area having length and breadth. The plane may be flat, curved, or may assume any other shape. A plane may be considered virtual if it is employed in connection with an extended reality display or an extended reality environment, regardless of whether the plane is visible. Specifically, a plane may be displayed in color or with texture so that it may be visible to a wearer of an extended reality appliance, or the plane may be invisible to the eye, but might become perceptible when visible objects are located in the plane. In one example, a virtual plane may be illustrated with virtual grid lines in an extended reality environment. A virtual plane may include, for example, a flat surface, a non-flat surface, a curved surface, or a surface having any other desired configuration. In some examples, a virtual plane may have a particular size, such as 0.5 square meters, 1 square meter, 2 square meters, 5 square meters, 10 square meters, 100 square meters, or any other desired amount of area. In some examples, a virtual plane may extend indefinitely far. A virtual plane may be defined, generated, and/or used by a computing device for various processes as described herein. In some examples, a virtual plane or a portion thereof may be displayed to a user as virtual content by a wearable extended reality appliance. In some examples, a virtual plane may not be displayed to a user of a wearable extended reality appliance, and may be a surface, invisible to the user, by which locations of various objects (physical or virtual) may be measured.

Moving a virtual cursor along two planes may refer to movement that results in a change of position from one plane to another. For example, if a first plane is coincident with a top horizontal surface of a desk and a second plane vertically extends transverse to the first plane, movement of a cursor from the first plane to the second plane is one example of cursor movement along two planes. Similarly, two vertical display planes may be transverse to each other (e.g., a V-formation, or in any other angle) and cursor movement from one display plane to another is another example of movement along two planes.

When using a wearable extended reality appliance, there may be a desire to move a virtual cursor between traversing surfaces. For example, the wearable extended reality appliance may display virtual objects on a vertical virtual screen (also referred to as virtual display herein) and on a horizontal desk. Some disclosed embodiments may include controlling the movement of the virtual cursor in a three-dimensional environment using two-dimensional inputs, as described herein.

Some disclosed embodiments may include generating a display via a wearable extended reality appliance (WER-Appliance), the display including a virtual cursor and plurality of virtual objects located on a first virtual plane that traverses a second virtual plane overlying a physical surface. A virtual object may include a visual representation rendered by a computing device. Virtual objects may include any rendering of any item, icon, symbol, data display, virtual character, virtual display, or display of other information via an extended reality appliance. The objects may be generated in a manner so that, for example, they all appear in a first virtual plane. For example, if the first virtual plane represents a curved screen, a plurality of objects might be displayed along the curvature of the plane representing the curved screen.

The generated display may include, for example, virtual content shown by a display system of the wearable extended reality appliance. In some examples, the display system may include an optical head-mounted display system, a monocular head-mounted display system, a binocular head-mounted display system, a see-through head-mounted display system, a helmet-mounted display system, or any other type of device configured to show images to a user. In some examples, the display system may be configured to generate the display based on reflecting projected images and allowing a user to see through the display system. In other embodiments, displayed images may be projected onto the eye of the wearer. The generated display may be based on waveguide techniques, diffraction optics, holographic optics, polarized optics, reflective optics, or other types of techniques for combining images projected by a computing device and optical signals emanated from a surrounding physical environment of the user, the display system, and/or the wearable extended reality appliance. In some examples, the generated display may refer to an extended reality display including virtual content. At least one processor may generate the display via the wearable extended reality appliance.

A virtual plane may refer to a surface configured to be used in connection with one or more embodiments described herein. The virtual cursor may be displayed on a first virtual plane. For example, the virtual cursor as displayed may be facing a particular direction.

A first virtual plane may traverse a second virtual plane overlying a physical surface. The physical surface may include a surface of a physical object. The physical object may include, for example, a desk, a table, a keyboard, a mouse, a touch pad, a lamp, a cup, a telephone, a mobile device, a printer; a screen, a shelf, a machine, a vehicle, a door, a window, a chair, a button, or any other physical item. In some examples, the physical surface may include the top surface of a table or desk. In some examples, the physical surface may include a horizontal surface on which objects (physical or virtual) may be placed. For example, the physical surface may include a horizontal surface of a desk that a physical keyboard is placed on.

The second virtual plane may overlie (e.g., be placed on top of) the physical surface. In some examples, the boundaries of the second virtual plane may be same as the boundaries of the physical surface. In some examples, the boundaries of the second virtual plane may be within the boundaries of the physical surface. In some examples, the second virtual plane and the physical surface may have overlapping areas and may each have areas that may not overlap with the other. In some examples, the boundaries of the physical surface may be within the boundaries of the second virtual plane. In some examples, the second virtual plane may match the contours of the physical surface. For example, if the physical surface is flat, the second virtual plane may be flat. If the physical surface is curved, the second virtual plane may have a curvature similar to the curved form of the physical surface. In some examples, a position, an orientation, or any other aspect of the second virtual plane may be same as or similar to that of the physical surface. In some embodiments, dimensions of the second virtual plane may correspond with dimensions of the physical surface. For example, the physical object and the second virtual plane may share the same or similar dimensions, or may otherwise overlap. For example, the physical object may correspond with dimensions of the second virtual plane in one or more of a position, an orientation, a size, a contour, a form, or any other aspect of a surface.

The first virtual plane (or an extension of the first virtual plane) may traverse the second virtual plane (or an extension of the second virtual plane). For example, the first virtual plane and the second virtual plane may intersect in a line. In some examples, the line of intersection may be a straight line (e.g., if the first virtual plane is a flat surface and the second virtual plane is a flat surface), or a curved line (e.g., in one or more scenarios where either or each of the first virtual plane and the second virtual plane is a curved surface). In some examples, the traversing of the first virtual plane and the second virtual plane may include an extension of one of the virtual planes traversing the other one of the virtual planes, or an extension of one of the virtual planes traversing an extension of the other one of the virtual planes. For example, if the first virtual plane and the second virtual plane (e.g., not parallel with each other) have particular sizes such that the first virtual plane and the second virtual plane may not initially intersect, one or more of the first virtual plane or the second virtual plane may be extended so that the virtual planes as extended may intersect and a line of intersection may be created.

In some embodiments, the first virtual plane may be curved, and the second virtual plane may be flat. Regardless of orientation, the planes need not have the same shape. For example, the first virtual plane (e.g., oriented vertically) may be configured to be a concave surface on which virtual objects (e.g., virtual screens or virtual widgets) may be placed for viewing by a user. The second virtual plane (e.g., oriented horizontally) may be configured to be a flat surface overlying the top surface of a table.

Figure 41:
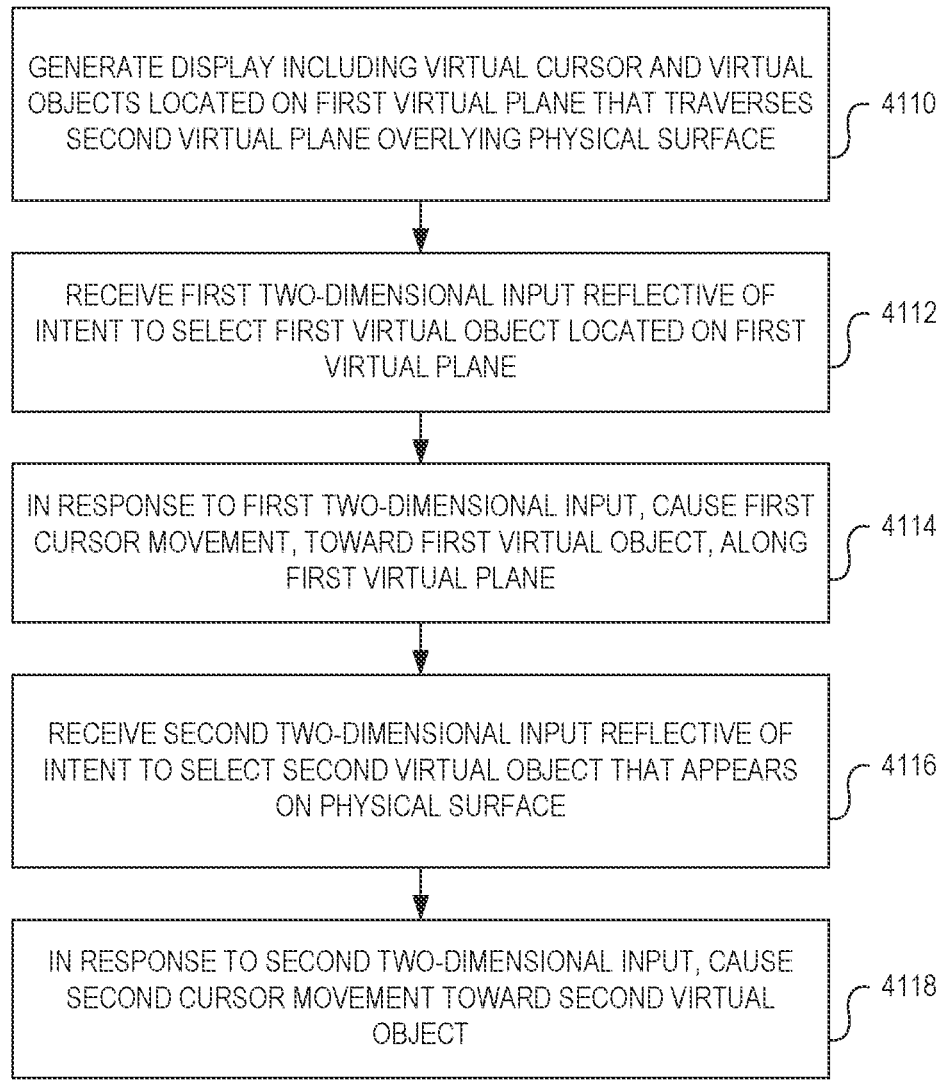
FIG. 41 is a flowchart illustrating an exemplary process for moving a virtual cursor along two traversing virtual planes, consistent with some embodiments of the present disclosure.

FIG. 41 is a flowchart illustrating an exemplary process 4100 for moving a virtual cursor along two traversing virtual planes consistent with some embodiments of the present disclosure. With reference to FIG. 41, in step 4110, instructions contained in a non-transitory computer-readable medium when executed by a processor may cause the processor to generate a display via a wearable extended reality appliance, the display including a virtual cursor and plurality of virtual objects located on a first virtual plane that traverses a second virtual plane overlying a physical surface.

Figure 42:
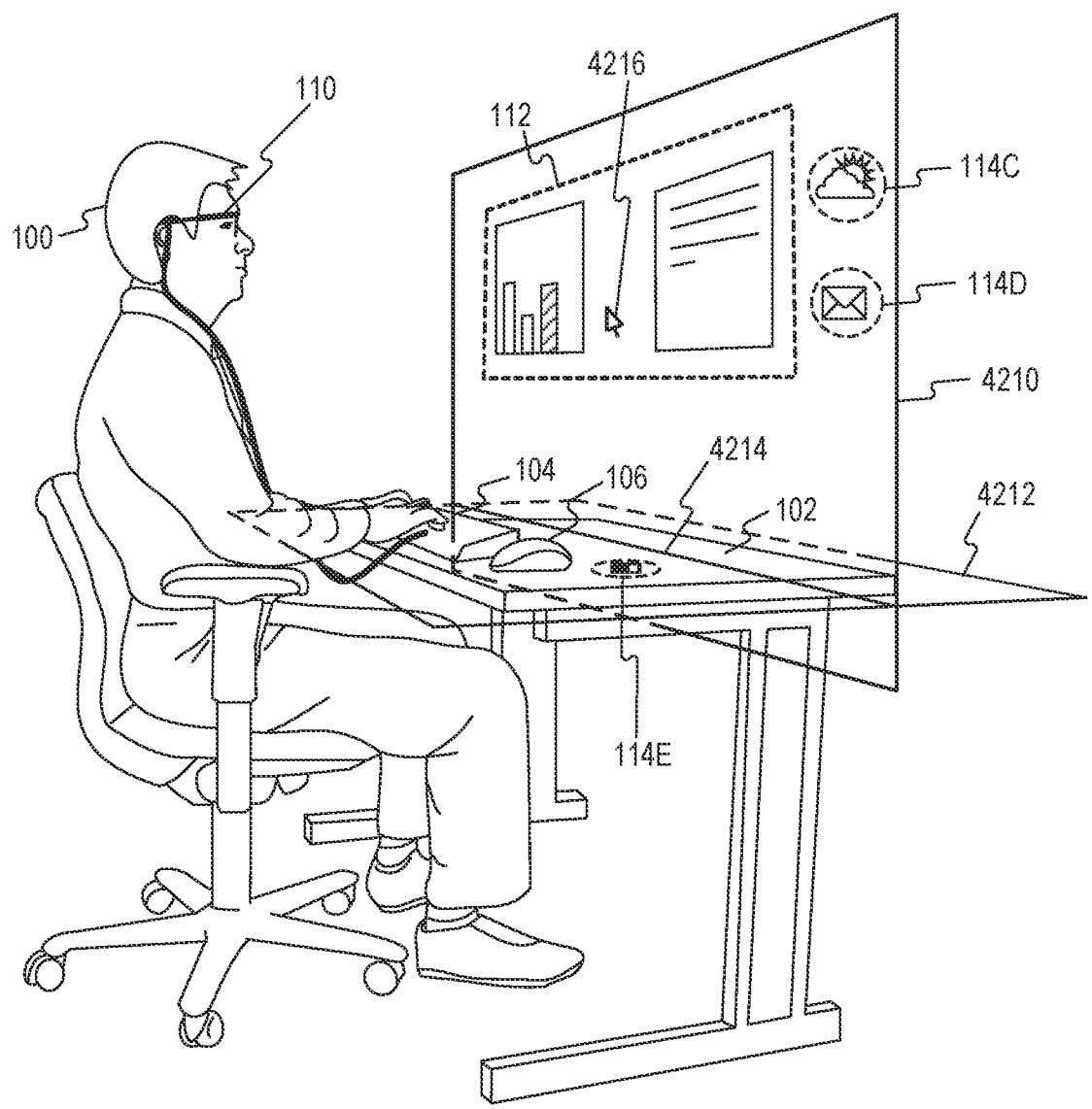
FIG. 42 is a schematic diagram illustrating use of an exemplary wearable extended reality appliance, consistent with some embodiments of the present disclosure.

FIG. 42 is a schematic diagram illustrating use of an exemplary wearable extended reality appliance consistent with some embodiments of the present disclosure. One or more elements as shown in FIG. 42 may be same as, or may be similar to, one or more elements as described in connection with FIG. 1. For example, with reference to FIG. 42, user 100 may be sitting behind table 102. User 100 may use a wearable extended reality appliance (e.g., wearable extended reality appliance 110). Keyboard 104 and mouse 106 may be placed on table 102. The wearable extended reality appliance (e.g., wearable extended reality appliance 110) may display virtual content to user 100, such as virtual screen 112 and virtual widgets 114C, 114D, 114E. The wearable extended reality appliance may display a virtual cursor 4216 to user 100. Virtual cursor 4216 and a plurality of virtual objects (e.g., virtual screen 112 and virtual widgets 114C, 114D) may be located on a first virtual plane 4210. Virtual widget 114E may appear on a top surface of table 102. A second virtual plane 4212 may overlie the top surface of table 102. First virtual plane 4210 (or an extension of the first virtual plane) may traverse (e.g., intersect with) second virtual plane 4212 (or an extension of the second virtual plane) by a line of intersection 4214. In some examples, first virtual plane 4210 and/or second virtual plane 4212 may be displayed to user 100 by the wearable extended reality appliance. In some examples, first virtual plane 4210 and/or second virtual plane 4212 may not be displayed to user 100.

Figure 43:
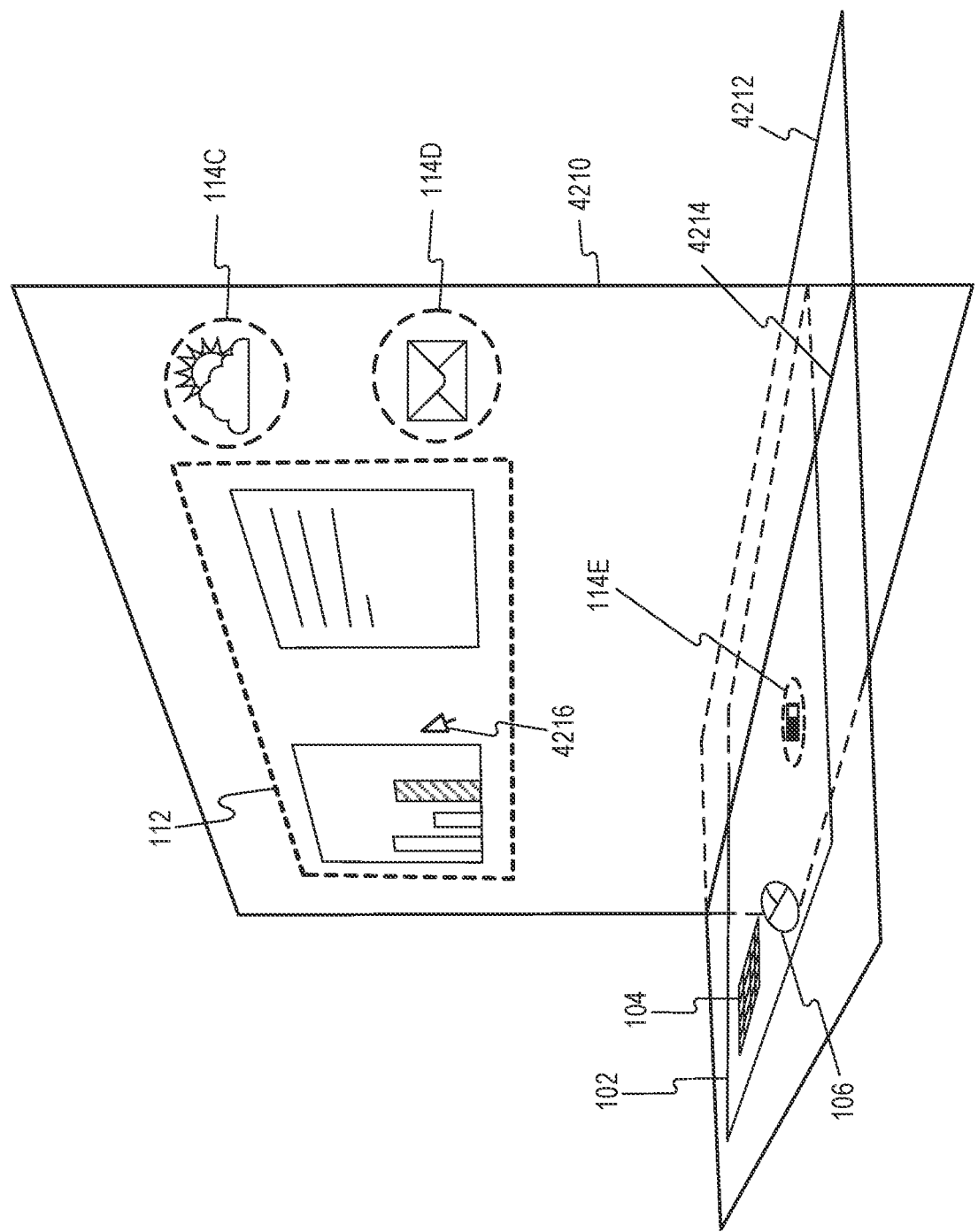
FIG. 43, FIG. 44, FIG. 45, FIG. 46, and FIG. 47 are schematic diagrams illustrating various use snapshots of an example system for moving a virtual cursor along two traversing virtual planes, consistent with some embodiments of the present disclosure.

FIG. 43, FIG. 44, FIG. 45, FIG. 46, and FIG. 47 are schematic diagrams illustrating various use snapshots of an example system for moving a virtual cursor along two traversing virtual planes consistent with some embodiments of the present disclosure. FIG. 43, FIG. 44, FIG. 45, FIG. 46, and FIG. 47 may illustrate one or more elements as described in connection with FIG. 42. With reference to FIG. 43, virtual cursor 4216 and a plurality of virtual objects (e.g., virtual screen 112 and virtual widgets 114C, 114D) may be located on first virtual plane 4210. Keyboard 104 and mouse 106 may be placed on table 102. Virtual widget 114E may appear on the top surface of table 102. Second virtual plane 4212 may overlie the top surface of table 102. First virtual plane 4210 may traverse (e.g., intersect with) second virtual plane 4212 by line of intersection 4214.

Some disclosed embodiments may include, while the virtual cursor is displayed on the first virtual plane, receiving a first two-dimensional input via a surface input device. The first two-dimensional input may be reflective of an intent to select a first virtual object located on the first virtual plane. A surface input device may include any input control manipulable by a user from a surface. For example, a computer mouse, a touch sensor, a trackball, a pointing stick, a stylus pen, a light pen, a touchpad, a virtual touchpad (e.g., projected on the physical surface), or any other physical or virtual input mechanism may be considered a surface input device. In some embodiments, the surface input device may include a pointing device or a touch sensor device. The surface input device may include buttons (e.g., up, down, left, and/or right buttons, arrow keys, or cursor movement keys). In some examples, the surface input device may receive input indicating movement along a surface (e.g., a computer mouse moving along the top surface of a table, or a user's finger moving along the surface of a touchpad).

A two-dimensional input may include, for example, an input that may be based on a two-dimensional space. For example, two values may be used for determining a position of an element in the two-dimensional space, two values may be used for determining a vector (for example, of a displacement, of a velocity, etc.) in the two-dimensional space (such as angle and magnitude), and so forth. In some examples, the two-dimensional space may be a surface (e.g., flat, non-flat, or curved), and the two-dimensional input may be based on movement along the surface. For example, the two-dimensional input may be based on movement of a computer mouse along a top surface of a table. As another example, the two-dimensional input may be based on movement of a user's finger along a surface of a touchpad. The surface input device may capture a movement (e.g., a movement along a surface), and may generate, based on the captured movement, the two-dimensional input. A curved surface may be considered two-dimensional in that two-dimensions vary, but a third dimension is not variable.

In some examples, one or more directions of movement associated with the surface input device (e.g., up, down, left, or right) may be mapped onto the first virtual plane and/or the second virtual plane. For example, a coordinate system may be established on the first virtual plane and/or the second virtual plane, and the directions of the coordinate system (e.g., up, down, left, or right) may correspond to the directions of movement associated with the surface input device (e.g., up, down, left, or right). In some examples, the manner in which one or more directions of movement associated with the surface input device may be mapped onto the first virtual plane may be in harmony with the manner in which one or more directions of movement associated with the surface input device may be mapped onto the second virtual plane. For example, the manner of direction mapping for the first virtual plane and the second virtual plane may be such that, if one of the virtual planes rotates around the line of intersection between the virtual planes to such a degree that the virtual planes become coincident, the mapped directions for the first virtual plane may match (e.g. may be same as or similar to) the mapped directions for the second virtual plane.

In some examples, a distance of movement associated with the surface input device (e.g., 0.01 cm, 0.1 cm, 1 cm, 2 cm, 3 cm, 5 cm, 10 cm, or any other length) may be mapped onto the first virtual plane and/or the second virtual plane. For example, a distance of moving (e.g., of the virtual cursor) on the first virtual plane and/or the second virtual plane may be based on (e.g., may be proportional to) a distance of moving associated with the surface input device. In some examples, a proportionality between the distance of moving on the first virtual plane and the distance of moving associated with the surface input device may be same as a proportionality between the distance of moving on the second virtual plane and the distance of moving associated with the surface input device. In some examples, a proportionality between the distance of moving on the first virtual plane and the distance of moving associated with the surface input device may be different from a proportionality between the distance of moving on the second virtual plane and the distance of moving associated with the surface input device.

While the virtual cursor is displayed on the first virtual plane, at least one processor may receive a first two-dimensional input via the surface input device. For example, when the virtual cursor is displayed on the first virtual plane, a user may move a computer mouse along a top surface of a table. A first two-dimensional input indicating the movement along the table surface may be captured by the computer mouse and may be transmitted to the at least one processor. As another example, when the virtual cursor is displayed on the first virtual plane, a user may move his or her finger along a surface of a touchpad. A first two-dimensional input indicating the movement along the surface of the touchpad may be captured by the touchpad and may be transmitted to the at least one processor.

The first two-dimensional input may be reflective of an intent to select a first virtual object located on the first virtual plane. When a user causes an input that, for example, causes a cursor or other indicator to move toward to overlap with a displayed object, such input may be considered to be reflective of an intent to select that object. For example, the first two-dimensional input may be based on a movement along a surface (e.g., a top surface of a table, or a surface of a touchpad). The movement may include a position change that may correspond to a position difference between the virtual cursor on the first virtual plane and the first virtual object on the first virtual plane. The position change may include a distance that may be proportional to a distance of the position difference. The position change may include a direction that may be mapped onto the first virtual plane to be same as a direction of the position difference. The movement along the surface may be, for example, caused by a user intending to move the virtual cursor from its current location to a location of the first virtual object and to select the first virtual object. In some examples, the first two-dimensional input may be based on a portion of the movement along the surface.

In some examples, the first two-dimensional input may be based on a movement along a surface (e.g., a two-dimensional movement) as captured by the surface input device, and the movement may have a direction that, when mapped onto the first virtual plane, may point toward the first virtual object located on the first virtual plane. The direction of the movement may indicate an intent to select the first virtual object located on the first virtual plane. In some examples, the movement may be a straight movement or near-straight movement. In some examples, the movement may be a curved movement or a freeform movement. The movement may have a direction (e.g., a direction of moving at a particular time instance, an overall direction, or an average direction) that, when mapped onto the first virtual plane, may point toward the first virtual object located on the first virtual plane.

With reference to FIG. 41, in step 4112, instructions contained in a non-transitory computer-readable medium when executed by a processor may cause the processor to, while the virtual cursor is displayed on the first virtual plane, receive a first two-dimensional input via a surface input device. The first two-dimensional input may be reflective of an intent to select a first virtual object located on the first virtual plane. In one example, the first two-dimensional input may include a series of inputs corresponding to intent to move the virtual cursor to the first virtual object and to an intent to select the first virtual object once the virtual cursor reaches the first virtual object. In another example, the two-dimensional input may include an input indicative of a location of the first virtual object (such as coordinates corresponding to the first virtual object, displacement of a location of the first virtual object from an original location of the virtual cursor, and so forth).

Figure 44:
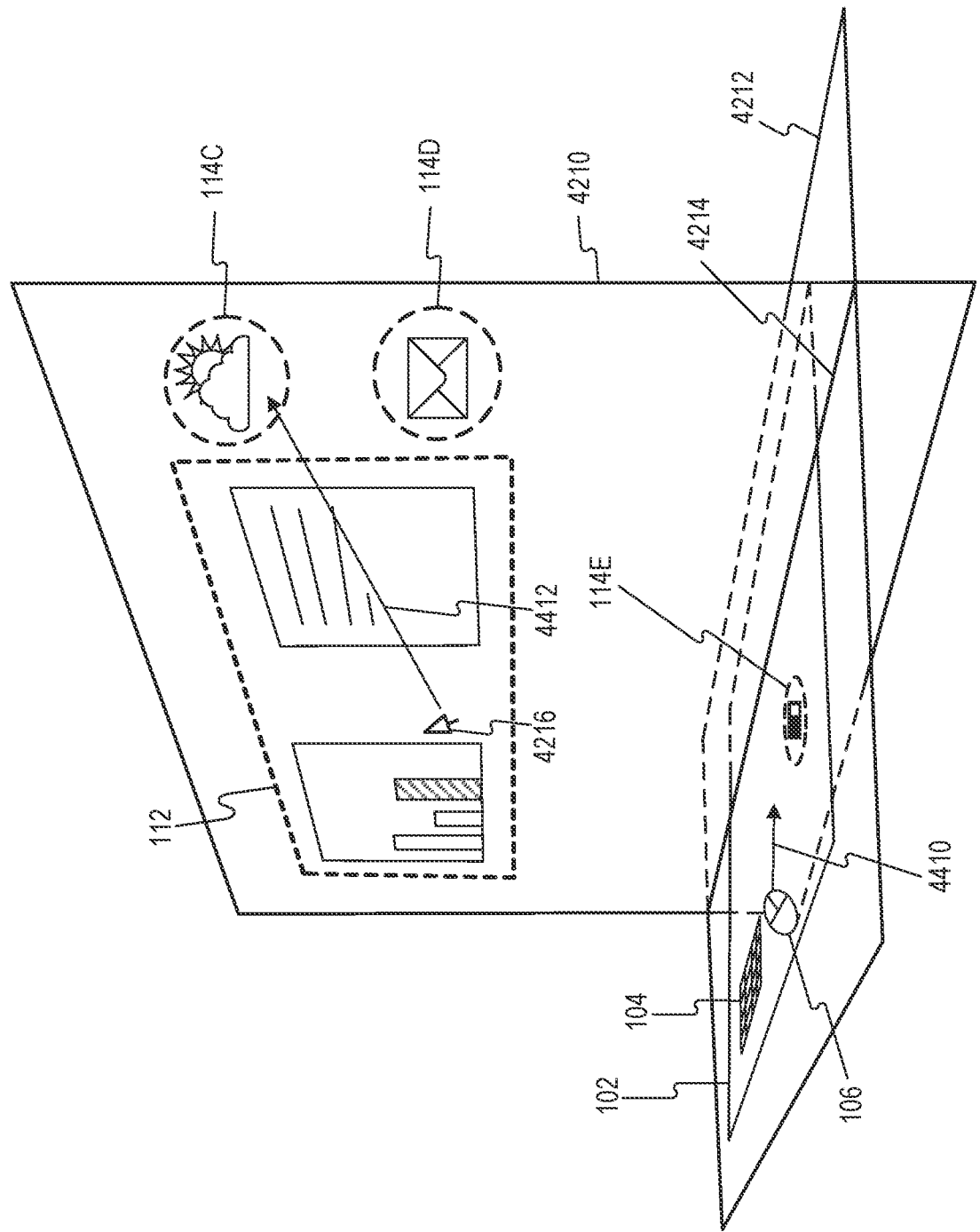

With reference to FIG. 44, mouse 106 may move along the top surface of table 102. A movement 4410 of mouse 106 may be caused (e.g., by user 100). Movement 4410 or a portion thereof may cause a first two-dimensional input via mouse 106. The first two-dimensional input may be reflective of an intent to select a first virtual object (e.g., virtual widget 1140) located on first virtual plane 4210. For example, movement 4410 may include a position change on the top surface of table 102. The position change may include a distance that may be proportional to a distance of a position difference between a position of virtual cursor 4216 on first virtual plane 4210 and a position of virtual widget 114C on first virtual plane 4210. The position change may include a direction that may be mapped onto first virtual plane 4210 to be same as a direction of the position difference.

Some disclosed embodiments may include, in response to the first two-dimensional input, causing a first cursor movement toward the first virtual object, the first cursor movement being along the first virtual plane. At least one processor may receive the first two-dimensional input and may cause a first cursor movement toward the first virtual object. In some examples, the first two-dimensional input may include data that may be, periodically or continuously, captured by the surface input device and transmitted to the at least one processor (e.g., a data stream indicating a number of segments of position change). The at least one processor may cause the first cursor movement (or a portion thereof) to be performed as data of the first two-dimensional input are received.

The first cursor movement may be along the first virtual plane. For example, the virtual cursor may be configured to move in accordance with movement indications captured by the surface input device. Movement of an element as captured by the surface input device may have one or more directions, which may be mapped onto the first virtual plane. Movement of an element as captured by the surface input device may have a distance, which may be proportional to a distance by which the virtual cursor may move along the first virtual plane. In response to the first two-dimensional input, the at least one processor may cause the virtual cursor to move toward the first virtual object along the first virtual plane.

With reference to FIG. 41, in step 4114, instructions contained in a non-transitory computer-readable medium when executed by a processor may cause the processor to, in response to the first two-dimensional input, cause a first cursor movement toward the first virtual object, the first cursor movement being along the first virtual plane.

With reference to FIG. 44, in response to a first two-dimensional input based on movement 4410 or a portion thereof, at least one processor may cause a first cursor movement (e.g., a movement 4412 or a portion thereof) toward the first virtual object (e.g., virtual widget 114C) along first virtual plane 4210. In the first cursor movement (e.g., movement 4412 or a portion thereof), virtual cursor 4216 may move toward the first virtual object (e.g., virtual widget 114C) along first virtual plane 4210.

Figure 45:
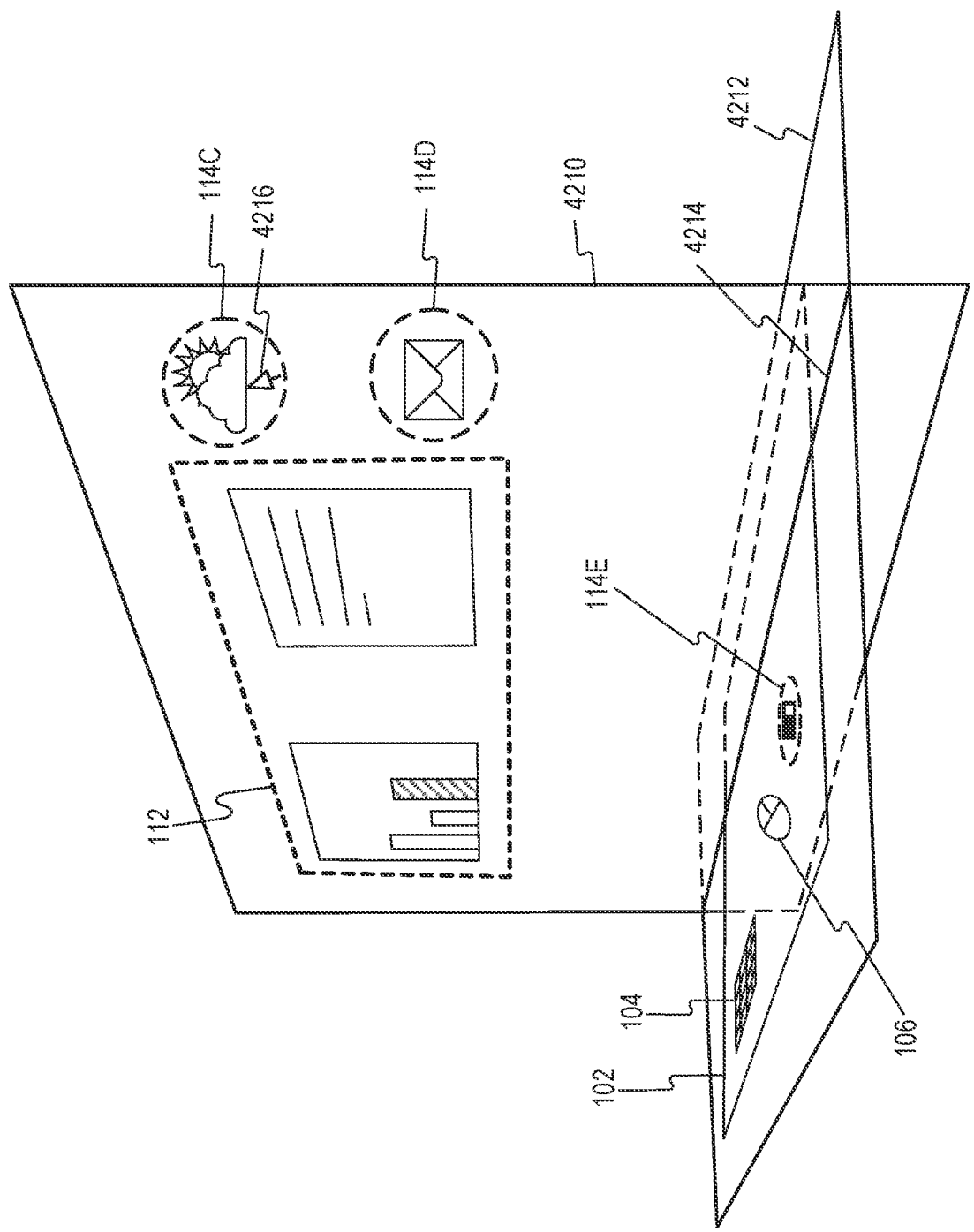

With reference to FIG. 45, after movement 4410, mouse 106 may be at a location, on the top surface of table 102, different from the previous location of mouse 106. After movement 4412, virtual cursor 4216 may be displayed to be at a location of the first virtual object (e.g.; virtual widget 114C), different from the previous location of virtual cursor 4216. For example, virtual cursor 4216 may be displayed as hovering over the first virtual object (e.g., virtual widget 114C). User 100 may select the first virtual object (e.g., virtual widget 114C) using virtual cursor 4216.

Some disclosed embodiments may include, while the virtual cursor is displayed on the first virtual plane, receiving a second two-dimensional input via the surface input device. The second two-dimensional input may be reflective of an intent to select a second virtual object that appears on the physical surface. While the virtual cursor is displayed on the first virtual plane, at least one processor may receive a second two-dimensional input via the surface input device. For example, when the virtual cursor is displayed on the first virtual plane, a user may move a computer mouse along a top surface of a table. A second two-dimensional input indicating the movement along the table surface may be captured by the computer mouse and may be transmitted to the at least one processor. As another example, when the virtual cursor is displayed on the first virtual plane, a user may move his or her finger along a surface of a touchpad. A second two-dimensional input indicating the movement along the surface of the touchpad may be captured by the touchpad and may be transmitted to the at least one processor.

The second two-dimensional input may be reflective of an intent to select a second virtual object that appears on the physical surface (e.g., which the second virtual plane may overlie). For example, the second two-dimensional input may be based on a movement along a surface (e.g., a top surface of a table, or a surface of a touchpad). The movement may include a position change that may correspond to a position difference between the virtual cursor on the first virtual plane and the second virtual object that appears on the physical surface. The position difference may be measured, for example, along the first virtual plane, across the line of intersection between the first virtual plane and the second virtual plane (which may overlie the physical surface), and along the physical surface and/or the second virtual plane. The position change may include a distance that may be proportional to a distance of the position difference. The position change may include a direction that may be mapped onto the first virtual plane to be same as a direction of the position difference on the first virtual plane, and/or that may be mapped onto the second virtual plane to be same as a direction of the position difference on the second virtual plane. The movement along the surface may be, for example, caused by a user intending to move the virtual cursor from its current location to a location of the second virtual object and to select the second virtual object. In some examples, the second two-dimensional input may be based on a portion of the movement along the surface.

In some examples, the second two-dimensional input may be based on a movement along a surface (e.g., a two-dimensional movement) as captured by the surface input device. The movement may have a direction that, when mapped onto the first virtual plane, may point toward the second virtual object (e.g., if the second virtual plane, with the second virtual object in a fixed location relative to the second virtual plane, rotates around the line of intersection between the first virtual plane and the second virtual plane, in a manner that expands an angle between sections of the first and second virtual planes which sections virtual objects and/or physical objects are located on, to such a degree that the first virtual plane and the second virtual plane become coincident). In some examples, the movement may have a direction that, when mapped onto the first virtual plane, may point toward the line of intersection between the first virtual plane and the second virtual plane. Additionally or alternatively, the movement may have a direction that, when mapped onto the second virtual plane, may point toward the second virtual object that appears on the physical surface. The direction of the movement may indicate an intent to select the second virtual object that appears on the physical surface. In some examples, the movement may be a straight movement or near-straight movement. In some examples, the movement may be a curved movement or a freeform movement. The direction of the movement may include, for example, a direction of moving at a particular time instance, an overall direction, or an average direction.

The first two-dimensional input and the second two-dimensional input may be reflective of intents to select different virtual objects (e.g., the first two-dimensional input may be reflective of an intent to select the first virtual object, and the second two-dimensional input may be reflective of an intent to select the second virtual object). The different intents may be determined based on, for example, a direction of movement, associated with the surface input device, on which the first or second two-dimensional input is based. Additionally or alternatively, the different intents may be determined based on a current location of the virtual cursor. For example, the direction of the movement associated with the surface input device may be used to determine a projected movement direction of the virtual cursor from the current location of the virtual cursor. Based on determining whether the projected movement direction from the current location of the virtual cursor is toward the first virtual object (and/or an object, a location, an area, a line, or a surface associated with the first virtual object) or whether the projected movement direction from the current location of the virtual cursor is toward the second virtual object (and/or an object, a location, an area, a line, or a surface associated with the second virtual object), it may be determined whether the two-dimensional input based on the movement associated with the surface input device is reflective of an intent to select the first virtual object or is reflective of an intent to select the second virtual object.

With reference to FIG. 41, in step 4116, instructions contained in a non-transitory computer-readable medium when executed by a processor may cause the processor to, while the virtual cursor is displayed on the first virtual plane, receive a second two-dimensional input via the surface input device. The second two-dimensional input may be reflective of an intent to select a second virtual object that appears on the physical surface.

Figure 46:
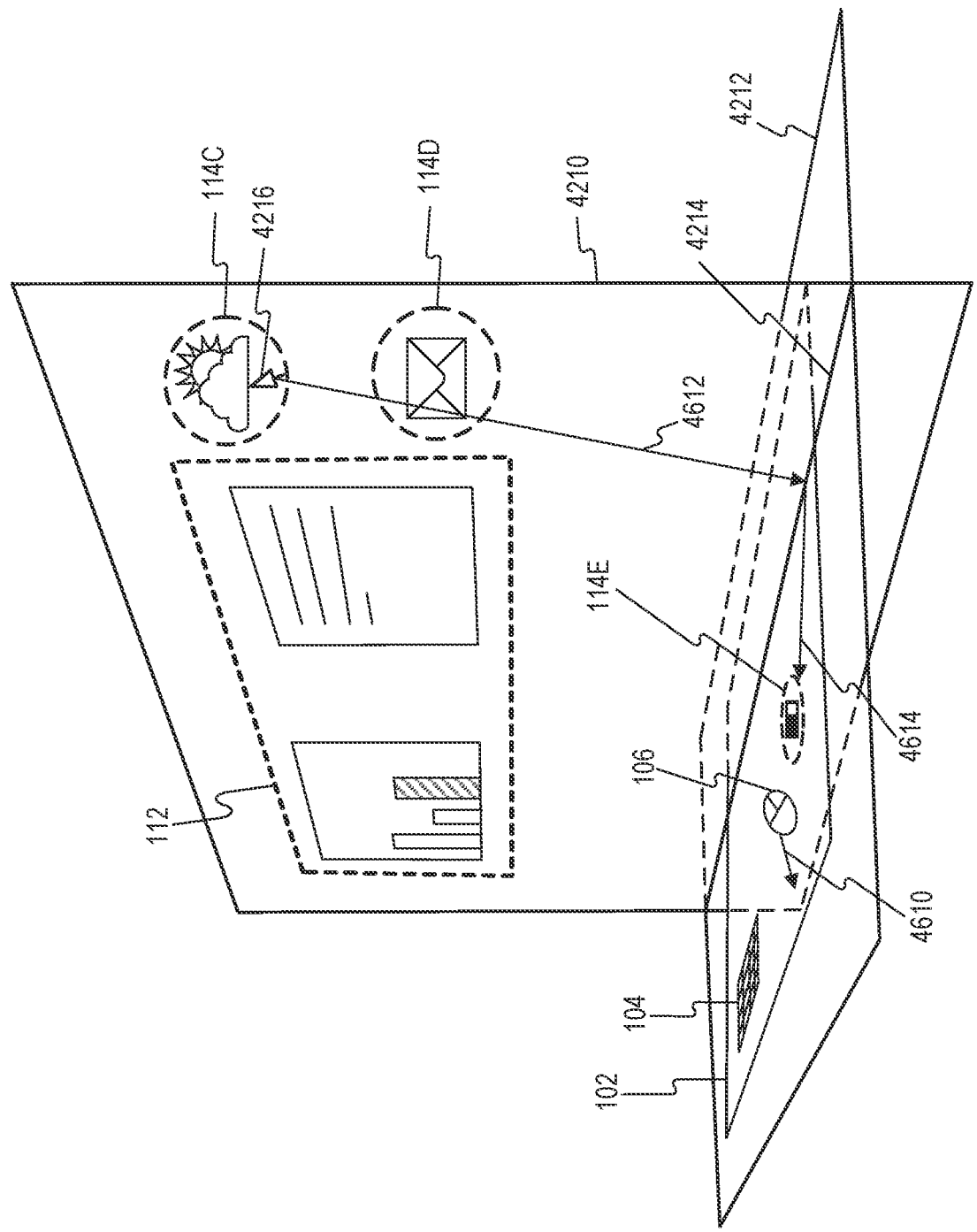

With reference to FIG. 46, mouse 106 may move along the top surface of table 102. A movement 4610 of mouse 106 may be caused (e.g., by user 100). Movement 4610 or a portion thereof may cause a second two-dimensional input via mouse 106. The second two-dimensional input may be reflective of an intent to select a second virtual object (e.g.; virtual widget 114E) that appears on a physical surface (e.g., the top surface of table 102). For example, movement 4610 may include a position change on the top surface of table 102. The position change may include a distance that may be proportional to a distance of a position difference between a position of virtual cursor 4216 on first virtual plane 4210 and a position of virtual widget 114E that appears on the physical surface (e.g., the top surface of table 102). The distance of the position difference may be measured, for example, along first virtual plane 4210, across line of intersection 4214, and along the physical surface (e.g., the top surface of table 102) and/or second virtual plane 4212. The position change may include a direction that may be mapped onto first virtual plane 4210 to be same as a direction of the position difference on first virtual plane 4210, and/or that may be mapped onto second virtual plane 4212 to be same as a direction of the position difference on second virtual plane 4212.

Some disclosed embodiments may include, in response to the second two-dimensional input, causing a second cursor movement toward the second virtual object. The second cursor movement may include a partial movement along the first virtual plane and a partial movement along the second virtual plane. At least one processor may receive the second two-dimensional input. In response to the second two-dimensional input, the at least one processor may cause the second cursor movement toward the second virtual object. In some examples, the second two-dimensional input may include data that may be, periodically or continuously, captured by the surface input device and transmitted to the at least one processor (e.g., a data stream indicating a number of segments of position change). The at least one processor may cause the second cursor movement (or a portion thereof) to be performed as data of the second two-dimensional input are received.

The second cursor movement may include a partial movement along the first virtual plane. For example, the virtual cursor may be configured to move in accordance with movement indications captured by the surface input device. Movement of an element as captured by the surface input device may have one or more directions, which may be mapped onto the first virtual plane. Movement of an element as captured by the surface input device may have a distance, which may be proportional to a distance by which the virtual cursor may move along the first virtual plane. In response to the second two-dimensional input, the at least one processor may cause the virtual cursor to move toward the second virtual object along the first virtual plane. In some examples, the second cursor movement may include the virtual cursor moving toward the line of intersection between the first virtual plane and the second virtual plane. Additionally, the second cursor movement may include the virtual cursor moving across the line of intersection, from the first virtual plane onto the second virtual plane.

The second cursor movement may include a partial movement along the second virtual plane. The partial movement along the second virtual plane may occur after the virtual cursor crosses the line of intersection between the first and second virtual planes. For example, the virtual cursor may be configured to move in accordance with movement indications captured by the surface input device. Movement of an element as captured by the surface input device may have one or more directions, which may be mapped onto the second virtual plane. Movement of an element as captured by the surface input device may have a distance, which may be proportional to a distance by which the virtual cursor may move along the second virtual plane. In response to the second two-dimensional input, the at least one processor may cause the virtual cursor to move toward the second virtual object along the second virtual plane.

With reference to FIG. 41, in step 4118, instructions contained in a non-transitory computer-readable medium when executed by a processor may cause the processor to, in response to the second two-dimensional input, cause a second cursor movement toward the second virtual object, the second cursor movement including a partial movement along the first virtual plane and a partial movement along the second virtual plane.

With reference to FIG. 46, in response to a second two-dimensional input based on movement 4610 or a portion thereof, at least one processor may cause a second cursor movement toward the second virtual object (e.g., virtual widget 114E). The second cursor movement may include a partial movement along first virtual plane 4210 (e.g.; a movement 4612 or a portion thereof). In the partial movement along first virtual plane 4210, virtual cursor 4216 may move toward the second virtual object (e.g., virtual widget 114E) along first virtual plane 4210. Additionally, virtual cursor 4216 may move across line of intersection 4214, from first virtual plane 4210 onto second virtual plane 4212. The second cursor movement may include a partial movement along second virtual plane 4212 (e.g., a movement 4614 or a portion thereof). In the partial movement along second virtual plane 4212, virtual cursor 4216 may move toward the second virtual object (e.g., virtual widget 114E) along second virtual plane 4212.

Figure 47:
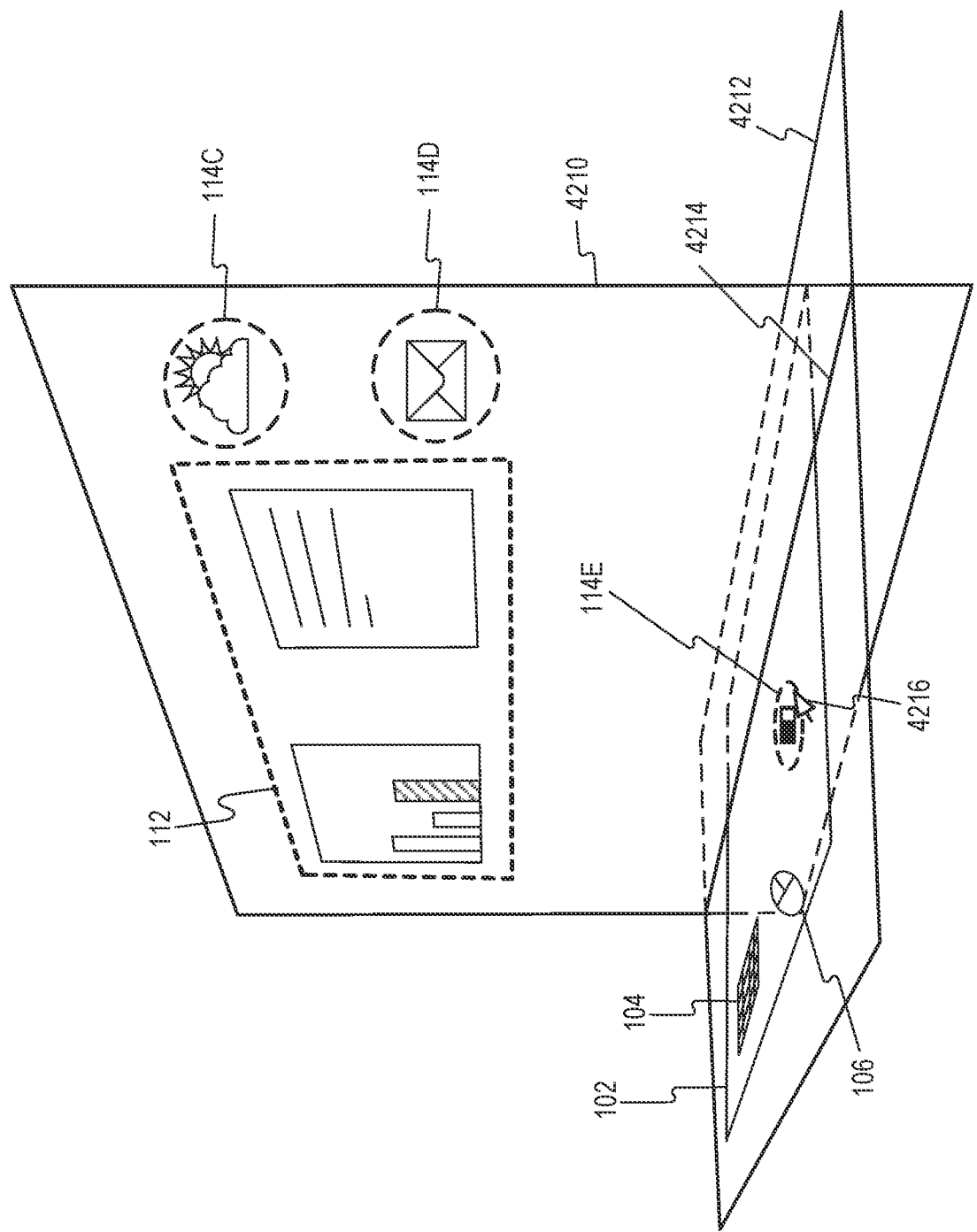

With reference to FIG. 47, after movement 4610, mouse 106 may be at a location, on the top surface of table 102, different from the previous location of mouse 106. After movement 4612 and movement 4614, virtual cursor 4216 may be displayed to be at a location of the second virtual object (e.g., virtual widget 114E), different from the previous location of virtual cursor 4216, For example, virtual cursor 4216 may be displayed as hovering over the second virtual object (e.g., virtual widget 114E). User 100 may select the second virtual object (e.g., virtual widget 114E) using virtual cursor 4216.

In some embodiments, the second two-dimensional input via the surface input device may include movement in a single direction, and the second cursor movement may include movement of the virtual cursor in two directions. The movement associated with the second two-dimensional input may include movement of an element associated with the surface input device. In some examples, the movement associated with the second two-dimensional input may include moving a physical object by a user. For example, if the surface input device is a computer mouse, the movement associated with the second two-dimensional input may include movement of the computer mouse on a surface. As another example, if the surface input device is a touchpad, the movement associated with the second two-dimensional input may include movement of a finger of a user on the touchpad.

A direction of movement may include, for example, a direction of moving at a particular time instance, an overall direction, an average direction, or any other measurement of direction of the movement. In some examples, the single direction of the movement associated with the second two-dimensional input may be different from the two directions of the movement of the virtual cursor. In some examples, the single direction of the movement associated with the second two-dimensional input may be same as or similar to one of the two directions of the movement of the virtual cursor. A first one of the two directions of the movement of the virtual cursor may be along the first virtual plane, and a second one of the two directions of the movement of the virtual cursor may be along the second virtual plane and/or the physical surface (e.g., which the second virtual plane may overlie).

For example, with reference to FIG. 46, the second two-dimensional input via the surface input device (e.g., mouse 106) may include movement (e.g., of mouse 106) in a single direction (e.g., movement 4610 or a portion thereof). The second cursor movement may include movement of virtual cursor 4216 in two directions (e.g., movement 4612 or a portion thereof in a first direction, and movement 4614 or a portion thereof in a second direction different from the first direction).

In some embodiments, the first cursor movement may be rendered from a first perspective and in the partial movement along the second virtual plane the virtual cursor may be re-rendered from a second perspective different from the first perspective. At least one processor may cause display of the virtual cursor to a user of the wearable extended reality appliance. The virtual cursor may be displayed to be located on the first virtual plane or on the second virtual plane. When the virtual cursor is displayed to be on the first virtual plane, the virtual cursor may be rendered from a first perspective. For example, the virtual cursor may be facing a same direction that the first virtual plane may be facing (e.g., a direction perpendicular to the first virtual plane). As another example, the virtual cursor may be oriented in a same manner as other virtual objects on the first virtual plane. When the virtual cursor is displayed to be on the second virtual plane, the virtual cursor may be rendered from a second perspective (e.g., different from the first perspective). For example, the virtual cursor may be facing a same direction that the second virtual plane may be facing (e.g., a direction perpendicular to the second virtual plane). As another example, the virtual cursor may be oriented in a same manner as other virtual objects on the second virtual plane. Additionally or alternatively, a perspective from which the virtual cursor may be rendered may include a size, a shape, a contour, a color, a visual effect, or other configurations of the virtual cursor. In the first cursor movement, the virtual cursor may be displayed on the first virtual plane, and may be rendered from the first perspective. In the partial movement along the second virtual plane, the virtual cursor may be displayed on the second virtual plane, and may be rendered from the second perspective (e.g., different from the first perspective). For example, with reference to FIG. 44 and FIG. 45, virtual cursor 4216 (e.g., in movement 4412) may be rendered from a first perspective. With reference to FIG. 46 and FIG. 47, virtual cursor 4216 (e.g., in movement 4614) may be rendered from a second perspective different from the first perspective.

Some disclosed embodiments may include issuing a notice when a perspective of the virtual cursor changes from the first perspective to the second perspective and when a perspective of the virtual cursor changes from the second perspective to the first perspective. For example, at least one processor may monitor the location of the virtual cursor. Based on the location of the virtual cursor, the at least one processor may detect instances when the virtual cursor moves across the line of intersection between the first and second virtual planes, from the first virtual plane onto the second virtual plane or from the second virtual plane onto the first virtual plane. Based on detecting such instances, the at least one processor may issue (e.g., transmit) the notice to a user. Additionally or alternatively, the at least one processor may monitor a perspective from which the virtual cursor is rendered. Based on detecting a change in the perspective of the virtual cursor (e.g., from the first perspective to the second perspective, or from the second perspective to the first perspective), the at least one processor may issue (e.g., transmit) the notice to a user. The notice may, for example, notify a user that the virtual cursor moved from one surface to another surface, or that the virtual cursor changed from being rendered from one perspective to being rendered from another perspective. In some examples, the notice may indicate to a user a current location of the virtual cursor. The notice may assist the user in tracking the location of the virtual cursor, and/or in searching for the virtual cursor (e.g., if the user loses track of the virtual cursor).

In some embodiments, the notice may include at least one of a visual notification, an audible notification, or a tactile notification. A visual notification may include, for example, a message including text and/or images, a highlighting effect (e.g. increasing the size) of the virtual cursor, a pop-up window, or any other desired display of information. The virtual notification may be displayed to a user, for example, by a display system of a wearable extended reality appliance. An audible notification may include, for example, playback of a particular sound, playback of a message including text, or playback of any other desired audio. The audible notification may be played to a user, for example, by an audio system associated with a wearable extended reality appliance, such as a loudspeaker, a headphone, a headset, an earbud, an earpiece, an ear-speaker, an earphone, or any other desired audio equipment. The tactile notification may include, for example, applying vibrations, forces, or any other desired form of motion for creating a sense of touch to a user. The tactile notification may be generated to a user, for example, by a tactile system associated with a wearable extended reality appliance, such as an eccentric rotating mass actuator, a motor, or any other desired equipment for creating a sense of touch to a user. The tactile notification may have a particular pattern as desired. For example, the tactile notification may be a vibration of a particular pattern. In some examples, the tactile notification may be generated by the surface input device (e.g., via which the first two-dimensional input and/or the second two-dimensional input may be received). In some examples, the visual notification, the audible notification, and/or the tactile notification may last for a temporary time period, such as 0.5 seconds, 1 second, 2 seconds, 3 seconds, 5 seconds, or any other desired amount of time. In some examples, multiple forms of the notice may be activated concurrently.

In some embodiments, the physical surface (e.g., which the second virtual plane may overlie) may be a desk. Some disclosed embodiments may include preventing the virtual cursor from moving beyond at least one desk edge. For example, at least one processor may capture, via an image sensor, image data of the scenes in front of the wearable extended reality appliance. Based on the image data (e.g., including images of the desk), the at least one processor may determine edges of the desk, for example, using image analysis algorithms to extract features of physical objects (including the desk) in captured images. One or more of the edges of the desk may be configured to be boundaries beyond which the virtual cursor may not move. The at least one processor may, for example, periodically or continuously monitor the location of the virtual cursor. Based on the monitored location of the virtual cursor, the at least one processor may detect instances where the virtual cursor reaches the configured boundaries. In such instances, the at least one processor may prevent the virtual cursor from moving beyond the configured boundaries (e.g., may prevent the virtual cursor from moving across the configured boundaries). For example, the at least one processor may disregard aspects of input data (e.g., from the surface input device) that may cause the virtual cursor to move, from the side of a configured boundary where the virtual cursor is located, in a direction perpendicular to the configured boundary, toward the side of the boundary where the virtual cursor is not located.

In some embodiments, the physical surface (e.g., which the second virtual plane may overlie) may be a desk. Some disclosed embodiments may include detecting a keyboard placed on the desk, identifying a disengagement of the keyboard from the desk, and causing the virtual cursor to return to the first virtual plane. For example, at least one processor may capture, via an image sensor, image data of the scenes in front of the wearable extended reality appliance. Based on the image data, the at least one processor may determine a keyboard placed on the desk, for example, using image analysis algorithms to extract features of physical objects (including the keyboard and the desk) in captured images.

The at least one processor may periodically or continuously capture, via the image sensor, image data of the scenes in front of the wearable extended reality appliance and may, based on the captured image data, monitor the location of the keyboard as relative to the location of the desk. The at least one processor may identify a disengagement of the keyboard from the desk, for example, by determining that a distance between the keyboard and the top surface of the desk satisfies (e.g.; meets or exceeds) a distance threshold (e.g., 1 cm, 2 cm, 3 cm, 5 cm, 10 cm, 15 cm, or any other desired length). The distance between the keyboard and the top surface of the desk may include, for example, an average distance between the keyboard and the top surface of the desk, a minimum distance between the keyboard and the top surface of the desk, a maximum distance between the keyboard and the top surface of the desk, a distance between a particular point of the keyboard and the top surface of the desk, or any other desired measurement of length between the keyboard and the top surface of the desk.

Based on identifying the disengagement of the keyboard from the desk, the at least one processor may cause the virtual cursor to return to the first virtual plane. For example, when the virtual cursor is displayed to be on the second virtual plane, the at least one processor may identify the disengagement of the keyboard from the desk and may, based on the identifying of the disengagement, cause the virtual cursor to return to the first virtual plane. In some examples, in returning the virtual cursor to the first virtual plane, the virtual cursor may be moved to a configured location of the first virtual plane (e.g., a center of the first virtual plane, a center of an area including one or more virtual objects, a location without nearby virtual objects, a random point on the first virtual plane, a point on the first virtual plane close to the location of the virtual cursor before the virtual cursor is returned to the first virtual plane, or any other desired point on the first virtual plane for placing the virtual cursor).

Some disclosed embodiments may include, while the virtual cursor is displayed on the second virtual plane, detecting that attention of a user of the wearable extended reality appliance shifted from the second virtual plane to the first virtual plane, and automatically causing the virtual cursor to return to the first virtual plane. In some embodiments, detecting that the attention of the user of the wearable extended reality appliance shifted from the second virtual plane to the first virtual plane may be based on input from a sensor located in the wearable extended reality appliance. Detection of a change in focus may occur from sensing a change of position of a head, eyes, hands, any other portion of a user's body, or based on signals received from an input device. For example, a sensor may be configured for eye tracking. The sensor may measure the point of gaze of the user (e.g., where the user is looking) and/or the motion of an eye of the user. At least one processor may receive the data of eye tracking as measured by the sensor and may, based on the data, determine the attention of the user (e.g., on the first virtual plane or the second virtual plane). For example, the at least one processor may determine that the attention of the user is on a particular virtual plane based on determining that the user keeps looking at the particular virtual plane for a threshold time period (e.g., 0.5 seconds, 1 second, 2 seconds, 3 seconds, 5 seconds, 10 seconds, or any other desired amount of time). The at least one processor may detect that the attention of the user shifts from the second virtual plane to the first virtual plane, for example, based on determining that the point of gaze of the user moves from the second virtual plane to the first virtual plane and/or based on determining that the point of gaze of the user stays on the first virtual plane for a threshold time period (e g, 0.5 seconds, 1 second, 2 seconds, 3 seconds, 5 seconds, 10 seconds, or any other desired amount of time).

Based on detecting that the attention of the user shifts from the second virtual plane to the first virtual plane, the at least one processor may automatically cause the virtual cursor to return to the first virtual plane. In some examples, in returning the virtual cursor to the first virtual plane, the virtual cursor may be moved to a point or area of attention (e.g., gaze) of the user on the first virtual plane. In some examples, in returning the virtual cursor to the first virtual plane, the virtual cursor may be moved to a configured location of the first virtual plane (e.g., a center of the first virtual plane, a center of an area including one or more virtual objects, a location without nearby virtual objects, a random point on the first virtual plane, a point on the first virtual plane close to the location of the virtual cursor before the virtual cursor is returned to the first virtual plane, or any other desired point on the first virtual plane for placing the virtual cursor).

In some embodiments, detecting that the attention of the user of the wearable extended reality appliance shifted from the second virtual plane to the first virtual plane may be based on input from an input device associated with the surface input device. The input device associated with the surface input device may include, for example, a button, a key, a pressure sensor, or any other equipment for receiving input. For example, the surface input device may be a computer mouse, and the input device associated with the surface input device may be a particular button of the computer mouse. As another example, the surface input device may be a touchpad, and the input device associated with the surface input device may be a pressure sensor of the touchpad (e.g., for sensing a degree of pressure as applied on a particular point or area on the touchpad). In some examples, the input device associated with the surface input device may be part of the surface input device. In some examples, the input device associated with the surface input device may be separate from the surface input device.

The input device associated with the surface input device may capture user input (e.g., pressing a particular button of a computer mouse, or pressing a particular point or area on a touch pad). The at least one processor may receive the captured user input and may, based on the captured user input, determine an indication that the attention of the user of the wearable extended reality appliance shifts from the second virtual plane to the first virtual plane. For example, touching or pressing of the input device at a particular location or in a particular pattern may be configured to indicate a change of a user's attention from the second virtual plane to the first virtual plane. When a user intends to change his or her attention from the second virtual plane to the first virtual plane, he or she may touch or press the input device at a particular location or in a particular pattern. Based on the input from the input device associated with the surface input device, the at least one processor may detect that the attention of the user shifts from the second virtual plane to the first virtual plane.

In some examples, movement along the first virtual plane (such as the first cursor movement, the partial movement alone the first virtual plane of the second cursor movement, etc.) may be at a first pace, and movement along the second virtual plane (such as the partial movement alone the second virtual plane of the second cursor movement) may be at a second pace. The second pace may differ from the first pace. In some examples, the second pace may be selected based on a type of the physical surface. For example, an image of the physical surface may be captured using an image sensor included in the wearable extended reality appliance. The image may be analyzed using a visual classification algorithm to classify the physical surface to one of a plurality of alternative classes, each alternative class corresponds to a type of surface, and thereby determining the type of the physical surface. In response to a first determined type of the physical surface, one value may be selected for the second pace, and in response to a second determined type of the physical surface, another value may be selected for the second pace. In some examples, the second pace may be selected based on a dimension of the physical surface (such as a length, a width, an area size, and so forth). For example, an image of the physical surface may be captured using an image sensor included in the wearable extended reality appliance. The image may be analyzed using a regression model to determine the dimension of the physical surface (such as a length, a width, an area size, and so forth). In response to a first determined dimension of the physical surface, one value may be selected for the second pace, and in response to a second determined dimension of the physical surface, another value may be selected for the second pace. In some examples, the first pace may be selected based on a distance of the first virtual plane (for example, from the user, from the keyboard, and so forth). For example, in response to a first distance of the first virtual plane, one value may be selected for the first pace, and in response to a second distance of the first virtual plane, another value may be selected for the first pace. In some examples, the ratio between the first pace and the second pace may be selected based on an angle between the first virtual plane and the second virtual plane. For example, the ratio may be a non-linear function of the angle. In one example, the second pace may be determined based on the first pace and the selected ratio. In another example, the first pace may be determined based on the second pace and the select ratio. In some examples, the first pace may be based on a curvature of the first virtual plane. For example, in response to a first curvature of the first virtual plane, one value may be selected for the first pace, and in response to a second curvature of the first virtual plane, another value may be selected for the first pace. In some examples, the second pace and/or the first pace may be functions of the distance of the virtual cursor from the line of intersection of the first virtual plane with the second virtual plane. For example, the virtual cursor may accelerate and/or decelerate when approaching the line of intersection.

Some disclosed embodiments may include, while the virtual cursor is displayed on the second virtual plane, receiving a third two-dimensional input via the surface input device. The third two-dimensional input may be reflective of an intent to move the virtual cursor back to the first virtual plane. A two-dimensional input reflective of an intent to move the virtual cursor back to the first virtual plane, may be determined similarly as previously discussed. For example, the third two-dimensional input may be based on a movement associated with the surface input device (e.g., a movement of a computer mouse on a surface, or a movement of a finger of a user on a touchpad). The movement associated with the surface input device may have a direction that, when mapped onto the second virtual plane, may point toward the first virtual plane and/or may point toward the line of intersection between the first and second virtual planes. The direction of the movement may indicate an intent to move the virtual cursor back to the first virtual plane. Some disclosed embodiments may include, in response to the third two-dimensional input, causing a third cursor movement. The third cursor movement may include a cursor movement along the second virtual plane and a cursor movement along the first virtual plane. The third cursor movement may be performed in a similar manner as one or more cursor movements as described herein (e.g., the first cursor movement and/or the second cursor movement). In some examples, during the cursor movement along the second virtual plane, the virtual cursor is rendered from the second perspective. During the cursor movement along the first virtual plane, the virtual cursor is re-rendered from the first perspective.

Some disclosed embodiments may include, while the virtual cursor is displayed on the second virtual plane, receiving a third two-dimensional input via the surface input device. The third two-dimensional input may be reflective of an intent to select a third virtual object located on a third virtual plane corresponding to another physical surface. The third virtual plane may, for example, overlie the other physical surface (e.g., different from the physical surface which the second virtual plane may overlie). In some examples, the third virtual plane (or an extension of the third virtual plane) may traverse the second virtual plane (or an extension of the second virtual plane). In some examples, the third two-dimensional input may be based on a movement associated with the surface input device (e.g., a movement of a computer mouse on a surface, or a movement of a finger of a user on a touchpad). The movement associated with the surface input device may have a direction that, when mapped onto the second virtual plane, may point toward the third virtual object located on the third virtual plane, may point toward the third virtual plane, and/or may point toward a line of intersection between the second and third virtual planes. In some examples, the movement associated with the surface input device may have a direction that, when mapped onto the third virtual plane, may point toward the third virtual object located on the third virtual plane. The direction of the movement may indicate an intent to select the third virtual object located on the third virtual plane.

Some disclosed embodiments may include, in response to the third two-dimensional input, causing a third cursor movement. The third cursor movement may include a cursor movement along the second virtual plane and a cursor movement along the third virtual plane. The third cursor movement may be performed in a similar manner as one or more cursor movements as described herein (e.g., the first cursor movement and/or the second cursor movement). In some examples, during the cursor movement along the second virtual plane, the virtual cursor is rendered from the second perspective. During the cursor movement along the third virtual plane, the virtual cursor is re-rendered from a third perspective different from the first and second perspectives.

Some disclosed embodiments may include, while the virtual cursor is displayed on the second virtual plane, receiving a third two-dimensional input via the surface input device. The third two-dimensional input may be reflective of an intent to interact with a physical device located on the physical surface. Again, the processes involved with the third two-dimensional input may be similar to those of the first two-dimensional input and second two-dimensional input. For example, the third two-dimensional input may be based on a movement associated with the surface input device (e.g., a movement of a computer mouse on a surface, or a movement of a finger of a user on a touchpad). The movement associated with the surface input device may have a direction that, when mapped onto the second virtual plane and/or the physical surface (e.g., which the second virtual plane may overlie), may point toward a physical device located on the physical surface. The direction of the movement may indicate an intent to interact with the physical device located on the physical surface. The physical device may include, for example, an air conditioner controller, a light switch, a lamp, a loudspeaker, or any other physical equipment that may be configured to interact with the virtual cursor.

Some disclosed embodiments may include, in response to the third two-dimensional input, causing the virtual cursor to overlay the physical device. For example, in response to the third two-dimensional input, at least one processor may cause the virtual cursor to move toward the physical device (e.g., along the second virtual plane). When the virtual cursor reaches the location of the physical device, the virtual cursor may be displayed as overlaying the physical device.

Some disclosed embodiments may include receiving input from a user of the wearable extended reality appliance. The input from the user may include or cause, for example, an activation of the virtual cursor. In some examples, the input from the user may include a click, a double-click, a scroll, a rotate, a slide; a tap, a double-tap, a zoom-in, a zoom-out, a drag, a pinch, a spread; a swipe, a touch, a touch-and-hold, a flick; a pointing, a thumb-up, a thumb-down, or any other type of gesture or indication from the user. The input from the user may be received, for example, via the surface input device. In some examples, the input from the user may be received via an input device separate from the surface input device.

Some disclosed embodiments may include, upon receiving the input, causing the physical device to execute a function. For example, the at least one processor may receive the input from the user and may, in response to the input from the user, cause the physical device to execute a function. The function may be associated with altering one or more parameters or operational conditions associated with the physical device. In some examples, in response to the input from the user, the at least one processor may cause altering of one or more parameters or operational conditions associated with the physical device. For example, if the physical device is a lamp, the function may include switching on the lamp, switching off the lamp, or other operations associated with the physical device. As another example, if the physical device is an air conditioner controller, the function may include switching on an air conditioner, switching off an air conditioner, modifying the settings of an air conditioner (e.g., the temperature, the cool mode, the fan mode, the sleep mode, or any other parameter of an air conditioner), or other operations associated with the physical device. As another example, if the physical device is a light switch, the function may include switching on a light, switching off a light, or other operations associated with the physical device. As another example, if the physical device is a loudspeaker, the function may include switching on the loudspeaker, switching off the loudspeaker, modifying the settings of the loudspeaker (e.g., the volume, the audio to be played, or any other parameter of the loudspeaker), or other operations associated with the physical device.

Some disclosed embodiments may include establishing a communication channel between the physical device and the wearable extended reality appliance, and upon receiving the input, transmitting a command associated with the function to the physical device. The communication channel may include, for example, an IP (Internet Protocol) connection, a Wi-Fi connection, a WiMAX connection, a cellular connection (e.g., 2G, 3G, 4G, or 5G), a Bluetooth connection, a near-field communication (NFC) connection, a low-power wide-area networking (LPWAN) connection, an Ethernet connection, a power-line communication (PLC) connection, a satellite communication connection, a mobile network connection, a terrestrial microwave network connection, a wireless ad hoc network connection, or any other type of connection via a network. The communication channel may be wired or wireless. In some examples, the communication channel may be via a personal area network, a local area network, a metropolitan area network, a wide area network, a global area network, a space network, or any other type of computer network that may use data connections between network nodes.

At least one processor may establish the communication channel between the physical device and the wearable extended reality appliance. The communication channel may be established before or after the received input. The at least one processor may, in response to the received input, transmit a command associated with the function to the physical device. The command may include data configured to instruct the physical device to execute the function. The command may be transmitted to the physical device via the established communication channel.

Some disclosed embodiments may include virtually displaying a plurality of functions associated with the physical device when the virtual cursor overlays the physical device and enabling user selection of at least one of the plurality of functions for execution. The plurality of functions may be specific to the physical device. For example, a first plurality of functions may be associated with a first physical device, and a second plurality of functions (e.g., different from the first plurality of functions) may be associated with a second physical device. For example, if the physical device is an air conditioner controller, the plurality of functions associated with the physical device may include switching on an air conditioner, switching off an air conditioner, modifying the settings of an air conditioner (e.g., the temperature, the cool mode, the fan mode, the sleep mode, or any other parameter of an air conditioner); or other operations associated with the physical device. As another example, if the physical device is a loudspeaker, the plurality of functions associated with the physical device may include switching on the loudspeaker, switching off the loudspeaker, modifying the settings of the loudspeaker (e.g., the volume, the audio to be played, or any other parameter of the loudspeaker), or other operations associated with the physical device.

At least one processor may cause a display (e.g., via the wearable extended reality appliance) of the plurality of functions associated with the physical device when the virtual cursor overlays the physical device. The at least one processor may enable user selection of at least one of the plurality of functions for execution. For example, a pop-up window listing the plurality of functions may be displayed (e.g., near the physical device) when the virtual cursor overlays (e.g., hovers over) the physical device. The at least one processor may receive user input (e.g., via the surface input device, or via an input device separate from the surface input device) to select, from the plurality of functions, one or more functions for execution.

In some embodiments, the physical surface (e.g., which the second virtual plane may overlie) may be a wall, and the physical device may be an air conditioner controller. Some disclosed embodiments may include turning off the air conditioner controller based on the received input. For example, at least one processor may receive the input from the user. The input from the user may indicate switching off the air conditioner controller. Based on the input from the user, the at least one processor may cause the air conditioner controller to be switched off. For example, the at least one processor may transmit to the air conditioner controller and via a communication channel, an instruction to switch off the air conditioner controller. Based on the instruction, the air conditioner controller may switch off.

In some embodiments, methods, systems, apparatuses, and non-transitory computer-readable media for changing cursor movement between physical surfaces and virtual surfaces are provided. In some embodiments, a user-controlled cursor may be caused to be displayed in an augmented reality environment. The augmented reality environment may include a virtual surface intersecting with a physical surface, which may create a line of intersection between the virtual surface and the physical surface. The intersection of the virtual surface and the physical surface may divide the physical surface into a proximal section closer to a user and a distal section. In some embodiments, while the cursor is displayed over the proximal section of the physical surface, a first input indicative of a user desire to move the cursor over the proximal section of the physical surface may be received. In response to the first input, the cursor may be caused to move over the proximal section of the physical surface. In some embodiments, while the cursor is displayed over the proximal section of the physical surface, a second input indicative of a user desire to move the cursor across the line of intersection may be received. In response to the second input, the cursor may be caused to move to the virtual surface. In some embodiments, while the cursor is displayed over the virtual surface, a third input indicative of a user desire to move the cursor over the virtual surface may be received. In response to the third input, the cursor may be caused to move over the virtual surface. In some embodiments, while the cursor is displayed over the virtual surface, a fourth input indicative of a user desire to move the cursor across the line of intersection may be received. In response to the fourth input, the cursor may be caused to move to the proximal section of the physical surface.

In some embodiments, the line of intersection between the virtual surface and the physical surface may be a curved line, may be a straight line, or may be in any other desired form. In some embodiments, the physical surface may be a desk.

In some embodiments, the physical surface may be a physical surface that a keyboard is placed over. In some embodiments, a movement of the keyboard from the physical surface while the cursor is displayed over the proximal section of the physical surface may cause the cursor to disengage from the physical surface (for example, the cursor may disappear, or may move away from the physical surface). In some embodiments, a movement of the keyboard over the physical surface while the cursor is displayed over the proximal section of the physical surface may cause the cursor to move over the physical surface. In some embodiments, a movement of the keyboard over the physical surface may cause the virtual surface and the line of intersection to move (in some embodiments, in case the cursor is displayed over the virtual surface while the virtual surface moves, the cursor may move with the virtual surface).

In sortie embodiments, the physical surface may be non-flat, may be flat, or may be in any other desired form. In some embodiments, the virtual surface may be associated with a virtual display screen (also referred to as virtual display herein). For example, while displayed over the virtual surface, the cursor may enable interaction with elements in the virtual display screen (such as software products and applications displaying in the virtual display screen).

In some embodiments, while the cursor is displayed over the virtual surface, an indication of a switch to a different mode of operation may be received, and in response to the indication of the switch to the different mode of operation, the cursor may be caused to move to the distal section of the physical surface.

In some embodiments, an indication of a switch to a different mode of operation may be received. After receiving the indication of the switch to the different mode of operation and while the cursor is displayed over the proximal section of the physical surface, a fifth input indicative of a user desire to move the cursor across the line of intersection may be received. In response to the fifth input, the cursor may be caused to move to the distal section of the physical surface.

In some embodiments, while the cursor is displayed over the physical surface, the cursor may enable the user to interact with virtual objects placed on the physical surface in the augmented reality environment.

Some embodiments may relate to enabling cursor control in an extended reality space, including methods, systems, apparatuses, and non-transitory computer-readable media. For example, a non-transitory computer-readable medium is described below, with the understanding that aspects of the non-transitory computer-readable medium may apply equally to methods, systems, and apparatuses. For example, one or more processes embodied in the non-transitory computer-readable medium may be performed as a method, in a system, or in an apparatus. Some aspects of such processes may occur electronically over a network that may be wired, wireless, or both. Other aspects of such processes may occur using non-electronic means. In a broadest sense, the processes are not limited to particular physical and/or electronic instrumentalities, but rather may be accomplished using many differing instrumentalities. For example, some embodiments may include a system, method or apparatus for enabling cursor control in an extended reality space, the system comprising at least one processor configured to perform various processes as described herein.

The non-transitory computer-readable medium may contain instructions that when executed by at least one processor cause the at least one processor to perform various processes as described herein.

The instructions contained in the non-transitory computer-readable medium may include, for example, software instructions, computer programs, computer code, executable instructions, source code, machine instructions, machine language programs, or any other type of directions for a computing device. The instructions contained in the non-transitory computer-readable medium may be based on one or more of various types of desired programming languages, and may include (e.g., embody) various processes for enabling cursor control in an extended reality space as described herein. At least one processor may execute the instructions contained in the non-transitory computer-readable medium to cause various processes to be performed for enabling cursor control in an extended reality space as described herein.

Some embodiments herein may relate to enabling cursor control in an extended reality space (also referred to as an extended reality environment herein) and may include receiving from an image sensor first image data reflecting a first region of focus of a user of a wearable extended reality appliance. In one example, the image sensor may be included in the wearable extended reality appliance. In another example, the image sensor may be external to the wearable extended reality appliance (such as an image sensor included in another wearable device of the user, an image sensor included in a wearable extended reality appliance of another user, an image sensor not included in a wearable device that is positioned in the environment of the user, and so forth). In the context of some disclosed embodiments, the terms region of focus and area of focus may refer to an area around and including a target (e.g., a window, a widget, or cursor) or virtual target (e.g., virtual window, a virtual widget, or a virtual cursor) on which the user's attention is directed. A region of focus may be located within an initial field of view in an extended reality space. A "field of view in an extended reality space" may refer to a user's visual field while operating a wearable extended reality appliance, a field of view of an image sensor included in the wearable extended reality appliance; a field of view of the wearable extended reality appliance (that is, the angular field in which the wearable extended reality appliance may present visual information to the user), and so forth.

In some embodiments, first image data may include an image, a plurality of images, a video or data associated with the initial field of view or the first region of focus. In some embodiments, the first image data may include at least one image of a first physical area corresponding to the initial or first field of view in the extended reality space. In an example, an image of a physical area may be an image of a non-virtual area corresponding to the field of view of the wearable extended reality appliance and may include a digital representations of one or more animate or inanimate objects present in the field of view. The wearable extended reality appliance may receive the first image data from an image sensor. For example, the image sensor may be configured to capture an image of the user's environment. Additionally, or alternatively, a remote server may receive the first image data from the image sensor. Additionally, or alternatively, the input device may receive the first image data from the image sensor. In some embodiments, the image data may be a single image and transmitted in known image formats, such as JPEG, TIFF, PNG, BMP, TGA, PDF, SVG, RAW, or other file formats. In some embodiments, the image data may be a sequence of images and may be transmitted in known file formats, such as, GIF, WebP, APNG, MPEG, AVI, or MNG.

In some embodiments, the first image data captured by the image sensor may include images of at least an eye of the user. As discussed above, the wearable extended reality appliance may receive the first image data from an image sensor. In some embodiments, the image sensor may be configured to capture an image of a user's eye. Thus, the image data may additionally or alternatively include one or more images of one or both eyes of the user. For example, the image sensor may be included in the wearable extended reality appliance and directed to at least one eye of the user. In some embodiments, the image sensor may communicate with at least one processor of a remote server or of the wearable extended reality appliance. The at least one processor may perform image analysis on image data received from the image sensor. In some embodiments, the first image data may include at least one image of an eye of the user looking at the initial or first field of view in the extended reality space, or at the first region of interest.

The first image data may include one or more images of a user's eye or pupil suitable for performing eye tracking calculations. Additionally, or alternatively, the user's eye or pupil may be in a first position or orientation associated with the first region of focus. Alternatively, the at least one processor may be located at the remote server or on the wearable extended reality appliance. Regardless of location, such a processor may be configured to perform computations, such as the eye tracking calculations.

In some embodiments, the first region of focus may be associated with a first virtual object. In some embodiments, the first region of focus may be associated with a first virtual window. A virtual object may be a visual presentation rendered by a computing device. The presentation may take on any form, so as to represent anything animate or inanimate (e.g., people, animals, items, furniture, utensils, icons, widgets, or any other representation depending on design choice). The virtual object may be presented in a virtual window, which may include any frame or designated area in which the virtual object may be represented. The virtual window may be presented within an extended reality space. A user's attention may be directed towards a region (e.g., first region of focus) including and/or surrounding a virtual object and/or a virtual window. In other examples, the virtual object may be the virtual object, may be a virtual display screen (also referred to as virtual display herein) including the virtual window, and so forth. In one example, the virtual window may be associated with an operating system or an application. For example, the virtual window may present virtual content generated by the application or the operating system.

Some embodiments may include causing a first presentation of a virtual cursor in the first region of focus. A virtual cursor may be any indicator or marker used to show the current position for user interaction on a virtual display. The virtual cursor may include any number of visual pointers, symbols, sizes, shapes, colors, or other visual indicators. The virtual cursor may be configured to interact with virtual targets, such as UI elements. The interactions may include, but not limited to, selecting, highlighting, or manipulating the virtual targets. In some examples, the virtual cursor may also be configured to interact with physical objects, for example to enable the user to trigger functionality of the physical object or to present information related to the physical object. The virtual cursor may be presented to the user though one or more sensory indications, for example visual indications or auditory indications. For example, visual indications may include visual pointer, blinking, color changes, size changes, shape changes, symbol changes, animations, or other visual indicators. In some embodiments, the virtual cursor may be placed near an edge of the initial field of view or the first region of focus. Additionally or alternatively, the virtual cursor may be placed where the virtual cursor was last seen by the user, or placed within the initial field of view or the first region of focus. In some embodiments, the virtual cursor may be placed outside the initial field of view or the first region of focus, or placed in the center of the initial field of view or the first region of focus.

In some embodiments, auditory indications associated with a virtual cursor may include sounds, for example, "beeps," "dings," or other notification sounds. Additionally or alternatively, auditory indications may include voice prompts, for example, "the cursor is located near the top left of your field of view," or "the cursor has been moved into your region of focus." Additionally or alternatively, the auditory indications may recognize objects in reality and use those objects as a point of reference, for example, an audio indication for a field of view which includes a coffee cup may guide the user to the cursor though a voice prompt, such as, "the cursor is located near the coffee cup." The user may look for their coffee cup on the table and be able to easily find the cursor. It will be understood that visual and auditory indicators may be used in combination to help the user find the virtual cursor. Additionally or alternatively, the visual or auditory indications may be in response to user behavior or user inputs. In an example, the user may say "Hey, where is my cursor?", move the pointing device in a predetermined or learned motion pattern indicating that the user lost view of the virtual cursor, or move their eye in a predetermined or learned motion pattern indicating that the user lost view of the virtual cursor, causing a sensory indication to trigger.

Figure 48A:
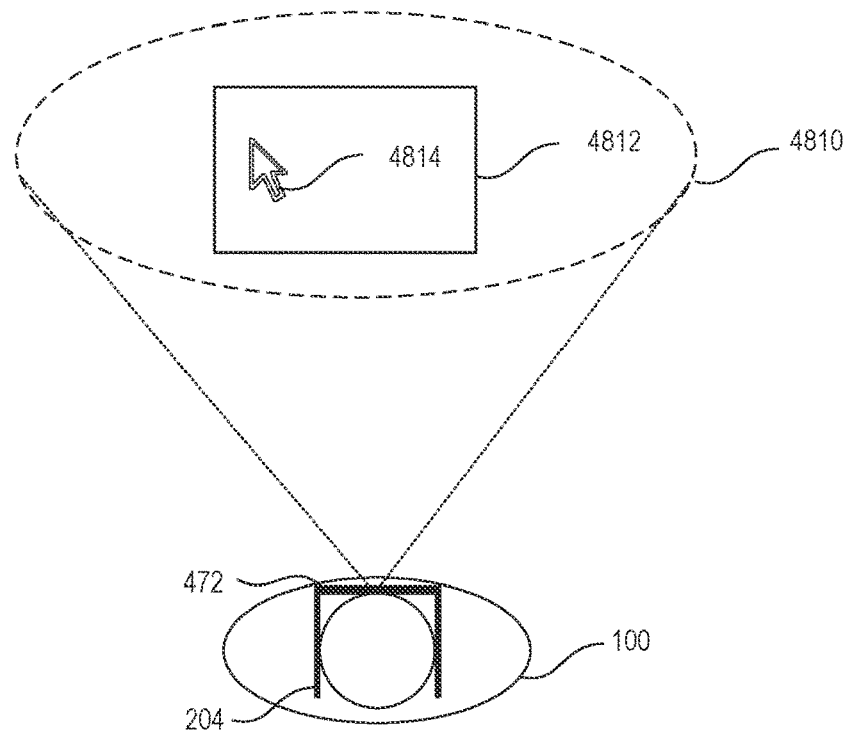
FIG. 48A is an exemplary schematic illustration of a user using an extended reality unit in a first configuration, consistent with some embodiments of the present disclosure.

FIG. 48A is an exemplary illustration of a user using a wearable extended reality appliance in a first configuration. As illustrated in FIG. 48A, user 100 may operate XR unit 204, which includes image sensor 472. In this example, the user 100 may wear XR unit 204 during operation. Field of view 4810 may be a field of view experienced by the user 100 when operating XR unit 204 (for example, the angular range in which the wearable extended reality appliance presents and/or may present visual information to the user). The image sensor 472 may be configured to have a field of view that is substantially similar to a field of view 4810 experienced by the user 100 when operating the XR unit 204. Additionally, or alternatively, image sensor 472 may have field of view wider than the field of view 4810 experienced by the user 100, and the field of view 4810 experienced by the user 100 may be determined, for example based on an analysis of the image data captured using the image sensor 472, based on calibration between the image sensor and a physical display device of the wearable extended reality appliance, and so forth. The field of view 4810 may include a region of focus 4812. The region of focus 4812 may be determined by the image sensor based on an analysis of the image data from the image sensor 472. A virtual cursor 4814 may be displayed within the region of focus 4812, for example via the wearable extended reality appliance.

Some embodiments may involve receiving from the image sensor second image data reflecting a second region of focus of the user outside the initial field of view in the extended reality space. In some embodiments, the second image data may include an image, a plurality of images, a video, or data associated with a second field of view or the second region of focus. The second image data may be received from an image sensor in a manner similar to the first image data. Both the first and second image data may be received from the same sensor(s) or may be received from differing sensors. In some embodiments, the second image data may include at least one image of an eye of the user looking at the second field of view in the extended reality space, or looking at the second region of interest.

In some embodiments, the second image data may include at least one image of a second physical area corresponding to a second field of view in the extended reality space. The initial field of view and the second field of view may have some overlap or no overlap. The first physical area and the second physical area may have some overlap or no overlap. In some embodiments, the first field of view may correspond to a first physical area. The second field of view may correspond to a second physical area. In some embodiments, some portions of the first physical area may also be included in the second physical area. In some embodiments, the first and second physical areas may be completely separate and spaced apart from each other. In some embodiments, the first region of focus may be identical to the initial field of view, and may be fully included in (but need not be identical to) the initial field of view. In some embodiments, the second region of focus of the user may be identical to the second field of view, and may be fully included in (but need not be identical to) the second field of view. In some embodiments, the first image data may be analyzed to identify the initial field of view and/or the first region of focus of the user. In some embodiments, the second image data may be analyzed to identify the second field of view and/or the second region of focus of the user.

Figure 48B:
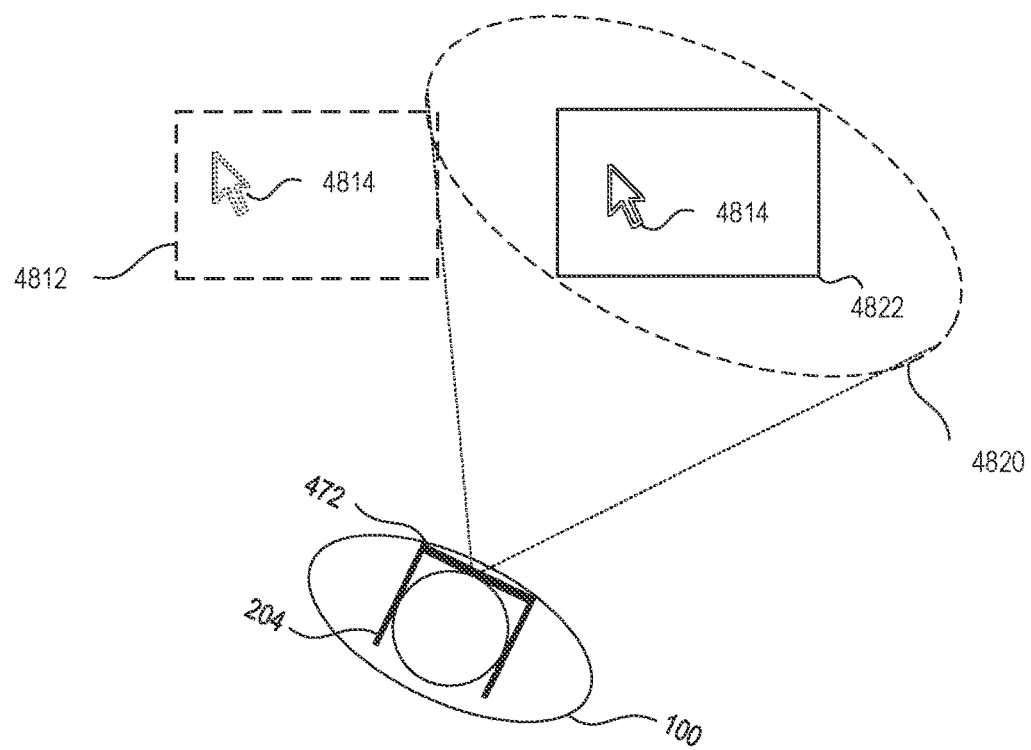
FIG. 48B is an exemplary schematic illustration of a user using an example extended reality unit in a second configuration, consistent with some embodiments of the present disclosure.

An example is shown in FIG. 48B. In the example, User 100 may operate extended reality unit 204, which includes image sensor 472. In this example, the user 100 may wear extended reality unit 204 during operation. Field of view 4820 may be a field of view experienced by the user 100 when operating XR unit 204 (for example, the angular range in which the wearable extended reality appliance presents and/or may present visual information to the user). The image sensor 472 may be configured to have a second field that is substantially similar to a second field of view experienced by the user 100 when operating the extended reality unit 204. Additionally, or alternatively, image sensor 472 may have field of view wider than the field of view 4820 experienced by the user 100, and the second field of view 4820 may be determined, for example based on an analysis of the image data captured using the image sensor 472, based on calibration between the image sensor and a physical display device of the wearable extended reality appliance, and so forth. The field of view 4820 may include a second region of focus 4822. The second region of focus 4822 may be determined by the image sensor based on an analysis of the image data from the image sensor 472. A second presentation of virtual cursor 4824 may display within the second region of focus 4822, for example via the wearable extended reality appliance.

In some embodiments, the second image data captured by the image sensor may include images of at least an eye of the user. The second image data may be obtained in a manner similar to the first image data.

Some embodiments may involve determining a gaze location of the user based on the images. The term gaze location refers to a direction towards which or a point on which the user's attention may be directed. The gaze location of the user may be determined by comparing the first and second image data. The comparison may include computing a vector between a center of the user's pupil and one or more corneal reflections to determine a gaze location. In some embodiments, the first and/or second image data may be used to track eye movement or eye movement patterns to determine at least one of: the gaze location, the initial field of view, the first region of focus, or a user's desire to interact with the virtual cursor. In some embodiments, the images may be used to track eye movement or eye movement patterns to determine at least one of: the second field of view, or the second region of focus. In some embodiments, tracking eye movements or eye movement patterns may include tracking the center of the pupil of a user's eye using infrared/near-infrared non-collimated light to create corneal reflections (CR). In some embodiments, a vector between the pupil center and the corneal reflections may be computed and used to determine the gaze location. In some embodiments, an optical flow between the first and second images may be computed by comparing the first and second images and the optical flow may be used to determine the gaze location. The term optical flow may refer to the pattern of apparent motion of image objects between two consecutive frames caused by the movement of object or camera. It is 2D vector field where each vector is a displacement vector showing the movement of points from first frame to second.

For example, the image sensor may capture a first image including first image data associated with the user's eye in a first position. Then, the image sensor may capture a second image including second image data associated with the user's eye in a second position. The at least one processor may compare the first and second images, to determine a vector between the center of the user's pupil and the user's corneal reflections. The new gaze location may be determined by the computed vector.

In another example, the image sensor may capture a first image including first image data associated with the first field of view of the wearable extended reality appliance and a second image including second image data associated with the second field of view of the wearable extended reality appliance. The at least one processor may compare the first and second images, to determine an optical flow between the first and second images. The new gaze location may be determined by the computed vector.

In some embodiments, the second region of focus may be associated with a second virtual object. For example, the user may change gaze location to another region of focus, which may include a second virtual object different from a first virtual object that may be present in the first region of focus.

Some embodiments may include determining a user intent to interact with the second virtual object based on at least one of the input data and the second image data. The user intent to interact with the second virtual object may be based on at least one of: a change in gaze location to the second virtual object, an amount of time spent gazing at the second virtual object, input data indicating movement of the virtual cursor towards the second virtual object, a region of focus that includes the second virtual object, or a field of view that includes the second virtual object. For example, the user may indicate an intent to interact with a virtual object by changing the gaze location from a first gaze location to virtual object, such as a virtual widget, virtual cursor, and/or a virtual widget. In another example, the user may indicate the intent to interact with a virtual object by gazing at the virtual object, such as a virtual widget, virtual cursor, and/or a virtual widget for a predetermine amount of time. The predetermined amount of time may be 0.1 second, 0.5 second, 1 second, 1.1 seconds, 1.5 seconds, 2 seconds, 5, seconds, 7 seconds, or any other length of time. By way of another example, the user may indicate their intent to interact with a virtual object by moving the virtual cursor towards the second virtual object. In another example, the user may indicate their intent to interact with a virtual object by moving the virtual cursor towards a region of focus that includes the second virtual object. In an example, the user may indicate their intent to interact with a virtual object by moving the virtual cursor towards a field of view that includes the second virtual object.

In some embodiments, the second region of focus may be associated with a second virtual window. For example, the user's attention may be directed towards a region (e.g., second region of focus) including and/or surrounding the second virtual window.

Some embodiments may include analyzing the input data to identify an intention to move the virtual cursor outside a boundary of the first window, and keeping the virtual cursor within the first window until the user intent is identified. The position of the virtual cursor may not be altered until a user intent to move the virtual cursor has been identified. For example, analysis of the input data may show that a user has changed a gaze location from the first virtual window (which may include the virtual cursor) to the second virtual window for less than a predetermined amount of time, indicating that the user does not have an intention to move the virtual cursor outside the boundary of the first window. In this example, the virtual cursor may be displayed in the first window and may not be moved to the second window. In another example, analysis of the input data may show that the user changes a gaze location from the first virtual window (which may include the virtual cursor) to the second virtual window for more than a predetermined amount of time indicating that the user intends to move the virtual cursor outside the boundary of the first window. In this example, the virtual cursor may be deleted or removed from the first window and may be moved to or displayed in the second window.

In some embodiments, identifying the user intent to move the virtual cursor outside the boundary of the first window may be based on predetermined rules associated with motion of the virtual cursor. The predetermined rules may be stored in memory associated with the remote server, the wearable extended reality appliance, or the input device. The predetermined rules may be based on at least one factor such as: acceleration, distance of motion, repeated motion, starting point, or a user's head position differing from the virtual cursor position. The predetermined rules may determine intent by gauging whether one or a combination of the factors occurred, how one or a combination of factors occurred, and/or based on threshold times that once surpassed, reflects an intention to move the virtual cursor. For example, the user may move the pointing device in a motion pattern indicating user intent to move the virtual cursor outside the boundary of the first window. As another example, the user may repeat a movement, such as a back and forth movement of the input device 2, 3, 4, 5, or 6 times within 0.5 seconds, 2, seconds; 3 seconds, 4 seconds, or 5 seconds. Similarly, the user may move their eye in a motion pattern indicating the user intent to move the virtual cursor outside the boundary of the first window. For example, the user may repeat an eye movement, such as a glancing between two or more gaze locations, 2, 3, 4, 5, or 6 times within 0.1 seconds, 0.25, seconds, 0.5 seconds, 0.75 seconds, or 1 seconds. In some embodiments, a motion pattern indicating the user intent to move the virtual cursor outside the boundary of the first window may include deliberate movement of a pointing device. For example, the user may deliberately accelerate the pointing device at 2.0 m/s^2 or greater in a direction. In some embodiments, a motion pattern indicating the user intent to move the virtual cursor outside the boundary of the first window may include movements towards a boundary of the first window. For example, if the boundary first window is defined by a plurality of pixel coordinates, the user may move the virtual cursor within a few pixels of at least one pixel coordinate of the plurality of pixel coordinates, thereby indicating an intent to move the virtual cursor outside the boundary of the first window. In some embodiments, a motion pattern indicating the user intent to move the virtual cursor outside the boundary of the first window may include a user changing gaze locations after a predetermined amount of time. For example, the user may gaze at a location outside the boundary of the first window for 0.2 seconds, 0.5 seconds, 0.8 seconds, or 1 second, to indicate an intent to move the virtual cursor outside the boundary of the first window. In some embodiments, user intent to move the virtual cursor outside the boundary of the first window may include a user changing less than a predetermined number of gaze locations within a predetermined amount of time. For example, the user may repeat an eye movement, such as a back-and-forth movement between 2, 3, 4, 5, or 6 different gaze locations, within 0.5 seconds, 2, seconds, 3 seconds, 4 seconds, or 5 seconds, to indicate an intention to move the virtual cursor outside the boundary of the first window.

Some embodiments may include membrane-like behavior at the boundary of the first window to indicate that the virtual cursor is trying to move outside the boundary of the first window. The term "membrane-like" may mean flexible, elastic, or capable of returning to its original shape like a thin piece of material when deformed. For example, if a user's gaze location or region of focus is directed to the first window, and the virtual cursor, though an unintentional user input, tries to leave the first window though the right window boundary, the virtual cursor may "bounce" or swing left from the right window boundary to the center of the window. In another example, if a user's gaze location or region of focus is directed to the first window, and the virtual cursor, though an unintentional user input, tries to leave the first window though the top window boundary, the virtual cursor may "bounce" or slide down from the top window boundary to a position within the window and near the top window boundary.

Some embodiments may include receiving input data indicative of a desire of the user to interact with the virtual cursor. The input data may be received from a pointing device, such as a mouse, keyboard, or stylus, a voice command, a touch screen, or an eye-tracking device. In some embodiments, the input data may be received from a pointing device connected to the wearable extended reality appliance. In one example, the pointing device may be connected to the wearable extended reality appliance via a computing device. In another example, the pointing device may be connected to the wearable extended reality appliance directly. In one example, the pointing device may be connected to the wearable extended reality appliance wirelessly or by wire. Input data may include at least one of: position, velocity, acceleration, orientation, button press, or wheel scrolling. In some embodiments, input data indicative of a desire of the user to interact with the virtual cursor may include large or rapid movement of a pointing device reflected by high acceleration or velocity values and frequent changes in acceleration or velocity direction. In some embodiments, input data indicative of a desire of the user to interact with the virtual cursor may include virtual cursor movements towards a boundary of the field of view reflected by position data of the input device from the boundary.

Some embodiments may include determining that the user lost view of the virtual cursor based on at least one of the input data or the second image data. Some embodiments may include analyzing the input data to identify a motion pattern indicating that the user lost view of the virtual cursor. Analysis of the input data may indicate that the user has lost view of the virtual cursor. In some embodiments, analysis of the input data may identify a motion pattern based on one or more parameters associated with a movement of an input device. Such parameters may include, for example, a direction of movement, a distance associated with the movement, a speed or acceleration of the movement, a repeated movement, starting point of motion, or other predetermined movements of the input device. In some embodiments, the analysis may identify a motion pattern where a direction of movement of a pointing device is in a direction away from the region of focus, indicating that the user has lost view of the virtual cursor. In some embodiments, a motion pattern indicating that the user lost view of the virtual cursor may include large or rapid movement of a pointing device reflected by high acceleration or velocity values and frequent changes in acceleration or velocity direction. In some embodiments, a motion pattern indicating that the user lost view of the virtual cursor may include movements towards a boundary of the field of view reflected by position data of the input device from the boundary. In some embodiments, a motion pattern indicating that the user lost view of the virtual cursor may include movement of a virtual cursor that is not towards the second region of focus. In some embodiments, the second image data may be analyzed to determine whether the user lost view of the virtual cursor. In some examples, a machine learning model may be trained using training examples to determine whether users lost view of virtual cursors from images and/or videos captured using wearable image sensors used by the users. An example of such training example may include a sample image and/or a sample video using a sample wearable image sensor used by a sample user, together with a label indicating whether the sample user lost the virtual cursor. The trained machine learning model may be used to analyze the second image data and determine whether the user lost view of the virtual cursor. In some examples, the second image data may be indicative of movement of the user head and/or eyes, for example looking for the virtual cursor, and the determination that the user lost view of the virtual cursor may be based on the movement of the user head and/or eyes determined by analyzing the second image data. In some examples, the second image data may include a depiction of a physical object placed in a location that causes it to hide the virtual cursor, the second image data may be analyzed using an object localization algorithm to identify a position of the physical object; and a ray casting algorithm may be used to determine that the location of the physical object causes it to hide the virtual cursor. Further, determining whether the user lost view of the virtual cursor may be based on the determination that the location of the physical object causes it to hide the virtual cursor, alone, together with the motion pattern, or in combination with additional data.

Some embodiments may include changing the first presentation of the virtual cursor in the first region of focus in response to the input data, wherein changing the first presentation may include changing a location of the virtual cursor in the first region of focus. In some embodiments, changing a location of the virtual cursor may include placing the virtual cursor near an edge of the initial field of view or region of focus, placing the virtual cursor where the virtual cursor was last seen by the user, placing the virtual cursor within the initial field of view or region of focus and proximate a location of the virtual cursor outside the initial field of view or region of focus, or placing the virtual cursor in the center of the initial field of view or region of focus. Changes in location may also include placing (e.g., moving or teleporting) the virtual cursor near an edge of the initial field of view or region of focus, placing the virtual cursor where the virtual cursor was last seen by the user, placing the virtual cursor within the initial field of view or region of focus and proximate a location of the virtual cursor outside the initial field of view or region of focus, or placing the virtual cursor in the center of the initial field of view or region of focus. The change in presentation may be in response to input data, for example, input data indicating large accelerations or velocities of a pointing device, a distance between a window boundary and a position of the virtual cursor, or a voice input reflecting a question or command.

Some embodiments may include changing the first presentation of the virtual cursor in the first region of focus in response to the input data, and wherein changing the first presentation may include changing a visual appearance of the virtual cursor. In some embodiments, a visual appearance may include at least one of: size, shape, or color of the visual cursor. In some embodiments, changes in visual appearance may include blinking, color changes, size changes, shape changes, symbol changes, animations, or other visual indicators. In some embodiments, the change in visual appearance may be in response to input data, for example, input data indicating large accelerations or velocities of a pointing device, a distance between a window boundary and a position of the virtual cursor, or a voice input reflecting a question or command.

Some embodiments may include estimating a user's awareness of an actual location of the virtual cursor based on the input data and the second image data. In some embodiments estimating the user's awareness of the actual location of the virtual cursor may include using a statistical model to learn from previous events that the user lost view of the virtual cursor. The statistical model may include regressions, machine learning models, or other predictive or inferential models. The user's awareness may be estimated at various time intervals, for example, every second, every minute, every half-hour, or another suitable time interval. The user's awareness may be estimated based on triggers, for example, changes in gaze location, region of focus, or field of view. Previous events that the user lost the virtual cursor may be determined by motion patterns or user inputs. Data utilized for the statistical models may include: input data including voice inputs, pointing device position, velocity, or acceleration, and image data including images of the fields of view, regions of focus, physical areas, or user's eye movements. For example, a user who is estimated to not be aware of the virtual cursor's actual location may have a field of view, determined by the second image data, which does not include the virtual cursor, as determined by input data including a position of the pointing device. In some embodiments, a high level of user awareness may be associated with a discrepancy between the virtual cursor location and the gaze location of the user when the virtual cursor location is greater than a predetermined distance away from the user's gaze location. When the virtual cursor location is within a predetermined distance from the user's gaze location, no discrepancy may be determined. The predetermined distance may be, for example, 0.5 cm, 1 cm, or 2 cm.

When the estimated user's awareness of the actual location of the virtual cursor is greater than a threshold, some embodiments may include causing a third presentation of the virtual cursor in a manner that follows an intended movement of the virtual cursor. When the virtual cursor location is within a predetermined distance from the user's gaze location, no discrepancy may be determined, and may cause a third presentation of the virtual cursor. The third presentation may be in a manner that follows an intended movement of the virtual cursor. For example, when the virtual cursor is outside the initial field of view or region of focus, and the input data corresponds to movement of the virtual cursor into the initial field of view or region of focus, continue to display the virtual cursor.

When the estimated user's awareness of the actual location of the virtual cursor is below the threshold, some embodiments may include causing the third presentation of the virtual cursor in a manner that does not follow the intended movement of the virtual cursor. When the virtual cursor location is greater than a predetermined distance away from the user's gaze location, a third presentation of the virtual cursor may occur. For example, when the input data corresponds to movement of the virtual cursor away from the initial field of view or region of focus, present the virtual cursor within the field of view or region of focus. The presentation of the virtual cursor may include, for example, placing (e.g., teleporting, or moving) the virtual cursor near an edge of the initial field of view, placing the virtual cursor where the virtual cursor was last seen by the user, placing the virtual cursor within the initial field of view and proximate a location of the virtual cursor outside the initial field of view, or placing the virtual cursor in the center of the initial field of view.

In some examples, when the virtual cursor is outside the current field of view (of the wearable extended reality appliance), if the user input corresponds to movement of the virtual cursor to the current field of view, the virtual cursor may be moved according to the user input (for example, assuming the user knows where the virtual cursor is). In some examples, when the virtual cursor is outside the current field of view, if the user input corresponds to movement of the virtual cursor not in the direction of the current field of view, the virtual cursor may be brought to the current field of view (for example, assuming the user doesn't know where the virtual cursor is). In some examples, when the virtual cursor is outside the current field of view, the virtual cursor may be brought to the current field of view, for example regardless of whether the user input corresponds to movement of the virtual cursor in the direction of the current field of view or not. One non-limiting example of bringing the virtual cursor to the current field of view may include "teleporting" it to the field of view (for example, to a place near an edge of the current field of view where the virtual cursor was last seen, nearest to the previous place of the virtual cursor outside the current field of view, to the center of the current field of view, nearest to an edge of the current field of view in which the current user input will push the virtual cursor deeper into the current field of view or towards the center of the current field of view, and so forth). Another non-limiting example of bringing the virtual cursor to the current field of view may include pulling it towards the current field of view or towards to center of the current field of view.

In some embodiments, estimating a user's awareness of an actual location of the virtual cursor based on the input data and the second image data. The user's awareness may be estimated in a manner similar to that discussed above. When the estimated user's awareness of the actual location of the virtual cursor is greater than a threshold, some embodiments may include causing a third presentation of the virtual cursor in a manner that follows an intended movement of the virtual cursor. The third presentation may be caused in a manner similar to that discussed above.

When the estimated user's awareness of the actual location of the virtual cursor is below the threshold, some embodiments may include causing the third presentation of the virtual cursor in a manner that accounts for the intended movement of the virtual cursor. For example, when the input data corresponds to movement of the virtual cursor away from the initial field of view or region of focus, present the virtual cursor within the field of view or region of focus. The presentation of the virtual cursor may include, for example, placing (e.g., teleporting, or moving) the virtual cursor at a location where the user believes the virtual cursor should be based on the user's movement of the virtual cursor through a pointing device or eye motion.

In some examples, when the user input corresponds to moving a virtual cursor to a particular direction while it is located outside and on the particular direction of a current field of view or of a virtual display screen (i.e., the user input is moving the virtual cursor further away from the current field of view or from the virtual display screen), the virtual cursor may be brought to an extremity (or near to the extremity) of the current field of view or of the virtual display screen at an opposite direction to the particular direction, and in some examples the virtual cursor may be moved to the particular direction from the extremity (for example, bringing the virtual cursor to a left region of the current field of view or of the virtual display screen when the particular direction is right, and moving it to the right as the user input indicates, regardless of the original position of the virtual cursor at the right of the current field of view or of the virtual display screen). In some examples, when the user input corresponds to moving the virtual cursor in a particular direction, the virtual cursor may enter the current field of view or the virtual display screen from the opposite direction to the particular direction, moving in the particular direction (for example, towards the center or a focal region of the current field of view or of the virtual display screen).

Some disclosed embodiments may include causing a second presentation of the virtual cursor in the second region of focus in response to the input data. As discussed above, the second presentation may be made in a manner similar to the first presentation, as discussed above. The presentation may be in response to input data, for example, input data may include the user saying "Hey, where is my cursor?", or moving the pointing device in a predetermined or learned motion pattern indicating that the user lost view of the virtual cursor. The presentation may be made in a manner similar to the first presentation. For example, the virtual cursor may be deleted from the first region of focus and displayed in the second region of focus. In some examples, a location for the second presentation of the virtual cursor in the second region of focus may be selected based on an analysis of the second image data. In some examples, a machine learning model may be trained using training examples to select locations for virtual cursors in an extended reality environment from images and/or videos of the physical environment corresponding to the extended reality environment. An example of such training example may include a sample image and/or a sample video of a sample physical environment corresponding to a sample extended reality environment, together with a label indicating a desired location for a virtual cursor in the sample extended reality environment. The trained machine learning model may be used to analyze the second image data and select a location for the second presentation of the virtual cursor in the second region of focus. In some examples, the second image data may be analyzed using an object detection algorithm to detect a physical object in a subregion of the second region of focus, and as a result the location for the second presentation of the virtual cursor in the second region of focus may be selected in the subregion of the second region of focus. In some examples, the second image data may be analyzed using a motion detection algorithm to detect a physical movement in a subregion of the second region of focus, and as a result the location for the second presentation of the virtual cursor in the second region of focus may be selected away of the subregion of the second region of focus.

In some embodiments, causing the second presentation of the virtual cursor may include removing the virtual cursor from the first region of focus and causing the virtual cursor to appear in the second region of focus. The virtual cursor may be presented to the user though one or more sensory indications, for example visual indications or auditory indications. For example, visual indications may include blinking, color changes, size changes, shape changes, symbol changes, animations, or other visual indicators. In some embodiments, the virtual cursor may be removed from the initial field of view or region of focus. Additionally or alternatively, the virtual cursor may be removed from where the virtual cursor was last seen by the user, or removed from within an initial field of view or region of focus. In some embodiments, the virtual cursor may be removed from outside the initial field of view or region of focus, or removed from the center of the initial field of view or region of focus.

In some embodiments, auditory indications associated with a virtual cursor may include sounds, for example, "beeps," "dings," or other notification sounds. Additionally or alternatively, auditory indications may include voice prompts, for example, "the cursor has been removed from near the top left of your field of view," or "the cursor has been removed from your region of focus".

Some embodiments may include determining a discrepancy between a gaze location and a virtual cursor location based on the second image data. For example, the second image data may be compared with input data associated with the virtual cursor. Based on the comparison, a discrepancy may be determined between the virtual cursor location and the gaze location of the user when the virtual cursor location is greater than a predetermined distance away from the user's gaze location. When the virtual cursor location is within a predetermined distance from the user's gaze location, no discrepancy may be determined. The predetermined distance may be, for example, 0.5 cm, 1 cm, 2 cm, or any other distance.

Some embodiments may include maintaining a virtual spring between the virtual cursor location and the gaze location. The term virtual spring may refer to a linkage that draws a cursor either back to its original location after following a gaze, or draws the cursor toward a gaze location. For example, following a gaze in a particular location which caused the cursor to move to that particular location, the cursor might snap back to its original location, simulating a spring-like motion. A distance offset may be maintained between a user's gaze location and the virtual cursor as the user shifts gaze locations. For example, when a distance between a user's gaze location and the virtual cursor is 10 cm, and then the user shifts their gaze location by 7 cm in a direction, the virtual spring may maintain the distance between the virtual cursor and the new gaze location by moving the virtual cursor by 7 cm in the same direction, thereby following the user's gaze but maintaining the 10 cm separation.

In some embodiments, the operations may include activating the virtual spring to bring the virtual cursor location towards the gaze location upon receiving the input data. For example, if, while the cursor is located in an initial position the user gazes to another location, the cursor might be drawn to that gaze location. In some embodiments, the virtual spring may be activated by the user in any number of ways, for example, pressing a button on an input device, speaking a voice command, shifting the gaze location to an area designated for activating the virtual spring, or other input methods. In some embodiments, the virtual spring may be activated when a certainty level of input data is determined to be above a threshold. The certainty level of input data may be based on a level of interaction. For example, clicking on a button may be deemed to be a high level of interaction, and may be associated with a high certainty level that a user intends to interact with or is interacting with the virtual cursor, which activates the virtual spring. On the other hand, gazing at a virtual object may be indicative of a low level of interaction, and therefore a low level of certainty that the user intends to interact with the virtual cursor. The low level of certainty may not activate the virtual spring.

Some disclosed embodiments may include avoiding activation of the virtual spring when a certainty level of the input data is below a threshold. For example, if a user shifts their gaze location to a virtual object for less than a predetermined amount of time, thereby indicating low certainty level associated with an intent to interact with the virtual object, then the virtual spring may not activate.

Other embodiments may include a method for presenting a virtual cursor in an extended reality space. By way of example, FIG. 49 shows a flowchart illustrating an exemplary process for presenting a virtual cursor in an extended reality space, consistent with some embodiments of the present disclosure. In step 4912, method 4900 may include receiving from an image sensor first image data reflecting a first region of focus of a user of a wearable extended reality appliance. In step 4914, method 4900 may include causing a first presentation of a virtual cursor in the first region of focus. In step 4916, method 4900 may include receiving from the image sensor second image data reflecting a second region of focus of the user outside the initial field of view in the extended reality space. In step 4918 method 4900 may include receiving input data indicative of a desire of the user to interact with the virtual cursor. In step 4920, method 4900 may include causing a second presentation of the virtual cursor in the second region of focus in response to the input data.

Users of a wearable extended reality appliance may have two main ways to control the movement of virtual objects in a three-dimensional virtual space. The first way may involve intraplanar movement, e.g., moving a virtual object to a different location on the same virtual plane. The second way may involve interplanar movement, e.g., moving a virtual object to a different virtual plane. Aspects of this disclosure that follows are directed to dual control functionality for regulating such movement.

Some disclosed embodiments may include moving virtual content between virtual planes in three-dimensional space. Moving virtual content may refer to a change of position, orientation, or rotation of virtual content. Non-limiting examples of movement may include, for example, virtual content displaced by one inch, one foot, one yard, or by any other distance to any direction in the three-dimensional space, virtual content rotated by 1°, 10°, 90°, 180°, 270°, or by any other angle, virtual content translated, or any other similar movement. In one example, the virtual content may include, for example, portrayal, depiction, or rendering of subject matter, matter, material, or substance that may be computer-generated, computerized, simulated, digital, or generated using software instructions. A virtual plane may refer to a flat, level, horizontal, vertical, diagonal, curved, uniform, or any other computer-generated surface on which virtual objects are placed. Some non-limiting examples of a virtual plane may be a horizontal virtual plane, a vertical virtual plane, or a diagonal virtual plane. Three-dimensional space may refer to any space in a coordinate system with an x-axis, a y-axis, and a z-axis. In some examples, the three-dimensional space may be represented with a plurality of XY-planes associated with differing Z values.

Disclosed embodiment may involve using a wearable extended reality appliance to virtually display a plurality of virtual objects. A plurality of virtual objects may refer to one or more virtual displays, virtual items, inanimate virtual objects, animate virtual objects, virtual documents, virtual characters or personas, virtual computer screens, virtual widgets, or one or more other formats for displaying information virtually. For example, in some embodiments, a wearable extended reality appliance (e.g., smart glasses, a headset, etc.) may be used to virtually display an animate virtual object, a virtual computer screen, and a virtual weather widget on a plurality of virtual planes. The plurality of virtual objects may be displayed on a plurality of virtual planes. The plurality of virtual planes may include a first virtual plane and a second virtual plane. In one example, the plurality of virtual planes may include a first virtual plane formed by the x-axis and the y-axis (also known as XY-plane) and associated with a first value of the z-axis and a second virtual plane formed by the x-axis and the y-axis and associated with a second value of the z-axis. A virtual plane may be a flat plane, a curved plane, or any other type of plane. In one example, no indication of the virtual planes may be provided to the user of the wearable extended reality appliance. In another example, visual indications of at least one of the plurality of virtual planes may be presented to the user of the wearable extended reality appliance. In yet another example, visual indication of a virtual plane may be presented to the user of the wearable extended reality appliance at selected times, while no indication of the virtual planes may be provided to the user at other times. For example, the visual indication may be provided when the user moves one or more virtual objects. In some examples, the plurality of virtual planes may include two virtual planes, three virtual planes, more than three virtual planes, more than ten virtual planes, infinite number of virtual planes, or any other number of virtual planes.

In some examples, a virtual plane may include a two-dimensional object or area having length and width. The plane may be flat, curved, or may assume any other shape. A plane may be considered virtual if it is employed in connection with an extended reality display or an extended reality environment, regardless of whether the plane is visible. Specifically, a plane may be displayed in color or with texture so that it may be visible to a wearer of an extended reality appliance, or the plane may be invisible to the eye, but might become perceptible when visible objects are located in the plane. In one example, a virtual plane may be illustrated with virtual grid lines in an extended reality environment. A virtual plane may include, for example, a flat surface, a non-flat surface, a curved surface, or a surface having any other desired configuration. In some examples, a virtual plane may have a particular size, such as 0.5 square meters, 1 square meter, 2 square meters, 5 square meters, 10 square meters, 100 square meters, or any other desired amount of area. In some examples, a virtual plane may extend indefinitely far. A virtual plane may be defined, generated, and/or used by a computing device for various processes as described herein. In some examples, a virtual plane or a portion thereof may be displayed to a user as virtual content by a wearable extended reality appliance. In some examples, a virtual plane may not be displayed to a user of a wearable extended reality appliance, and may be a surface, invisible to the user, by which locations of various objects (physical or virtual) may be measured.

Figure 50A:
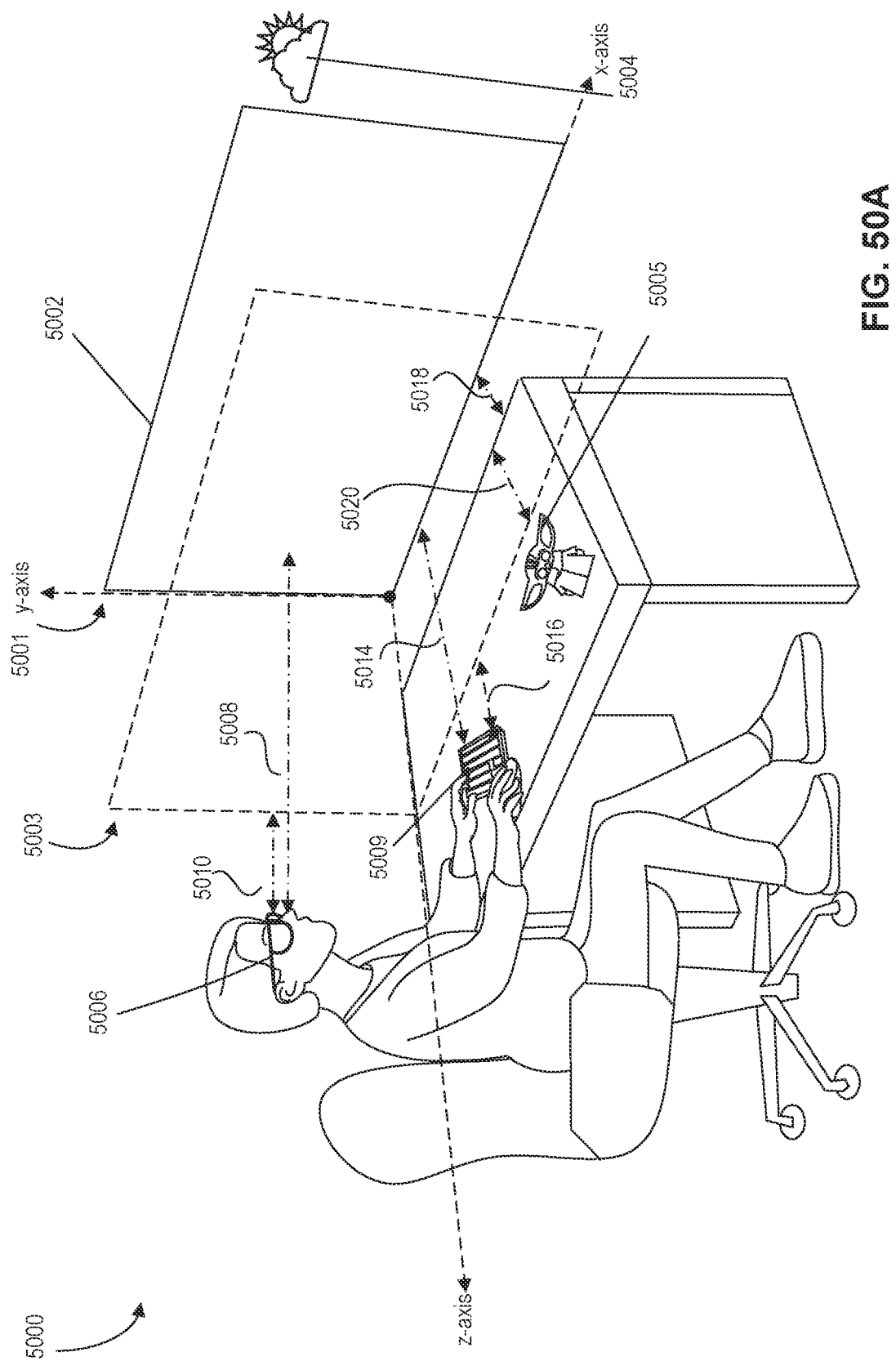
FIG. 50A illustrates an exemplary extended reality display with a wearable extended reality appliance, a plurality of virtual objects, and a plurality of virtual planes, consistent with some embodiments of the present disclosure.

By way of example, FIG. 50A illustrates a scene 5000 in which a wearable extended reality appliance 5006 (e.g., smart glasses, a headset, etc.) virtually displays a plurality of virtual objects on a plurality of virtual planes. As illustrated in FIG. 50A, the plurality of virtual planes may include first virtual plane 5001 and second virtual plane 5003.

In some embodiments, the first virtual plane may be associated with a first distance from the wearable extended reality appliance and the second virtual plane may be associated with a second distance from the wearable extended reality appliance. The distance of a virtual plane from the wearable extended reality appliance may refer to a length, size, space, span, width, or any amount of space between two things. Non-limiting examples may include a distance of one millimeter, one inch, one foot, or any other distance between a virtual plane and a wearable extended reality appliance. In some embodiments, the first distance associated with the first virtual plane may be greater than the second distance associated with the second virtual plane. For example, the first virtual plane and the second virtual plane may be positioned spaced apart from each other. Thus, the first virtual plane may be positioned at a first distance from the wearable extended reality appliance and the second virtual plane may be positioned at a different second distance from the wearable extended reality appliance. In other embodiments, the first distance may be greater than, equal to, or less than the second distance. For example, a first virtual plane formed by the x-axis and the y-axis may be associated with a first distance of three feet from the wearable extended reality appliance. Additionally, a second virtual plane formed by the x-axis and the y-axis different from the first virtual plane may be associated with a second distance of one foot from the wearable extended reality appliance.

By way of example, FIG. 50A illustrates first virtual plane 5001 associated with a first distance 5008 from a wearable extended reality appliance 5006 and second virtual plane 5003 associated with a second distance 5010 from the wearable extended reality appliance 5006. As also illustrated in FIG. 50A, the first distance 5008 associated with first virtual plane 5001 is greater than the second distance 5010 associated with second virtual plane 5003.

In some embodiments, the first virtual plane may be associated with a first distance from a physical input device and the second virtual plane may be associated with a second distance from the physical input device, and the first distance associated with the first virtual plane is greater than the second distance associated with the second virtual plane. A physical input device may include any physical device that may allow a user to provide one or more inputs through manipulation of the physical input device. The disclosed physical input device may be configured to provide the data to a computational device. The data provided to the computational device may be in a digital format and/or in an analog format. Some examples of the physical input device may include a button, a key, a keyboard, a computer mouse, a touchpad, a touchscreen, a joystick, a track ball, or another mechanism from which input may be received. For example, in some embodiments, a user may provide one or more inputs via a physical input device by pressing one or more keys of a keyboard. As another example, a user may provide one or more inputs via a physical input device by changing a position of a joystick by linear or rotational motion of the joystick. By way of another example, a user may provide one or more inputs via a physical input device by performing one or more gestures (e.g., pinch, zoom, swipe, or other finger movements) while touching a touchscreen. As discussed above, a first virtual plane and a second virtual plane may be positioned spaced apart from each other. Thus, the first virtual plane may be positioned at a first distance from a physical input device and the second virtual plane may be positioned at a different second distance from the physical input device. The first distance may be greater than, equal to, or less than the second distance. For example, a first virtual plane formed by the x-axis and the y-axis may be associated with a first distance of three feet from a physical input device (e.g., a keyboard) and the second virtual plane formed by the x-axis and the y-axis different from the first virtual plane may be associated with a second distance of one foot from the physical input device. In some examples, the first distance associated with the first virtual plane of three feet may be greater than the second distance associated with the second virtual plane of one foot. However, in other examples, the first distance associated with the first virtual plane may be less than or equal to the second distance associated with the second virtual plane.

By way of example, FIG. 50A illustrates first virtual plane 5001 associated with a first distance 5014 from a physical input device 5009 (e.g., a keyboard) and second virtual plane 5003 associated with a second distance 5016 from the physical input device 5009. As also illustrated in FIG. 50A, the first distance 5014 associated with first virtual plane 5001 is greater than the second distance 5016 associated with second virtual plane 5003.

In some embodiments the first virtual plane may be associated with a first distance from an edge of a physical surface and the second virtual plane may be associated with a second distance from the edge of the physical surface, and the first distance associated with the first virtual plane is greater than the second distance associated with the second virtual plane. The physical surface may include, for example, an exterior, top, side, external layer, or an outside part or outermost layer of an object. Non-limiting examples of physical surfaces may include a table, a desk, a bed, a floor, a counter, a wall, and any other object having a surface. An edge of a physical surface may refer to a corner, end, fringe, outskirt, rim, or other outside limit of an object, area, or surface. As discussed above, a first virtual plane and a second virtual plane may be positioned spaced apart from each other. Thus, the first virtual plane may be positioned at a first distance from an edge of a physical surface and the second virtual plane may be positioned at a different second distance from the edge of the physical surface. The first distance may be greater than, equal to, or less than the second distance. For example, a first virtual plane formed by the x-axis and the y-axis may be associated with a first distance of two feet from one edge of a desk and the second virtual plane formed by the x-axis and the y-axis different from the first virtual plane may be associated with a second distance of one inch from that edge of the desk. In some examples, the first distance associated with the first virtual plane may be greater than the second distance associated with the second virtual plane. However, in other examples, the first distance associated with the first virtual plane may be less than or equal to the second distance associated with the second virtual plane.

By way of example, FIG. 50A illustrates first virtual plane 5001 associated with a first distance 5016 from a back edge of a desk and second virtual plane 5003 associated with a second distance 5020 from the back edge of the desk. As also illustrated in FIG. 50A, the first distance 5018 associated with first virtual plane 5001 is greater than the second distance 5020 associated with second virtual plane 5003.

In some embodiments, the first virtual plane and the second virtual plane may be surfaces of convex shapes. A convex shape may be any shape that curves outward or where all its parts point outward. For example, a first virtual plane and a second virtual plane may have a same (or different) curvature and may be associated with differing distances from the wearable extended reality appliance, from the input device, or from the edge of the physical surface. In some examples, the virtual planes may be at least a part of a convex shape, at least a part of a convex shape that surrounds a wearable extended reality appliance, or at least any other shape where all its parts point outwards. By way of example, FIG. 50D illustrates a scene 5000 with first virtual plane 5001 and second virtual plane 5003 as surfaces of convex shapes.

In some embodiments, the first virtual plane and the second virtual plane may be surfaces of concentric shapes and the wearable extended reality appliance may be located in a center of the concentric shapes. In another example, the first virtual plane and the second virtual plane may be surfaces of concentric shapes and the physical input device may be located in a center of the concentric shapes. In yet another example, the first virtual plane and the second virtual plane may be surfaces of concentric shapes. Concentric shapes may include circles, arcs, spheres, or other shapes which share the same center wherein the larger often surrounds the smaller. Non-limiting examples of concentric shapes may include concentric circles, concentric spheres, and concentric cylinders. In some embodiments, the disclosed first virtual plane and the disclosed second virtual plane may each be a curved surface. Alternatively, only one of the disclosed first virtual plane and the disclosed second virtual plane may be a curved surface. The first virtual plane and the second virtual plane may be concentric such that a wearable extended reality appliance used to virtually display the first virtual plane and the second virtual plane may be located at a center of the concentric first virtual plane and the concentric second virtual plane. For example, a first virtual plane and a second virtual plane different from the first virtual plane may be parts of surfaces of concentric spheres and the wearable extended reality appliance may be located in a center of the concentric spheres.

By way of example, FIG. 50D illustrates first virtual plane 5001 and second virtual plane 5003. As illustrated in FIG. 50D, first virtual plane 5001 and second virtual plane 5003 may be concentric and the wearable extended reality appliance 5006 may be located at a common center of the concentric first virtual plane 5001 and the concentric second virtual plane 5003.

Some disclosed embodiments may include outputting, for presentation via the wearable extended reality appliance, first display signals reflective of a virtual object at a first location on the first virtual plane. In one example, outputting display signals may include sending a signal to the wearable extended reality appliance from any external device. In another example, outputting display signals may include providing the signal to a subunit of the wearable extended reality appliance, for example by another subunit of the wearable extended reality appliance. For example, a processor or a memory unit included in the wearable extended reality appliance may provide the signal to a see-through display unit. Presentation of a virtual object may include; for example, portraying, depicting, or rendering subject matter, matter, material, or substance that may be computer-generated, computerized, simulated, digital, or generated using software instructions. In one example, at least one processor, associated with the wearable extended reality appliance or with an external device, may be configured to transmit or provide display signals to cause a presentation of text, one or more pictures, a screenshot, a media clip, or other textual or graphical subject matter in an extended reality environment. As mentioned above, the display signals may include, for example, analog or digital electrical signals that may cause the wearable extended reality appliance to present content in the form of a virtual or digital representation. The location of a virtual object on a virtual plane may refer to a place, an orientation, or any way in which an object or content is positioned or arranged in the three-dimensional space. In one example, a wearable extended reality appliance may output for presentation first display signals. The first display signals may represent a virtual display screen (also referred to as a 'virtual display' or a 'virtual screen' herein) positioned at a first location on a first virtual plane, for example, formed by the x-axis and the y-axis. In another example, the first display signals may represent a virtual weather widget displayed on the first virtual plane formed, for example, by the x-axis and the y-axis. In yet another example, the first display signals may represent a virtual animate object displayed on a first virtual plane formed, for example, by the x-axis and the z-axis.

By way of example, FIG. 50A illustrates scene 5000 in which first display signals may cause a display via wearable extended reality appliance 5006 of a virtual object at a first location on first virtual plane 5001. As illustrated in FIG. 50A, first display signals may cause a display via wearable extended reality appliance 5006 of virtual display screen 5002 at a first location on first virtual plane 5001 formed by the x-axis and the y-axis. Also illustrated in FIG. 50A, first display signals may cause a display via wearable extended reality appliance 5006 of virtual object 5004 (e.g., a virtual weather widget) at a location on first virtual plane 5001 formed by the x-axis and the y-axis. Also illustrated in FIG. 50A, first display signals may cause a display via wearable extended reality appliance 5006 of virtual animate object 5005 at a location on a virtual plane formed by the x-axis and the z-axis.

Some disclosed embodiments may include receiving intraplanar input signals for causing the virtual object to move to a second location on the first virtual plane. An input signal may refer to an electrical impulse or radio wave transmitted or received by a computer, processor, wearable extended reality appliance, or other similar electronic device. Intraplanar input signals may refer to input signals related to a virtual plane on which a virtual object is located or positioned. The intraplanar input signals may be determined using image processing, from processing of data obtained from the input device, or from processing of any data captured by any of the sensor of the system. A non-limiting example of intraplanar input signals may include hand movement related to a virtual plane formed by the x-axis and the y-axis when a virtual object is on the virtual plane formed by the x-axis and the y-axis. The hand movements may indicate a desire of the user to move the virtual object to a different location on the same virtual plane. For example, the hand movement may include motion in the x, y and z axes, and based on the type of gesture used being associated with an intraplanar input, the motion in the z axis may be ignored. Another non-limiting example of intraplanar may include cursor movement signals related to a virtual plane formed by the x-axis and the z-axis when the virtual object is on the virtual plane formed by the x-axis and the z-axis. The cursor movements may indicate a desire of the user to move the virtual object to a different location on the same virtual plane. Another non-limiting example of intraplanar input signals may include audio command related to a virtual plane formed by the y-axis and the z-axis when the virtual object is on the virtual plane formed by the y-axis and the z-axis. The audio command may indicate a desire of the user to move the virtual object to a different location on the same virtual plane. Specifically, intraplanar input signals related to a first virtual plane formed by the x-axis and the y-axis may be received for causing animate virtual object 5005 to move to a second location on the first virtual plane. Another example may include receiving intraplanar input signals related to the first virtual plane formed by the x-axis and the y-axis for causing virtual object 5004 (e.g., a virtual weather widget) to move to a different location than its original location on the first virtual plane. In some examples, an input may be associated with a type of input and a three-dimensional direction. When the type of input is associated with an intraplanar input (for example, based on a type of gesture, based on a working mode, etc.), the three-dimensional direction may be interpreted as a two-dimensional direction, for example by ignoring the component of the three-dimensional direction that is orthogonal to the plane. In this example, the second location may be determined based on the first location and the interpretation of the three-dimensional direction as a two-dimensional direction. In some examples, an input may be associated with the virtual object, a type of input and a three-dimensional location. When the type of input is associated with an intraplanar input (for example, based on a type of gesture, based on a working mode, etc.) and the three-dimensional location is outside the first virtual plane, the three-dimensional location may be interpreted as a two-dimensional location on the first virtual plane, for example by projecting the three-dimensional location on the first virtual plane, thereby determining the second location.

Some disclosed embodiments may include causing the wearable extended reality appliance to virtually display an intraplanar movement of the virtual object from the first location to the second location in response to the intraplanar input signals. Intraplanar movement may refer to a movement of a virtual object on the same virtual plane. Non-limiting examples of intraplanar movement may include horizontal intraplanar movement, vertical intraplanar movement, diagonal intraplanar movement, two-dimensional rotational intraplanar movement, movement along an arc, or similar movement of the virtual object on the same virtual plane as it is currently located and/or positioned. For example, a wearable extended reality appliance may receive input signals corresponding to intraplanar movement of the virtual object. In response, the wearable extended reality appliance may virtually display the intraplanar movement including a horizontal translation of an animate virtual object from a first location on a first virtual plane to a second location on the same first virtual plane. In another example, the wearable extended reality appliance may virtually display the intraplanar movement including a vertical translation of a virtual weather widget from a location on the first virtual plane to a different location on the same first virtual plane. In another example, virtually displaying the intraplanar movement of the virtual object from the first location to the second location may comprise causing the virtual object to disappear from the first location and to appear at the second location.

Figure 50B:
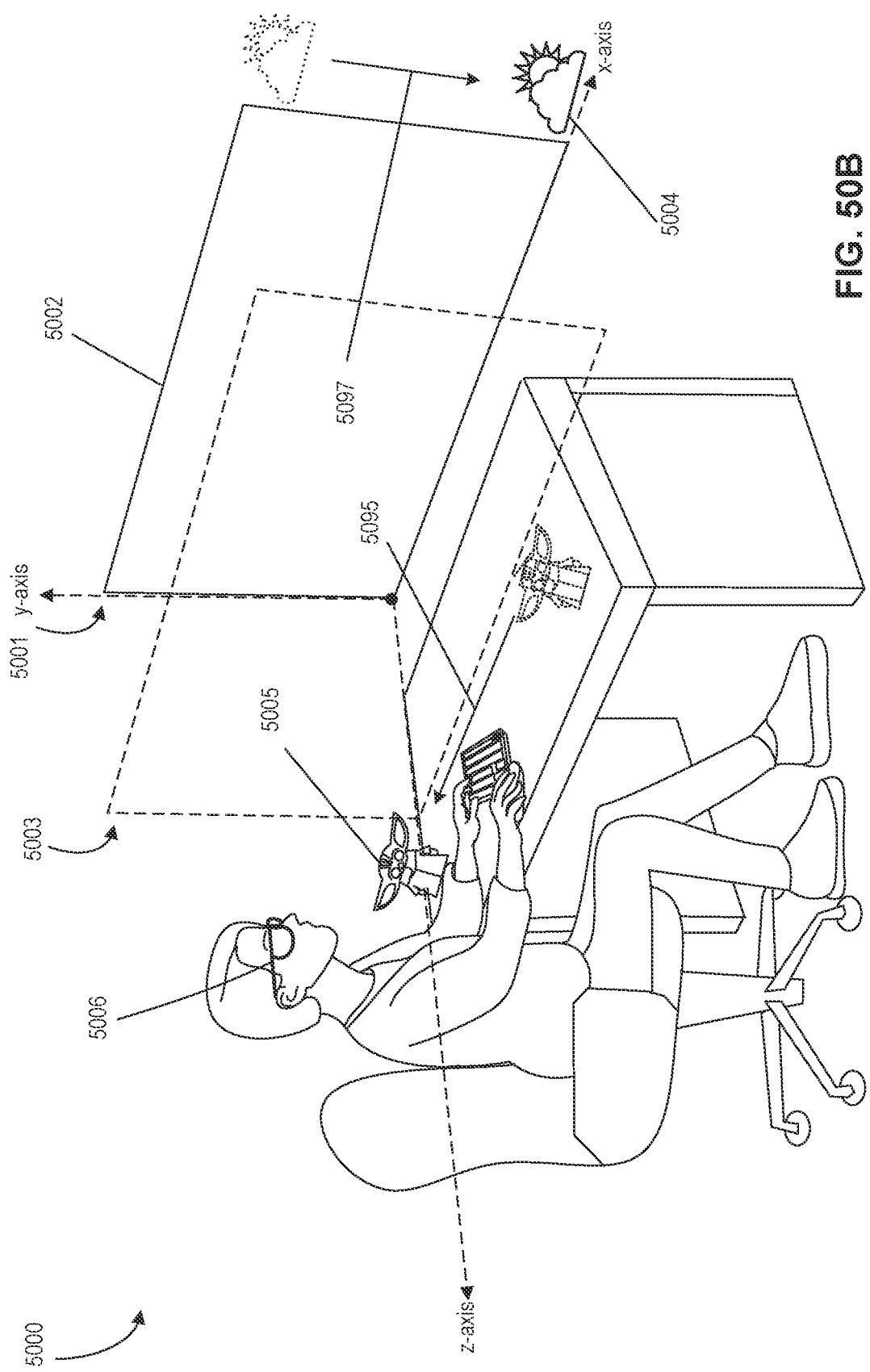
FIG. 50B illustrates an exemplary extended reality display for moving virtual content between virtual planes as intraplanar movement, consistent with some embodiments of the present disclosure.

By way of example, FIG. 50B illustrates a scene 500 in which virtual object 5004 is located on first virtual plane 5001 formed by the x-axis and the y-axis. As illustrated in FIG. 50B, wearable extended reality appliance 5006 may virtually display an intraplanar movement including horizontal translation 5095 of animate virtual object 5004 from a first location to a second location on first virtual plane 5001 in response to intraplanar input signals related to first virtual plane 5001. Also illustrated in FIG. 50B, wearable extended reality appliance 5006 may virtually display an intraplanar movement including vertical translation 5097 of virtual object 5004 (e.g., a virtual weather widget) from a location to a different location on first virtual plane 5001 in response to intraplanar input signals related to first virtual plane 5001.

In one embodiment, the intraplanar movement may involve moving the virtual object along two orthogonal axes, and wherein a movement along a first axis may include changing dimensions of the virtual object, and a movement along a second axis may exclude changing dimensions of the virtual object. This embodiment may happen when the virtual plan is curved. An orthogonal axis may refer to an axis that is at a right angle to one or more other axes. A non-limiting example of an orthogonal axis may include an x, y, and z axis in a three-dimensional space. Changing dimensions may refer to altering or modifying a measurable extent of a virtual object. Non-limiting examples of dimensions may include length, width, depth, height, radius, angular span, or extent. For example, an intraplanar movement in a curved virtual plane may involve a horizontal translation of a virtual object along the x-axis. Further, the intraplanar movement may also involve a vertical translation of the virtual object along the y-axis. In some examples, the intraplanar movement along both the x-axis and the y-axis may change the dimensions of the virtual object. In other examples, the intraplanar movement along both the x-axis and the y-axis may not change the dimensions of the virtual object. In further examples, only one of the intraplanar movements along both the x-axis and the y-axis may change a dimension of the virtual object. For example, intraplanar movement along one axis, for example, the y-axis may cause an increase in the height of an animate virtual object, whereas a movement along another axis, for example, the x-axis may not change the dimensions of the animate virtual object.

By way of example, FIG. 50D illustrates scene 5000 wherein virtual object 5004 moves by horizontal translation 5095 in the form of intraplanar movement along the x-axis. Also illustrated in FIG. 50D, virtual object 5004 moves by vertical translation 5097 in the form of intraplanar movement along the y-axis. As illustrated in FIG. 50D, the intraplanar movement along the y-axis may cause a change in height dimension 5082 of virtual object 5004, whereas a movement along the x-axis may not cause a change in the dimensions of virtual object 5004.

Some disclosed embodiments may further include changing the dimensions of the virtual object based on a curvature of the first virtual plane. A curvature may refer to the degree to which a curved surface deviates from a flat plane. Non-limiting examples of changing dimensions of a virtual object based on a curvature may include increasing the height, width, or depth of the virtual object. In one example, when the curvature of a first virtual plane is equal to a curvature of a reference virtual plane, the virtual object's height or width may be increased by a certain amount, But, when the curvature of the first virtual plane is greater than the curvature of the reference virtual plane, the virtual object's height or width may be increased by more than the certain amount. For example, the height of an animate virtual object may be increased by 110% based on the curvature of 10° of the first virtual plane, and the height of the animate virtual object may be increased by 115% based on the curvature of 12° of the first virtual plane.

Some disclosed embodiments may include receiving interplanar input signals for causing the virtual object to move to a third location on the second virtual plane, while the virtual object is in the second location. Interplanar input signals may refer to input signals not related to a virtual plane on which a virtual object is located or positioned on. The interplanar input signals may be determined using image processing, from processing of data obtained from the input device, or from processing of any data captured by any of the sensor of the system. A non-limiting example of interplanar input signals may include hand movements related to a virtual plane formed by the x-axis and the y-axis when the virtual object is positioned on a different virtual plane formed by the x-axis and the y-axis. The hand movements may indicate a desire of the user to move the virtual object to a different location on the different virtual plane. Another non-limiting example of interplanar input signals may include cursor movements related to a virtual plane formed by the x-axis and the z-axis when the virtual object is on a virtual plane formed by the x-axis and the y-axis. The cursor movements may indicate a desire of the user to move a virtual object to a different location on the different virtual plane. After receiving interplanar input signals, the virtual object may move from a second location on a first virtual plane to a third location on a second virtual plane. For example, an animate virtual object may be on a second location on a virtual plane formed by the x-axis and the y-axis. While the animate virtual object is on the second location, interplanar input signals related to a different virtual plane formed by the x-axis and the y-axis may be received. Once the interplanar input signals are received, the interplanar input signals cause the animate virtual object to move to a third location on the different virtual plane formed by the x-axis and the y-axis. In some examples, an input may be associated with a type of input, for example, a type of gesture, a working mode, and so forth. Further, it may be determined whether the input is associated with an intraplanar input or with an interplanar input based on the type of input.

Some disclosed embodiments may include causing the wearable extended reality appliance to virtually display an interplanar movement of the virtual object from the second location to the third location, in response to the interplanar input signals, Interplanar movement may refer to movement of a virtual object from the plane it is located on to a different virtual plane. A non-limiting example of interplanar movement may include movement from a virtual plane closer to a wearable extended reality appliance to a different virtual plane further away from the wearable extended reality appliance. Another non-limiting example of interplanar movement may include movement from a virtual plane formed by the x-axis and the y-axis to a virtual plane formed by the x-axis and the z-axis. For example, the wearable extended reality appliance may receive input signals corresponding to interplanar movement of the virtual object. In response, the wearable extended reality appliance may virtually display the interplanar movement of the virtual object from a second location on a virtual plane formed by the x-axis and the y-axis to a third location on a different virtual plane formed by the x-axis and the y-axis. The different virtual plane may be associate with a differing Z value than the original virtual plane. Although the two virtual planes discussed above were both formed by the x and y axes, it should be understood that interplanar movement may cause a virtual object to move between planes that may not be necessarily parallel or concentric to each other.

Figure 50C:
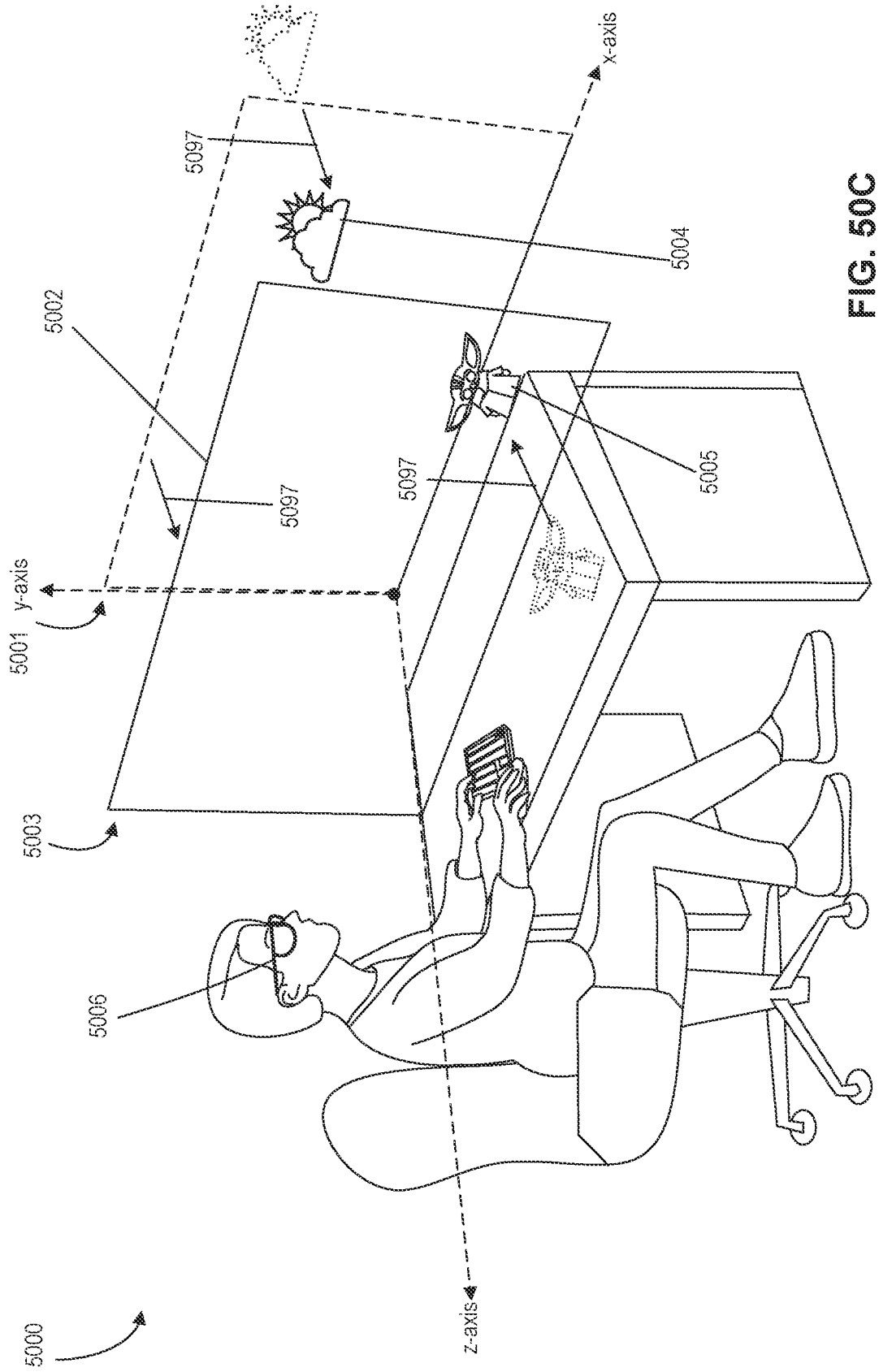
FIG. 50C illustrates an exemplary extended reality display for moving virtual content between virtual planes as interplanar movement, consistent with some embodiments of the present disclosure.

By way of example, FIG. 50C illustrates scene 5000 where virtual display screen 5002 was positioned at a second location on first virtual plane 5001 formed by the x-axis and the y-axis. In response to receiving interplanar input signals corresponding to interplanar movement 5097, wearable extended reality appliance 5006 may virtually display interplanar movement 5097 of virtual display screen 5002 to a third location on second virtual plane 5003 formed by the x-axis and the y-axis. Also illustrated in FIG. 50C is virtual animate object 5005 positioned at a location on a virtual plane formed by the x-axis and the y-axis. Wearable extended reality appliance 5006 may also virtually display interplanar movement 5097 of virtual animate object 5005 to a different location on a different virtual plane formed by the x-axis and the y-axis.

In some embodiments, a first curvature of the first virtual plane may be substantially identical to a second curvature of the second virtual plane, and may further include, in response to the interplanar input signals, modifying a display of the virtual object to reflect a difference between the first distance and the second distance. Substantially identical may refer to greatly, for the most part, essentially, or to a significant extent the same as each other. A first virtual plane's curvature may be identical, substantially identical to, the same, different, substantially different, not similar, or not the same as a second virtual plane's curvature. The first virtual plane may be associated with a first distance from a wearable extended reality appliance. The second virtual plane may be associated with a second distance from the wearable extended reality appliance. When the first virtual plane and the second virtual plane's curvatures are substantially identical, the wearable extended reality appliance may receive interplanar input signals. Further, the wearable extended reality appliance may modify an extended reality display of a virtual object to reflect a difference between the first distance and the second distance. For example, the first curvature of the first virtual plane may be 5° and the first distance may be two feet away from the wearable extended reality appliance. In this example, the second curvature of the second virtual plane may be 4.99° and the second distance may be one foot away from the wearable extended reality appliance. In this example, the curvatures may be substantially identical. In response to interplanar input signals, the wearable extended reality appliance may magnify, shrink, rotate, or otherwise modify the extended reality display of an animate virtual object, a virtual computer screen, and/or a virtual weather widget. This modification may reflect the difference between the first distance of two feet associated with the first virtual plane and the second distance of one foot associated with the second virtual plane.

By way of example, FIG. 50D illustrates a first curvature of 5° of first virtual plane 5001 at first distance 5008 of two feet from wearable extended reality appliance 5006. FIG. 50D also illustrates a second curvature of 4.99° of second virtual plane 5003 at second distance 5010 of four feet from wearable extended reality appliance 5006. In this illustration, the curvatures may be substantially identical. Also illustrated in FIG. 50D, wearable extended reality appliance 5006 may modify an extended reality display of animate virtual object 5004. This modification may reflect a difference between first distance 5008 associated with first virtual plane 5001 and second distance 5010 associated with second virtual plane 5003.

In some embodiments, a first curvature of the first virtual plane may differ from a second curvature of the second virtual plane, and may further include, in response to the interplanar input signals, modifying an extended reality display of the virtual object to reflect a difference between the first distance and the second distance and a difference between the first curvature and the second curvature. A first virtual plane's curvature may be identical, substantially identical to, the same, different, substantially different, not similar, or not the same as a second virtual plane's curvature. The first virtual plane may be associated with a first distance from a wearable extended reality appliance. The second virtual plane may be associated with a second distance from the wearable extended reality appliance. When the first virtual plane and the second virtual plane's curvatures are different, the wearable extended reality appliance may receive interplanar input signals. Further, the wearable extended reality appliance may modify an extended reality display of a virtual object. This modification may reflect a difference between the first distance and the second distance or may reflect a difference between the first curvature and the second curvature. Alternatively, the modification may reflect both or neither differences. For example, the first curvature of the first virtual plane may be 5° and the first distance may be two feet away from the wearable extended reality appliance. In this example, the second curvature of the second virtual plane may be 1° and the second distance may be one foot away from the wearable extended reality appliance. In this example, the curvatures may be different. In response to interplanar input signals, the wearable extended reality appliance may magnify, shrink, rotate, or otherwise modify the extended reality display of an animate virtual object, a virtual computer screen, and/or a virtual weather widget. This modification may reflect the difference between the first distance of two feet associated with the first virtual plane and the second distance of one foot associated with the second virtual plane. Alternatively, the modification may reflect the difference between the first curvature of 5° and the second curvature of 1°. In other examples, the modification may reflect both or neither differences.

In some embodiments, the first virtual plane may be curved and the intraplanar movement of the virtual object from the first location to the second location may involve a three-dimensional movement. A three-dimensional movement may refer to any motion in space which includes movement components in three directions. A first virtual plane may be curved with a curvature and a virtual object may be located at a first location on the first virtual plane. A wearable extended reality appliance may receive intraplanar input signals related to the first virtual plane. The wearable extended reality appliance may cause the virtual object to move by intraplanar movement from the first location to a second location on the first virtual plane. The intraplanar movement may involve three-dimensional movement. Non-limiting examples of three-dimensional movement may include a combination of rotations and/or translations of the virtual object around the x-axis, the y-axis, and the z-axis. For example, a three-dimensional movement in Cartesian coordinates may include a movement or translation along the x-axis, the y-axis, and the z-axis. For example, a first virtual plane may be curved with a curvature of 5° and the intraplanar movement of a translation of a virtual object from the first location to the second location may involve a three-dimensional movement along three directions, for example, along the x, y, and z axes.

In some embodiments, at least one of the intraplanar input signals and the interplanar input signals may be received from a physical device including a touch pad and a plurality of keys. A touch pad may refer to a pad or pointing device or a similar device with a surface that can translate motion and/or position of a user's fingers to a relative position on a virtual object. A key may refer to a button on a panel for operating a computer, laptop, typewriter, telephone, or other similar input device. A plurality of keys refers to more than one key. For example, the press or input of a left-arrow key on a keyboard may indicate intraplanar movement to the left. In another example, the press or input of a right-arrow key on the keyboard may indicate intraplanar movement to the right. For example, a user may drag or move his or her finger from a left side of a touch pad or track pad to a right side of the touch pad or track pad to indicate intraplanar movement to the right. In another example, the user may drag or move his or her finger from the right side of the touch pad or track pad to the left side of the touch pad or track pad to indicate intraplanar movement to the left. For example, the user may drag or move one or more fingers (e.g., two) from a top side of the touch pad or track pad to a bottom side of the touch pad or track pad to indicate interplanar movement from one virtual plane to a different virtual plane closer to the user. Alternatively, the user may drag or move one or more fingers (e.g., two) from the bottom side of the touch pad or track pad to the top side of the touch pad or track pad to indicate interplanar movement from one virtual plane to a different virtual plane further away from the user.

In some embodiments, at least one of the intraplanar input signals and the interplanar input signals may be received from a touchscreen of a smartphone connectable to the wearable extended reality appliance. A touchscreen may refer to a screen that enables a user to interact directly with what is displayed. Connectable may refer to wirelessly and/or physically attachable to a wearable extended reality appliance. A wearable extended reality appliance may receive intraplanar input signals, interplanar input signals, or a combination. The intraplanar input signals and the interplanar input signals may be received from a touchscreen. The touchscreen may be a screen of a smartphone, for example an iPhone. In other examples, the touchscreen may be a screen of a smart tablet, for example an iPad. In some examples, the touchscreen may be connectable to the wearable extended reality appliance. The connection may be physical or wireless. One example of a touchscreen connectable may include the touchscreen physically connected by an auxiliary cord to the wearable extended reality appliance. Another example of a touchscreen connectable may include the touchscreen wirelessly connected via Bluetooth to the wearable extended reality appliance. For example, a user may click on an icon or prompt on the touchscreen indicating intraplanar movement. In another example, the user may use two fingers and slide his or her two fingers from a top side of the touchscreen to the bottom side of the touchscreen indicating interplanar movement.

In some embodiments both the intraplanar input signals and the interplanar input signals may be received from a touch sensor. The discloses may include identifying a first multi-finger interaction as a command for causing intraplanar movement, and identifying a second multi-finger interaction different from the first multi-finger interaction, as a command for causing interplanar movement. A touch sensor may refer to an electronic sensor used in detecting and recording physical touch. Non-limiting examples of touch sensors may include a smartphone screen or a trackpad. A multi-finger interaction may refer to a particular way in which one or more fingers of a user affect an object or sensor. A command may refer to an order, instruction, or direction. The intraplanar input signals and interplanar input signals may be received by a wearable extended reality appliance. The signals may be received from a touch sensor. A user may use one finger or more than one fingers by touching, tapping, sliding, or otherwise making contact with the touch sensor as a command. The user may make one command or more than one command. The more than one command may be the same as or different from the one command. For example, a user may use one finger and tap or click on the touch sensor indicating intraplanar movement. Additionally, the user may use two fingers and tap or click on the touch sensor indicating interplanar movement.

Some disclosed embodiments may further include receiving preliminary input signals for selecting a desired curvature for the first virtual plane, and the intraplanar movement may be determined based on the selected curvature of the first virtual plane. Preliminary input signals may refer to input signals received preceding other events and/or input signals. A wearable extended reality appliance may first receive input signals for a selection of a desired curvature for a first virtual plane. Thereafter, the wearable extended reality appliance may receive additional input signals. These additional input signals may be input signals related to changing the curvature of the first virtual plane or selecting a curvature of a second virtual plane. Alternatively, the additional input signals may be interplanar input signals, intraplanar input signals, or a combination of different input signals. Further, intraplanar movement may be based on the selected curvature of the first virtual plane. For example, when the preliminary input signals indicate a selection of a desired curvature of a first virtual plane, an intraplanar movement will take into account the desired curvature of a first virtual plane. This means, determining a new location of the virtual object based on the desired curvature of a first virtual plane, determining a new orientation of the virtual object based on the desired curvature of a first virtual plane, and/or determining new dimensions of the virtual object based on the desired curvature of a first virtual plane.

In some disclosed embodiments selecting the curvature for the first virtual plane may affect a curvature of the second virtual plane. A non-limiting example of a curvature selection for a first virtual plane affecting a curvature of a second virtual plane may include the curvature of the second virtual plane mirroring or copying the selection of the curvature for the first virtual plane. For example, when a selected curvature for the first virtual plane is 5°, the curvature of a second virtual plane may be changed to or set at 5° as well. In another example of the curvature selection for the first virtual plane affecting the curvature of the second virtual plane may include the curvature of the second virtual plane reduced or increased based on the curvature selection of the first virtual plane. For example, when the selected curvature for the first virtual plane is 5°, the curvature of the second virtual plane may be reduced or set at 2.5°.

Some disclosed embodiments may further include determining that the virtual object is docked to another virtual object, prior to receiving the intraplanar input signals. Additional disclosed embodiments may also include causing the wearable extended reality appliance to display an intraplanar movement of the virtual object and the another virtual object, in response to the intraplanar input signals. Other embodiments may further include causing the wearable extended reality appliance to display an interplanar movement of the virtual object and the another virtual object, in response to the interplanar input signals. Docking may refer to an action of connecting a device or object to another device or object either virtually or physically. Non-limiting examples of docking may include virtually connecting a first virtual object to a second virtual object. Alternatively, docking may include virtually connecting a virtual object to a physical object. For example, a virtual computer screen may be docked to a physical keyboard or docking a virtual computer screen to both a physical keyboard and a physical joystick. For example, a virtual computer screen may be docked to a virtual animate object. Once a determination is made that a virtual object is docked to another virtual object, for example, the wearable extended reality appliance may receive intraplanar input signals. The wearable extended reality appliance may display the intraplanar movement of both the virtual object and the another virtual object. In some embodiments, the wearable extended reality appliance may also or alternatively receive interplanar input signals. The wearable extended reality appliance may display the interplanar movement of both the virtual object and the another virtual object.

Some disclosed embodiments may include receiving input signals indicating that the virtual object is docked to a physical object. Some embodiments may also include identifying a relative movement between the physical object and the wearable extended reality appliance. Additional embodiments may further include determining whether to move the virtual object to a differing virtual plane based on the identified movement. A relative movement between a physical object and a wearable extended reality appliance may include a small displacement or translation or a large displacement or translation. The displacement may be of the physical object in relation to the wearable extended reality appliance. Alternatively, the displacement may be of the wearable extended reality appliance in relation to the physical object. In other examples, the displacement may result from movement of both the wearable extended reality appliance and the physical appliance. Non-limiting examples of determining whether to move a virtual object may include a user or computer setting a threshold or limit. For example, a threshold movement of a physical object may require a displacement. In another example, the threshold movement of the physical object may require a rotation. When the identified movement is not equal to or greater than the threshold movement, the virtual object may not be moved to a differing virtual plane. Alternatively, when the identified movement is greater than the threshold movement, the virtual object may be moved to the differing virtual plane. For example, the wearable extended reality appliance may receive input signals indicating that a virtual display screen is docked to a physical keyboard. A threshold might be set so that the wearable extended reality appliance may determine not to move the virtual display screen based on the displacement of the physical keyboard by less than the threshold amount. In one example, the threshold amount may be on the order of one inch.

Some disclosed embodiments may further include determining relative movement caused by a motion of the physical object. Some embodiments may also include causing the interplanar movement of the virtual object to the differing virtual plane, in response to the determined relative movement. Non-limiting examples of motion may include a rotation, translation, or displacement of a physical or virtual object. A wearable extended reality appliance may determine that a physical keyboard has been displaced by, for example, two feet. This determination may be made by a sensor associated with the wearable extended reality appliance. Further, the wearable extended reality appliance may cause a virtual object to move by interplanar movement from a first virtual plane to a different second virtual plane. For example, a displacement of two feet of the physical keyboard may be determined by the wearable extended reality appliance. A wearable extended reality appliance may determine that a physical keyboard has been displaced by two inches. In response, the wearable extended reality appliance may cause a virtual display screen to move by interplanar movement from the first virtual plane to the different second virtual plane.

Some disclosed embodiments may further include determining the relative movement caused by a motion of the wearable extended reality appliance. Some embodiments may also include preventing the interplanar movement of the virtual object to the differing virtual plane, in response to the determined relative movement. By way of example, a wearable extended reality appliance may determine that a physical keyboard has been displaced. Further, the wearable extended reality appliance may prevent a virtual object to move by interplanar movement from a first virtual plane to a different virtual plane. For example, if a displacement of an item such as a keyboard is below a threshold (e.g. two inches), the wearable extended reality appliance may prevent a virtual display screen from moving by interplanar movement from the first virtual plane to the different second virtual plane.

In some embodiments, input signals indicating that the first virtual plane and the second virtual plane are docked to a physical object may be received. For example, receiving the input signals may include at least one of reading the input signals from memory, receiving the input signals from an external device, receiving the input signals from a user (for example via a user interface, via an input device, via a gesture, via a voice command, etc.), and so forth. In some examples, while the virtual object is at the second location and before receiving the interplanar input signals, a movement of the physical object to a new position may be identified. For example, positioning data captured using a positioning sensor included in the physical object may be analyzed to identify the movement of the physical object. In another example, motion data captured using a motion sensor included in the physical object may be analyzed to identify the movement of the physical object. In yet another example, image data captured using an image sensor included in the wearable extended reality appliance may be analyzed using a visual object tracking algorithm to identify the movement of the physical object. Other examples of identifying motion of physical objects are described above. In some examples, new positions for the first virtual plane and the second virtual plane may be determined based on the new position of the physical object. For example, the positions of the first and second virtual planes may be a function of the position of the physical object. In another example, the first and second virtual planes may be docked to the physical object, and may thereby move with the physical object as described above. In some examples, for example in response to the identified movement of the physical object, the wearable extended reality appliance may be caused to display a movement of the virtual object from the second location on the first virtual plane at an original position of the first virtual plane to the second location on the first virtual plane at the new position of the first virtual plane. Displaying the motion may be similar to the display of motion from the first location to the second location described above. In some examples, the display of the interplanar movement of the virtual object from the second location to the third location may be a display of a movement of the virtual object from the second location on the first virtual plane at the new position of the first virtual plane to the third location on the second virtual plane at the new position of the second virtual plane.

According to another embodiment of the present disclosure, a method for moving virtual content between virtual planes in three-dimensional space may be provided. Consistent with some embodiments, the method may include using a wearable extended reality appliance to virtually display a plurality of virtual objects on a plurality of virtual planes, wherein the plurality of virtual planes may include a first virtual plane and a second virtual plane. The method may further include outputting, for presentation via the wearable extended reality appliance, first display signals reflective of a virtual object at a first location on the first virtual plane. The method may additionally include receiving intraplanar input signals for causing the virtual object to move to a second location on the first virtual plane. The method may include causing the wearable extended reality appliance to virtually display an intraplanar movement of the virtual object from the first location to the second location in response to the intraplanar input signals. The method may include, while the virtual object is in the second location, receiving interplanar input signals for causing the virtual object to move to a third location on the second virtual plane. The method may include, in response to the interplanar input signals, causing the wearable extended reality appliance to virtually display an interplanar movement of the virtual object from the second location to the third location.

FIG. 51 illustrates an exemplary method 5100 for moving virtual content between virtual planes in three-dimensional space. Method 5100 may be performed by one or more processors (e.g. 360, 460, or 560) associated with input unit 202 (see FIG. 3), XR unit 204 (see FIG. 4), and/or remote processing unit 208 (see FIG. 5). The steps of the disclosed method 5100 may be modified in any manner, including by reordering steps and/or inserting or deleting steps. Method 5100 may include a step 5142 of using a wearable extended reality appliance 5006 to virtually display a plurality of virtual objects on a plurality of virtual planes, wherein the plurality of virtual planes includes a first virtual plane 5001 a second virtual plane 5003. Method 5100 may include a step 5144 of outputting, for presentation via a wearable extended reality appliance 5006, first display signals reflective of a virtual object 5004 at a first location on a first virtual plane 5003. Method 5100 may include a step 5146 of receiving intraplanar input signals for causing a virtual object 5004 to move to a second location on a first virtual plane 5001. Method 5100 may include a step 5148 of causing a wearable extended reality appliance 5006 to virtually display an intraplanar movement 5095 of a virtual object 5004 from a first location to a second location in response to the intraplanar input signals. Method 5100 may include a step 5150 of receiving interplanar input for causing a virtual object 5004 to move to a third location on a second virtual plane 5003. Method 5100 may include a step 5152 of, in response to interplanar input signals, causing the wearable extended reality appliance 5006 to virtually display interplanar movement 5097 of a virtual object 5004 from a second location to a third location.

Figure 52:
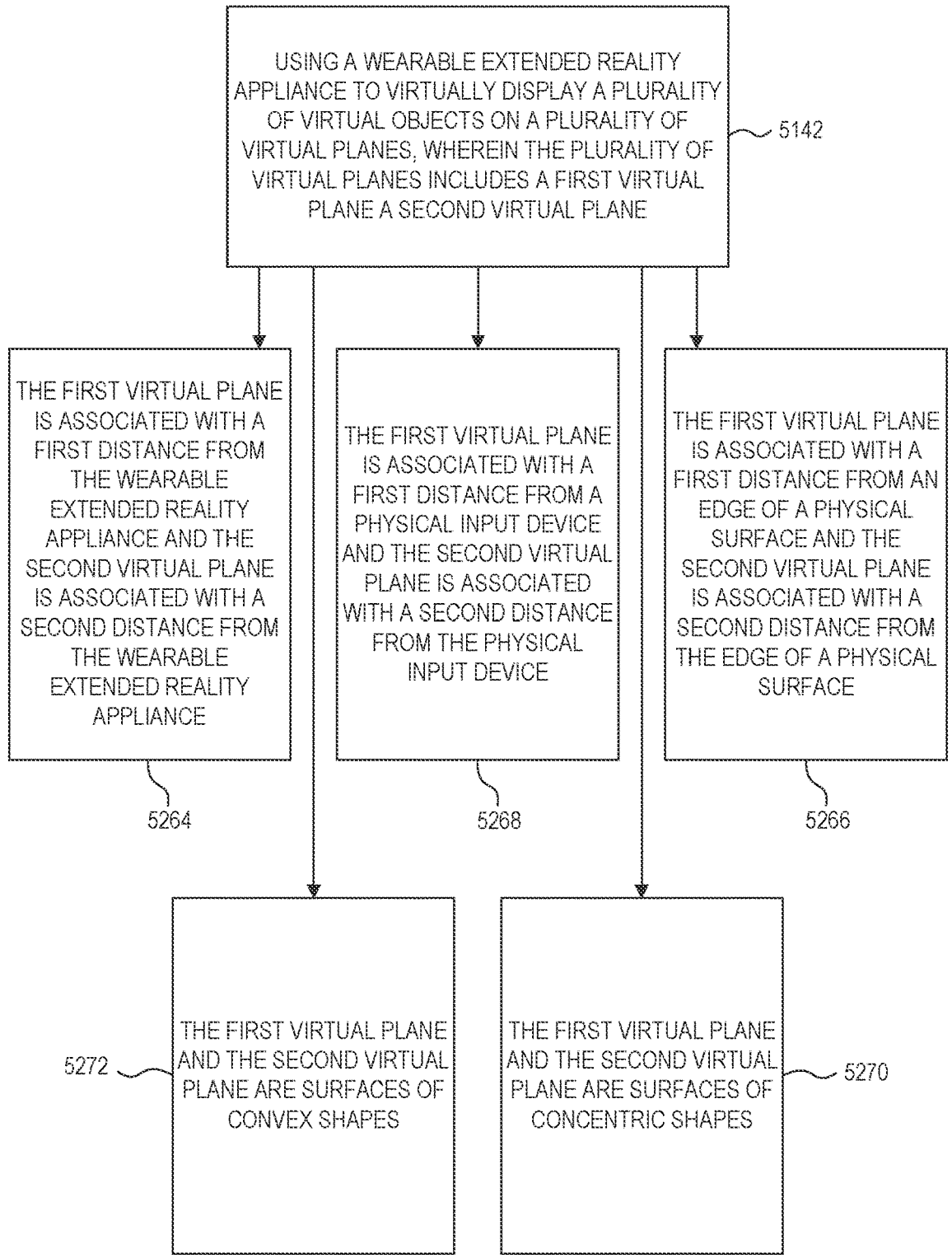
FIG. 52 is a block diagram illustrating an exemplary method wherein a first virtual plane is associated with a first distance and a second virtual plane is associated with a second distance, consistent with some embodiments of the present disclosure.

FIG. 52 illustrates an exemplary method 5200 wherein a first virtual plane is associated with a first distance and a second virtual plane is associated with a second distance. Method 5200 may include step 5264 where the first virtual plane may be associated with a first distance from the wearable extended reality appliance and the second virtual plane may be associated with a second distance from the wearable extended reality appliance, and the first distance associated with the first virtual plane is greater than the second distance associated with the second virtual plane. Alternatively, method 5200 may include step of 5268 where the first virtual plane may be associated with a first distance from a physical input device and the second virtual plane may be associated with a second distance from the physical input device, and the first distance associated with the first virtual plane is greater than the second distance associated with the second virtual plane. Alternatively, method 5200 may include step 5266 where the first virtual plane may be associated with a first distance from an edge of a physical surface and the second virtual plane may be associated with a second distance from the edge of the physical surface, and the first distance associated with the first virtual plane is greater than the second distance associated with the second virtual plane. Method 5200 may include step 5272 where the first virtual plane and the second virtual plane may be surfaces of convex shapes. Method 5200 may include step 5270 where the first virtual plane and the second virtual plane may be surfaces of concentric shapes and the wearable extended reality appliance may be located in a center of the concentric shapes.

Figure 53:
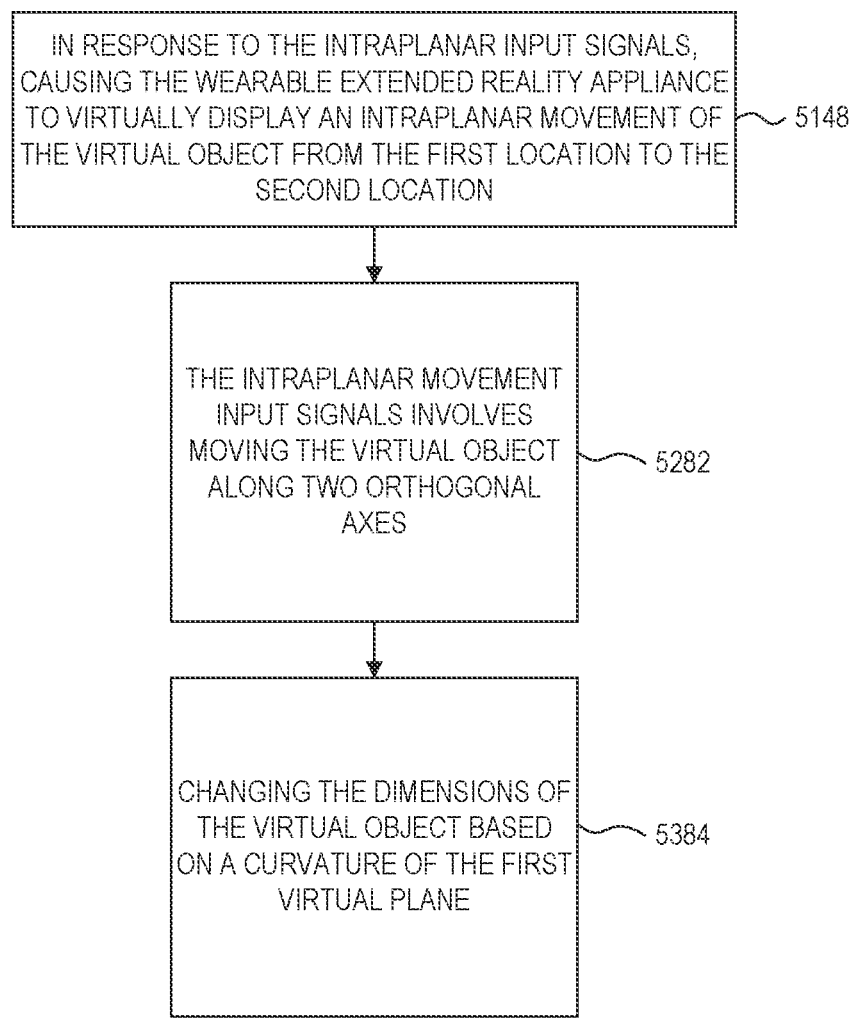
FIG. 53 is a block diagram illustrating an exemplary method, consistent with some embodiments of the present disclosure.

FIG. 53 illustrates an exemplary method 5300. Method 5300 may include step 5382 where the intraplanar movement may involve moving the virtual object along two orthogonal axes. Further, method 5300 may include step 5384 where a movement along a first axis may include changing dimensions of the virtual object, and a movement along a second axis may exclude changing dimensions of the virtual object.

Figure 54:
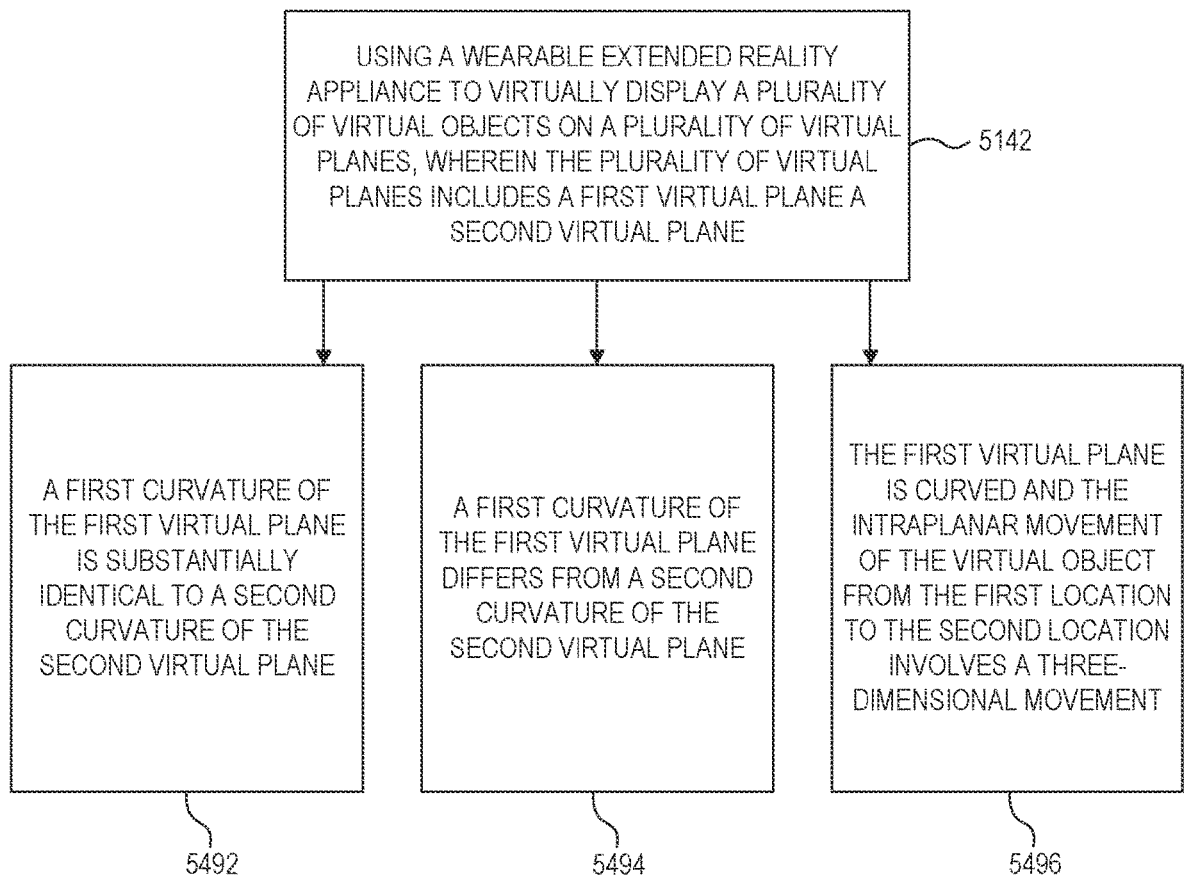
FIG. 54 is a block diagram illustrating an exemplary method wherein a first virtual plane and a second virtual plane is curved, consistent with some embodiments of the present disclosure.

FIG. 54 illustrates an exemplary method 5400 wherein a first virtual plane and a second virtual plane is curved. Method 5400 may include step 5492 where a first curvature of the first virtual plane may be substantially identical to a second curvature of the second virtual plane, and may further include, in response to the interplanar input signals, modifying a display of the virtual object to reflect a difference between the first distance and the second distance. Alternatively, method 5400 may include step 5494 where a first curvature of the first virtual plane may differ from a second curvature of the second virtual plane, and may further include, in response to the interplanar input signals, modifying an extended reality display of the virtual object to reflect a difference between the first distance and the second distance and a difference between the first curvature and the second curvature. Method 5400 may include step 5496 where the first virtual plane may be curved and the intraplanar movement of the virtual object from the first location to the second location may involve a three-dimensional movement.

Figure 55:
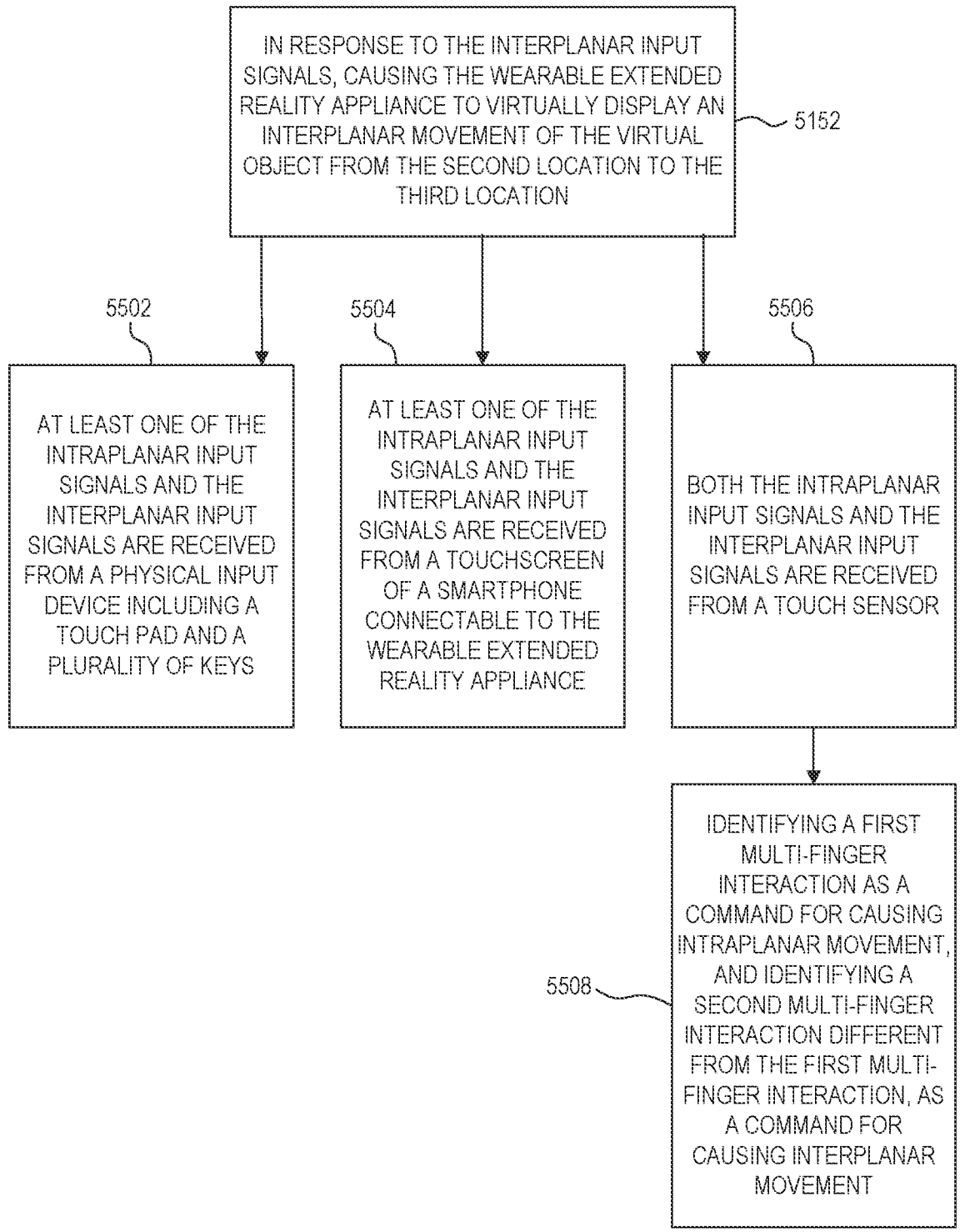
FIG. 55 is a block diagram illustrating an exemplary method wherein at least one of the intraplanar input signals and the interplanar input signals are received from an input device, consistent with some embodiments of the present disclosure.

FIG. 55 illustrates an exemplary method 5500 wherein at least one of the intraplanar input signals and the interplanar input signals are received from an input device. Method 5500 may include step 5502 where at least one of the intraplanar input signals and the interplanar input signals may be received from a physical device including a touch pad and a plurality of keys. Method 5500 may include step 5504 where at least one of the intraplanar input signals and the interplanar input signals may be received from a touchscreen of a smartphone connectable to the wearable extended reality appliance. Method 5500 may include step 5506 where both the intraplanar input signals and the interplanar input signals may be received from a touch sensor. Further, method 5500 may include step 5508 of identifying a first multi-finger interaction as a command for causing intraplanar movement, and identifying a second multi-finger interaction different from the first multi-finger interaction, as a command for causing interplanar movement.

Figure 56:
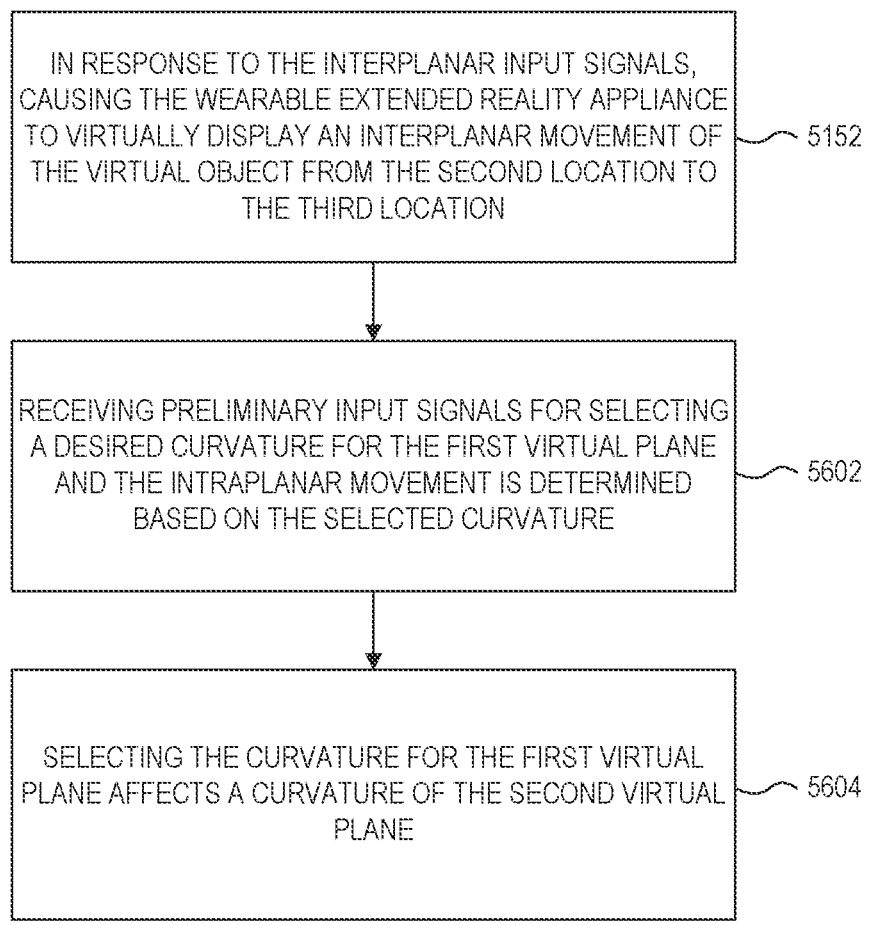
FIG. 56 is a block diagram illustrating an exemplary method for receiving preliminary input signals, consistent with some embodiments of the present disclosure.

FIG. 56 illustrates an exemplary method 5600 for receiving preliminary input signals. Method 5600 may include step 5602 of receiving preliminary input signals for selecting a desired curvature for the first virtual plane, and the intraplanar movement may be determined based on the selected curvature of the first virtual plane. Method 5600 may include step 5604 of selecting the curvature for the first virtual plane affects a curvature of the second virtual plane.

Figure 57:
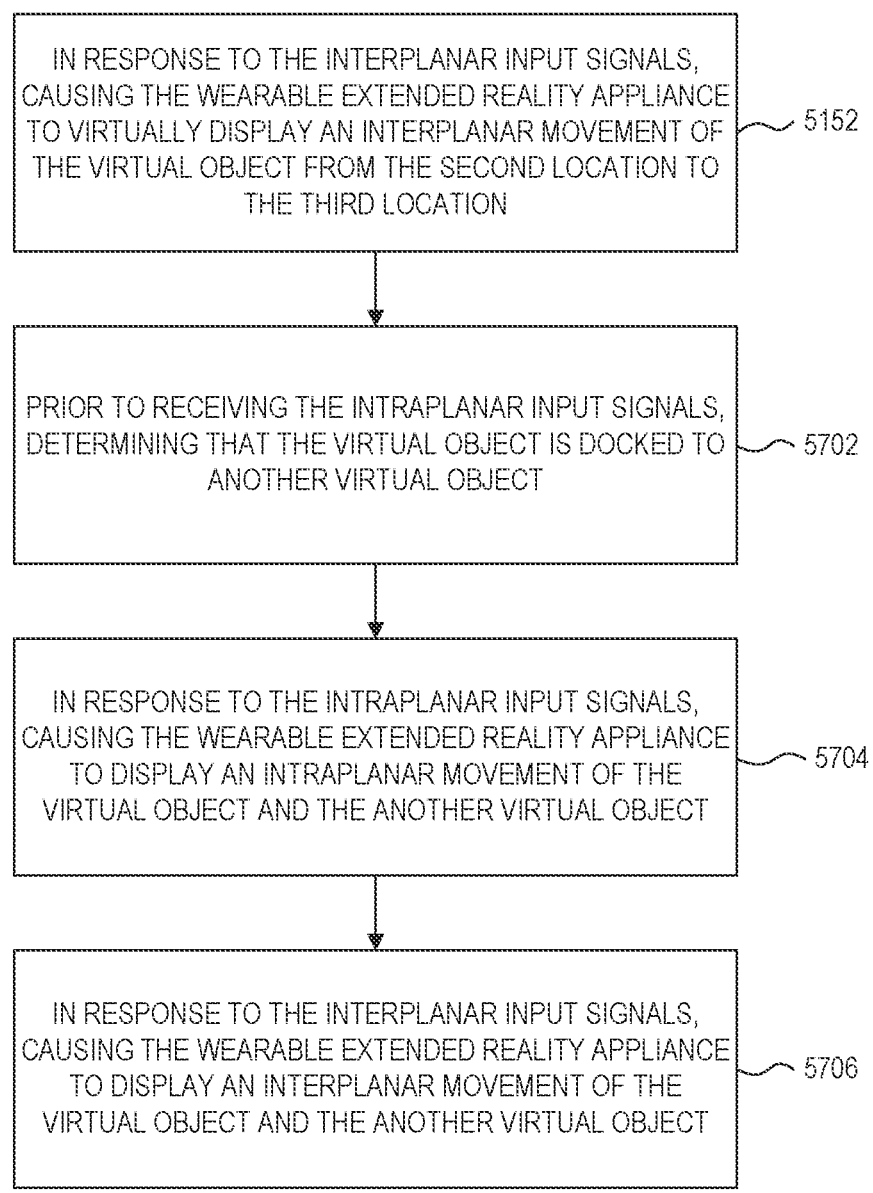
FIG. 57 is a block diagram illustrating an exemplary method for determining whether a virtual object is docked to another virtual object, consistent with some embodiments of the present disclosure.

FIG. 57 illustrates an exemplary method 57000 determining whether a virtual object is docked to another virtual object. Method 57000 may include step 5702 of, prior to receiving the intraplanar input signals, determining that the virtual object is docked to another virtual object. Further, method 57000 may include step 5704 of, in response to the intraplanar input signals, causing the wearable extended reality appliance to display an intraplanar movement of the virtual object and the another virtual object. Further, method 57000 may include step 5706 of, in response to the interplanar input signals, causing the wearable extended reality appliance to display an interplanar movement of the virtual object and the another virtual object.

Figure 58:
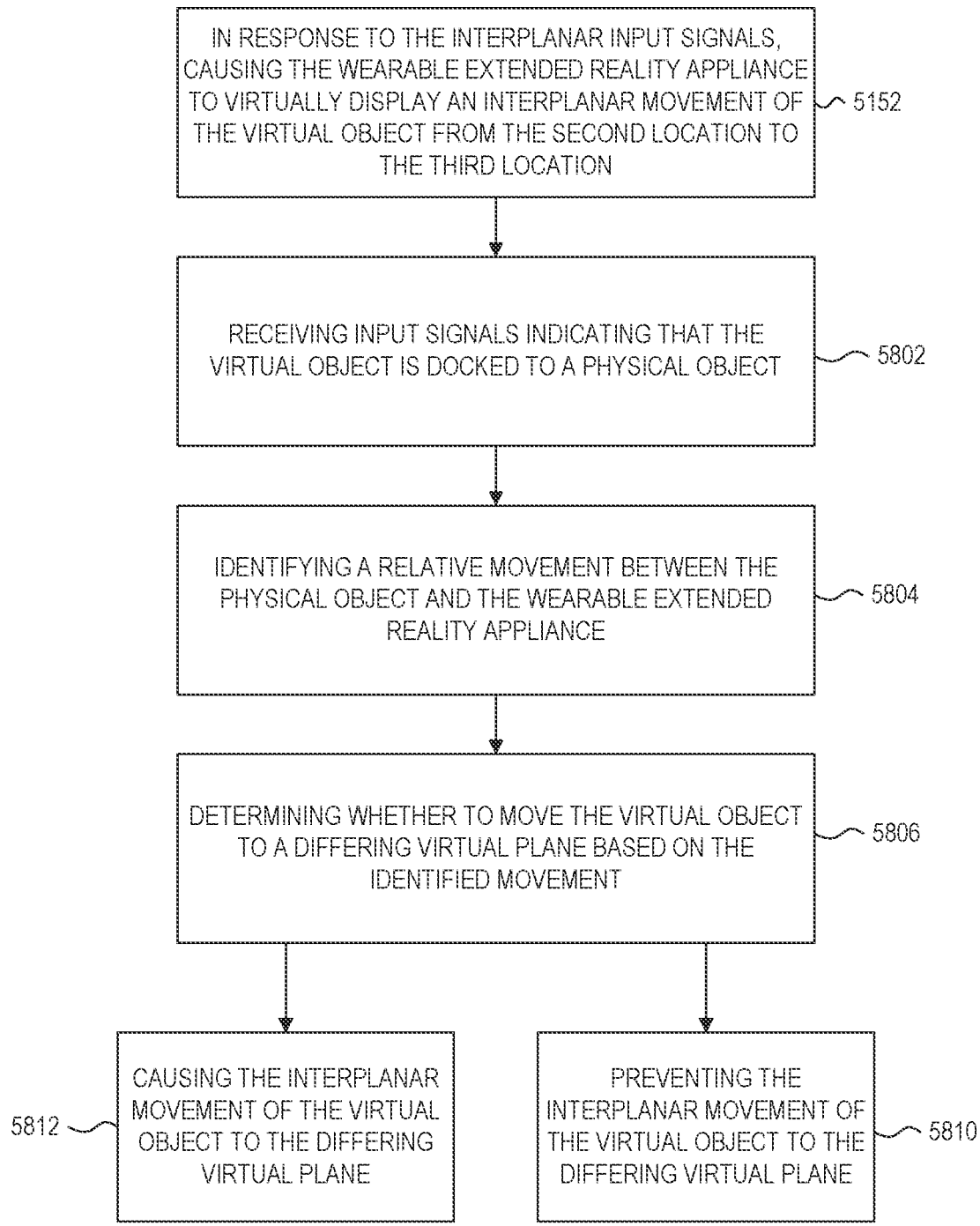
FIG. 58 is a block diagram illustrating an exemplary method for receiving input signals indicating that a virtual object is docked to a physical object, consistent with some embodiments of the present disclosure.

FIG. 58 illustrates an exemplary method 5800 receiving input signals indicating that a virtual object is docked to a physical object. Method 5800 may include step 5802 of receiving input signals indicating that the virtual object is docked to a physical object. Further, method 5800 may include step 5804 of identifying a relative movement between the physical object and the wearable extended reality appliance. Further, method 5800 may include step 5806 of determining whether to move the virtual object to a differing virtual plane based on the identified movement. Method 5800 may include step 5810 of preventing the interplanar movement of the virtual object to the differing virtual plane. Alternatively, method 5800 may include step 5812 of causing the interplanar movement of the virtual object to the differing virtual plane.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HM or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet. The computing system can include clients and servers. A client and server are generally remote from each other and typically interact through a communication network. The relationship of client and server arises by virtue of computer programs running on the respective computers and having a client-server relationship to each other.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above-described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above-described modules/units can be combined as one module or unit, and each of the above-described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof. And other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

The invention claimed is:

1. A non-transitory computer readable medium containing instructions that when executed by at least one processor cause the at least one processor to perform operations for moving a virtual cursor along two intersecting virtual planes, the operations comprising:

generating a display via a wearable extended reality appliance, the display including a virtual cursor and plurality of virtual objects located on a first virtual plane that intersects a second virtual plane overlying a physical surface;

while the virtual cursor is displayed on the first virtual plane, receiving a first two-dimensional input via a surface input device, wherein the first two-dimensional input is reflective of an intent to select a first virtual object located on the first virtual plane;

in response to the first two-dimensional input, causing a first cursor movement toward the first virtual object, the first cursor movement being along the first virtual plane at a first pace;

while the virtual cursor is displayed on the first virtual plane, receiving a second two-dimensional input via the surface input device, wherein the second two-dimensional input is reflective of an intent to select a second virtual object that appears on the physical surface; and in response to the second two-dimensional input, causing a second cursor movement toward the second virtual object, the second cursor movement including a partial movement along the first virtual plane and a partial movement along the second virtual plane, wherein the movement along the second virtual plane is at a second pace, and the second pace differs from the first pace.

2. The non-transitory computer readable medium of claim 1, wherein the second two-dimensional input via the surface input device includes movement in a single direction and wherein the second cursor movement includes movement of the virtual cursor in two directions.

3. The non-transitory computer readable medium of claim 1, wherein the first virtual plane is curved, and the second virtual plane is flat.

4. The non-transitory computer readable medium of claim 1, wherein dimensions of the second virtual plane correspond with dimensions of the physical surface.

5. The non-transitory computer readable medium of claim 4, wherein the physical surface is a desk, and the operations further include preventing the virtual cursor from moving beyond at least one desk edge.

6. The non-transitory computer readable medium of claim 4, wherein the physical surface is a desk, and the operations further include detecting a keyboard placed on the desk, identifying a disengagement of the keyboard from the desk, and causing the virtual cursor to return to the first virtual plane.

7. The non-transitory computer readable medium of claim 1, wherein while the virtual cursor is displayed on the second virtual plane, the operations further include detecting that attention of a user of the wearable extended reality appliance shifted from the second virtual plane to the first virtual plane, and automatically causing the virtual cursor to return to the first virtual plane.

8. The non-transitory computer readable medium of claim 7, wherein detecting that the attention of the user of the wearable extended reality appliance shifted from the second virtual plane to the first virtual plane is based on input from a sensor located in the wearable extended reality appliance.

9. The non-transitory computer readable medium of claim 7, wherein detecting that the attention of the user of the wearable extended reality appliance shifted from the second virtual plane to the first virtual plane is based on input from an input device associated with the surface input device.

10. The non-transitory computer readable medium of claim 1, wherein the surface input device includes a pointing device or a touch sensor device.

11. The non-transitory computer readable medium of claim 1, wherein the first cursor movement is rendered from a first perspective and in the partial movement along the second virtual plane the virtual cursor is re-rendered from a second perspective different from the first perspective.

12. The non-transitory computer readable medium of claim 11, wherein the operations further include issuing a notice when a perspective of the virtual cursor changes from the first perspective to the second perspective and when a perspective of the virtual cursor changes from the second perspective to the first perspective.

13. The non-transitory computer readable medium of claim 12, wherein the notice includes at least one of a visual notification, an audible notification, or a tactile notification.

14. The non-transitory computer readable medium of claim 1, wherein the operations further include:
while the virtual cursor is displayed on the second virtual plane, receiving a third two-dimensional input via the surface input device, wherein the third two-dimensional input is reflective of an intent to move the virtual cursor back to the first virtual plane; and
in response to the third two-dimensional input, causing a third cursor movement, the third cursor movement including a cursor movement along the second virtual plane and a cursor movement along the first virtual plane.

15. The non-transitory computer readable medium of claim 1, wherein the operations further include:
while the virtual cursor is displayed on the second virtual plane, receiving a third two-dimensional input via the surface input device, wherein the third two-dimensional input is reflective of an intent to select a third virtual object located on a third virtual plane corresponding to another physical surface; and
in response to the third two-dimensional input, causing a third cursor movement, the third cursor movement including a cursor movement along the second virtual plane and a cursor movement along the third virtual plane.

16. The non-transitory computer readable medium of claim 1, wherein the operations further include:
while the virtual cursor is displayed on the second virtual plane, receiving a third two-dimensional input via the surface input device, wherein the third two-dimensional input is reflective of an intent to interact with a physical device located on the physical surface;
in response to the third two-dimensional input, causing the virtual cursor to overlay the physical device;
receiving input from a user of the wearable extended reality appliance; and
upon receiving the input, causing the physical device to execute a function.

17. The non-transitory computer readable medium of claim 16, wherein the operations further include establishing a communication channel between the physical device and the wearable extended reality appliance, and upon receiving the input, transmitting a command associated with the function to the physical device.

18. The non-transitory computer readable medium of claim 16, wherein the operations further include virtually displaying a plurality of functions associated with the physical device when the virtual cursor overlays the physical device and enabling user selection of at least one of the plurality of functions for execution.

19. The non-transitory computer readable medium of claim 1, wherein the second pace is selected based on a type of the physical surface.

20. A method for moving a virtual cursor along two traversing intersecting virtual planes, the method comprising:
generating a display via a wearable extended reality appliance, the display including a virtual cursor and plurality of virtual objects located on a first virtual plane that traverses intersects a second virtual plane overlying a physical surface;
while the virtual cursor is displayed on the first virtual plane, receiving a first two-dimensional input via a surface input device, wherein the first two-dimensional input is reflective of an intent to select a first virtual object located on the first virtual plane;
in response to the first two-dimensional input, causing a first cursor movement toward the first virtual object, the first cursor movement being along the first virtual plane at a first pace;
while the virtual cursor is displayed on the first virtual plane, receiving a second two-dimensional input via the surface input device, wherein the second two-dimensional input is reflective of an intent to select a second virtual object that appears on the physical surface; and
in response to the second two-dimensional input, causing a second cursor movement toward the second virtual object, the second cursor movement including a partial movement along the first virtual plane and a partial movement along the second virtual plane, wherein the movement along the second virtual plane is at a second pace, and the second pace differs from the first pace.

21. A system for moving a virtual cursor along two traversing intersecting virtual planes, the system comprising:
- at least one processor configured to:
    - generate a display via a wearable extended reality appliance, the display including a virtual cursor and plurality of virtual objects located on a first virtual plane that traverses intersects a second virtual plane overlying a physical surface;
    - while the virtual cursor is displayed on the first virtual plane, receive a first two-dimensional input via a surface input device, wherein the first two-dimensional input is reflective of an intent to select a first virtual object located on the first virtual plane;
    - in response to the first two-dimensional input, cause a first cursor movement toward the first virtual object, the first cursor movement being along the first virtual plane at a first pace;
    - while the virtual cursor is displayed on the first virtual plane, receive a second two-dimensional input via the surface input device, wherein the second two-dimensional input is reflective of an intent to select a second virtual object that appears on the physical surface; and
    - in response to the second two-dimensional input, cause a second cursor movement toward the second virtual object, the second cursor movement including a partial movement along the first virtual plane and a partial movement along the second virtual plane, wherein the movement along the second virtual plane is at a second pace, and the second pace differs from the first pace.

* * * * *